J. H. & G. W. LORIMER.
G. W. LORIMER, ADMINISTRATOR OF J. H. LORIMER, DEC'D.
AUTOMATIC EXCHANGE.
APPLICATION FILED APR. 24, 1900.
1,187,634.
Patented June 20, 1916.
24 SHEETS—SHEET 7.
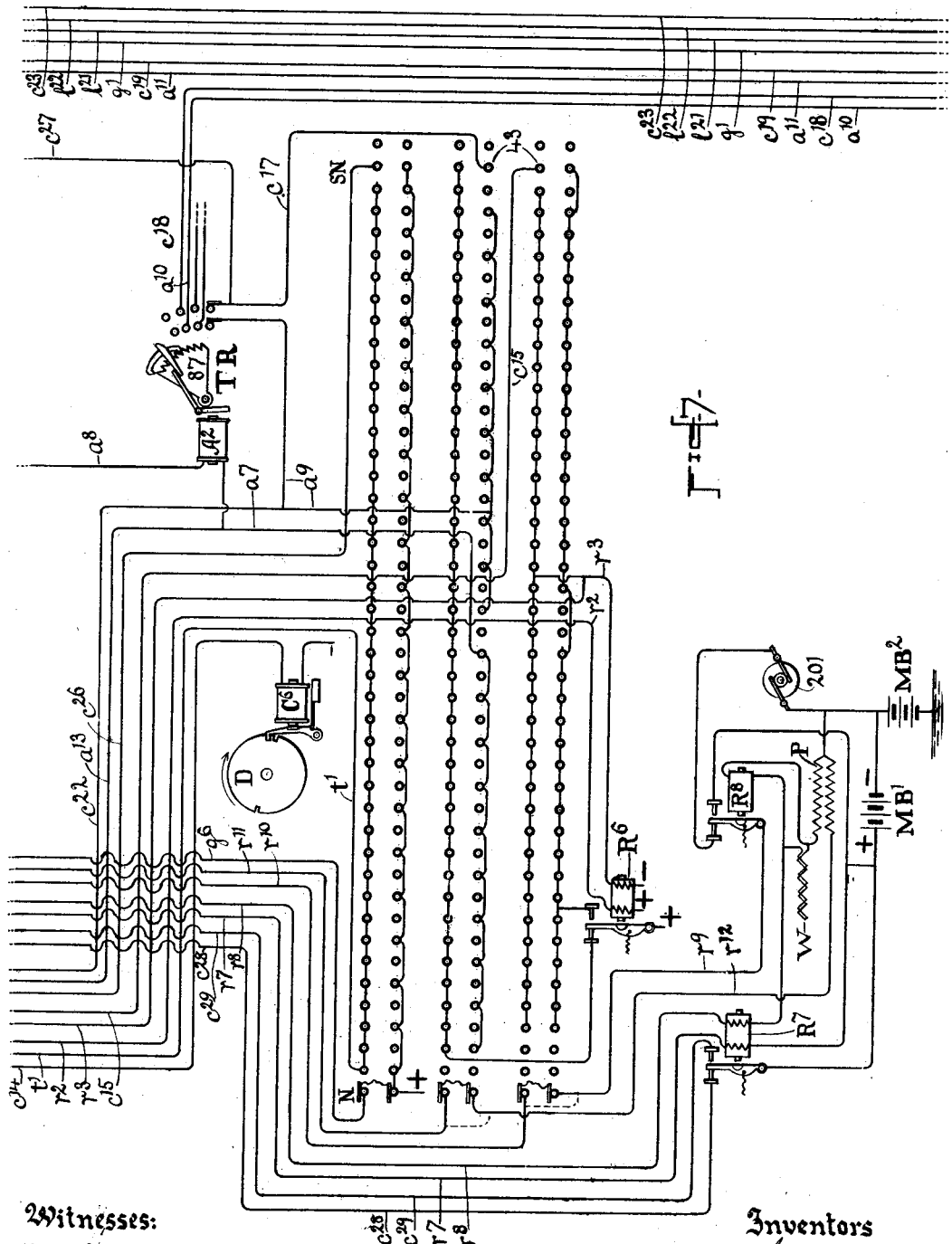

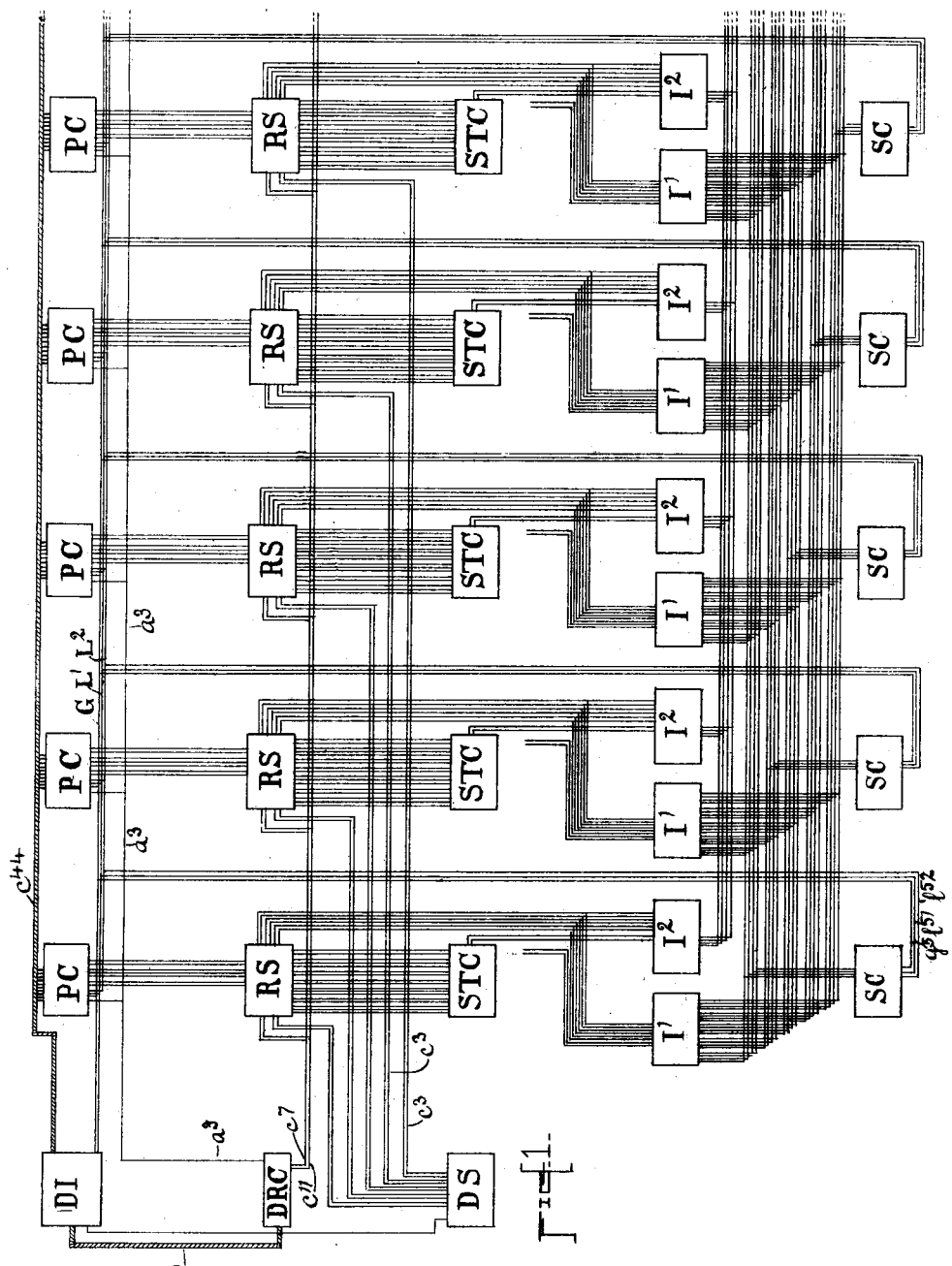

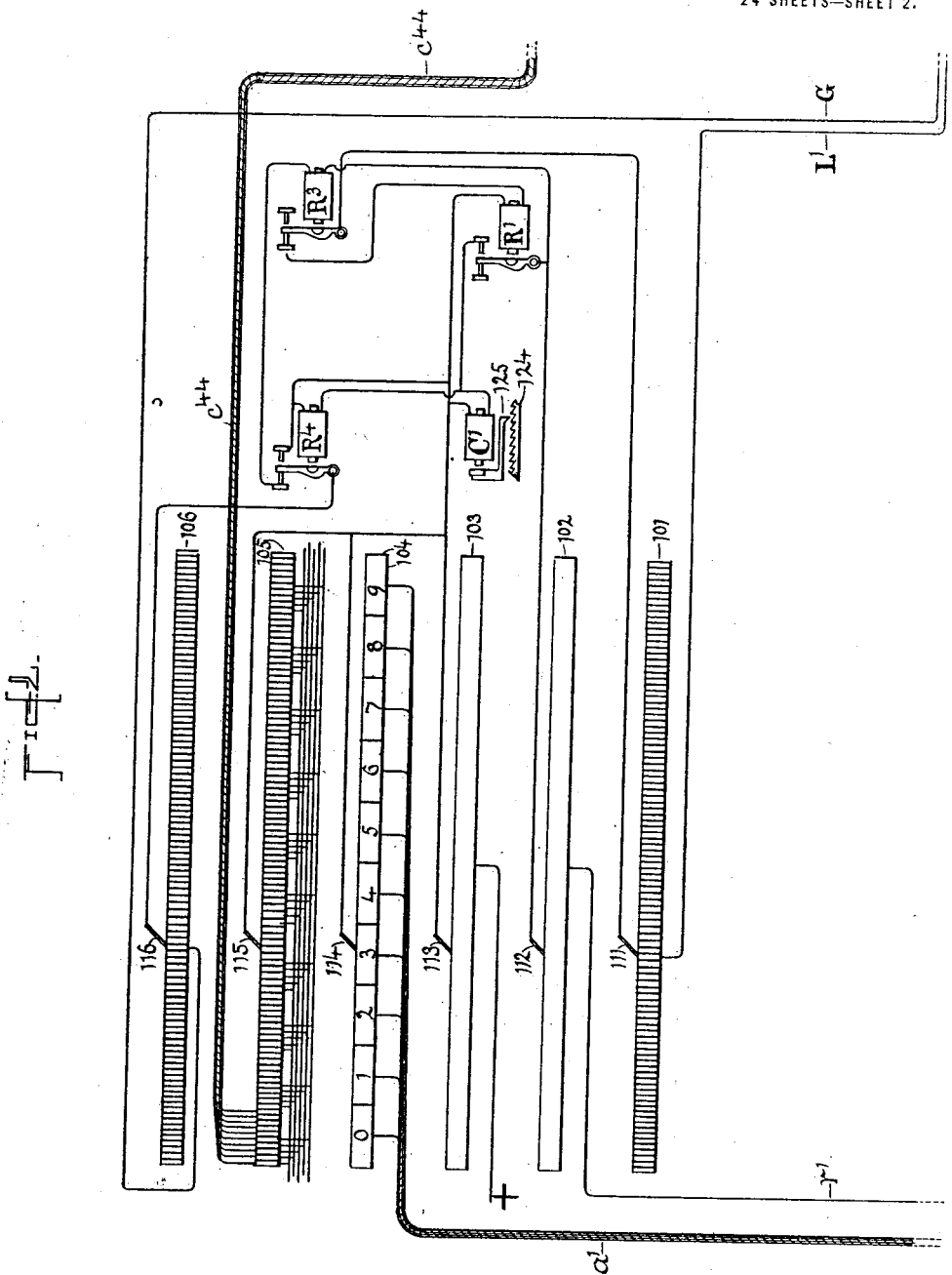

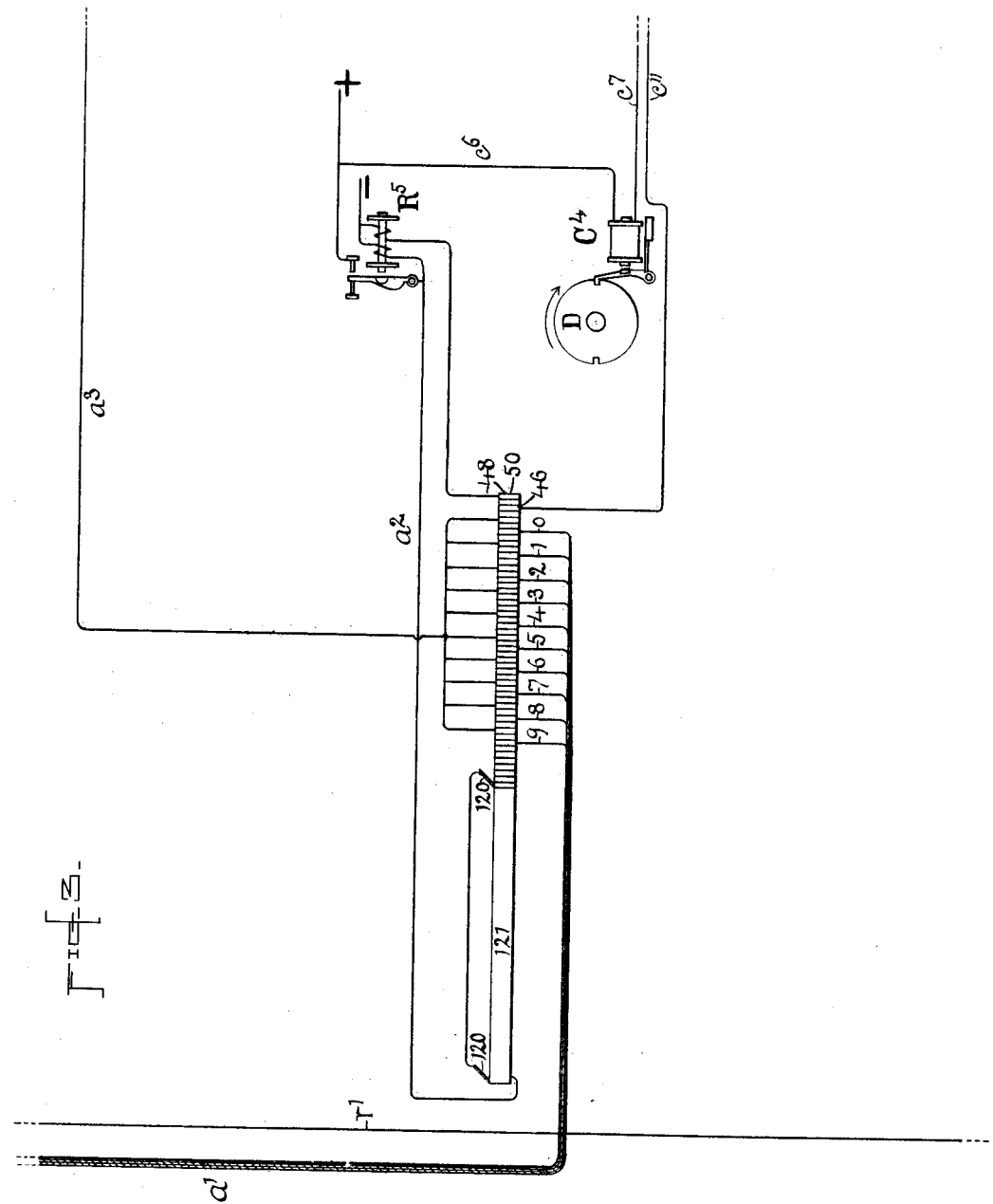

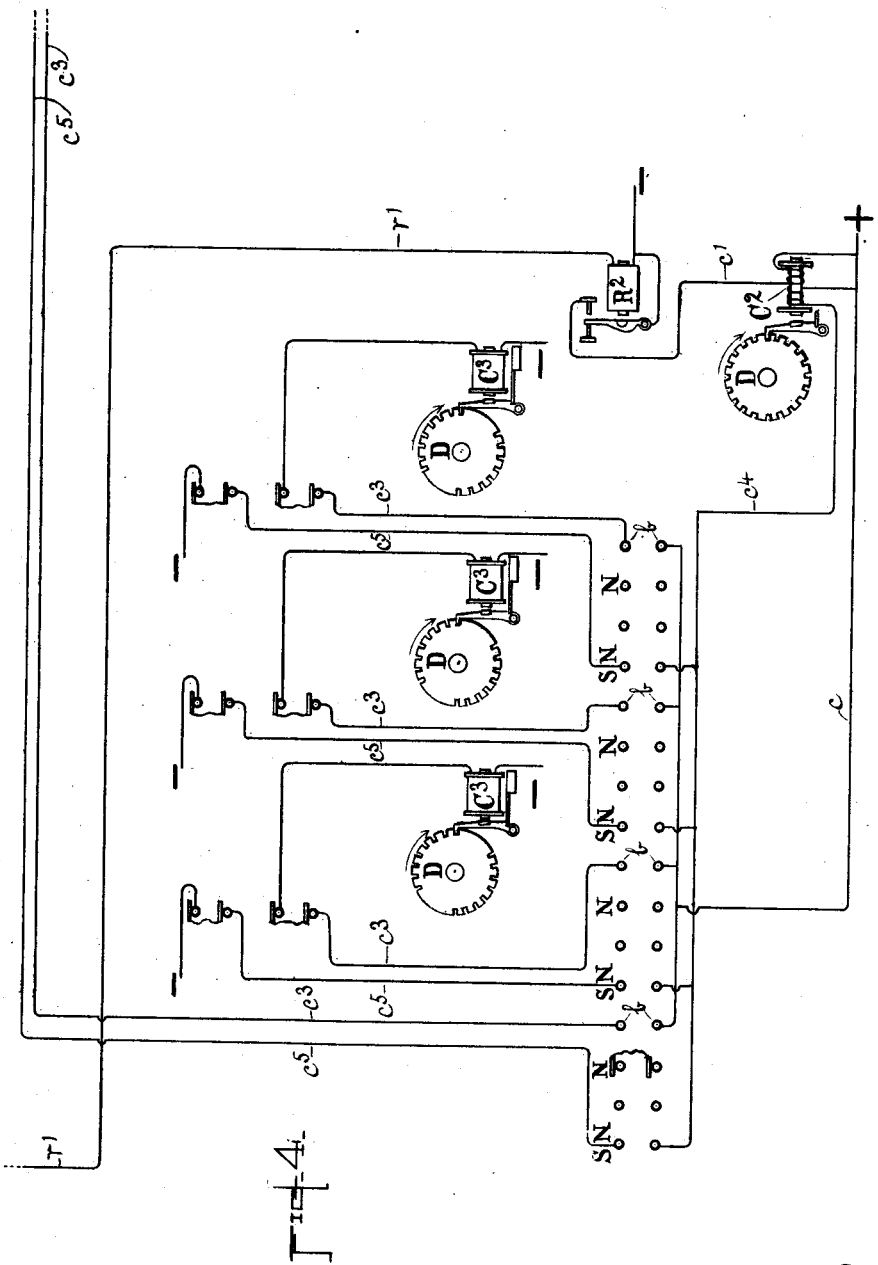

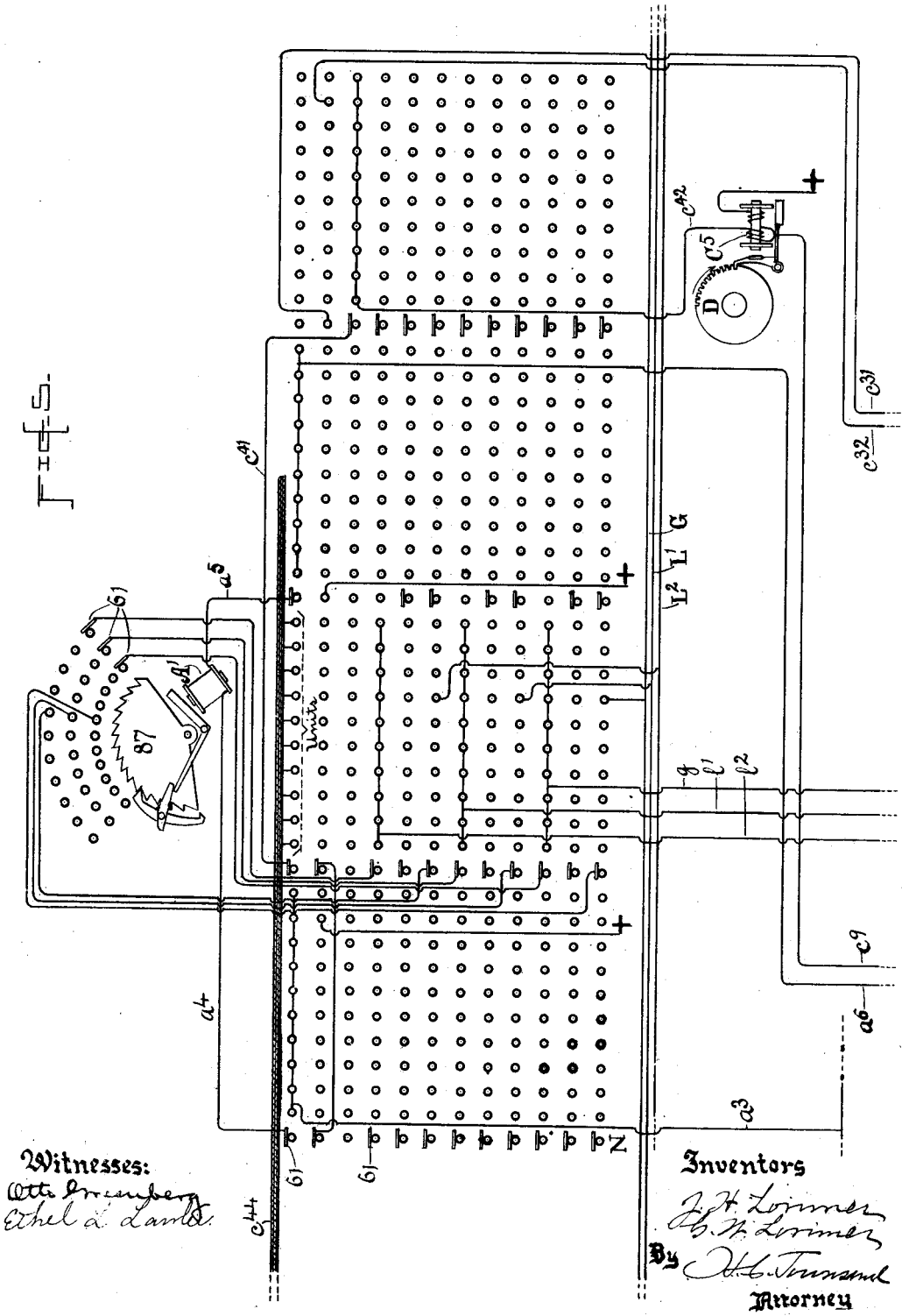

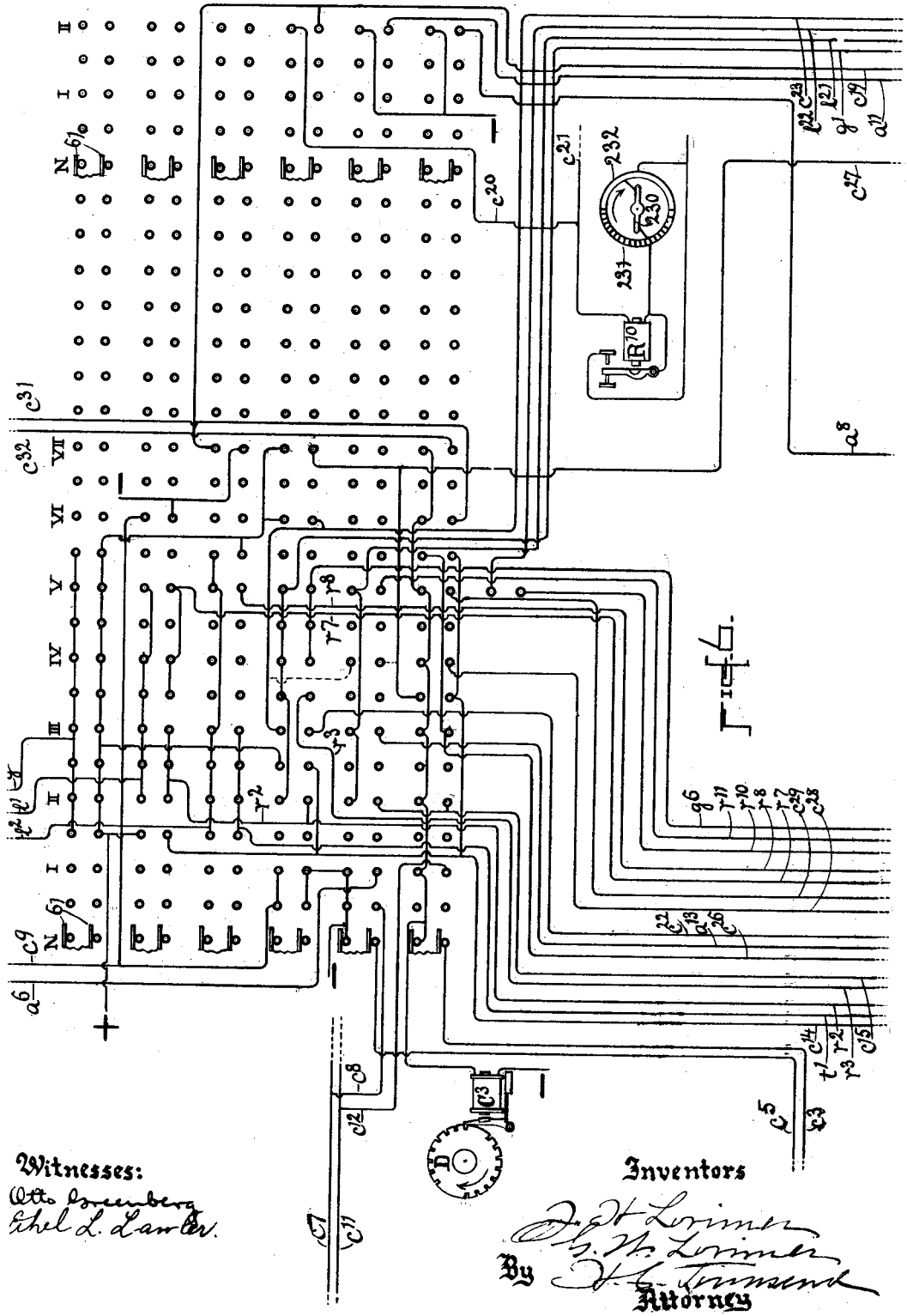

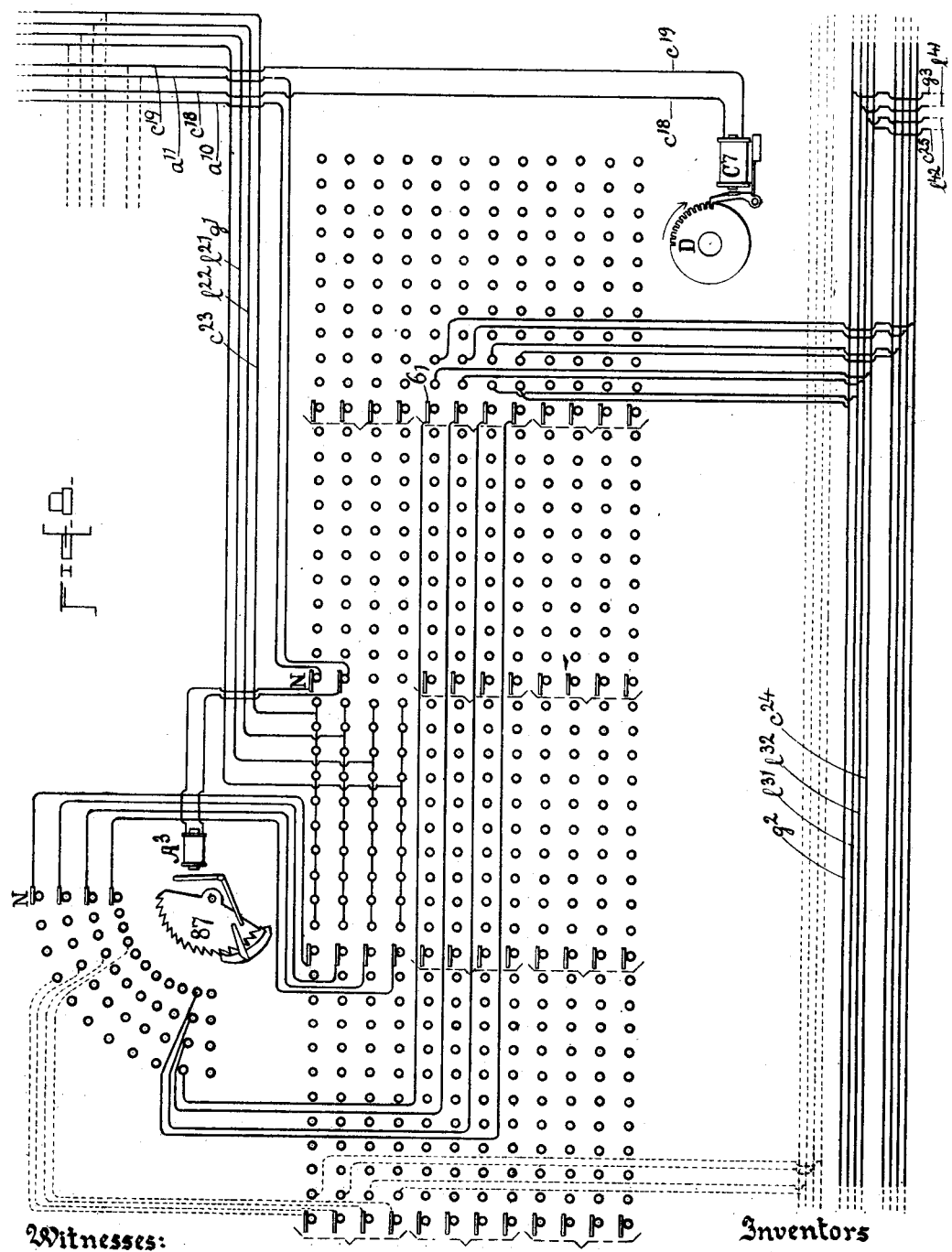

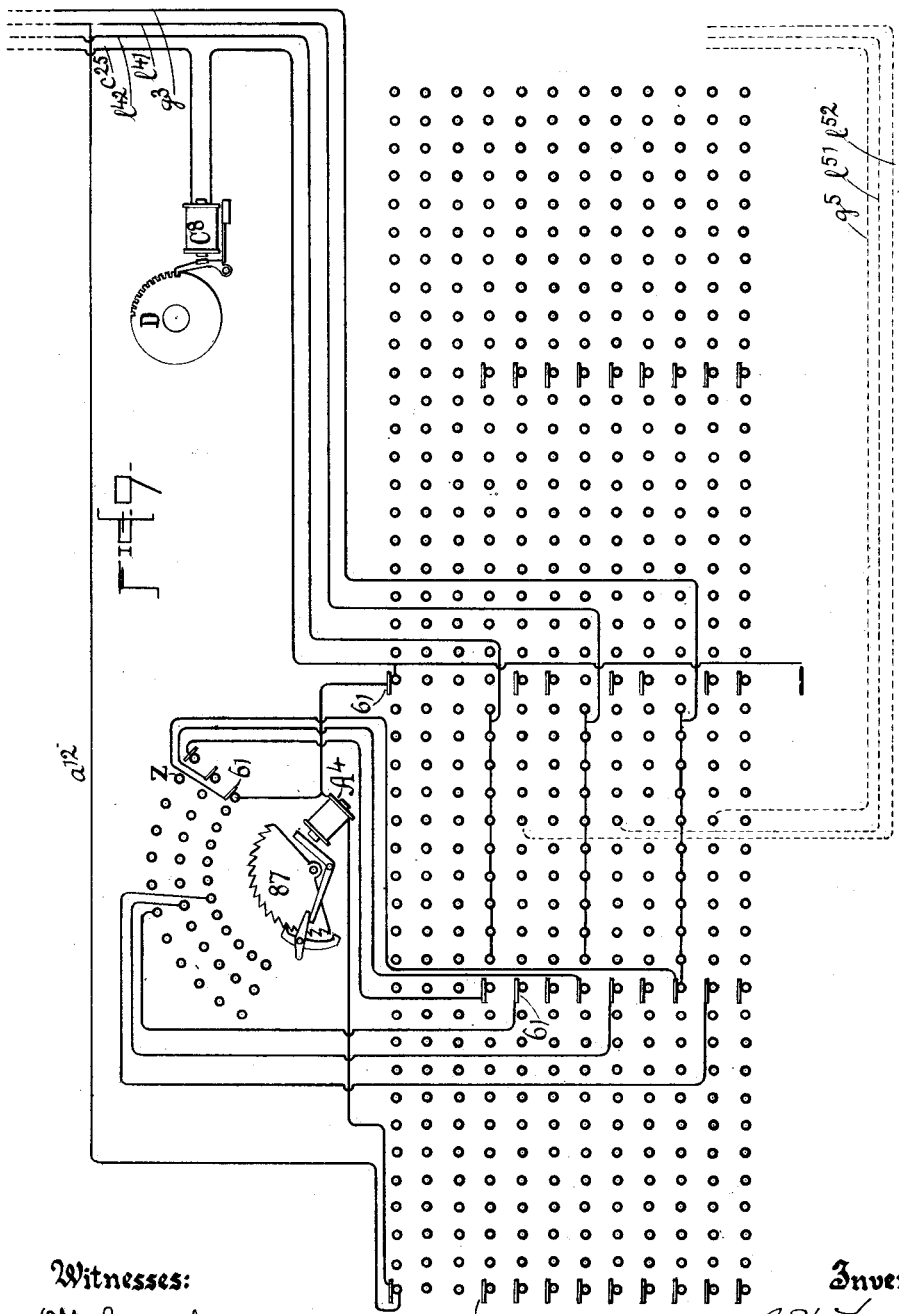

J. H. & G. W. LORIMER.
G. W. LORIMER, ADMINISTRATOR OF J. H. LORIMER, DEC'D.
AUTOMATIC EXCHANGE.
APPLICATION FILED APR. 24, 1900.
1,187,634.
Patented June 20, 1916.
24 SHEETS—SHEET 10.
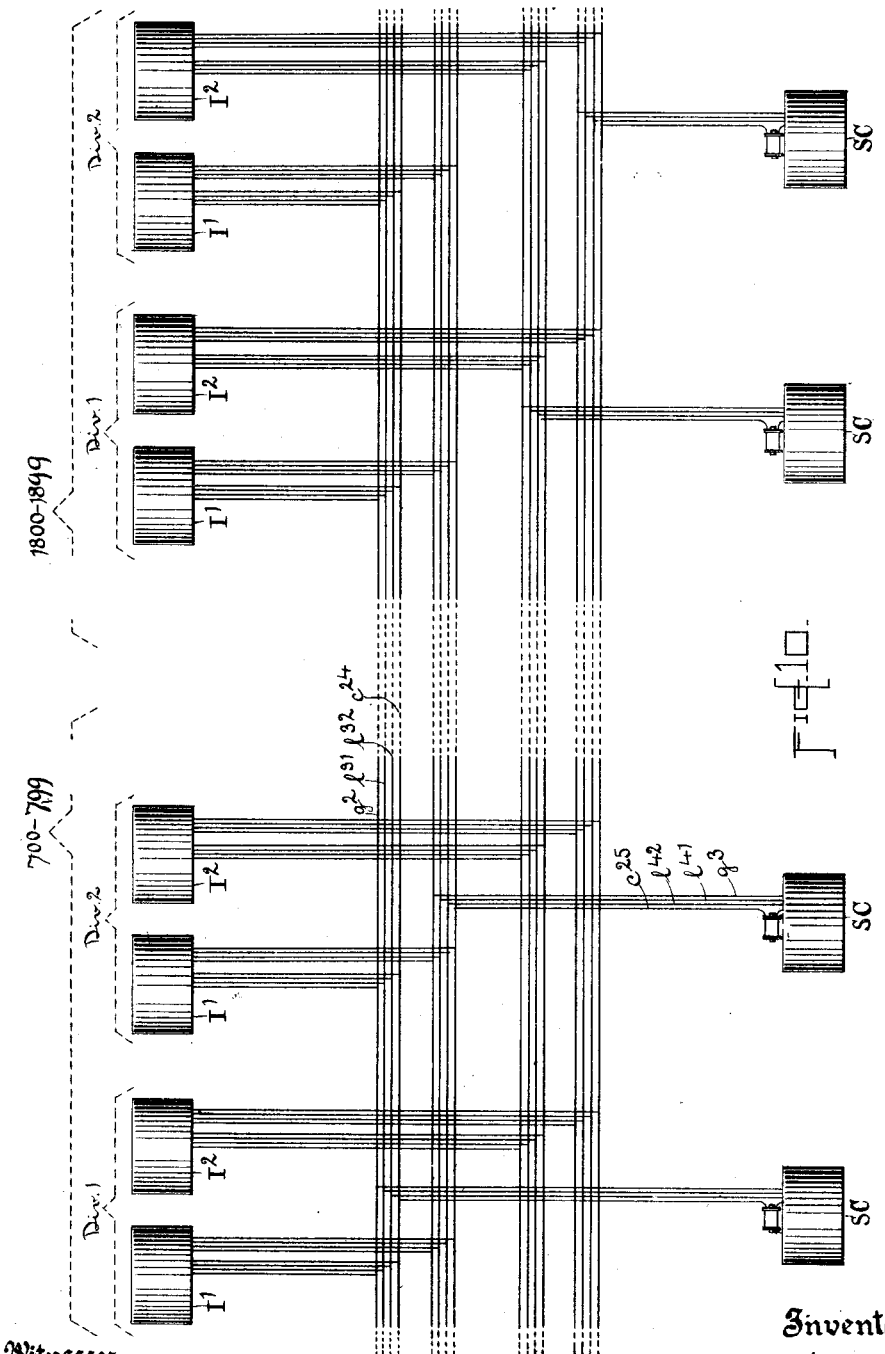

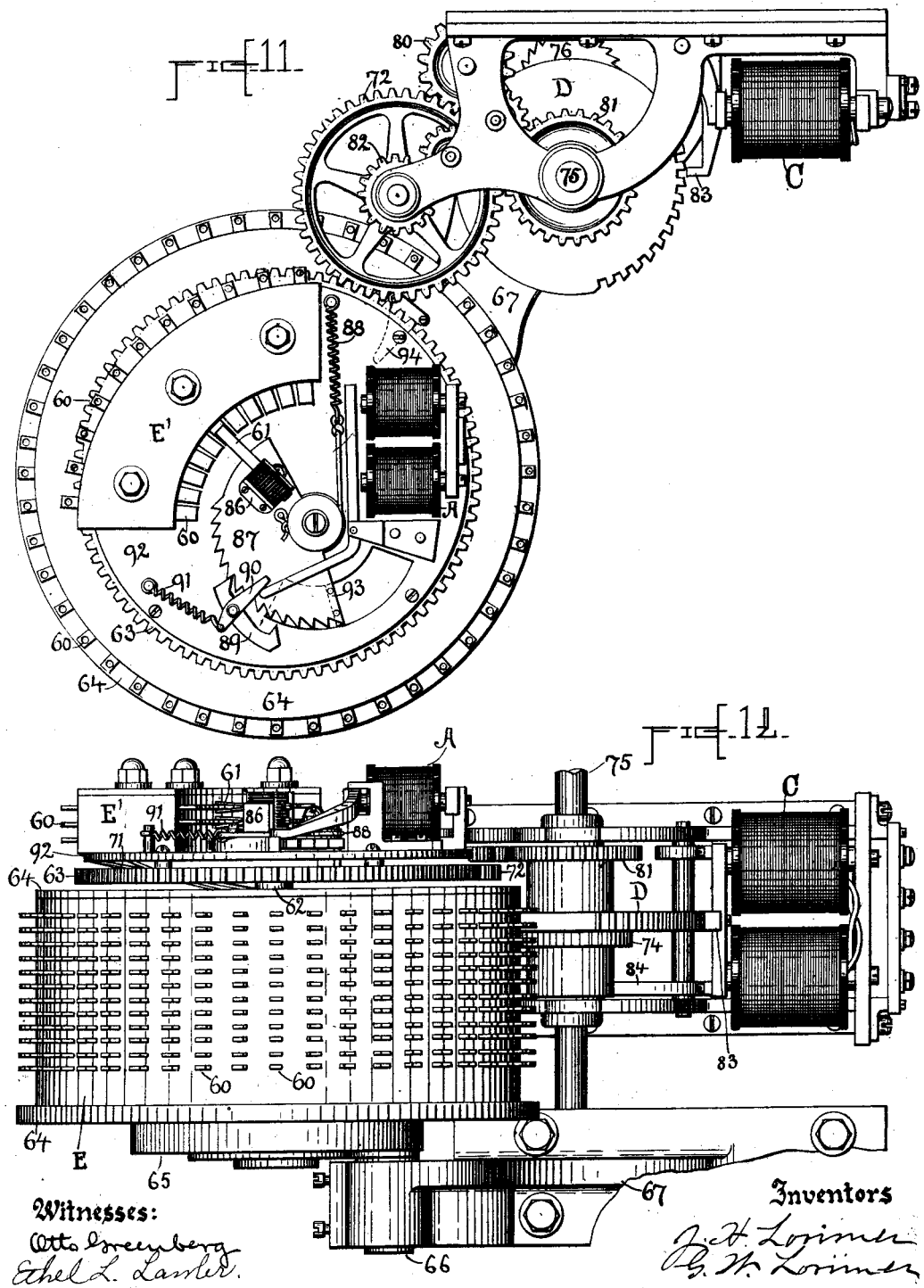

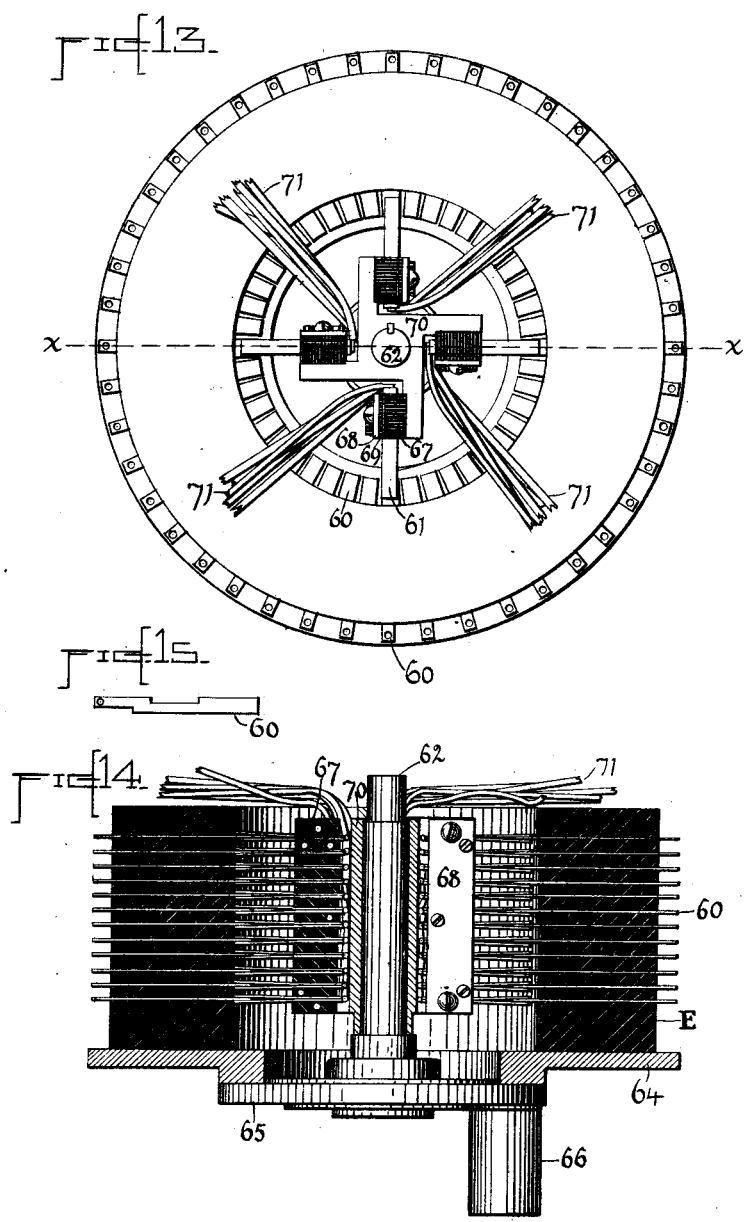

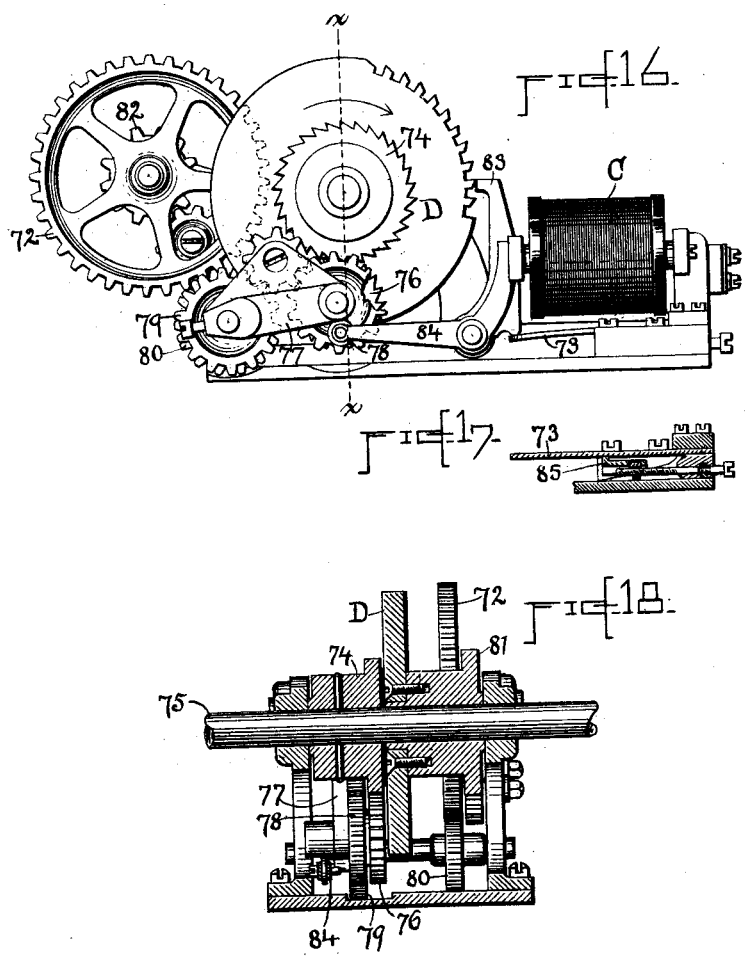

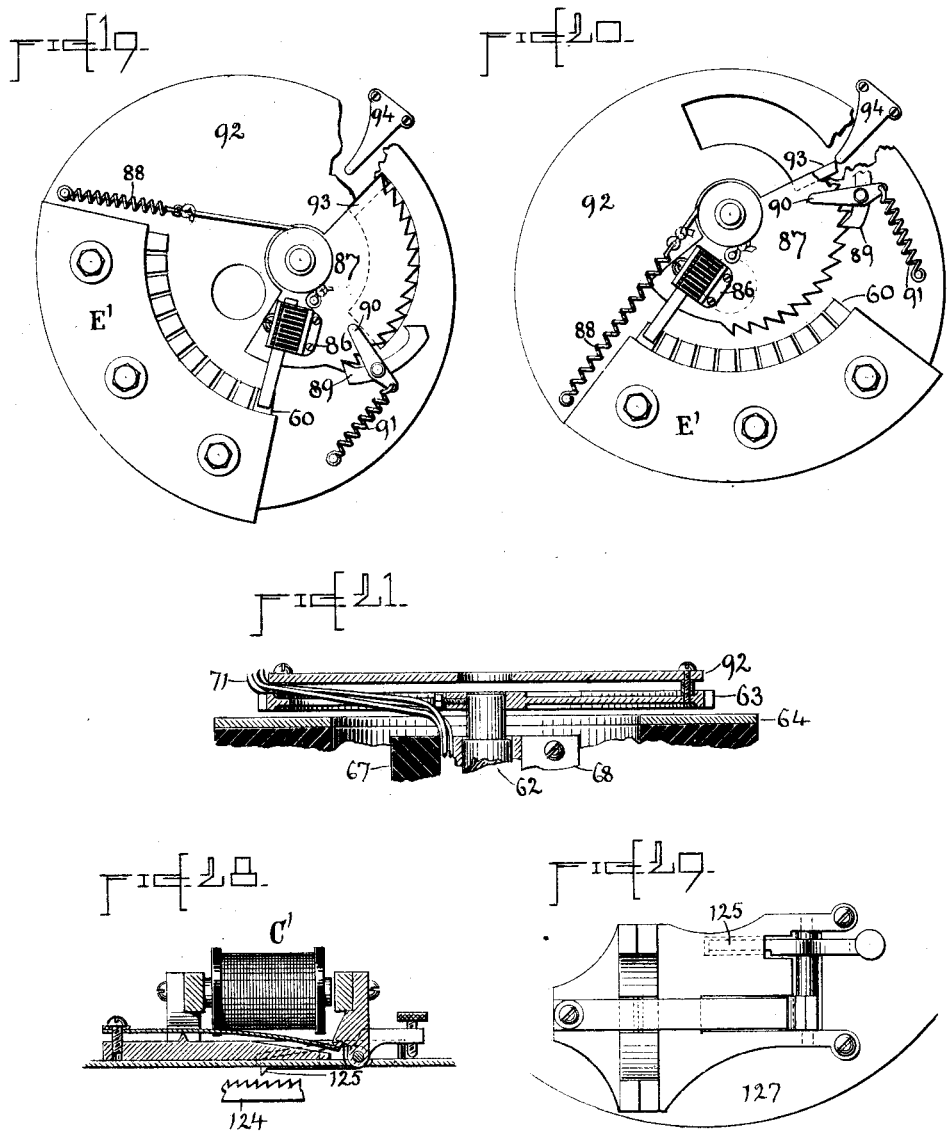

J. H. & G. W. LORIMER.
G. W. LORIMER, ADMINISTRATOR OF J. H. LORIMER, DEC'D.
AUTOMATIC EXCHANGE.
APPLICATION FILED APR. 24, 1900.
1,187,634.
Patented June 20, 1916.
24 SHEETS—SHEET 15.
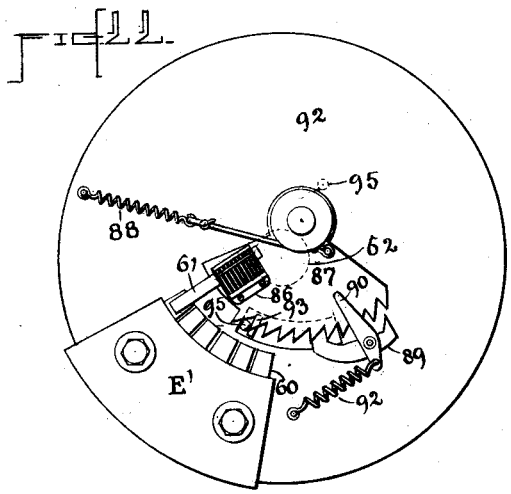
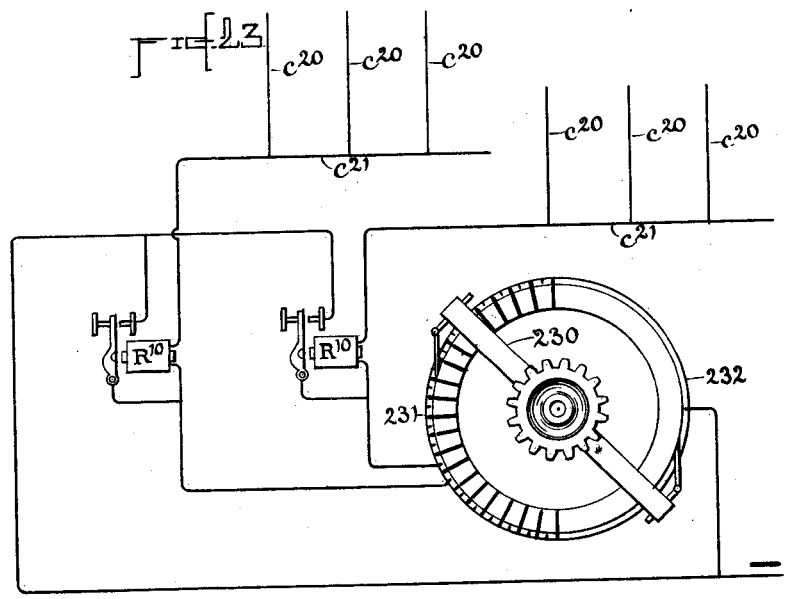

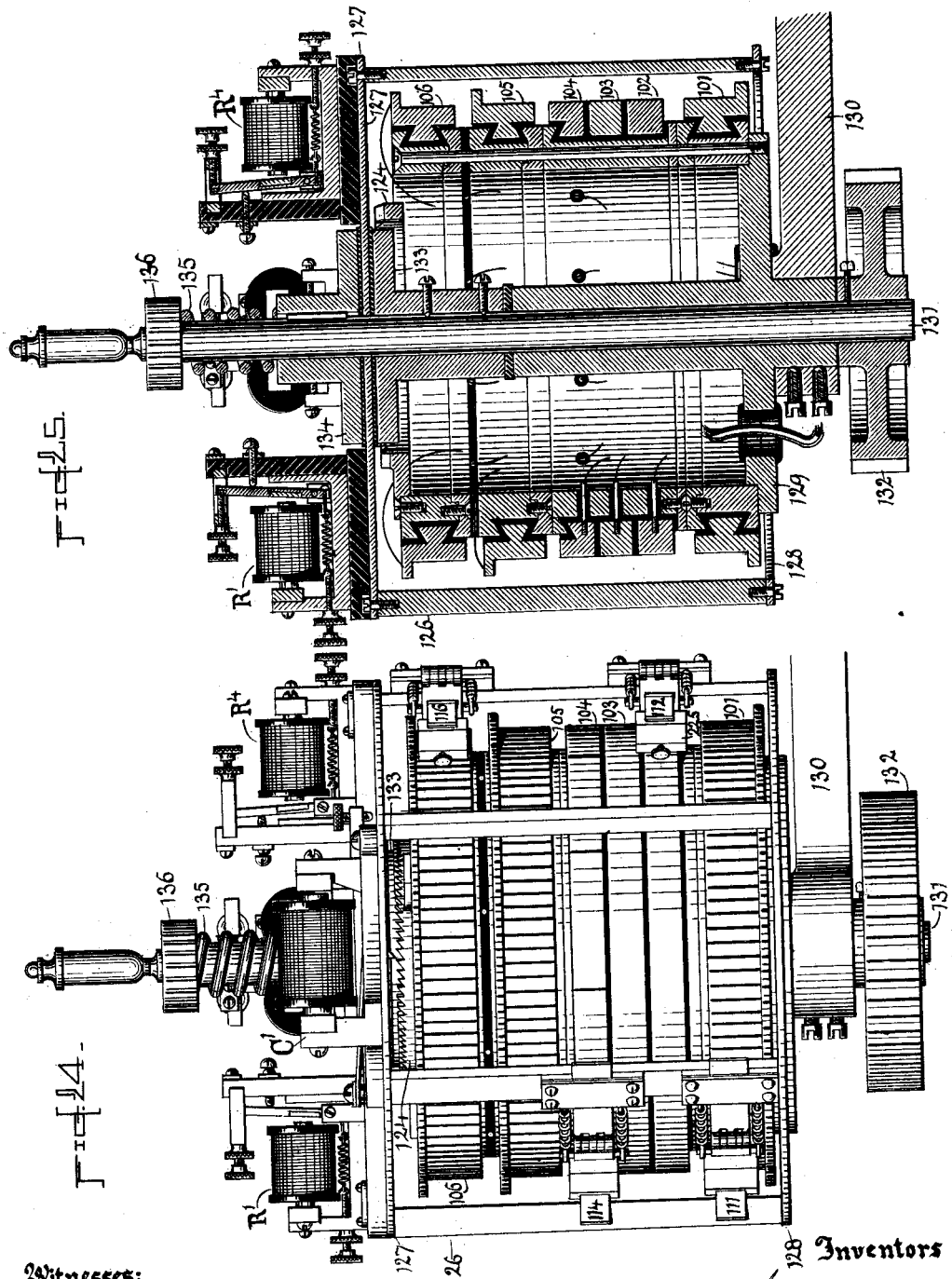

J. H. & G. W. LORIMER.
G. W. LORIMER, ADMINISTRATOR OF J. H. LORIMER, DEC'D.
AUTOMATIC EXCHANGE.
APPLICATION FILED APR. 24, 1900.
1,187,634.
Patented June 20, 1916.
24 SHEETS—SHEET 17.
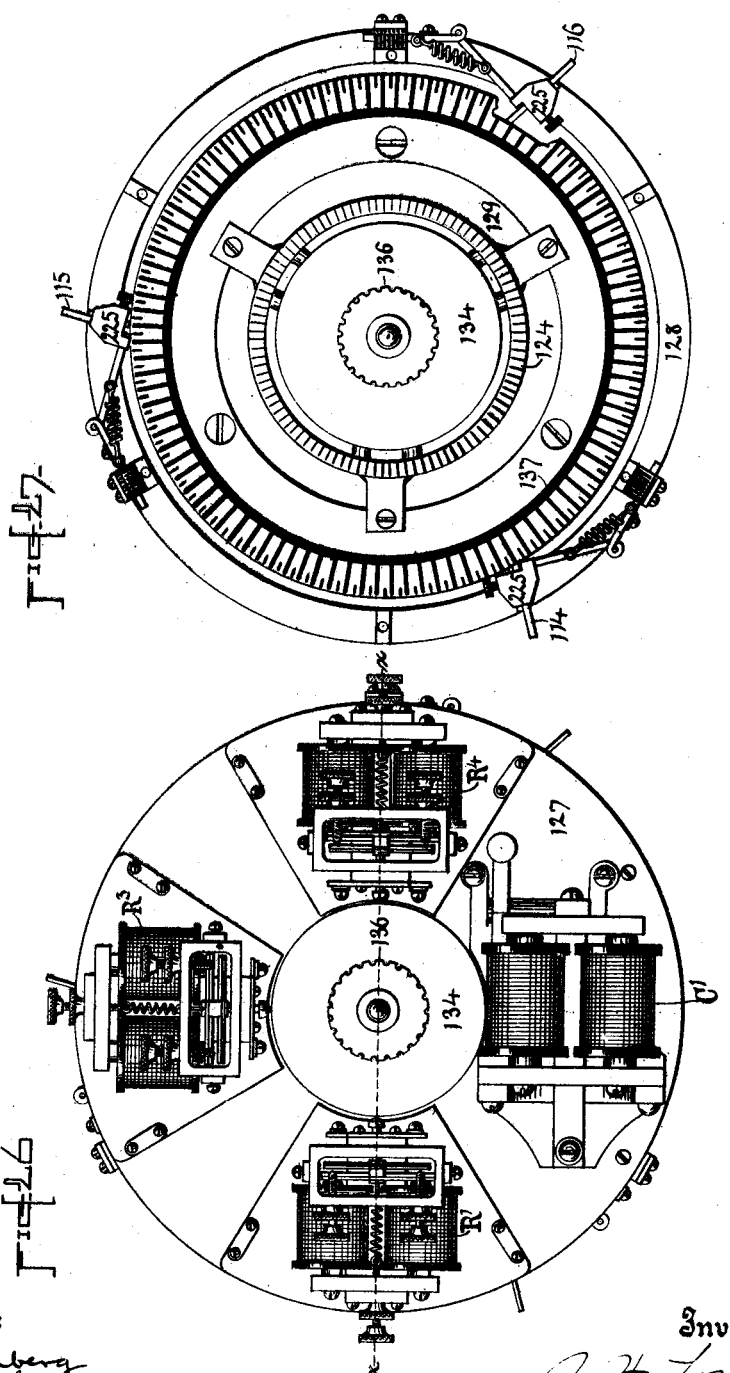

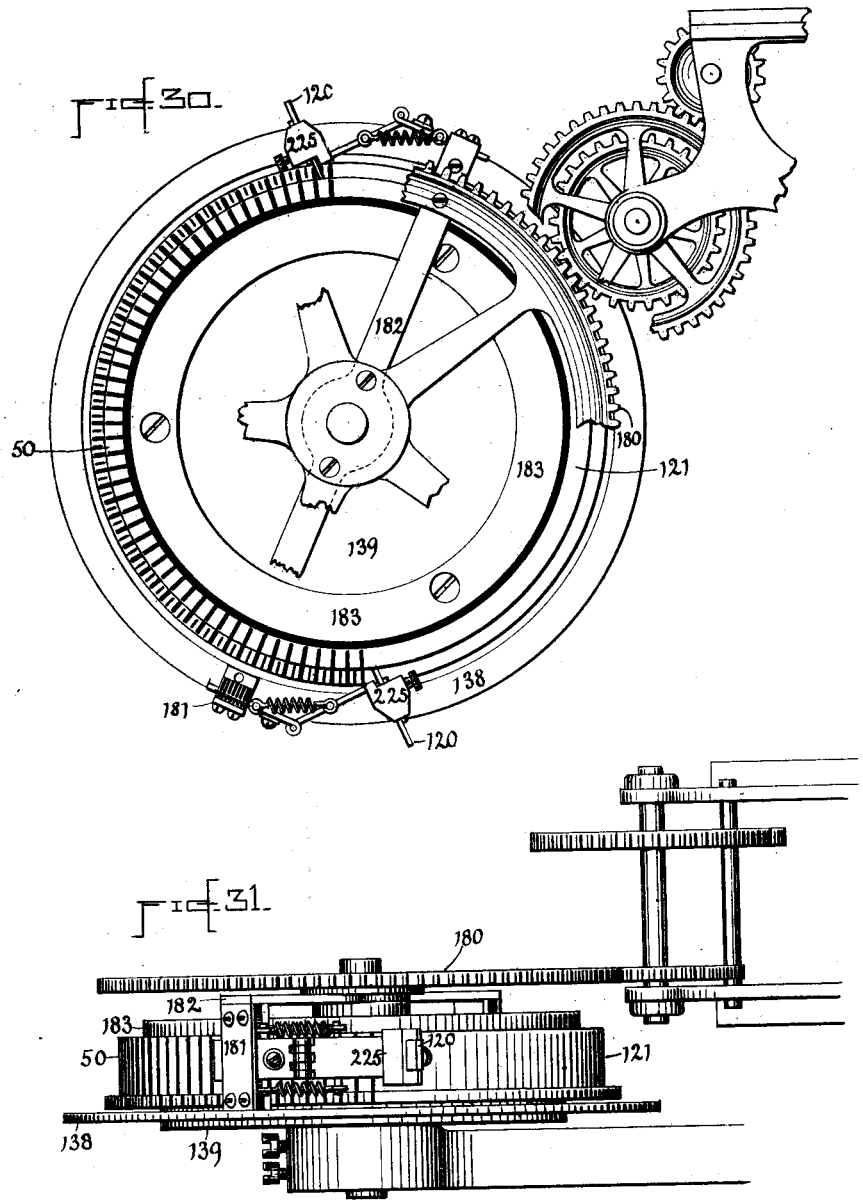

J. H. & G. W. LORIMER.
G. W. LORIMER, ADMINISTRATOR OF J. H. LORIMER, DEC'D.
AUTOMATIC EXCHANGE.
APPLICATION FILED APR. 24, 1900.
1,187,634.
Patented June 20, 1916.
24 SHEETS—SHEET 19.
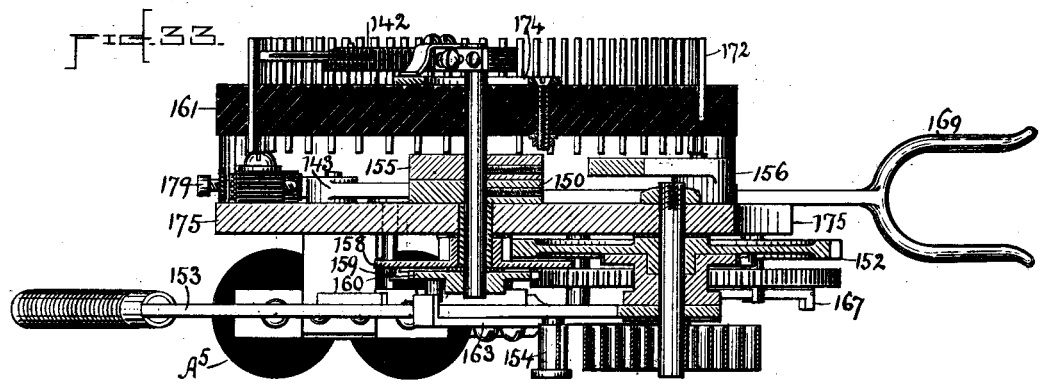
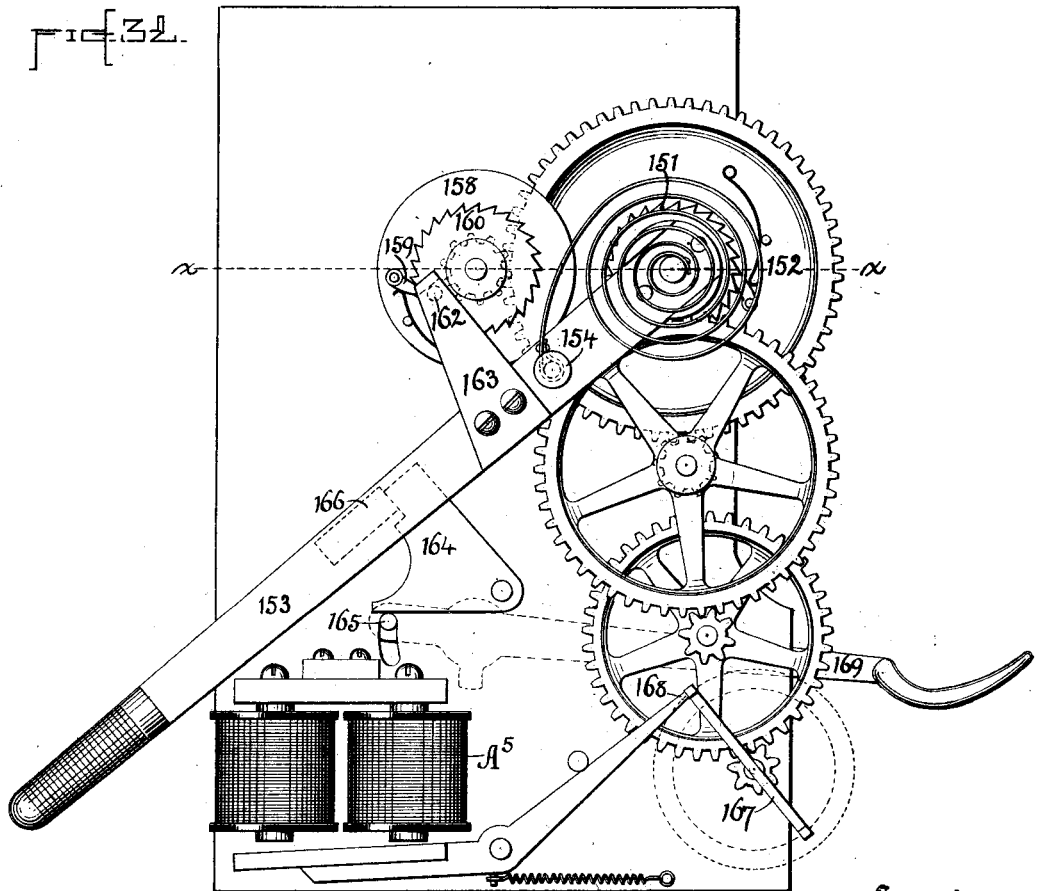

J. H. & G. W. LORIMER.
G. W. LORIMER, ADMINISTRATOR OF J. H. LORIMER, DEC'D.
AUTOMATIC EXCHANGE.
APPLICATION FILED APR. 24, 1900.
1,187,634.
Patented June 20, 1916.
24 SHEETS—SHEET 20.
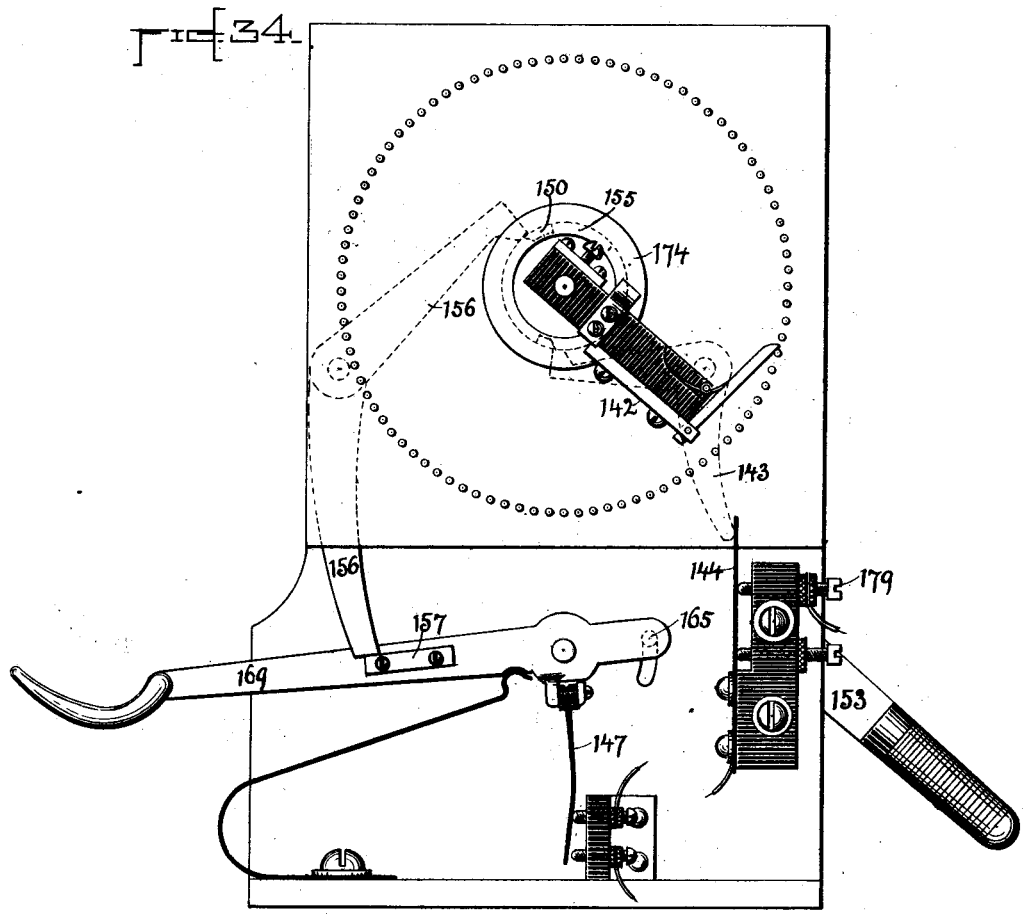
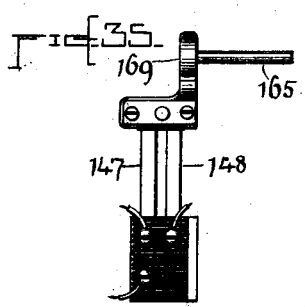

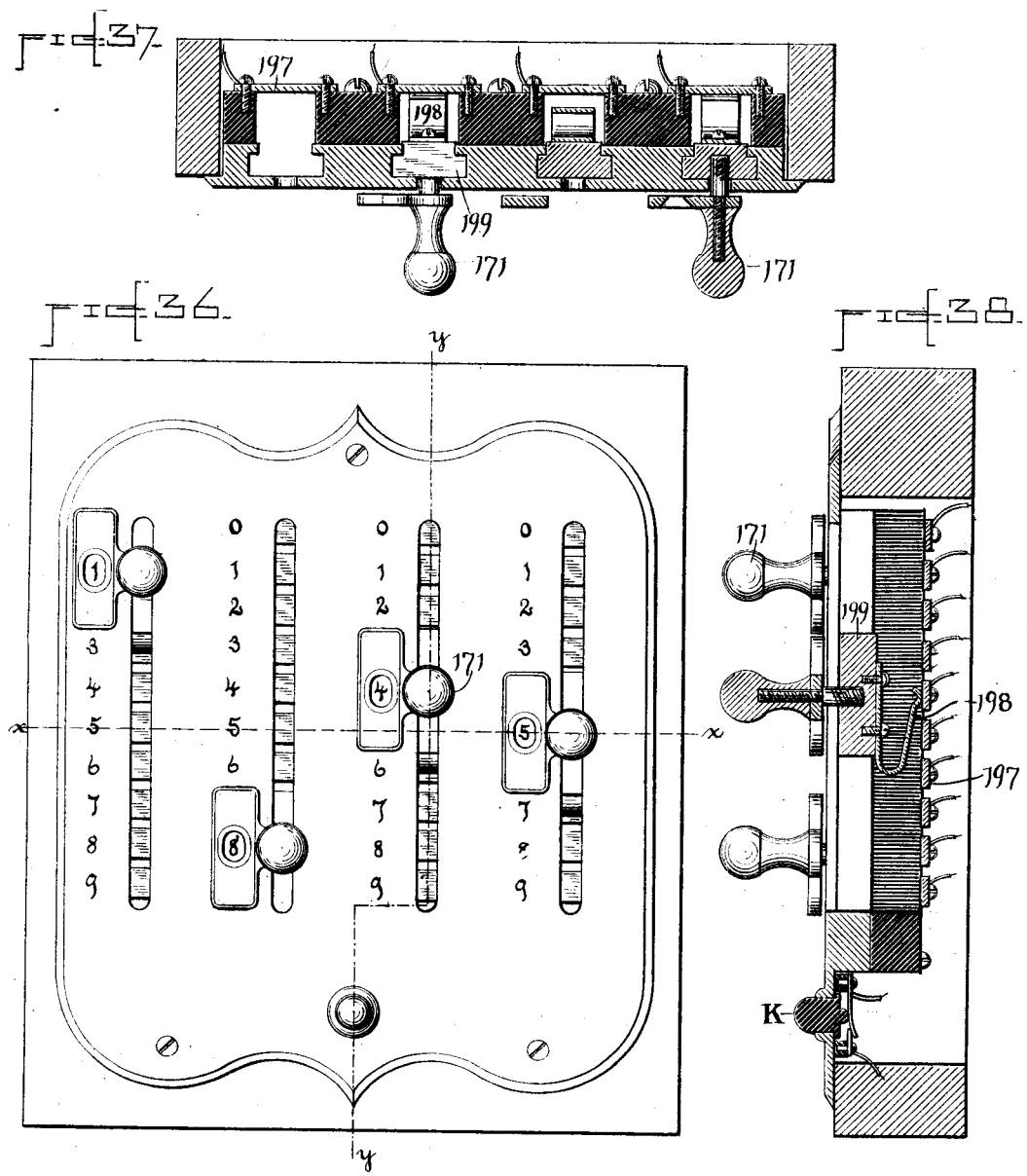

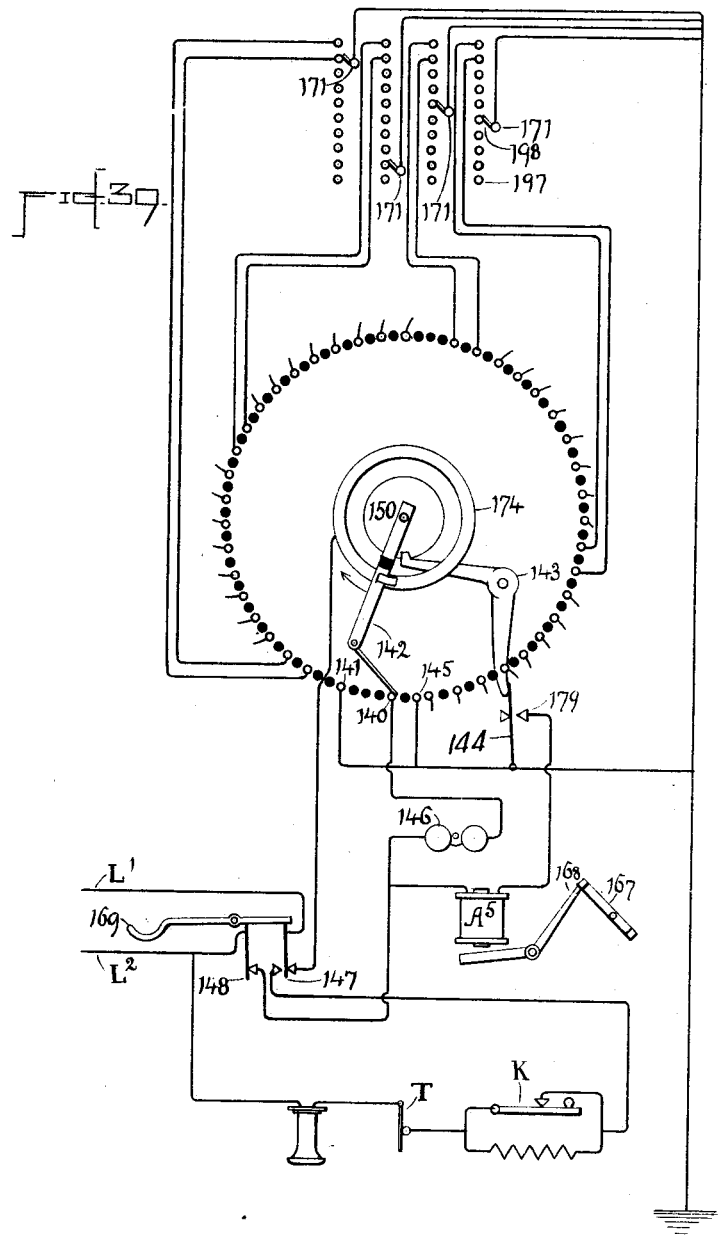

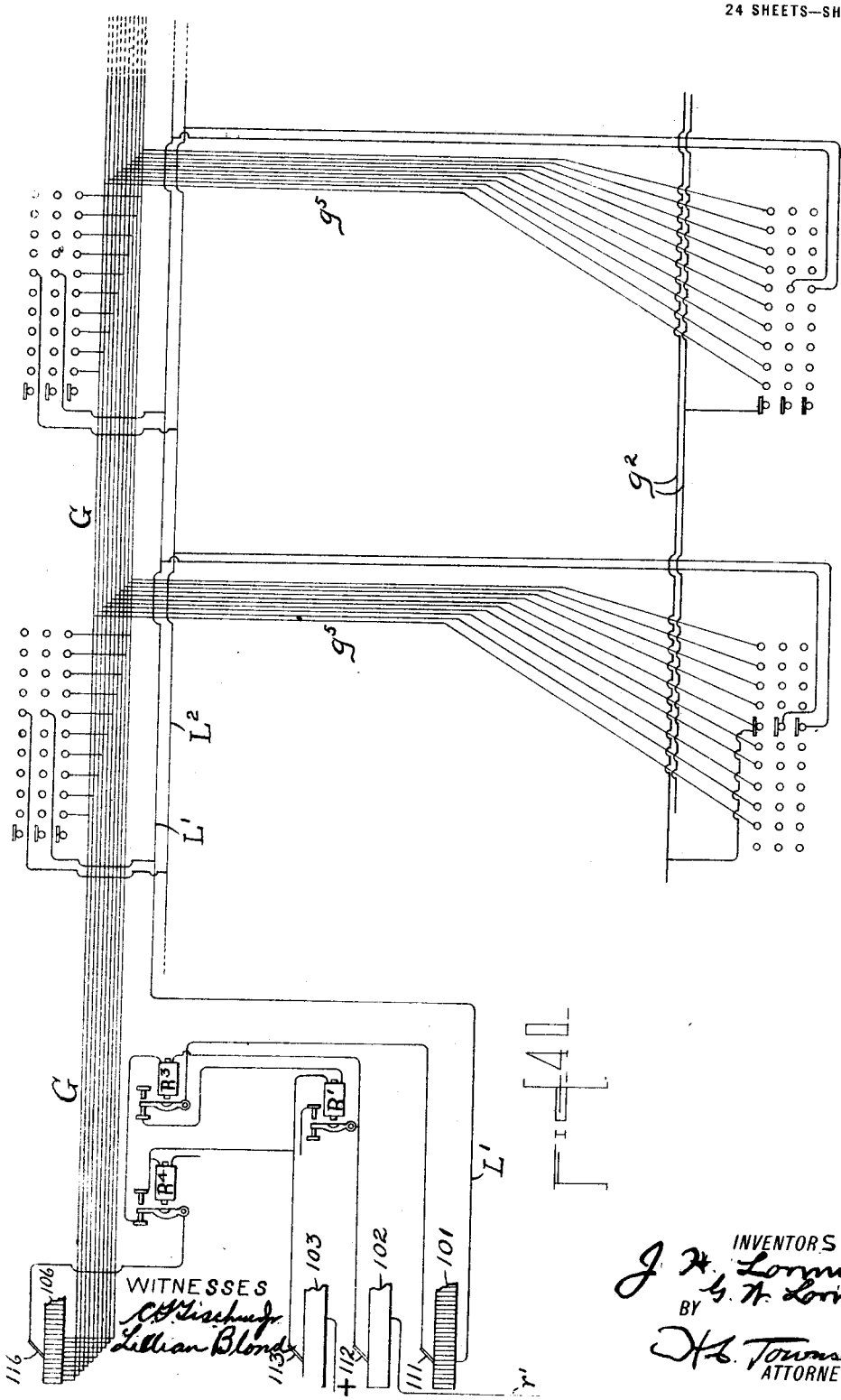

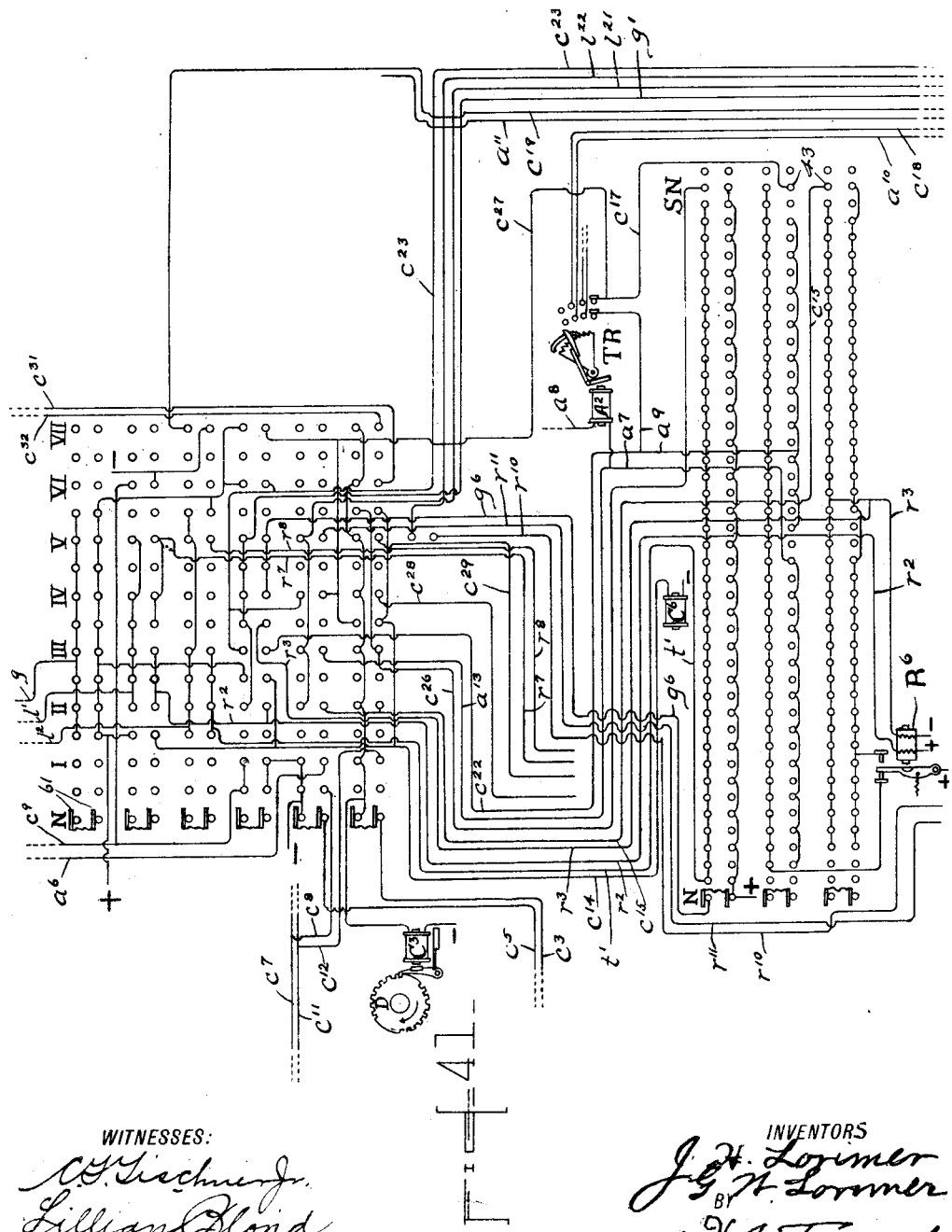

UNITED STATES PATENT OFFICE.

JAMES H. LORIMER AND GEORGE W. LORIMER, OF BRANTFORD, ONTARIO, CANADA; GEORGE WILLIAM LORIMER, ADMINISTRATOR OF SAID JAMES H. LORIMER, DECEASED, ASSIGNOR, AS ADMINISTRATOR AND INDIVIDUALLY, BY MESNE ASSIGNMENTS, TO WESTERN ELECTRIC COMPANY, INCORPORATED, A CORPORATION OF NEW YORK.

AUTOMATIC EXCHANGE.

1,187,634.  Specification of Letters Patent.  Patented June 20, 1916.

Application filed April 24, 1900. Serial No. 14,075.

*To all whom it may concern:*

Be it known that we, JAMES H. LORIMER and GEORGE W. LORIMER, subjects of the Queen of Great Britain, and residents of Brantford, in the Province of Ontario and Dominion of Canada, have invented certain new and useful Improvements in Automatic Exchanges, of which the following is a specification.

This invention relates to that class of apparatus known as automatic exchanges whereby any one of a number of substations, such, for instance, as telephone subscribers' stations may be put in electrical connection with any other substation through the automatic operation of central office apparatus common to the substations and controlled by them over wires or circuits connecting said substations with the central office.

The object of the invention is to simplify and cheapen the apparatus, to make the same more reliable and particularly to permit the system to be extended to serve a large number of substations without complicating the apparatus or increasing the number of connections and contacts and the expense of construction, to a prohibitory degree as is the case with the systems of automatic exchange heretofore devised.

The general plan of the present invention contemplates the subdivision of the subscribers' or substation lines into groups, each group comprising any convenient or desired number of lines, say for example, 100, and the provision for each group of main lines, of groups, sets or divisions of telephone exchange switching apparatus constituting practically duplicates of one another and adapted alike to be used by any one of the substations of a group of lines for effecting connection with the line of another substation. In practice as many sets or divisions are employed as may be necessary to permit the maximum number of substations to be accommodated that will probably desire to use the exchange at the same time. Experience having demonstrated that the maximum is under ordinary commercial conditions from 7 to 10 simultaneous connections, there would be provided for each group of lines or section of the exchange from 7 to 10 duplicate sets or divisions of connecting apparatus, each embracing devices to be presently described. Provision is also made whereby any substation initiating a call may automatically seize and appropriate to its use one of the percentage of devices thus embraced in the exchange and which may be idle at the required time of use. Provision for preventing interference in the use of it by the several substations is also provided and the apparatus for effecting this embraces, among other things, a means for giving control of the exchange apparatus or a set or division thereof to the lines non-simultaneously and in fixed order of rotation, preferably through the medium of a circuit changer which closes circuit to the various lines comprising a group of lines successively. The various devices being thus provided in number corresponding to what may be called the traffic demand of the system, it is obvious that they will constitute a percentage less than the whole number of main lines which they serve or in other words will be less in number than the whole number of main lines of a group which may be connected to any group or set of such connecting apparatus.

In the following description the term "connector" is used to mean any device in the form of an electric switch, which, by selective action, may establish connection with any one of a number of different circuit wires or connections leading to or from said connector. By preference, we use that form of switch in which fixed contact points or terminals and a coöperating movable brush or brushes are employed. The term "connector" is hereinafter employed to designate the devices called primary connector, secondary connector and interconnector. As the function of those portions of the apparatus is peculiarly to select one out of a multiplicity of lines, circuits or connections, however, in parts of the description and claims where more specific designation seems to be appropriated, they will be spoken of as circuit selecting switches. The same term "circuit selecting switch" is peculiarly appropriate for the same reason to the device hereinafter called thousands register. What we more particularly designate as a division of connecting apparatus embraces preferably the following devices and inasmuch as our exchange is organized on the basis of providing a percentage only of apparatus for effecting connections, it will be obvious that the same kind of connectors belonging to a number of divisions for the same section of the exchange taken collectively constitute a group of devices less in number than the whole number of substation lines of any group. Thus for instance, taking the device hereinafter termed "secondary connector" which is used to establish connection with the substation lines of a group when they are called lines, there would be for such group of lines a series or group of secondary connectors less in number than the whole number of the group of lines served thereby. The said divisions of which there may be a number, as stated before, 7 or more, embrace in our exchange, preferably, in each division the following devices whose function in the combination will be more particularly hereinafter ascertained:

1st: A device termed "secondary connector" which is a circuit selecting switch upon which all lines of a group of lines are represented and which may be adjusted to establish connection with a substation line when such line is a called line. Each of the group of secondary connectors comprising the connectors upon the several divisions is accessible for this purpose from any one of the whole number of subscribers' lines, a secondary connector that is for the time being, idle, being automatically selected and isolated from use by other lines than the line employing it as will be hereinafter more particularly set forth.

2nd: A primary connector upon which all the lines of a group of lines are represented and which may be adjusted to form connection between the substation line used as a calling line and the circuits or connections over which the selective signals are conveyed to the signal receiving apparatus and over which also talking connection is finally established. By using a group or multiplicity of such primary connectors forming percentage of the main lines called and each capable of use by any one of the whole number of a group of lines and by providing, through such connectors, suitable connections to groups or series of signal receiving devices and circuit selecting switches, we are enabled to adjust the amount of apparatus required to the traffic demand and thus make unnecessary the use of individual pieces of apparatus for each line.

3rd: A rotary switch for changing the connections of various parts of the apparatus at the various stages of the operation of the circuit selecting switches and the devices through which the calling line may signal the called line and may form at the central office the talking connection:

4th: A signal transmitter controller co-operating with the signal transmitter at the substations in a special way which is not, however, an essential in the carrying out of the broad principles of our invention.

5th: An interconnector which is a circuit selecting switch used in a train of circuit selecting actions whereby the calling line may be finally placed in connection with a secondary connector on which the lines of the same group as the calling line are represented or with a connector to which any other group of lines of the exchange belong, thus making it possible eventually for the calling subscriber of any group of lines to establish connection with any subscriber of the whole exchange by selecting and adjusting an idle secondary connector of the group of secondary connectors to which the called subscriber's line belongs.

6th: A thousands register which is employed when the exchange embraces more than a certain number of sections or groups of main lines, say 10; said thousands register is in fact a circuit selecting switch which is employed when the circuit selecting actions required to enable a calling subscriber's main line to be placed in connection with a called subscriber's main line are more than three in number; said thousands register is a circuit selecting switch which is set to position corresponding to the value of the digit in the thousands place of the called subscriber's number after which the selective action proceeds through the interconnector and secondary connector under the control of selective signals corresponding respectively to the hundreds, tens and units places of the called subscriber's number.

From the foregoing it will be understood that our apparatus in its preferred form is organized to operate in accordance with the decimal system of notation, although it is obvious that in principle it is not restricted to such system.

7th: Certain relays termed signal relay, release relay and ringing relay, and accessory devices to be described hereinafter.

The terms mentioned in the above seven heads are used only for convenience of description. The functions of the various devices will be better understood from the general description of the devices themselves and their manner of operation from which it will readily be seen that some of the functions of the rotary switch, signal transmitter controller and interconnector might be performed by other parts. When the apparatus is organized upon a percentage basis throughout, we employ in addition and for each group or multiplicity of divisions of connecting apparatus certain devices whereby any one of a group of lines used as a calling line may, before sending its selecting signals, be automatically placed in connection with that portion of an idle division of connecting apparatus which it is necessary for a line to employ in automatically establishing a connection to a connecting wire leading to an idle secondary connector of the group to which the called subscriber is assigned. This apparatus, as already stated, is controllable by the lines of the group in which the call originates non-simultaneously and in fixed order of rotation and its action in giving such non-simultaneous control to said lines is preferably effected primarily by means of a progressive contact maker or circuit changer forming a part of the device termed a "decimal indicator". Associated with said decimal indicator are a decimal register controller and division starter, which said three devices are common to a number of divisions of connecting apparatus. These devices as combined with the primary connectors constitute collectively speaking primary line connecting apparatus whose function is to connect a calling main line to one out of a number or group of idle primary connecting wires over which the selective signals controlling the circuit selecting switches are received. The terms decimal indicator, decimal register controller and division starter are also used only for convenience of description.

When the revolving line finder portion of the decimal indicator finds a contact connected to a substation line on which a call has been initiated, it halts, but is restored to the use of other substation lines after the calling line has appropriated to its use apparatus in an idle division of connecting apparatus. Coincidently with the seizure of apparatus in such idle division, a guarding electric potential is established whereby the calling line may be protected from seizure by any other line of the exchange as hereinafter more fully described.

In addition to a line finder, the decimal indicator preferably embraces means for automatically determining the position to which the primary connector of the seized division shall be set to establish connection from the calling line. The division starter is a device employed in association with the decimal indicator to seize upon and appropriate to the use of a calling line, apparatus in an idle division. The decimal register controller merely aids in setting the primary connector to connection with the line calling.

According to the broad principles of the invention any suitable means may be employed for bringing into operation an idle set of connecting apparatus by any calling line either coincidently with the initiation of the call which is preferable for the purpose of expediting the operation, or by means of a signal given at any time by the calling line.

The several divisions of connecting apparatus with the associated means for permitting any calling line of a group of lines to pick out an idle division constitute a section of exchange apparatus that is a complete unit adaptable for use as an exchange for 100 subscribers or that may be used in connection with other similar sections for an exchange embracing as many groups of substation lines as may be desired, each group comprising an arbitrary number, say 100, substation lines. For an exchange of 10 groups or 1000 substations, the thousands register is not necessary, but if additional sections or groups of main lines be employed, it is desirable to use the thousands register. We then use in each of the aforesaid divisions an additional interconnector for each additional ten groups or 1000 substations. Such additional interconnector would be merely a circuit selecting switch duplicating in its construction and manner of operation the interconnector for the first thousand and the thousands register would be a circuit selecting switch operating in response to the first or thousands place selecting signal to pick out a circuit selecting switch, (interconnector) controlling the connections to a set of idle tertiary connecting wires running to those groups of secondary connectors which belong to that thousand of subscribers' lines embracing the line of the called subscriber and that particular group of hundred lines embracing said called subscribers' lines. An idle secondary connector or main-line-circuit selecting switch having thus been chosen through the circuit selecting action of the thousands register followed by the circuit selecting action of the chosen interconnector, said idle final main-line circuit selecting switch is adjusted by the selective signals corresponding respectively to the tens and hundreds of the called subscriber's number. By this train of circuit selecting actions taking place through successively operating circuit selecting switches and by using for each step of the train a group of like circuit controlling switches forming a percentage only of the whole number of wires or connections from which it may make a selection, it becomes possible to accommodate 10,000 substations with a little more than ten times the amount of apparatus and connections that would be used for an exchange of 1000, whereas with most systems heretofore employed the number of line contacts and the complication of apparatus increases as the square of the number of substations served. It will be obvious from the subjoined description that this principle of employing a percentage of circuit selecting switches is in our apparatus extended to include not only the final main-line-circuit selecting switches, namely, the secondary connectors, but also the interconnectors or circuit selecting switches acting at the hundreds stage of selection and in the case of the use of a thousands register, such percentage principle is shown as applied for those switches which respond to the first selective signals sent from a substation. When, however, any thousands register or any interconnector has been selected and made available for the use of any main line, it is for the time being and during its use individual to that line and in that sense is as completely a main switch as if it were assigned permanently to the use of that one line and could at no time be any other. While, therefore, we prefer to carry out the percentage principle through the whole system of selecting switches and interconnecting wires, it is obvious that the principle of our invention would reside in a system in which the percentage principle were availed of only for a portion of the train of selective actions.

The circuit selecting switches, namely, primary connector, secondary connector and interconnector may each consist of two switches whose movements are coördinated in order to establish connection between a particular wire or connection in the apparatus and the line contact or point desired. This coördination of movement is employed for the purpose of reducing the distance or extent of movement which would otherwise be necessary. Upon one of said switches all the lines or circuits are represented in points, but said points are divided into groups and the brushes which ride over the respective groups are connected to contacts or points of a second switch which is termed the "register", and which may have its brushes adjusted to find the brush which rides upon the points of the particular group in the first named switch where the circuit desired is represented. As well understood in the art, however, two movements on intersecting lines may be given to a device carrying a brush or brushes and by the coordination of these movements the particular group and contact point desired in said group may be found. It is preferred, however, to use the expedient of two independent switch arms, one of which is adjusted to find the group of points in which the line desired is located, while the other is adjusted over the points of said group to select or find the particular point wanted. Each primary connector, secondary connector and interconnector, according to this preferred plan, embraces therefore a switch having contacts or points for all of the lines or circuits, and a second switch having a limited number of contacts connected respectively with brushes riding over the groups or subdivisions into which the contacts of the first named are supposedly divided. The second switch is herein termed the "register". The first is the "cylinder" or "cylinder switch". The two constitute the connector.

As the register portion of the device may be of comparatively small dimensions, it may be operated by means of a stepping or escape magnet. For the cylinder portion of the connector, or rather for operating the brushes thereof, it is preferable to use a power constantly acting which is coupled to and uncoupled from the shaft carrying said brushes by means of a suitable clutch magnetically controlled. The switches may, however, be adjusted and brought to rest in the desired position by any magnetic or electromagnetic actuating or controlling device, as will be well understood by electricians.

Our invention briefly stated and in its broadest aspect may be said to consist in the division of the subscribers' lines into groups and the provision for each group of two or more main-line-circuit selecting switches, (secondary connector) each adapted to serve all the lines of that group in a manner to establish connection with any one of the lines as a called line and in the further provision of means whereby any one of all the groups of lines when used as a calling line may establish a connection with an idle one of the group of secondary connectors in any one of the whole number of groups so as to be able to establish a connection with a subscriber in any one of the whole number of groups of lines, and, therefore, with any line of the whole exchange.

The invention further briefly stated consists in the provision of a primary connector and a secondary connector on each section of the exchange, the primary connector being appropriated to forming connection with calling lines, and the secondary connector to forming connection with the called lines and intermediate devices whereby a connection may be established between the called line found upon the secondary connector and the calling line found upon the primary connector.

The invention consists further in an exchange having a primary connector and secondary connector on each section as described, and suitable means for establishing a connection between the primary connector of one section and a secondary connector on the same or any other section of the exchange; also in the subdivision of the sections of the exchange into groups or grand divisions, each accommodating a thousand more or less substation lines, and each provided with suitable main-line-circuit selecting switches, and in further providing and making available to the substation lines a series of interconnectors or circuit selecting switches controlling respectively connections leading to the secondary connectors of said grand divisions so as to permit any main line, by an automatically controlled action, to pick out a particular one of the series of interconnectors assigned to a thousand grand divisions and by such interconnector to establish connection with one of the secondary connectors in that division and through the adjustment of the latter to establish connection with the called line.

The invention consists further in establishing a guarding potential for a calling line as soon as the substation initiates a call whereby the line of said substation may be automatically protected from seizure by any other line and a similar guarding potential (as soon as the secondary connector is set or adjusted to proper position) whereby the called line may be protected from seizure by any other line than the one first calling. This protection against interference is secured by rendering the part or parts of the connecting apparatus inoperative by means of an electro-magnet operated from the circuit or portions of the apparatus on which the guarding potential is established. One of the ways in which this magnet may act is to cut off the controlling or releasing current by which the parts are set to position for effecting connection, but said magnet might be made to act in other ways, as well understood in the electric art, so as to render the device inoperative in a manner to prevent interference. The preferable way of using this guarding potential is to make it control, through a suitable magnet, the action of a circuit closing device which must go to circuit closing position in order to form a talking connection between the calling and called subscribers' lines.

Another part of the invention consists of what is termed hereinafter a "consecution controller," by means of which the calls coming from a number of lines at the same time are spaced out upon the interconnectors of the various sections, so as to prevent the same line from being seized at its secondary connector from two or more lines at the same instant under conditions to be described hereinafter. This device supplements the spacing out of the signals coming from two or more lines of the same section, which is produced by means of a decimal indicator, which brings said lines into operative connection with the exchange in succession, and the two together absolutely prevent interference between substations that may endeavor at the same time to effect connection with the same substation.

The invention consists also in certain improvements in the signal transmitter at the substation whereby the correct and proper operation of the same by the person using the apparatus at the substation is insured.

The invention also consists in the details of construction and combinations of apparatus more particularly specified in the claims.

The invention consists further in the special combinations of circuit selecting switches, circuit closers and other combinations of circuits and circuit controlling devices hereinafter more particularly described and then specified in the claims.

In the subjoined description and claims the term "main-line-circuit selecting switch" is used to designate switches that make connection to subscribers' or substation lines and in contradistinction to the term "local-circuit selecting switches" such as the interconnectors which only control connections between substation or main lines.

In the accompanying drawings, Figure 1 is a skeleton diagram of one section of the exchange, but shows only five of the ten divisions of connecting apparatus; Fig. 2 is a diagram illustrating the connections of the decimal indicator and other parts conveniently shown therewith; Fig. 3 shows diagrammatically the apparatus termed decimal register controller, and Fig. 4 illustrates the division starter and some of its connections; Fig. 5 illustrates diagrammatically a form of primary connector for one of the divisions; Fig. 6 is a similar view of the rotary switch; Figs. 7, 8 and 9 are similar views of the signal transmitter controller, interconnector and secondary connector. For convenience the thousands register, signal relay, release relay and ringing relay of one division together with some other parts are also shown in Fig. 7; Fig. 10 is a skeleton diagram showing how different sections of the exchange are connected to one another; Fig. 11 is a general plan of the cylinder switch, the register, and the controlling magnet and mechanism connected therewith; Fig. 12 is a side elevation of the same apparatus; Fig. 13 is a plan view of the cylinder switch with the parts supported at the top of the rotary shaft removed; Fig. 14 is a cross vertical section on the line $x$—$x$, Fig. 13; Fig. 15 is a detail showing one of the contact pieces of the switch cylinder; Fig. 16 is a plan of the clutch and its connected mechanism looking from beneath; Fig. 17 is a detail showing the adjustment for the retractor spring of the armature, Fig. 16; Fig. 18 is a cross section on the line $x$—$x$, Fig. 16; Figs. 19 and 20 are plan views of the register illustrating the manner in which it is restored to zero; Fig. 21 is a vertical section through the parts secured to the brush carrying shaft of the cylinder switch. Fig. 22 illustrates a modification in the manner of restoring the register to zero; Fig. 23 illustrates the consecution controller; Fig. 24 is a side elevation, and Fig. 25 a vertical section on the line x—x, Fig. 26, of a preferred construction of the decimal indicator; Fig. 26 is a plan of the same; Fig. 27 is a plan view with the plate which carries the magnets and brushes removed; Fig. 28 is a detail side elevation of the stop magnet for the decimal indicator, and Fig. 29 is a detail plan of the frame with the magnet removed; Fig. 30 is a general plan view of the decimal register controller; Fig. 31 is a side elevation of the same; Fig. 32 is an elevation showing the preferred construction of apparatus used at the substation; Fig. 33 is a horizontal cross section on line x—x, Fig. 32; Fig. 34 is a rear elevation of the apparatus shown in Fig. 32; Fig. 35 is a detail view showing the switch springs and contact stops, Fig. 34; Fig. 36 is a face view of the indicator used in connection with the signal transmitter at the substation; Fig. 37 is a cross section of the line x—x, of Fig. 36, and Fig. 38 is a cross section of the line y—y, of Fig. 36; Fig. 39 is a diagram of the connection of the substation apparatus. Fig. 40 is a diagram of a modification in the connections of a part of the apparatus. Fig. 41 is a diagram illustrating the guard circuits and connections effective at a particular stage of the operation as hereinafter more particularly set forth.

By placing the diagram Figs. 5, 6, 7, 8 and 9, one above the other in the order named, and Figs. 2, 3 and 4, one above the other in the order named, but to the left of 6, 7, 8 and 9, so that similarly marked wires or connections will join at the edge of the sheets, a general diagram may be formed showing in detail the connections between the various parts of the apparatus constituting one division and the one set of devices common to the several divisions.

In the skeleton diagram, Fig. 1, the principal parts of the apparatus and the connections between them are shown for five divisions of one section. The parts are thus designated in the diagram: P. C. primary connector; R. S. rotary switch; S. T. C. signal transmitter controller; I' and I² the two interconnectors respectively for the first and second thousands of the exchange; S. C. secondary connector; D. I. decimal indicator; D. R. C. decimal register controller, and D. S. division starter.

Before describing in detail the several parts of the apparatus constituting a division, a construction of a cylinder switch, register switch and clutch device suitable for use as a primary connector, secondary connector or interconnector by proper arrangement of the connections and modification of the clutch disk will be described. The switch may be connected up to operate as the rotary switch of each division, and also, by proper connecting up, as the signal transmitter controller. It may also be used for other parts of the apparatus.

*Cylinder switch.*—Referring to Figs. 11 and 12 to 18, E, is a switch cylinder, and 60 the points or contacts anchored in that cylinder. Cylinder E is preferably plaster of Paris or other plastic insulating material, and the contacts 60 are pieces of wire or sheet metal formed as indicated in Fig. 15, so that they may be anchored against longitudinal movement in the cylinder E. In the diagrams the contact ends of these pieces are shown as circular in form. The pieces 60 are assembled for manufacture of the cylinder in any suitable mold and in the proper relative position, and plaster of Paris is poured around them and allowed to set. The pieces 60 are arranged radially as shown with their inner ends projecting for engagement by the switch brushes, while their outer ends are left free for the attachment of wires or conductors. The cylinder shown is provided with 12 longitudinal rows of points or contacts 60, each row containing 44 contacts, thus providing for quadrants, each longitudinal row of which contains 11 contacts. Four corresponding sets of brushes 61 are provided which are carried by shaft 62.

63 is a gear wheel secured to the shaft and imparting motion thereto from any suitable power.

The cylinder E is fastened between two plates 64, to the lower one of which is secured a plate 65, carrying a bearing for the shaft 62, and provided with a depending pivot 66, that enters a socket in the bracket 67, secured to the frame of the apparatus. This construction permits the cylinder to be swung away from its driving gear and allows ready access to the outer ends of the contact plates or points 60 around its whole periphery. Each brush 61 consists, preferably, of two springs turned up at their forward edges to permit them to slide readily into contact with the ends of the plates 60. The springs grasp said ends between them to afford good connection. The brushes 61 are set in slots cut in a block 67, of vulcanite or other insulating material, and are secured therein by clamp plates 68, secured to the face of the block 67, and insulated from the brushes by the sheets 69 of non-conductor. The inner ends of the brushes project from the block 67 and to each is secured one of a number of wires 71, which pass out through the upper end of the cylinder E, for connection to other parts, or may be connected with one another in pairs, so as to make their brushes act as bridging brushes, which will connect the contacts or points 60, upon which they are for the time bearing, and so form an electric connection between the two wires attached respectively to the outer ends of said contacts. The inner ends of the brushes 61 project through the blocks 67, as shown, for attachment to the wires 71, by soldering or otherwise. Each gang of 12 brushes after being assembled and secured in place in its block 67, is fastened to the face of one of the arms of casting 70, secured to the shaft 62.

The device, as thus constructed, affords a rotary switch or circuit closer that may be very cheaply constructed, with a large number of contact points, since the contacts 60 may be stamped or cut in quantities from sheet metal, and being assembled in the mold in proper position all that is required in order to complete the switch cylinder is to cast the insulation around them in the form shown, so as to leave the inner ends of said plates exposed for engagement by the switch brushes, and the outer ends exposed for attachment of the wires or circuit connections.

By properly connecting the contacts 60 to the circuits to be controlled, or to one another in rows, or in any desired relation, and by proper connection of the brushes 61 to one another, or to other parts through the wires 71, according to the electrical operations to be performed, it is obvious that the device described may be used for a large variety of purposes. It may be employed in the exchange herein described, in the primary connector, in the secondary connector, the interconnector, the rotary switch and the signal transmitter controller, or for other parts, although for some of these parts not all of the contacts and brushes need to be utilized. The switch shown affords 528 contact points.

In utilizing this device for the automatic exchange, shaft 62 may be set and brought to rest in the desired position by any desired means. It is preferably operated by means of a driving power whose application to the shaft is controlled by means of an electro-magnet and clutch of any suitable construction.

*The clutch.*—72 is a wheel gearing to wheel 63 upon the brush carrying shaft 62. The shaft of wheel 72 carries a wheel 82 geared through idler wheels with a wheel 81 rotating loosely on shaft 75, and having a clutch control disk D fastened to its hub. The edge of the disk is cut or notched to permit the entrance of a dog 83. A clutch controlling elbow lever 84 carries the dog and the armature of an electro-magnet C which serves to operate the lever and bring a serrated wheel 76 into engagement with a serrated wheel or disk 74 keyed to a power-driven shaft 75. When the wheels are engaged power is transmitted to the wheel 72, and wheel 63 of the brush carrying shaft from shaft 75 through wheel 78 on the same shaft with wheel 76, through an idle wheel to wheel 79, and a second wheel 80 on the same shaft with 79, and gearing to the wheel 72. Wheels 76 and 78 are mounted in pivoted frame 77, which also carries the idler wheel connecting wheels 78 and 79. The frame is operated to cause the clutch wheels 76 and 74 to engage by means of a magnet C, whose armature lever 84 carries a roller which engages the frame. As soon as the clutch is engaged by the magnet, it is kept engaged by the dog 83 riding on the continuous edge of the disk D, or upon the spaces between notches. As soon as it finds a notch into which it may drop, it permits the lever 84 to be actuated by the spring 73, so that the clutch will be disengaged, and the wheel 72 and disk D will come to rest. A momentary action of the magnet lifts the dog out of the notch in the disk and immediately sets the parts to revolving so that the disk D by riding under the dog will keep them in revolution, although the magnet may be discharged. This continues until the dog finds the next notch of the disk. The gearing is such that in passing from one notch to the next the dog will permit the cylinder brushes to advance one or more whole steps, depending upon the space between the notches. With the spacing shown the brushes would move one step or space for each notch in the disk. Assuming that the arrow indicates direction of the revolution of the disk D, the first of the notches in the notched segment which is engaged as the dog passes off the uncut portion of the disk is the normal notch, and the remaining 10 notches provide for bringing the brushes to rest in any one of the 10 positions upon the consecutive contacts 60 following the first or normal contact in any quadrant of the contact cylinder. By keeping the magnet excited, the brushes may be made to pass without stopping over intermediate contacts until they reach the contact 60 desired, at or just before which time the magnet may be deënergized and permit the dog to enter the corresponding notch so as to bring the brush to rest on the desired contact. When the dog is lifted from the last notch of the group shown, the disk and the brush shaft will make three-quarters of a revolution without stopping until the dog finds the normal or first notch of the group, when it will come to rest.

The arrangement of the notches may obviously be varied to suit the requirements. The 11 in one quadrant as shown provide for the 11 different positions normal and 0 to 9 inclusive of the brushes in moving through a quarter revolution, which is the arrangement employed for the primary connector and secondary connector when the line contacts are grouped or arranged according to the decimal system.

*The register.*—The portion of the connector termed herein the register may be constructed as shown in Figs. 11 and 12. It is preferably made to revolve with the brushes of the switch cylinder for which purpose its parts are mounted on a plate 92 secured to the gear wheel 63.

$E^1$ represents the contact sector of the register. Said sector contains one or more rows of contact points 60 preferably mounted and anchored like those of the cylinder E, in plaster of Paris or other plastic material cast around them. The sector shown has three rows of contacts over which three corresponding brushes (61) are adjusted to rest in any circuit closing position. This is a sufficient number of rows for the register of the primary connector in the organization of apparatus herein shown and described. The three brushes (61) are mounted as a gang of brushes in substantially the same manner as those of the switch cylinder by fastening the block in which they are secured to a support (86), which in the case of the register is fastened to an escapement sector 87. Each row of sector contacts may consist of a normal N and ten other contacts numbered 0 to 9 inclusive, which is sufficient for the primary connector. In the case of the secondary connector an additional contact which is a "dead" contact may be provided between the N and 0 contacts for a purpose to be described. A spring 88 secured at its free end to a strap wound around the hub of the escapement sector tends to turn the sector in the direction of the arrow to cause the brushes to move under the restraint of scape lever 89, step by step over the contacts. The scape lever allows the brushes to move one whole step for each to and fro movement of the scape lever.

A is the actuating magnet having an armature adapted to engage an arm 90 of the scape lever. A spring 91 brings the pallet of the scape lever back to normal position after such action of the magnet. The scape teeth and pallets are formed as shown to permit the scape sector to be forced back to zero position, when the support plate (92) upon which the register is mounted is rotated by the superior force of the driving power for shaft (62) so as to bring the lug (93) depending from the sector through an opening in the plate (92) against and past an obstruction such as a post 94 upon the fixed cylinder E, or other fixed support. The pivotal center of the sector being eccentric to the center upon which the plate (92) turns, it will be obvious that by proper adjustment of the overlap of the lug (93) and post (94) where they engage they may be made to clear one another at the instant the sector brushes have been restored to the normal position, and the support (92) may then continue its forward movement around to normal ready for another operation. In the resetting operation the tension of the actuating spring (88) is restored in obvious manner.

Inasmuch as the register is carried by the shaft which carries the cylinder brushes, and since the range of movement of the rear end of the register brushes with relation to the brushes carried by the shaft in the switch cylinder is limited, the desired connections between cylinder brushes and register brushes may be made directly through the wires (71) which are sufficiently flexible to allow for the comparatively limited movement. Any desired connection between the register contacts and cylinder brushes may be made directly either by the connections (71) or by other means destitute of flexibility.

*Divisions.*—The preferred construction of the various portions of the connecting apparatus in one division of a section and the general connections and functions of the same are as follows: It will be assumed that each substation is connected with the central station by two wires adapted for use as a metallic circuit in communicating with any other substation. These two wires will be designated as the No. 1 and No. 2 or the $L^1$ and $L^2$ sides of the substation circuit or line. In the several diagrams Figs. 5–9 the fixed contact points are indicated by the small circles. The cylinder contacts are shown in 12 straight parallel rows and the register contacts in the 3 or more curved rows.

*Primary connector.*—For each primary connector the apparatus described in connection with Figs. 11–18 may be utilized without material alteration. The primary connector operates to place any substation of the section on which it is located in connection with the other portions of the apparatus in the same division. As shown in the diagram, Fig. 1 and as already stated, a group of such primary connectors, (P. C.) would be employed for a group of main lines, and each is available for use by any line of the group so as to place any main line in connection with some one of a number of normally idle connecting wires or sets of wires which become, for the time being, an extension from the main line calling to the apparatus which receives the selective signals and to the circuit selecting switches by whose combined operation a talking circuit is established to the line called by adjustment of a secondary connector. There being five primary connectors, there would be five primary connecting wires or sets of wires with an idle one of which a calling main line would establish connection by sending a preliminary electrical impulse. As already stated the primary connectors are organized on a percentage basis and the number of the same available to each group of subscribers lines is less than the whole number of subscribers in that group. They may be described as circuit selecting switches or connectors whose function is to pick out or select any main line of a group when used as a calling line and establish connection between said selected main line and a terminal of a local circuit or circuits of the exchange apparatus. Said terminal forms the terminal of a circuit or circuits which receive the selective signals sent from the main line station and also by preference is in effect a terminal of a cord circuit over which the calling and the called line are connected in the exchange apparatus. For this purpose the two sides $L^1$, $L^2$, of each line are connected to two contacts (61) assigned to it by branch wires as indicated in Figs. 1 and 5, where one such line is shown. In addition to two line contacts for each line a guard contact is provided connected in a similar way with a guard wire (G), one for each line or substation of the section. Wire G is a local wire at the central station.

The line points are subdivided or arranged preferably in groups 0–9 inclusive, each group of ten points occupying one horizontal row in one of the cylinder quadrants. There being 100 lines for the section, ten such groups are appropriated for each side of the line, and ten similar groups are provided as guard points for the 100 lines. A brush is assigned to each group and is adapted to ride over all of the contacts of its group in succession, and each of said brushes is connected to one of the contacts in one of the three rows of contacts on the register sector E'. The outer row of contacts in the register brushes are connected to cylinder brushes which ride upon rows of cylinder contacts connected up to one another on the exterior of the cylinder and joined to wires $l^1$, $l^2$, $g$, so that said register brushes may be kept in constant connection with said wires during the use of the apparatus in effecting and maintaining connection between substations. These interconnected groups of points serve as continuous feed segments and perform the practical function of continuous metallic segments or plates. The wires $l^1$, $l^2$ are primary connecting wires and as many pairs are employed as there are primary connectors and as the service or traffic may demand, and connection is made with an idle pair of said wires in response to a preliminary electric impulse from a calling subscriber's station. To establish connection between any main line and these wires the register brushes are adjusted until they rest upon a contact of the register sector, which is in turn connected to a cylinder brush adapted to ride upon the particular group of cylinder contacts in which the line point wanted is located, and by the adjustment of said cylinder brush to engage that contact, connection is established from said line to the register brush and thence through a feed segment by means of a brush bearing thereon and connected with the register brush. This is the operation for either the $L^1$, $L^2$, or G line of any substation; and by the orderly arrangement of the contacts and brushes connection may obviously be established for the $L^1$, $L^2$, and G lines of any substation represented in the primary connector by contact points 60. With the arrangement shown the maximum movement required of the cylinder brushes in order to find contacts of any line or substation is a quarter revolution of the brush shaft.

$C^5$ indicates the stop or clutch magnet for the primary connector. This magnet may be actuated on the initiation of the call to start the cylinder brushes on their way to find the contacts assigned to the calling substation, and it is discharged automatically to stop the cylinder brushes on said contacts. The control disk D is hence provided with 10 notches in addition to the normal notch, and said notches are arranged to permit the brush shaft to come to rest with the brushes on any one of the ten contacts engaged in a quarter revolution of the shaft. The devices resume their normal position by moving without obstruction through the remaining three-quarters of their revolution to the zero notch of the disk. The clutch magnet $C^5$ is preferably wound with two coils, one of which is the starting and the other the release or stopping coil. For this purpose the latter may be wound or connected so as to oppose the effects of the first.

The coil by which the brushes are brought to rest is connected with a feed segment of the primary connector cylinder formed by connecting up a line of contacts in one quadrant, and a brush adapted to ride on said segment is connected with another brush adapted to ride and make contact in succession with a series of contacts designated as the "units" row of contacts. The latter connect respectively over the wires made up into a cable $c^{44}$, and joined respectively to the contacts of the "units" indicator ring, to be described in connection with the decimal indicator.

When the cylinder brush finds a contact which is connected to a contact of the "units" ring upon which the circuit has been closed by a brush, the circuit for the magnet $C^5$ is completed, and the magnet being discharged the dog falls back into a notch of the disk D, and the connector is brought to rest. These cylinder contacts form stop controlling contacts since the action of the stop and the consequent position in which the primary connector will come to rest depend upon the selection by the cylinder brush of a contact which is connected to a circuit closed at a particular position of the decimal indicator. Another pair of brushes in the primary connector cylinder are connected together through the magnet A' of the register and ride upon feed segments formed by connecting up cylinder contacts as shown, so that when the connector is started a circuit through the magnet A' will be immediately established. Other pairs of cylinder brushes are interconnected to operate as bridging brushes which, by simultaneously engaging certain contacts of the cylinder, will complete circuits whereby, as the connector moves on its way to zero position, other parts of the connecting apparatus will also be released and sent to zero. The connection of the various parts of the connector with the decimal register controller common to the divisions and with the rotary switch in the same division will be described more in detail in setting forth the general operation.

The magnet A' when thrown into circuit by the bridging brushes in the cylinder, is operated to step the register around to position corresponding to the tens value of the particular station from which the call comes. This is effected by the devices brought into action as soon as the call is initiated by the substation and adapted to produce a number of impulses corresponding to the tens value of the substation number from which the call comes. For each division in a section one such connector is employed.

*Rotary switch.*—In a preferred manner of combining and operating the apparatus the rotary switch embodies circuit closing and changing devices operating to close circuit and thereby effect operations in substantially the following order. Some of these operations may be effected, however, by closures of circuit produced by other parts of the apparatus actuating at the proper relative times in the order of operations. By means of a signal from the substation, preferably the signal sent on initiating a call, the rotary switch of the division of connecting apparatus seized is started. Its first action is to break the circuit over which it is started, thus isolating it from interference. As soon as it starts, it closes circuit or circuits over which the adjustment of the primary connector is effected. In the preferred arrangement it operates the clutch magnet which starts the cylinder brushes of the primary connector and also sets into operation the devices whereby the register brushes are adjusted to position corresponding to the tens value of the number for the substation calling.

In the particular arrangement of apparatus described the device so started by the rotary switch to operate the register is the decimal register controller. Immediately thereafter the rotary switch closes a connection for charging the guard circuit of the calling substation, and also closes a circuit by means of which the decimal indicator, which had been previously stopped by the initial signal from the calling substation, may be released, so as to revert to the common use of the other substations in the same section. It also at this stage of operation completes the circuit over which the interconnectors of the same section may be started as soon as such circuit is found by a device termed a "consecution controller," the function of which is to give all the interconnectors of a section over to the control of the substations of various sections consecutively, or in sequence for said sections respectively. By this means no two interconnectors are permitted to start into operation at the same time so as to come in conflict in the endeavor to seize the same secondary connector or line, as might be the case if two substations should endeavor at the same instant to effect connection with the same substation. The rotary switch also closes circuits which prepare the connecting apparatus of the same division for operation through the controlling action of the signal transmitter and the signal transmitter controller operating in conjunction to set the connecting apparatus to position for finding the circuit of the called line.

As soon as the signal transmitter has been set to proper position the rotary switch closes connection for charging the guarding circuit of the substation called upon the particular section of the apparatus to which said substation is assigned, thus preventing the seizure of said circuit by any other calling substation. But in passing to position for closing connection it closes a circuit by which a test is applied to determine whether the line wanted is in use, and whereby, should it not be in use, the connecting apparatus may move on to position to establish the signaling and talking connection between the calling and called subscriber, but whereby the apparatus is prevented from coming to such position if the line wanted is found to be in use. The line wanted being found idle, the rotary switch charges the guard circuit, and circuits by means of which, through suitable apparatus at the central station, the calling substation may signal the called substation, and over which also communication may be held between the two connected substations. On the conclusion of conversation the rotary switch moves so as to break the talking and signaling circuits at the central office, and closes circuits whereby the primary connector, secondary connector and interconnector may be set to normal position, and whereby also any other parts of the apparatus which may be off normal position may be restored to proper zero or normal position.

In addition to the general operation effected as above described, the rotary switch closes circuits at proper stages in the operation of the apparatus for effecting other minor results as, for instance, the restoration to normal position of the devices used in the setting of the primary connector to register with the line calling, and for stepping or moving the signal transmitter, as will be more fully described in setting forth the general operation.

The circuits closed for the various purposes above described may be ones which are connected directly with parts described, or may be simply circuits which operate through the intervention of others in the nature of relay circuits to effect the desired operation. Thus, in the case of restoring the interconnector to zero, the circuit closed by the rotary switch may be one which releases the primary connector or the secondary connector, and the latter in turn may operate upon the circuit over which interconnector is released and sent to zero. In performing these various actions the rotary switch is preferably caused to assume seven different positions, after leaving the normal, upon each of which it is permitted to rest for a greater or less time, depending upon the number of operations which must take place before it passes to the next position. Some of the circuits may be closed as the switch passes from one position of rest to the next.

The rotary switch may be of any desired mechanical construction, but the construction before described as employed for the switch cylinder of the primary connector may be profitably used for the rotary switch by connecting the brushes in pairs to form bridging brushes which operate to close the necessary circuits by simultaneously engaging contact points forming terminals or poles of said circuits, or to engage rows of contact points connected up to form practically continuous contacts. The rotary switch as thus constructed completes its action or moves from normal around to normal by one-half a revolution of the shaft carrying the brushes, and in such half-revolution the switch brushes assume after passing normal, seven different positions, as indicated by the numerals 1—V$^{11}$ at the top of the diagram. From the No. 7 position, which is that occupied by the bridging brushes, after having passed over 14 vertical rows of contacts, the brushes pass to normal by moving over the remaining contacts of half cylinder without effecting any operation.

As will be apparent upon inspection of the diagram, only a portion of the contacts in the first half of the cylinder are utilized, and a few only of those in the second half, which latter it is necessary to use, because those in the first half corresponding to the No. 2 position of the switch are fully utilized. It is also obvious that it is necessary only to use as bridging brushes those brushes 61, which are located on the same diametrical line.

In making one step the brushes are supposed to move over two of the contacts 61. When the control of the movement is effected by mechanism such as already described, and consisting of the disk D, and control magnet $C^3$, the disk D would preferably have its notches spaced apart twice the distance of those indicated in the case of the primary connector, provided that the same ratio of gearing be employed between it and the driving mechanism for the switch cylinder or brushes of the switch cylinder.

As shown in the diagram, the disk D is supposed to be used with the same ratio of gear, and is arranged to stop the brushes in seven different positions in addition to the normal position. As the switch repeats its operation in the second half revolution, the disk D is provided with two sets of notches, the normal one of which in each set is the one first engaged by the dog in case the disk revolves in the direction of the arrow. The dog is shown in the figure as engaged with the normal notch of one group of notches, and the bridging brushes of the switch as in the corresponding normal position. The particular way in which the contact points are connected up to one another, and to other parts of the apparatus in order to close and break the proper circuits in the proper order, and for the proper periods, will be understood clearly from the subjoined description of the general operation of the apparatus.

The clutch magnet $C^3$ of the rotary switch is operated in the manner to be more fully described hereinafter over circuits leading from other parts of the apparatus and established by the rotary switch in its various positions of rest. Of this apparatus also one is used for each division of each section.

*Signal transmitter controller.*—The primary function of this portion of the apparatus is to transmit impulses over the sub-station circuit for the purpose of operating the signal transmitter and causing the contact arm thereof to move over the units, tens, hundreds and thousands segments or contacts. It may also embody certain circuit closing devices through which the talking connection and other connections are made. It is preferable to embody in the same piece of apparatus the means whereby stepping or controlling impulses are produced for operating the thousands register, interconnector, secondary connector, and whereby also other circuits and connections are closed for purposes which will be more clearly understood when the general operation of the apparatus is described.

When the circuits are closed or broken by means of rings of contacts and bridging brushes such as already described in the case of the switch cylinder, only six such rings will be required, and six corresponding brushes, which are bridged in pairs to make and break connection for circuits over the rings or rows of contacts. One way of connecting up these six rows to one another and to the circuits, is illustrated in the diagram, Fig. 7. The two upper rows constitute in connection with a suitable source of electric energy a form of impulse generator whose impulses operate the signal transmitter. The two middle rows generate in a similar way impulses which operate the thousands register, the interconnector and secondary connector, and the two lower rows operate in connection with their pairs of bridging brushes as a local circuit closer for coils of the signal relay and for other purposes as will be described.

The normal position of the brushes of the device is indicated by the letter N. In this position two pairs of them may be utilized in completing the signaling and talking circuit.

In the operation of establishing interconnection between two substations the brushes make two complete revolutions over the rows of contacts, each containing 44 contacts. The device is properly controlled in its operation so that the brushes will, in completing a cycle of actions, assume three positions of rest. First, the N or normal position. Second, the S. N. or subnormal position just before they complete their first revolution, and third, a second subnormal position on the same contacts just before completing the second revolution. The device may be stopped in these positions by any mechanism, but it will be found convenient to employ, as already described, a clutch controlling disk D, and stop and start magnet C⁶. The disk D is properly notched and is connected to the operating shaft for the brushes by a train of gear properly proportioned to secure the above-named positions of rest for the brushes as shown. In the drawing the normal notch of the disk is shown engaged by the dog. The two other notches on the same diametrical line correspond to the two subnormal positions. In this case the gear is properly proportioned to permit the disk to make a half revolution for one whole revolution of the brushes.

When the device is started from the normal position by an impulse sent through the magnet C⁶, it moves without interruption over the whole row of contacts to the subnormal position, S. N. It is obvious that by connecting every other one of the contacts as shown in the second row, and connecting all of the contacts in the first row except those indicated, the brushes in moving over said rows may be made to make and break circuit by connecting the contacts to one another and to the exterior circuits in the manner indicated in the diagram. The apparatus has other functions which will be better understood in connection with the description of the general operation.

While we prefer to use a signal transmitter and signal transmitter controller combined as herein described to effect the adjustment of the central office devices to their different required positions, we do not limit ourselves to the use of the same, as other means may be employed for causing the interconnector and the secondary connector to step or move to the desired position and there come to rest under the control of a signal transmitter at the substation upon which the signal corresponding to the line wanted is composed.

*Interconnector.*—The function of the interconnector is mainly to establish connection with that section of the exchange in which the line of the called subscriber terminates, and to select in said section, or call into operation a secondary connector that is for the time being not in use. After selection the idle connector is adjusted to position to establish connection with the line called. It is desirable to employ one such interconnector in each division for every 10 sections or thousand substations of the exchange, although each interconnector may serve for a greater or less number of sections, that is to say when the exchange is so large as to require a large number of sections, said whole number of sections is subdivided into groups; and to each group an interconnector is assigned by means of which the particular section of said group and an idle secondary connector in said group may be brought into action. As will be obvious, however, each section might accommodate a less number of subscribers than 100, and the sections might be grouped in any other way so that each group would embrace any other number greater or less than 10. Each separate group we term herein a grand division or group, and when we speak of "thousands" of the exchange we mean one group of sections. In the present case the use of two interconnectors is assured, one for each thousand substations, that for substations 0–999 being marked I′, and that for substations 1000–1999 or any less number in the second thousand being marked I². The interconnector is like the primary connector, in that it serves for selecting or picking out and establishing connection upon one particular point, or set of points, out of a large number of sets of points. Preferably it comprises two switches whose operations are coördinated, one acting to pick out the group of points in which are located the particular point or set of points desired, and the other to select the point or set of points desired in the group picked out by the first.

In practice it is desirable to use the register and the cylinder switch before described as the switches whose actions are coördinated, though other constructions of interconnectors may be employed. In this case the register and cylinder switch may be connected up and used as indicated in the diagram, Fig. 8. Upon the switch cylinder all the secondary connectors of all the sections which the interconnector serves are preferably represented each by a set of four contact points, two of which represent the two sides $L^1$, $L^2$, of the talking circuit. A third contact represents a circuit over which a guarding potential may be established on the secondary connector after seizure or a test for line busy applied to the line wanted and found on the secondary connector. The same circuit may also serve as a test circuit by means of which the interconnector may test the secondary connector and be automatically brought to rest in connection therewith in case it finds said secondary connector idle. The fourth contact is for a circuit over which a part of the secondary connector may be adjusted to find the line called. The register sector is provided with four corresponding rows of contacts and four brushes, one for each row.

Assuming that there are for 1,000 substations 10 sections of 10 divisions each, thus requiring 100 secondary connectors, and that each secondary connector is represented in the interconnector by a set of four points, there would be 100 of such sets of points; but no interconnector would necessarily have more than 100 such sets even if the exchange were extended to accommodate ten thousand substations or a greater number. All of the sets for the 10 secondary connectors of one section are preferably grouped in one quadrant of the interconnector cylinder and as indicated by brackets applied to groups of points. Each set of four points in the interconnector represents one secondary connector and is connected to a set of four bus wires, $g^2$, $l^{31}$, $l^{32}$, $c^{24}$, which run through all sections of the exchange; and the secondary connector so represented on every interconnector is connected to bus wires by tap wires at the section where said secondary connector is located. Corresponding sets of points representing the same secondary connector on all interconnectors of the exchange in both the first and second thousands grand division or group are connected to the same set of bus wires. In other words, every secondary connector in a thousands grand division is represented in a corresponding thousands interconnector in every division of every section of the exchange. When a thousands register is used these wires constitute tertiary connecting wires since they are the wires which are selected by the "thousands" and "hundreds" signals and then form a path for circuits over which the third selective signal acts in adjusting the secondary connector or final main-line-circuit selecting switch so as to connect said tertiary wire or wires to the so called main line.

The bus wire $g^2$ is the test and guard bus, and $c^{24}$ is the bus over which the cylinder brushes for portion of the secondary connector are adjusted to connection with the guard and line points of the line called. The bus wires $l^{31}$, $l^{32}$, are the signaling and talking bus wires. This general plan of connection is illustrated in Fig. 10 where the 8th section of the group of sections embracing the first thousand substations, viz.—the section for substations 700-799, and the 9th section of the group of sections embracing the second thousand, or that for substations 1800-1899 are indicated.

The interconnectors $I^1$, $I^2$, and the secondary connector for two divisions on each section are indicated, together with the four sets of bus wires for the four secondary connectors. For other secondary connectors of the same and other sections, similar sets of bus wires would be provided. In the diagram, Fig. 8 the two sets of tap wires running down in full lines from the interconnector cylinder contacts are those for the first two divisions of secondary connector in one particular section of the exchange. The one set of bus and tap wires in dotted lines indicate one secondary connector of another division.

Rows of contacts on the interconnector cylinder as indicated in the outer four rows of the second quadrant may be connected together to form continuous feed contacts or segments upon which, when the interconnector starts from normal position indicated, four brushes will ride. These four brushes connect respectively to four brushes of the register riding respectively on the four rows of contacts of the contact sector. The four contacts of the register sector engaged by the four brushes at each of their positions connect respectively to sets of four brushes adapted to ride over groups of contacts on the interconnector cylinder in which all the divisions of the secondary connector in one section of the exchange are represented. The brushes of the register in normal position rest on dead contacts, and may be adjusted to assume position upon 10 different sets of contacts, as shown, which correspond to 10 different sections 0–9 of the exchange. As will be made more apparent from the description of the operation, the register portion of the interconnector is the part thereof which effects a preliminary selection of any desired group of the secondary connectors which are the main-line-circuit selecting switches for establishing connection to any one of a group of main lines used as a called line. The continuous contact segments are connected respectively to wires $g^1$, $l^{21}$, $l^{22}$, and $c^{23}$, leading from the rotary switch and parts of the signal transmitter controller over which circuits are established in the manner described in connection with the general operation.

The interconnector may be set or adjusted through the action of any desired devices, as, for instance, devices such as before described, and consisting of a clutch control disk D, and operating magnet $C^7$, for the switch cylinder portion thereof, and of a stepping escapement magnet $A^3$ for the register. When connected up in the manner described to the bus wires and when the interconnector is made to control connection to 10 sets of secondary connectors for each section, the cylinder brushes must be capable of being set to 10 different positions in addition to the normal position, and the clutch disk D is therefore provided with 11 control notches; the one engaged by the dog as shown is the normal notch. The disk D makes one whole revolution of the cylinder shaft in the interconnector.

The 11 positions occupied by the cylinder brushes are covered in the one-quarter revolution of the shaft. In returning to normal position the brushes rotate in the same direction through the remaining three-quarters of the revolution, during which time the dog 83 rests upon the uncut portion of the edge of the disk D. Magnet $C^7$ is controlled over circuit wires $c^{18}$ and $c^{19}$, connected to the rotary switch and the signal transmitter controller and associated parts, as will be described in the general operation.

The register may be mounted upon the gear carried by the cylinder shaft, and the brush carrying escapement disk may be restored to normal in the manner already explained when the parts are released and allowed to move around to N position.

*Secondary connector.*—The secondary connector of each division, like the primary connector, has line and guard points representing all the lines of the section in which it is located. The tap wires $g^5$, $l^{52}$, $l^{51}$, for one substation line are represented in the diagram Figs. 1 and 9. The secondary connector when seized through the interconnector of the same or any other section, may be adjusted to the contacts of the line called by any desired means, and may be constructed in any desired manner to afford circuit connections and circuit closing and breaking devices whereby the general actions described in connection with the general operation may be produced. Each secondary connector is joined to a set of bus wires by the four tap wires $c^{25}$, $l^{41}$, $l^{42}$, and $g^3$, as clearly shown in the diagram. The connection $c^{25}$ serves merely to control the movement of the brushes which find and are brought to rest upon the line and guard contacts of the line called, and may be connected directly to earth and negative battery. The circuit for $g^3$ is joined to contacts at the normal or end position of the secondary connector, so that when the secondary connector is moved from normal or end position the change in condition of the circuit $g^3$ produced thereby may be utilized as hereinafter described to determine the operation of the interconnector in its hunting action for the purpose of seizing an idle secondary connector. The $l^{41}$ and $l^{42}$ tap wires connect directly or indirectly with the brushes which are adapted to move over the sets of contacts representing the L', $L^2$ lines for the various substations represented in the same section of the exchange.

For the secondary connector, as for other devices, it is convenient to employ the switch cylinder and register already described. The register in this case, however, requires but three rows of contacts in the register sector. Combined with each secondary connector is a circuit closer and breaker which closes circuit in the normal position of the secondary connector and breaks circuit when the secondary connector is put into use and therefore out of normal position. When any moving interconnector in its search for an idle secondary connector reaches connection to a secondary connector in normal or idle position a circuit is established by the interconnector through said circuit closer and this causes the controlling circuit of the interconnector to be broken so as to bring the same to rest. This may be brought about through the intervention of a suitable relay such as $R^6$, Fig. 7 acting on the circuit including clutch magnet $C^7$ for the interconnector, Fig. 8. Conveniently the said circuit closer and breaker consists of brush and coöperating contact on the register of the secondary connector engaged with one another in the normal position and shown as the inner one of the three register brushes and the first contact of the inner row of contacts, Fig. 9. There is, however, on the register, an additional contact in each of said rows which is represented by the letter Z. These contacts are dead contacts upon which the register brushes may rest temporarily when this portion of the secondary connector is moved forward from normal position after seizure by an interconnector, so as to prevent any other interconnector from coming to rest in position for closing circuit to the same secondary connector.

The contacts succeeding the Z contact, ten in number, represent the ten decimal values of the tens order of numerals, and are connected respectively to sets of brushes in the cylinder, each set of which latter, after leaving N position, is adapted to move over the group or row of cylinder contacts representing the units value of the several substation numbers.

The brushes of the register which move over the contact segments of the register connect respectively with the brushes adapted to ride upon contact segments connected with the tap wires $g^3$, $l^{41}$, and $l^{42}$. These contact or feed segments may be made up, as before explained, by connecting a row of contacts on the switch cylinder sufficient in number to preserve the connection on the segment so formed during the necessary interval. These feed segments are engaged as soon as the cylinder brushes are started from their N position. In this case, as before, the cylinder is supposedly divided into quadrants, each adapted for use with one gang of brushes carried by one of the four arms upon the brush carrying shaft. Those brushes which connect to the contact points of the register, 0 to 9 inclusive, rest in their N position upon points that are normally dead. The two register brushes through which circuits $l^{41}$ and $l^{42}$ are formed are also joined to brushes as shown, which are dead in their normal position, and engage two feed segments respectively as soon as they start to revolve, but the inner brush which corresponds to the $g^3$ tap is connected to a brush bearing on a feed segment that is engaged by said brush in its N position, so that there is normally a circuit over $g^3$ to the register brush, and thence by a contact in the N position of said brush to negative battery or return circuit by a brush and contact of the switch cylinder, as clearly shown. The circuit is broken when the register is moved off the normal position to the z contacts. There is also a connection formed in the normal position of the switch cylinder through the register magnet $A^4$, from one of the bus wires to earth and return. This may be from the bus wire $l^{31}$ to tap $l^{41}$, and the branch $a^{12}$, which is connected to a contact engaged by a brush in the N position of the switch cylinder shaft, and thence through register magnet $A^4$ by a bridge wire connected to a similar brush and contact joined to earth or return. By this means when the cylinder brushes start, they break the connection of the magnet $A^4$ which, however, has previously fulfilled its function of responding to the tens impulses and has moved its brushes to the proper position. The purpose of thus breaking the circuit of the magnet $A^4$ is to prevent interference with the talking circuit when established over $l^{41}$, which might result from the ground connection for $l^{41}$ over branch $a^{12}$.

The clutch and control magnet $C^8$, and the disk D may be utilized in substantially the manner as before explained to control its movements in the cylinder brushes. In this case, as before, the range of operation of the cylinder brushes being embraced in one-quarter revolution, the notches in the disk D may be arranged in the same way as in the case of the primary connector and interconnector. The register may be mounted upon a plate carried by the cylinder shaft, and the brush carrying escapement disk may be restored to normal in the manner already explained.

There being one or more of such main-line-circuit selecting switches termed secondary connectors for each group of main lines and there being also for all of the main lines of all groups, a circuit-selecting switch (inter-connector) one or more for each group of lines in which each of said secondary connectors is represented, it will be obvious that the operation for establishing a connection from any main line to a secondary connector and to a main line represented thereon involves a train of circuit selecting actions in which interconnectors operate as circuit-selecting switches to pick out an idle secondary connector in the desired group and that all lines may, by such circuit-selecting action, seize upon any secondary connector of any group. The interconnector switch by its selecting action picks out an idle secondary connector in that group of secondary connectors belonging to the group of lines which includes the called line and its action may be said to be of a two fold character for it not only as a switch selects the required group but picks out or seizes upon one of said secondary connectors that may be idle or ready for use. The selection of the group however is apart from its selection of an idle member of that group for the former action takes place in obedience to the selecting signals sent by the transmitter while the latter action is an automatic action determined by the condition in which the secondary connectors are found as the interconnector proceeds in its search for one which is in normal position and therefore in position to close some test or trip circuit upon which the interconnector acts. The said secondary connectors are comprised in groups or series of secondary connectors each having a multiplicity of line connections greater in number than the number of secondary connectors in the group and said secondary connectors form a percentage less than the whole number of main lines and proportionate to the traffic demand.

It is preferable that the several connectors of any group, for instance, the group appropriated to making connections with the lines as called lines should be separate or individual pieces of apparatus or self-contained mechanism each having its own set of brushes, contacts and brush carrying shaft. This however is obviously not necessary in order to realize the broad principle of grouping and electrically connecting the lines and connectors. The number of selecting contacts on each interconnector (selecting switch) depends upon the number of selecting switches, (secondary connectors) employed, and if but one section of exchange with ten secondary connectors thereon be used, selecting contacts ten in number only would be required on the interconnector. It is preferred, however, to install each interconnector with a capacity for selecting secondary connectors in a large number of sections preferably ten.

The term "secondary" is employed in the term "secondary connector" in allusion to the fact that the movable elements or brushes of said instrument in establishing connection with the called line are used in analogous manner to that plug of a manual cord circuit which is placed in the called line terminal and is the second one of the cord terminals to be used by the operator, the other having been already used in establishing connection with the calling line. Similarly we use the term "primary" in the term "primary connector" in allusion to the fact that the movable elements of the same correspond in function to the cord terminal of a manual exchange which makes connection with a calling line when a call is re-received. Having regard to the action of those portions of the apparatus involving the primary connector, interconnector and secondary connector, the action may be thus outlined: By the primary connector a calling line is connected to an interconnector, and the latter by the selecting signals selects a secondary connector in the required group, which secondary connector under the action of the further selecting signals picks out the line called. There is thus formed from the contact of the secondary connector to the line called a circuit analogous to a cord circuit of a manual exchange. More or less of the apparatus required for selecting and adjusting the secondary switch or selector may be retained in the circuit thus established by the connecting of a calling line to a secondary switch and the automatic adjustment of the latter to select the line called.

*Thousands register.*—The thousands register is simply a selecting switch by whose means one of a number of interconnectors may be selected according to the value of the number for the substation called. This selecting switch may be of any desired construction and responsive to a selective signal or signals of any desired character sent from the substation. If more than two interconnectors are employed, it is preferable to use a step-by-step selective switch. If said number be, for instance, in the first thousand, interconnector I' will be brought into operative relation to the apparatus seized by the calling subscriber for the purpose of effecting connection with another substation. If the number of the called substation is in the second thousand, the thousands register is automatically set to make a second interconnector, namely $I^2$, operative, this connector being the one for establishing circuit with bus wires leading to sections of the exchange whereon substations 1,000 to 1,999 inclusive, are represented. In the same manner, if the substation called be in the third thousand, the thousands register seized will be set to position to establish an operative connection for another interconnector whereby the calling substation might find the particular section in the said third thousands whereon the substation wanted is represented in contacts on an idle secondary connector. As a register for this purpose it is convenient to employ a device like that before described as employed for the register portion of the primary connector and secondary connector.

The thousands register is shown on the signal transmitter controller diagram at T. R. Its contact sector has but two rows of contacts, those being all that are required for this part of the apparatus. The two register brushes corresponding to said rows of contacts rest in their normal position on dead points. The several points of one row engaged by said brushes connect respectively with the operating magnets for the registers on interconnectors for different thousands, while the contacts in the other row connect to the clutch magnet $C^7$ of the same interconnectors, and the brushes themselves are connected through wires $a^9$, $c^{17}$, and $c^{27}$, with contacts of the rotary switch and with circuits and devices whereby the operation of the interconnector may be controlled for the purpose of finding an idle division of secondary connector in the required section of the exchange, and for permitting said interconnector to be returned to normal position, as will be described more fully in connection with the general operation.

The thousands register might be restored to normal position in the same way as the register of the primary connector and secondary connector by supporting it upon some rotary shaft of the apparatus which would carry it around at the time the parts are restored to normal. It may, however, as indicated in Fig. 22, be mounted upon a fixed support consisting of the fixed cylinder for the rotary switch, and be arranged so that a projection upon its disk 87 will be engaged by either of two pins 95, carried by the wheel secured to the shaft of the rotary switch. One of these pins operates in the first half revolution of the rotary switch, and the other in the second half of the revolution of the rotary switch which, as already explained, completes its train of operations in one-half revolution. The thousands register is mounted in proper position such that the pins will engage with the lug on the thousands register escapement disk 87 after the rotary switch leaves its seventh position, and will automatically disengage themselves as soon as the thousands register brushes have been restored to normal. After disengagement the pins complete their revolution and assume the normal position again.

*Division relays.*—The division of relays of which there is preferably a set of three for each division, may be mounted and located in any desired position. They are shown, however, diagrammatically in connection with their associated devices on the signal transmitter controller diagram. They comprise the relay $R^6$ called signal relay, relay $R^7$ called release relay and relay $R^8$ called ringing relay. Relay $R^6$ is for convenience made to serve several functions and to operate in connection with the signal transmitter and with the secondary connectors in the special manner to be hereinafter described for the purpose of controlling the operation of said secondary connector and primary connector, and the governing action of the signal transmitter controller and its associated parts. This relay may be of any desired construction. It is provided with two windings and operates in a special way to be set forth more particularly in connection with the general operation. The release relay $R^7$ is designed to aid in restoring the parts to original position and for other purposes to be more fully described, and also has two windings. The ringing relay, $R^8$, is designed primarily to cut out the battery or generator used for talking, and to connect the circuit of the called subscriber with an alternating current generator 201, or other generator of pulsatory or varying currents. The coils of the relay $R^8$ are shunted by a bridging noninductive resistance W, so that its inductance shall not interfere with the conversation.

P indicates an induction coil having two equal windings.

M $B^1$ and M $B^2$ indicate sections of continuous current generator which supply energy for the various operations herein described. For the local operations at the central station but one section of said generator is ordinarily employed owing to the lower voltage required, but for the operations conducted over the circuits of the substations both sections are employed in series to give an increased voltage. For conversation, one section only of the continuous generator is used. The connection from said generators to the apparatus of one division is shown, but the apparatus of other divisions may be supplied from the same generators in multiple in obvious manner. For the sake of simplicity, these multiple connections are omitted on the diagram; so also are the connections by which positive and negative battery is supplied from said generators to the various parts as indicated by the signs positive and negative throughout the diagrams. The local circuits are, generally speaking, metallic circuits. Some of the operations are conducted between the substations and the central station over ground circuits, in which cases the ground represents negative battery.

The particular way in which the several relays described operate in conjunction with other parts of the apparatus will be set forth in detail in describing the general operation. Relays of any form or character may be employed and, generally speaking, the devices may be operated either on closed or on open circuit. This and other modifications in the manner of utilizing the relays to control actions of various parts of the current used to energize such relays and cause them to perform the necessary actions will be obvious to electricians.

*Consecution controller.*—The object of this device is to prevent interference or confusion in case two substations on different sections of the exchange should endeavor to effect communication with the same substation at the same time. This is accomplished by rendering the connecting apparatus on the different sections respectively capable of operation only in succession, or one at a time. By this means should two substations on different sections call at the same instant, their calls would be rendered effective through the connecting apparatus, one at a time, and one of them would seize the called substation line before the other so that the latter would receive the "line busy" indication. The consecution controller in effect spaces out the signals received on the different sections at the same instant, or in other words delays the action of the apparatus of one section so that it can operate only after the other has assumed a condition such that interference cannot take place.

In the telephone exchange system herein described, the only confusion which might result from the seizure of the same called substation line by two lines on different sections would arise from their both receiving the indication of "line busy." But even this kind of interference or confusion is eliminated by the use of the consecution controller. A further object is to prevent confusion in the operation of the interconnectors of different sections which would arise if they should be started simultaneously and the lines called should be in the same section of the exchange.

The apparatus of the several sections respectively may be rendered successively capable of operation by any mechanical or electrical expedient. It is preferable to employ an electrical circuit closer or changer which will intermittently close some operating circuit of the apparatus for one section, and then the similar circuits for the other sections of the exchange in succession. This circuit changer is kept in continuous operation and intermittently closes the operative circuits of the various sections in rapid succession. In connection with each circuit suitable means are provided whereby it is kept closed when the consecution controller finds the apparatus on such circuit ready to operate at the instant of closure. Hence the consecution controller may continue its revolution leaving the particular apparatus of the section in question operable in the desired manner.

With the system herein described it is preferable to allow the consecution controller to operate upon the circuit over which the interconnector is started on its way to find an idle secondary connector. When employed in this way it prevents any two interconnectors from starting at the same time. Hence one will seize the called line on secondary connector first and then the other calling line will get the "line busy" indication on seizing said line by means of its own interconnector.

Fig. 23 shows a form of consecution controller that may be used for carrying out this part of the invention.

230 is a revolving circuit changer arm having contact springs adapted to sweep simultaneously over a feed segment 232, connected to negative battery, and over a series of segments 231 insulated from one another and connected respectively with bus wires $c^{21}$, one for each section of the exchange. For a 20-section exchange there would be 20 segments 231, and 20 of these bus wires. Each bus wire is connected by taps $c^{20}$ with the circuits for the starting magnets $C^7$ of the several interconnectors controlled by the same group of lines. These circuits may be the common return circuits for the two interconnectors of each division leading, as will be described in connection with the general operation, to negative battery. As illustrated a tap wire $c^{20}$ is provided for each division. The circuit momentarily closed for each bus $c^{21}$ leads through an electro-magnet $R^{10}$. When the brush of the arm 230 leaves the segment connected to a bus wire, the connection to negative battery through the circuit changer is broken but the magnet $R^{10}$ at the instant it is excited closes a substitute connection from the bus $c^{21}$ to negative battery by its front contact, as shown, and as this connection includes the coils of $R^{10}$, the connection is preserved until the circuit is broken at some other point in the restoration of the connecting apparatus to 0 or normal position. The circuit changing arm of the consecution controller may be operated by any constantly acting driving power geared to the shaft carrying the arm.

In practice the consecution controller may be operated at such speed as to render the apparatus of each section capable of operation at intervals of say every two seconds. The interval which should elapse before the arm 230 repeats the closure of connection upon the segment for any section will depend upon the speed at which the apparatus connected to the wire $c^{21}$, and rendered operative by such closure, itself operates. In any case the repetition of closure on the contact should not take place until the circuit completed through $c^{20}$ and bus has been broken in the connecting apparatus rendered operative, which may take place as soon as said circuit is no longer of service for the particular set of connecting apparatus found ready for operation at the time or instant of the first closure. If the magnet $C^7$ of the interconnector completes its action of finding an idle secondary connector, and has its circuit leading through $c^{20}$ broken by the rotary switch, or other part, in going to another position in one second, the next closure of the circuit by the consecution controller may occur at any time after the lapse of one second. The practical effect of this device is to space out the signals as received from substations of different sections, and to supplement the spacing out produced by the decimal indicator for signals coming at about the same time from substations of the same section.

*Decimal indicator.*—This device is common to the substations for one section and to all the divisions of the connecting apparatus on that section. The main purpose of this portion of the apparatus is to give control of the connecting apparatus upon a section of the exchange to the substation lines of the section in succession, or one at a time. It preferably consists of a switch or circuit changer adapted to close circuit to the several lines in succession, each of which is represented on said decimal indicator by a contact or segment of a divided contact ring, herein termed a line contact ring. By preference it also comprises a guard contact ring which is composed of a number of segments or contacts corresponding to the several lines. The decimal indicator also operates through certain devices when it completes the circuit of the line of substation calling, whereby an idle division of the sets of connecting apparatus upon the same section may be seized or put in operative relation to the calling line. By preference there is also combined with the circuit changer, means for automatically adjusting the primary connector to connection with the calling line when said circuit changer is in position to close circuit on itself with the line called. This is preferably accomplished by the use of other divided contact rings, one of which is termed the units contact ring, and the other the tens contact ring, which operate in conjunction with other devices as will be described more particularly in the general operation. These units and tens contact rings are preferably made a part of the same structure as the guard and line contact rings. By preference the brushes of the decimal indicator are made to revolve and the contact rings are stationary. Preferably also the brushes normally revolve and are in a constant search for the contact of the calling line, and are automatically brought to rest thereon by the signal from the calling substation, but are released and resume their normal revolution as soon as the connecting apparatus seized by the calling station has passed beyond the point where it may be seized from some other calling station.

Associated with the decimal indicator are relay and control magnets connected to the brushes riding on the divided contact rings and operating in the manner hereinafter set forth in conjunction with the other parts of the apparatus.

The decimal indicator is preferably constructed as illustrated in Figs. 24-29 but other mechanical constructions might be employed. Referring to the drawings, 131 is a constantly rotating shaft which is secured to the driving wheel 132, driven from any suitable power, and serving to impart motion to the structure carrying the revolving brushes by means of friction disks 133 and 134. These friction disks embrace between their friction faces a disk or plate 127, from which depend the arms 126, united at their lower ends in a stiffening ring 128. Upon one or more of the arms 126 are mounted the revolving brushes of the device. Friction disk 133 is fastened to the shaft. The disk 134 is capable of slight longitudinal movement on said shaft, but is driven thereby by means of a pin and slot connection. The spring 135 encircling the shaft serves to force the disk 134 into engagement with the plate 127 with an adjustable force regulated by nut 136, mounted on the end of shaft 131. The several divided contact rings, four of which are like the commutator rings of a dynamo, are secured to a plate or head 129 that is fastened to a bracket 130, and has a hub extending up within the commutator cylinder and affording a bearing for the shaft 131 by means of the hub for disk 133.

The divided contact ring 101 may be used as the line contact ring, and divided ring 106 at the top of the cylinder as divided guard contact ring. Each of these rings contains as many segments insulated from one another as there are substation lines in the section. Assuming 100 lines to a section, each ring would have segments 0 to 99 inclusive. Ring 105 is the divided units contact ring, and ring 104 is the divided tens contact ring. The latter contains ten segments of equal length, and the individual segments correspond to the different values of the numeral in the tens decimal place of the substation numbers. The units contact ring contains 100 segments corresponding to the 100 units of the substation numbers. The units contact ring may be considered as embracing ten groups of ten each. In each group the contacts are connected each with similarly placed contacts in the other groups, that is to say, the No. 1 contacts of all the groups are interconnected and similarly the No. 2 contacts are interconnected to form in effect ten groups of contacts whose individual members are interspaced with one another. Each group of ten contacts occupying the same arc or portion of the divided units ring corresponds in position with one of the segments in the tens contact ring, so that the brush riding on the units contact ring may make connection with a units contact of any value from 0-9 inclusive at the same time that another brush makes contact with a segment of any value in the tens ring. Hence, any number from 0 to 9 may be represented as to its tens and units value by a brush riding upon the tens contact ring in conjunction with the brush riding over the units contact ring, the number so indicated depending upon the circumferential position of the two brushes at any instant. These two rings are termed herein "decimal indicator rings".

One way of connecting up the segments of the units contact ring is more clearly indicated in the diagram, Fig. 2. The contacts of the units ring may be connected up in other ways, and the contacts of the two rings and the brushes riding on them arranged in different relations to one another from that shown, and yet permit the number of the 100 substations to be "indicated" by the two rings. The rings 102 and 103 are continuous rings and act as feed rings by which the circuits of the brushes and apparatus upon the revolving structure of the decimal indicator may be carried to other parts. 102 is a negative battery feed ring connected to the "division starter," while the brush 112 riding thereon connects with the relays mounted upon the plate 127 in the manner shown in the diagram. The divided contact ring 101 has its individual segments mounted upon a backing plate or ring and insulated from one another and the segments are clamped to said plate as indicated in the vertical section, the construction being substantially as in the case of a commutator for a dynamo. The segments of rings 105 and 106 are also similarly mounted each upon its own backing ring. The rings 102, 103 and 104 are mounted together upon another backing ring, as clearly shown, and the several backing rings are bolted together and to the head 129. The connections to the rings are taken through the interior of the cylindrical structure and out by openings in the head 129, so as not to interfere with the free rotation of the brushes. The brushes for rings 101, 102, 103, 104, 105 and 106 are marked respectively 111, 112, 113, 114, 115 and 116. The brush holders 225 are connected with the arms 126 in any suitable way, and are provided with any suitable construction of supporting arms and springs whereby they may be kept in engagement with the rings. The segments of rings 101, 105 and 106 may be furnished with shoulders or lugs to which the wires are attached, and rings 102, 103 and 104 may have connecting pins passing through the backing rings. Mounted upon the plate 127 is a stop magnet $C^1$, the armature of which is furnished with a dog 125, see Figs. 28 and 29, adapted to engage with a crown stop ring 124, having 100 teeth properly located to cause the brushes to come to rest upon a contact segment when the dog is forced down into engagement with the ring by the action of the magnet. The blade spring as indicated in Fig. 28 keeps the dog normally raised, but the moment the magnet is excited the plate carrying the dog and the brushes comes to rest, although shaft 131 which drives the brush structure may continue to revolve. The relays $R^1$, $R^3$, $R^4$, whose coil and contact stop circuits are connected with the brushes in the manner shown in the diagram, are also mounted upon the revolving structure, thus dispensing with the necessity for feed contact rings which would be required if they were mounted upon an exterior fixed support. Relay $R'$ is the line relay connected to the brush bearing on the line contact ring 101, and is adapted to be operated over the circuit of any substation line as soon as the brush 111 finds the contact of that line in ring 101. Relay $R'$ controls the action of the clutch magnet $C'$, and relay $R^4$ serves to charge the corresponding contacts for the substation calling on the guard ring 106. The special functions and operations of these various relays and their operation in conjunction with the decimal indicator will be described in the general operation. The several segments of the divided tens ring 104 connect by cable $a'$ with the device termed the "decimal register controller." Through the latter device the adjustment of one part of the primary connector is accomplished. The ten interconnected groups of contacts on the ring 105 connect by a cable $c^{44}$ with a set of ten contacts on each primary connector of the several divisions of connecting apparatus for a similar purpose. All of the No. 1 contacts of the ten several groups are joined to one wire of said cable, and all of the No. 2 contacts of said groups to another wire, and these wires represent each a different decimal value in the units place. Each connection to wire of cable $c^{44}$ may be obviously made by simply connecting one of the contacts of the group representing the one value. Ring 103 is a battery feed ring. Ring 102 connects by wire $r'$ with devices whereby an individual division of one of the sets of connecting apparatus may be started into operation when a substation sends a call.

*Decimal register controller.*—The decimal register controller which is connected to the cable $a'$ leading from the tens indicating ring serves as a means for setting the primary connector to position corresponding to the tens value of the substation number from which the call comes. For this purpose it is preferably constructed to send into a part of the primary connector in the division of connecting apparatus seized by the calling substation as, for instance, into the register portion, a number of impulses corresponding in number to the value of the number in the tens place of the substation number. Any construction of circuit closing and breaking device may be employed for this purpose.

The circuits in the cable $a'$ operate practically as test circuits for the decimal register controller. When the decimal register controller finds one of said cable circuits alive through the resting of a brush 114 upon a particular contact in the tens ring, said decimal register controller is rendered effective to transmit stepping pulses through the primary connector register. The decimal register controller is started immediately upon the reception of the call from any substation, but preferably, as will be described farther on, through a circuit completed as soon as the idle division of connecting apparatus which is seized begins to move.

The preferred mechanical construction of the decimal register controller is shown in Figs. 30 and 31, and the subdivision of segments or contacts to effect the desired result is indicated in the diagram Fig. 3. The contact ring for the decimal register controller consists, as to one-half, of 50 separate segments insulated from one another, while the other half of the ring marked 121 is continuous and operates as a feed segment to feed current to the segments on the divided half which is effected by means of two brushes 120 arranged to engage at diametrically opposite points. These brushes mounted in brush holders 225 are connected to one another to operate as bridging brushes. They are secured to arms 182 fastened to the hub of a driving wheel 180, and secured at their lower ends in a stay ring 138. The structure is substantially the same as that used in the decimal indicator. The compound ring is preferably secured to a backing ring and fastened thereto by a clamp plate 183. The backing ring is fastened to a fixed base or hub 139, which serves the same function as the hub 129 in Fig. 25. The shaft carrying the arms 182, and wheel 180, may have a bearing like that of shaft 131, upon a post rising from the hub 139. In the divided segment 50 the contacts are connected to the wires of cable $a'$, and to the wire $a^3$, leading to the primary connectors. The latter are connected to wire $a^3$ in multiple, as shown in Figs. 1 and 5, and the impulses transmitted over the same pass through the primary connector in the division of apparatus seized and by circuits completed on the reception of the call as will be more fully described. The contacts which are not connected form dead or space contacts or spaces. When the forward brush 120 finds a live contact connected to the cable $a'$, it causes the continuous segment 121 to be charged so that as the brushes continue their movement connection with said charged segments will be made and broken as the forward brush rides over the contacts which are connected to wire $a^3$. The sooner the forward brush finds the live contact of cable $a'$, the more impulses will be sent over the wire $a^3$.

$R^5$ indicates a relay which is initially charged over cable $a'$ to keep segment 121 charged thereby furnishing the energy for sending the stepping impulses over wire $a^3$. Said relay is preferably furnished with two windings as shown, one of which is the initial operating winding, while the other is connected to a segment 48 near the end of the movement of the brushes 120. When the contact 48 is reached the relay is discharged by the action of the current in the second coil, and the supply of current to the feed segment 121 is cut off. One of the contacts, 46, is connected to a bus wire $c^{11}$ leading to all divisions of the connecting apparatus of a section. Each rotary switch is connected by a tap to said bus wire. Over this wire the starting magnet of the rotary switch in the division seized is sent from its first to its second position after the decimal register controller has fulfilled its function in setting the primary connector. The decimal register controller may be started and stopped by means of a clutch magnet and automatic clutch disk D, such as already described. The magnet is indicated at $C^4$. The clutch disk D, if geared to the driving shaft of the decimal register controller so as to make one whole revolution of the decimal register controller shaft, would be provided with two notches at diametrically opposite points in its periphery. As soon as the clutch magnet $C^4$ receives a momentary impulse which is sent through it on the initiation of a call, and preferably over a circuit connected with some portion of one division of the connecting apparatus, it couples the power to the decimal register controller shaft through wheel 180 by mechanism such as already described. The shaft then continues its revolution until the dog falls into the next notch in the disk D, which occurs as soon as the brushes 120 have made a half revolution. The starting impulse for the magnet $C^4$ may be produced in any desired manner, or from any desired part of the apparatus, which is actuated directly or indirectly in response to a signal received from the calling substation. The circuits of the relay $R^5$ are such that as soon as it is excited by current in its No. 1 coil it will remain excited and keep the charging circuit formed at its front contact closed. This charging contact is for the feed segment 121.

*Division starter.*—This device serves to bring into operation one of the divisions of connecting apparatus that is idle when the substation sends a call. It is preferably brought into action by the initial signal operating directly or indirectly upon the starting or releasing devices of said division starter. It is responsive to a call from any substation of the same section. It is conveniently controlled by a circuit established at the decimal indicator when the latter finds the contact of the calling line. The division starter preferably stands normally at rest. If ten sets or divisions of connecting apparatus are provided, then the division starter has ten positions of rest, from any one of which it may start to seize an idle division. Having started an idle division, it moves on to position immediately preparatory to starting the next idle division and stops, passing on its way to such position all intermediate divisions which it finds in use. In other words it automatically assumes in its position of rest the most favorable position for starting an idle division without delay, when the next call is received on the same section.

The division starter embraces:

1. Means whereby it may be automatically stopped in any one of 10 positions (assuming a 10 division section to be used). Such means which are controlled either electrically or mechanically from the divisions of connecting apparatus, but preferably electrically, are under the governing action of all the divisions of the section in such manner that when any division is in use it will cause the starter to pass the stop position corresponding to said division after the starter has begun to move, but when the division is idle it will cause the starter to stop in position ready for starting said idle division when the said starter or selector again resumes its movement. Said means consists preferably of a clutch and clutch operating magnet and circuit controllers on some portion of the apparatus constituting a division, and on the starter, coöperating to the desired end. On each division the said controller acts, in the normal position only of the part by which it is operative, to close a controlling circuit that is completed by the coöperating contacts of the starter just before the latter reaches that position of rest from which it starts to bring the apparatus of the division into operation. The position of these coöperating contacts is termed the subnormal or S. N. position, indicated by the letters S. N. By preference the circuit controller is operated by the rotary switch of the division.

2. Means for bringing into action the idle division when the selector or starter moves from the position of rest which it has assumed preparatory to starting the switch of the corresponding idle division. This device is preferably electrical and consists of a circuit closer operated by said starter when it starts and acting to close a circuit starting the switch or other part which acts to bring the apparatus of any division into action.

3. Means for starting the division starter from any one of its normal positions by the initial call or signal sent from any substation, said means consisting preferably of a clutch and clutch magnet whose circuit is controlled directly or indirectly by the devices which bring the decimal indicator to rest, as, for instance, by the line relay. The circuit closing and circuit changing parts of the division starter may consist of contacts and brushes substantially the same as those used in the cylinder portion of the primary connector and secondary connector. It is, however, necessary to use for this device only two horizontal rows of cylinder contacts and one pair of bridging brushes, as indicated in Fig. 4. For each division of connecting apparatus four pairs of contacts would be used on the division starter, and hence for 10 divisions 40 pairs would be passed by the bridging brushes in completing a revolution of the division starter. The 16 pairs of contact points for four divisions of rotary switch are shown in the diagram. The several positions which the bridging brushes may occupy, or in which they may come to rest, are indicated by the letters S. N. and N. Immediately after leaving the N position the brushes pass over and send a momentary impulse by a pair of contacts marked $b\ b$. The remaining pairs of contacts between the S. N. and N. positions are merely dead or space contacts. The $b\ b$ contacts are connected to a starting circuit $c^3$ by means of which the rotary switch or other initial starting portion of the connecting apparatus is set into operation. The S. N. contacts complete circuits $c^5$ which are test circuits, and lead to contacts at an N. position of some part of the apparatus in a division. The bridging brushes may be connected to a shaft driven and controlled as to its starting and stopping by means of a clutch disk D, and controlling magnet and clutch such as already described for the cylinder portion of the primary connector. In the diagram $C^2$ indicates the clutch magnet of the division starter, and D the clutch control disk which is geared up to the brush carrying shaft of the division starter so as to make one revolution for one whole revolution of said shaft. Inasmuch as the brushes may occupy 20 different positions in their whole revolution, the clutch disk D has 20 notches in its periphery. The N. contacts or points, it should be observed, are also dead contacts, and merely represent the position in which the brushes may come to rest, which is that preparatory to the starting of the idle division whose $b\ b$ contacts are next to the S. N. contacts upon which the brushes have come to rest. The clutch magnet $C^2$ is preferably provided with two windings, one of which is the starting, and the other the release winding. The starting winding may have its circuit closed by relay magnet $R^2$. The latter is preferably energized from the decimal indicator and the connections are so made that the starting winding of the magnet $C^2$ will continue to be energized and allow the disk D to revolve until circuit is completed through the other winding of the magnet, when the dog will be permitted to drop into a notch in the disk and bring the brushes to rest. Other constructions of circuit closing devices and other starting and stop mechanisms and control magnets might be used.

*Division starter or selector.*

*General operation.*—The operation of the division starter when connected and controlled in the preferred manner is as follows: The division starter stands normally with its bridging brushes on one of the pairs of contacts N or in a normal position. When the low resistance relay R² is charged by the decimal indicator finding the calling line segment, said relay closes the circuit of one coil of the differential clutch magnet for the division starter directly, thus releasing its mechanism, and it thereupon proceeds to rotate from its position N and immediately closes momentarily the circuit to the clutch magnet of the idle rotary switch before whose pair of controlling contacts it has stopped. Without stopping, the division starter moves its one step to the next S. N. contacts for the next rotary switch of the section. Should it find that switch idle, the circuit for the deënergizing coil of the clutch magnet of the division starter is closed on said subnormal contacts, and by way of the contacts bridged in the idle position of the said rotary switch, thereby releasing the stop and bringing the starter temporarily to rest in this position or until the low resistance relay breaks the circuit of the other coil upon clutch magnet. This occurs when the decimal or primary indicator starts from its temporary rest position and reverts to common use. The starter is thus released and allowed to move another step forward to the N position or position preparatory to starting said idle switch when another station in the same section calls. Should the starter, when it reaches the subnormal contacts of the switch next to that previously released, find the circuit through said S. N. contacts open, owing to the fact that the rotary switch connected therewith is in use, then it fails to close the circuit of the release coil on its own clutch magnet, and the latter continues to hold the clutch engaged so that the starter instead of stopping on said S. N. contacts moves on until it finds an idle switch closing an S. N. circuit, when it automatically comes to rest, as just explained, until moved forward on the next call.

The division starter and the primary connectors controlled thereby constitute a primary line connecting apparatus adapted to connect a calling main line to an idle primary connecting wire or set of wires $l'$, $l^2$ in response to a preliminary electrical impulse from a calling substation after which the selective signals passing over an idle wire produce the required adjustment of the interconnected selecting switches.

*Substation apparatus.*

The substation apparatus comprises a signal transmitter for sending the signal whereby the central station apparatus may be set to connect with the line of the substation desired, and also a telephone receiver and transmitter, a call bell and a ringing key for calling up the substation with which connection has been effected through the central office apparatus. It also comprises an automatic telephone switch for changing the circuits from the call bell to the telephone apparatus automatically in the act of lifting the telephone receiver from its support. The signal transmitter is preferably so constructed that the initial signal cannot be transmitted if the telephone switch is out of normal position. It is also so combined with said switch that the position of the switch cannot be changed while the transmitter is in operation for the purpose of sending a call. The signal transmitter is also so constructed that its circuit changing arm will be automatically advanced from its normal position to position for transmitting the initial signal by the operation of the manual operating mechanism which is provided for bringing the signal transmitter into action.

Referring to Figs. 32–39, 142 is a circuit changing arm of the signal transmitter. The arm is provided at its end with a spring actuated contact shoe or lever as shown, adapted to ride over a series of contacts connected in regular order to the contact plates of the number indicator. The commutator contacts or segments of the circuit changing arm 142 consist preferably of pins 172, set in a plate 161, of vulcanite or other insulating material. Those pins, which are circuit making pins, extend through the plate 161 for attachment of the wires leading to the plates of the number indicator. Other pins 172 alternating with the contact pins pass only partly through the plate and serve as space or insulating segments over which the contact arm 142 rides. The spacing or insulating pins are indicated in the diagram Fig. 39, in solid black. In sending the signal the arm 142 makes a complete revolution, and for the purpose of sending a number of four decimal places, rides over four arcs corresponding respectively to the units, tens, hundreds and thousands sets of plates on the indicator. For smaller numbers, as, for instance, three decimal places, it is obvious that a less number of arcs of pins will be necessary. The indicator comprises four corresponding sets of contact plates (197), 10 in each row or set, any one of which in a row may be placed in connection with the ground or return wire by means of a button 171, exposed upon the face of the apparatus, and carrying within the face plate a contact spring or plate 198 adapted to engage any one of the series of plates 197 inclusive, according to the position in which the button is set. The indicator button is provided with a proper index adapted to register with numerals upon the face plate corresponding to the position of the contact plate which is grounded by means of the button. The button is secured to a metal block (199) which carries the spring 198 and works in a guideway formed in the plate. The connection from the spring to earth is through the metal face plate against which the block is forced by the spring.

In order to set the indicator to effect communication with any other substation, the indicator buttons are set to the number of that substation by moving the buttons in the thousands, hundreds, tens and units rows respectively to positions where they will point out or indicate the said substation number. The connections of the first two indicator plates of each set to the contact pins in the circle engaged by the arm 142 are shown in the diagram, Fig. 39. The remaining 8 plates in each row of the indicator are connected in corresponding manner to the remaining contact pins in the several quarters of the circle of pins. Contact arm 142 normally engages with the contact 140 through which connection is made with the call bell 146, and connection to the arm 142 from normal contact of the telephone switch is made through the contact feed ring 174 on the face of plate 161, which ring is continually engaged by a spring carried by the arm. When the arm 142 is moved forward two spaces, it engages a contact pin 141, which is connected directly to earth or return wire. The next step forward of the arm brings it into engagement with a pin next to the first contact pin of the series connected to the zero plate of one of the rows of the indicator and as it continues its movement passes over the succeeding contact pins of the first series, its momentary position of rest being in each instance upon a dead or space pin.

145 is a contact pin upon which the arm 140 temporarily makes direct connection to ground independently of the indicator plate at the completion of the transmission of a number thereby affording a circuit over which the release relay R⁷ may be operated when the telephone receiver is lifted from the hook so as to break the connection from one side of the line through the arm 142 to earth, and for the purpose of again operating said relay when the receiver is returned to the hook.

The mechanism for operating the arm 142 may be constructed as follows: 153 is the operating lever for the transmitter and 151 is a ratchet wheel that turns loosely upon a pin fastened in the frame or support 175 and engaged at its toothed edge by a pawl carried by a gear wheel 152 also rotating loosely on said pin. The operating lever 153 is fastened to the hub of wheel 151, and serves to wind up a spring one end of which is secured to the pin 154, projecting from the lever, while its other end is secured to the fixed supporting pin for wheel 151. When the lever is pulled down the spring is wound up. On letting go of the lever ratchet wheel 151 engages the pawl carried by the gear wheel 152, and the spring in unwinding turns said wheel. Gear wheel 152 engages a pinion carrying the wheel 158, to which latter is secured the pawl 159, engaging a ratchet wheel 160. Ratchet wheel 160 is secured to a shaft, which carries the contact arm 142. The pinion carrying wheel 158 rotates on a bushing or bearing in which said shaft turns. Wheel 160 carries a pin 162 adapted to be engaged by a hook 163, which is supported on the operating lever 153 and is so arranged as to turn the wheel 160 and thereby move the contact arm 142 forward from pin 140 to pin 141 at the end of the downward throw of the operating arm. Wheel 152 gears also through a train of wheels with the rotary escapement 167, having two arms adapted to engage in turn with a pallet 168 carried by the armature lever of a stepping electro-magnet A⁵.

The pins or projections from the escapement 167 move in different concentric paths as indicated, and the pallet 168 when actuated by the magnet disengages one arm and allows a half revolution of the escapement which is then stopped by the other arm. When the magnet is deënergized the pallet 168 releases the latter arm and allows another half revolution. One complete revolution of the escapement 167 takes place for each momentary impulse sent through the magnet A⁵. The gear of the mechanism is such that the arm 142 will move forward one whole step, or the space of two pins for each revolution of the rotary escapement.

The telephone hook or support 169 carries contact springs 147—148. When the hook is down spring 147 engages the upper of two contact pins, which is connected as shown in the diagram with the transmitter contact arm 142. When the hook is raised said spring leaves the upper contact and engages the lower contact, which is connected with the ringing key K, and through back contact of the latter with contact telephone transmitter T, telephone receiver, and thence with the L² side of the line. Spring 147 connects with the L' side of the line. In a shunt to the ringing key K is a resistance as shown. At the central office is a ringing relay R⁸, see Fig. 7, which, by the operation of the apparatus there, is included in the circuit of a calling subscriber's line. When the ringing key is depressed, the resistance is introduced into the circuit and the ringing relay, by going to its back contact, throws the ringing current on to the called subscriber's line, as will be more particularly described in the general operation. As will be seen, the operation of the ringing key does not disconnect the telephone receiver from the line and hence permits the ringing signal sent to the called subscriber's line to be received in the calling subscriber's telephone when repeated back by means of suitable devices at the central station, and which are operated by the ringing current going to the called subscriber's circuit. Spring 148 carried by the telephone lever 169 is connected with the L² side of the line and when the hook is down normally engages with the contact connecting to the signal bell 146, the circuit of which to the L' side of the line is normally completed by the contact 140 and arm 142. A contact spring 144 mounted on a suitable support is connected to earth or other return, and is adapted, when engaged with the contact pin 179, to complete the circuit for the stepping magnet A⁵ from the L² side of the line. Spring 144 is normally disengaged from such contact, but is forced into engagement therewith by means of a cam lever 143, and a cam disk 150, secured to the shaft of the contact arm 142. A notch or depression in the cam disk 150 is located so as to permit the spring 144 to break circuit when the arm 142 stands in the normal position, or in connection with pin 140. When the arm is moved, however, from said normal position by the operating lever 153 to start the signal, the cam disk operates on the lever 143 and causes spring 144 to make connection upon contact 179, and said connection is preserved by the disk until the arm 142 completes its revolution and resumes contact upon pin 140. This occurs as soon as the arm moves from the subnormal contact 145. A second cam disk 155 secured to the shaft of the contact arm 142 serves to keep the switch 169 depressed or in normal position during the transmission of the call. This is effected through the intervention of the pivoted arm 156, the lower end of which is drawn into position to lock the lever 169 as soon as the arm 142 is advanced from its normal position to initiate the signal. A notch in the disk is so placed as to release the arm 169 when the contact arm is upon the subnormal contact 145. In the normal position of the arm upon the pin 140 the toe on the upper end of lever 156 is raised upon the edge of the disk, and said lever locks the arm 169 in depressed position by standing in the path of a block or projection 157 secured to the switch lever. The lever remains so locked until the arm 142 has transmitted the call and has reached contact with pin 145. The switch lever 169 is then released and on lifting the telephone from the hook said lever changes the circuit connections to throw the telephone apparatus into circuit between the sides L', L² of the one and through the ringing key K. It will be observed that in this position of the arm 142, the spring 144 still remains in circuit closing position where it completes the circuit of the stepping magnet A⁵. A lock or stop is also provided for preventing the operation of the transmitter in case the lever 169 is not in proper position for the transmission of the signal, as would be the case if it had been raised by taking the telephone off the hook before pulling down the operating lever 153. To accomplish this a lock or stop may be provided which will prevent the operating arm 153 from being thrown down to a sufficient distance to initiate the call by moving the contact arm so as to close circuit on point 141. A simple device for this purpose comprises a pivoted lock or stop 164, which is normally raised by a pin 165 on the telephone switch lever 169 when the outer end of the lever is depressed by the weight of the telephone. When in raised position lever 164 leaves no obstruction to the movement of the parts to position for closing the circuit by pin 141, which initiates the call. If, however, the lever 169 is raised by taking the telephone off the hook, the stop lever 164 drops into position to be engaged by a projection 166 on lever 153, thus preventing the latter from being moved down to position for initiating the call. Should the attempt be made to operate the signal transmitter when the telephone is off the hook, no effect will be produced at the central station, and the lever 153 will simply remain down with projection 166 engaged upon the lock or stop lever 164, the spring being held from unwinding by the escapement which is controlled by the magnet A⁵. No effect will be produced upon the central office apparatus since the L' side of the line will still remain opened in the signal transmitter. When the telephone is restored to the hook, however, lever 153 may be thrown down to its full extent and the call initiated, which will set the transmitter into operation.

The ringing key or button K may be of any suitable construction adapted to introduce into circuit a resistance of any desired amount. In the normal position of the key said resistance is bridged or shunted. The switch 169 operates after the transmission of the call, to include key K in circuit between the two sides L', L² of the line. The depression of the key introduces resistance into the circuit and causes at the central office the transmission of a ringing current to the called substation, as will be described farther on. When the key is at rest the metallic circuit L' L² is completed directly through the telephone receiver and the telephone transmitter T. The circuit is charged for the transmission of speech by the battery at the central office.

Other devices for causing the signal transmitter circuit changing arm to move forward step by step might be used in place of that described. It is preferable, however, to employ a mechanical power like that of a spring intermittently released by means of a magnet instead of depending upon the actuating power of the magnet alone.

Other means might be employed for causing the transmitter to complete a connection when it has been stepped forward a determined number of steps by the action of the stepping magnet $A^5$. It is preferable, however, to use a separate set of indicator plates and buttons, connected as shown between the sets of commutator pins for arm 142 and the return or earth connection. It is obvious that the initial signal might be transmitted in any desired way by completing the earth connection from the L' side of the line, but it is preferable to complete the connection automatically in the act of pulling down the operating lever for the signal transmitter.

General operation.

The general operation of the apparatus organized as described and having its various parts organized and connected as indicated and as hereinafter traced in detail, will be as follows: As an example it will be assumed that the apparatus at substation No. 736 is to be put in connection with the apparatus at substation 1845.

The indicator at substation No. 736 having been set to the No. 1845, the operating arm 153 of the signal transmitter is pulled down to its full extent and then released. The signal which initiates the call is sent by connecting the L' side of the line to earth by any means as, for instance, by moving the transmitter circuit changer arm 142 from normal contact 140 to initial contact 141. In the transmitter shown this is done automatically in the act of pulling down the operating lever 153, which causes the hook 153 to move the arm forward, as already explained. The initial signal causes the decimal indicator to stop with the brushes 111 and 116 upon the No. 36 contacts of the line and guard contact rings 101 and 106. This is effected by the action of the stop relay R' which is instantly excited when brush 111 finds in ring 101 the No. 36 contact of the calling line, and thereupon causes the clutch magnet C' to be excited and to bring the dog 125 down to engage a tooth in the stop ring 124. At the same time the brushes 114 and 115 come to rest on contacts of the units and tens indicating rings 104 and 105 so as to "indicate" or point out the number 36 by establishing connections over particular wires in the cables $a'$ and $c^4$ whereby the primary connector may be adjusted to connection with line 36. (The circuit for the initial signal may be traced as follows: positive battery, to feed ring 103, brush 113, relay R', normal or back contact of relay $R^3$, brush 111, contact 36, of calling line on ring 101, line L', spring 147 and normal contact of telephone switch at the substation, arm of circuit changer, contact 141, to earth and negative battery.) (The circuit of the clutch magnet C' is from feed ring 103 and brush bearing thereon to the front contact of relay R', continuous feed ring 102 and to negative battery by circuit to be presently traced.) Stop relay R' besides exciting stop magnet C' at the same instant excites relay $R^4$ and keeps the same excited while the decimal indicator is at rest on the No. 36 contact. (Circuit of $R^4$: positive battery, feed ring 103, brush 113, coils of $R^4$, front contact of relay R' and to negative battery by brush 112, and negative feed ring 102.) Relay $R^4$ while excited charges the guard wire G of the calling substation with positive potential by connecting positive battery to same and thus causes all the guard points of said line on all the secondary connectors of the same section to be also charged. This prevents any other line of the same or any other section from forming a talking connection with the line calling even though such other line may seize and move one of said secondary connectors to position where it will connect with the line calling, which is the case supposed is the line 736.

The manner in which a guard point acts to prevent interference, and the manner in which a calling line when attempting to make connection with a line already called from some other substation, is prevented from so doing and gets a "busy" signal, will be described after the operation has been traced to the point where a calling line has set the secondary connector to position to connect with the substation wanted. (Charging circuit of G line: from positive battery, feed ring 103 of decimal indicator, brush 113, front contact of relay $R^4$ to brush 116, and to contact 36 of divided ring 106, which is the one upon which said brush is brought to rest by the calling substation 736.) At the instant of stoppage of the decimal indicator the division starter is started over wire $r'$ by the action of low resistance relay $R^2$ and clutch magnet $C^2$. (Circuit of $R^2$ may be traced as follows: positive battery, feed ring 103, coils of magnets C' and $R^4$ in multiple, front contact of relay R', continuous feed ring 102, wire $r'$, relay $R^2$ to negative battery, thus exciting said relay). When the relay $R^2$ is excited it closes circuit of one coil of clutch magnet $C^2$. (Circuit of $C^2$: from positive battery, Fig. 4, one coil of $C^2$, wire $c'$, front contact of relay $R^2$ to negative battery.) The division starter is thus set into operation and its bridging brushes which had been previously brought to rest just before a pair of contacts $b$ $b$ connecting with a rotary switch for an idle division of connecting apparatus close circuit through said contacts and excite the clutch magnet $C^3$ of said rotary switch, thus permitting the same to move from its normal to the No. 1 position, thus isolating the rotary switch from further interference. (Circuit of $C^3$: positive battery, Fig. 4, wire $c^2$, contacts $b$ $b$, wire $c^3$, to Fig. 6, contacts of rotary switch in N position, stop magnet $C^3$ and to negative battery.) Rotary switch comes to rest in the No. 1 position through the automatic action of the disk and clutch when magnet $C^3$ has been thrown out of action by the passage of the brushes in the rotary switch away from the N position, and the division starter automatically comes to rest in the next normal position through a similar automatic action of its own disk and clutch, provided that after passing the contacts $b$ the next S. N. contacts encountered by it are those of a rotary switch in the same section that is in normal position, so as to bring into action the second or deënergizing coil of magnet $C^2$, thus discharging said magnet and allowing the dog to drop back and temporarily engage a notch in the disk as soon as the disk has revolved sufficiently to cause the notch and dog to register. (The circuit of the deënergizing coil thus established may be traced as follows: positive battery, Fig. 4, deënergizing coil of $C^2$, wire $c^4$, contacts S. N., test circuit $c^5$, to contacts in N. position of the rotary switch found idle and to negative battery.) The division starter remains temporarily in this S. N. position until the decimal indicator is permitted to revert to common use, at which time the circuit of relay $R^2$ is broken by the relay $R'$, as will be described, and the circuit of the other coil of $C^2$ is thus broken at the front contact of $R^2$, so that the coil whose circuit was established as just described over the wire $c^4$ and the S. N. contacts leading to an idle switch acts and allows the division starter to move another step to the N position, where it is automatically brought to rest in readiness to bring said idle switch into operation on the reception of a call from any other line of the same section of the exchange. If the next S. N. contacts encountered by the switch after starting had been dead, the division starter would have moved on, as before explained, until it found S. N. contacts connected by test wire $c^5$ with an idle switch, whereupon it would temporarily come to rest as just described. As soon as the rotary switch starts from the N position, it starts the decimal register controller of the same section and the shaft in the cylinder of the primary connector of the same division. For this purpose the rotary switch may send an impulse over wires $c^7$ and $c^9$ respectively to the magnets $C^4$ and $C^5$ as it moves to the No. 1 position. (The circuit by which this is accomplished in the case of the magnet $C^4$ for the decimal register controller is as follows: positive battery, Fig. 2, wire $c^6$, magnet $C^4$, wire $c^7$, leading to all the rotary switches of the section, tap wire $c^8$ of the rotary switch started, contacts between N and No. 1 positions, and to negative battery, thereby sending a momentary impulse through said magnet. In the case of the magnet $C^5$ of the primary connector the circuit is as follows: positive battery, Fig. 5, starting coil of $C^5$, wire $c^9$, to contacts between N and No. 1 position of rotary switch, and to negative battery.)

*Rotary switch No. 1 position.*—When the rotary switch comes to rest on the No. 1 position as just explained, it completes a connection by wire $a^6$, over which the register magnet $A'$ of the primary connector in the same division may be operated by impulses sent from the decimal register controller by wire $a^3$, and also maintains temporarily the connection $c^9$ whereby the clutch magnet $C^5$ of the primary connector may be controlled for the purpose of stopping the cylinder brushes in the proper position. The complete circuits will be traced in describing the setting action of said primary connector. The rotary switch also completes in its No. 1 position a connection for its own clutch magnet from wire $c^{12}$ whereby it may be restarted and sent to No. 2 position by the action of the decimal register controller as will be presently described. When the decimal register controller starts, one of its brushes 120 moves over the series of contacts in the divided segment 50 in which are located the series of selector contacts connected in regular order through cable $a'$, with the segments in the divided tens ring 104 of the decimal indicator while its other brush 120 moves over the feed ring or segment 121 connected with one coil (the energizing coil) for its relay $R^5$. When the brush 120 finds that selecting contact of the divided segment 50, which is alive through connection with a segment in the tens ring 104 of the decimal indicator upon which the brush 114 has been brought to rest by the stoppage of the decimal indicator, the relay $R^5$ is excited. (This initial exciting circuit is as follows: positive feed ring Fig. 2, brush 113, brush 114, segment 3 of the divided tens ring 104 (assuming that No. 736 is the number of the substation calling) cable $a'$, contact No. 3 of segment 50, upon which one brush 120 rests, to the other brush 120, feed segment 121, wire $a^2$, relay $R^5$ and negative battery.) When the relay $R^5$ is excited its armature being drawn up closes circuit from positive battery Fig. 3 on its front contact through its initial exciting coil to negative battery, thus holding up the relay lever until the relay is discharged on the completion of the phase or cycle of the decimal register controller, as will be presently described. The relay also closes on its front contact the connection through the stepping contacts of segment 50 to and through the register magnet A' of the primary connector. (This circuit of the stepping contacts may be traced as follows: positive battery, Fig. 3, front contact of relay $R^5$, wire $a^2$, feed segment 121, brushes 120, stepping contacts engaged by one of said brushes in succession after it passes the contact 3, by which the feed segment 121 is charged through the action of the relay $R^5$, thence by wire $a^3$, tap wire leading to feed segment in the first quadrant of primary connector cylinder in the primary connector seized, brush engaged therewith by starting of the primary connector, wire $a^4$, magnet A', wire $a^5$ connected to brush which rides on a feed segment in the third quadrant of the primary connector cylinder, wire $a^6$, to contacts in the No. 1 position of rotary switch seized, to negative battery.)

Since the brush 120 in the decimal register controller rides over 4 stepping contacts after engaging the contact No. 3 in the divided segment 50, 4 impulses are transmitted over the circuit just traced, and the brushes on the register of the primary connector are advanced four steps over its contact sector, or to position to bear upon the contact points corresponding to the "tens" of the substation number from which the call proceeds, that is to say upon the number 3 contact points. The magnet $C^5$ of the primary connector having been excited, as already explained, by the movement of the rotary switch in the same division to No. 1 position, the brushes within the primary connector cylinder move over the contact points within the same until the one of the contacts in the selective units row or segment at the top of the second quadrant is found which is alive through connection with that group of segments in the units ring 105 upon which brush 115 of the decimal indicator is temporarily resting. When such a contact is found, the stop magnet $C^5$ is immediately discharged in any suitable way, as, for instance, by the action of its deënergizing coil whose circuit is closed over said contacts and the brushes carried by the shaft within the cylinder of the primary connector come to rest. (The circuit may be traced as follows: from positive feed ring of the decimal indicator, brush 113, brush 115, a segment in one of the groups of the units ring 105, wire of units cable $c^{44}$ connected to said groups, (to which cable all divisions of primary connector in the same section are connected) wire tapped from No. 6 wire in the cable $c^{44}$ to the No. 6 contact in the selective units group at the top of second quadrant of the primary connector seized, brush riding over said set of contacts, bridging wire $c^{41}$, brush riding over feed segment in the fourth quadrant, wire $c^{42}$, deënergizing coil of magnet $C^5$, and wire $c^5$ over which circuit was first completed to negative battery for the starting coil of magnet $C^5$). The brushes within the primary connector cylinder which connect with the No. 3 contacts in the contact sector of the register are thereby brought to rest in position corresponding to the units value of the substation number from which the call is initiated, that is to say, on the No. 6 position so as to engage with contact points in a vertical row to which the L', $L^2$ and G lines of the calling substation are connected. By this operation the L', $L^2$ and G lines of the calling substation are now in connection respectively with the wires $l'$, $l^2$ and $g$, which lead from said primary connector to the rotary switch of the same division, and thence to other parts of the connecting apparatus, as will be presently described. (The circuit from L' may be thus traced: proceeding in the reverse direction from $l'$, feed segment in the second quadrant of the primary connector, brush riding on the same, tie wire connecting said brush with a brush of the register riding on the contact sector of the latter, contact of said sector No. 3 position to brush in the second quadrant which rides on the No. 30 to 39 row of line points and is resting on the No. 6 point which is connected to the line L'. The connections from wire $l^2$ to the line $L^2$, and from wire $g$ to G may be similarly traced.) At the substation the connection of the L' side at this stage of the operation of sending the call is the same as already traced and produced by the initial act of transmitting a call. The $L^2$ side of the line is at this time connected to earth at the substation through stepping magnet $A^5$ of the signal transmitter. This circuit may be established simultaneously with the connection formed from the No. 1 side to earth for causing the decimal indicator to stop upon the contact of the line calling, or may be formed immediately thereafter, but in time for the subsequent operations to be presently described. The apparatus shown at the station provides for the formation of this connection by the pulling down of the operating lever 153. (The circuit for $L^2$ may be traced at the substation as follows: spring 148 of the telephone switch, normal contact therefor, magnet $A^5$, contact for spring 144, which has been caused to engage said contact by the action of lever 143, and cam wheel 150, on pulling down the lever 153, and thence to earth.)

Returning to the operation of the decimal register controller during the remainder of its cycle of actions, the brush 120 after passing the stepping contacts and just before completing its cycle, engages contact 46 to momentarily energize the stop magnet $C^3$ of the rotary switch and send the latter from No. 1 to No. 2 position where it automatically comes to rest. (The circuit of $C^3$ is as follows: from positive battery, front contact of relay $R^5$, wire $a^2$, feed segment 121, bridging brushes 120, contact 46, wire $c^{11}$ running to all the rotary switches of the section, tap wire $c^{12}$ of the switch which has just been started and brought to No. 1 position of the rotary switch, to magnet $C^3$ and negative battery.) Just before completing its own movement, the decimal register controller restores its relay $R^5$ to its normal condition in any suitable way as, for instance, by closing circuit by a contact 48 through a deënergizing coil of said relay thus breaking off the feed connection from positive battery through front contact of the relay. (The circuit of contact 48 may be traced as follows: from positive battery through front contact of relay $R^5$, wire $a^2$, feed segment 121, feed brushes 120, contact 48, second coil of relay $R^5$ to negative battery.) After passing contact 48, the decimal register controller automatically comes to rest by the action of its clutch control disk D and stands in position ready to respond to the next call through the action of any other rotary switch seized by the division starter in the manner already explained.

It will be observed that during the adjustment of the primary connector to position to find the line calling, the circuit from said connector to the other parts of a division of apparatus is broken in the rotary switch, and that said switch is not moved to establish such connection until after the connector has been adjusted to position of connection with said calling line. Hence when another line on the same section with the line first calling proceeds to adjust the brushes of the primary connector in that one of the divisions seized by it, the passage of the brushes of said primary connector over contacts belonging to the line first calling will not produce any effect upon the line first calling or upon the apparatus with which it has been connected by its own rotary switch since the circuit from the brushes of the second operating primary connector is at the instant of passage of its brushes over the contacts of the first calling line, open at the rotary switch on the second acting division.

In passing from the No. 1 to the No. 2 position, the rotary switch sends a momentary impulse through the clutch magnet $C^6$ of the signal transmitter controller, Fig. 7, thus starting the latter into operation. (The circuit may be traced as follows: from positive battery, contacts third and fourth rows of rotary switch between Nos. 1 and 2 position, wire $c^{14}$, magnet $C^6$ of signal transmitter controller, and negative battery.) This permits the signal transmitter controller to make nearly a whole revolution until its brushes reach the contacts 43, which is the subnormal position, and corresponds to the first notch found in the control disk D after the discharge of the magnet, in which position, or S. N. position, it is automatically and temporarily brought to rest. In this movement it acts as an electric impulse generator whose impulses operate over the substation line upon the signal transmitter. It also operates as a local electric impulse generator whose impulses generated synchronously with those in the line, act upon the various parts of the connecting apparatus to set them to the proper position. When the rotary switch leaves the No. 1 position, it breaks the connection $c^9$ from the clutch magnet $C^5$ and deënergizing coil thereof so that no effect can be produced thereon by the decimal indicator after said decimal indicator again starts into revolution, and its brush 114 again makes contact with the particular segment with which said magnet was connected over a contact of the primary connector. The rotary switch also charges the guard circuit G of the calling substation with + battery just as soon as said switch leaves the No. 1 position, and keeps it charged continuously throughout its movement through the remaining positions and until after it leaves the talking position. The effect of this in the decimal indicator is to keep the brush 116 of the guard ring 106 alive so that when the brush 116 after resuming its revolution again finds said segment the armature of the relay $R^3$ will be drawn up thus breaking the circuit from positive battery and feed ring 103, to the line calling through relay coils R' and back contact of $R^3$, to brush 111 and the contact ring 101 of said calling line. By this means the decimal indicator is prevented from putting positive battery to the line of the calling subscriber at every revolution after said decimal indicator has started again to revolve so as to revert to the common use of other substations on the same section. The decimal indicator is released by the breaking of the circuit through the relay R' on the L' side of the line at the substation through the starting of the signal transmitter which occurs just as soon as the rotary switch passes from No. 1 to No. 2 position and starts the signal transmitter controller, as will be presently described.

By the charging of the guard wire G produced as already explained, by the rotary switch, said wire is kept charged after the relay $R^4$ is discharged through discharge of relay R' in permitting the decimal indicator to revert to common use. Hence the points of the calling subscriber are kept charged with positive battery on all secondary connectors of the same section so as to prevent a talking connection from being established with said line from any other line, although such calling line may seize a secondary connector of said section and move it to the contacts of the line wanted. (The circuit over which the rotary switch charges the guard wire G, as just stated, may be thus traced: positive battery, switch contacts two upper rows of rotary switch extending from position Nos. 1 and 2 intermediate to position Nos. 5 and 6 intermediate, wire $g$, primary connector which has been automatically set to L', L² and G lines of calling substation. The circuit over which relay R³ is actuated is: from line G to contact No. 36 of the divided guard ring 106 on the decimal indicator, brush 116 when it touches the No. 36 contact of ring 106 at every revolution of the decimal indicator, back contact of relay R⁴, coils of relay R³, brush 112, and negative battery feed ring 102, wire $r'$ and to negative battery through low resistance relay R² in the division starter.) The relay R² is not affected at this time because it is of low resistance and few ampere turns while R³ is of high resistance and hence permits little current to flow through R².

In passing from the No. 1 to the No. 2 position the rotary switch also causes the earth connection of L' to be broken at the substation, thus breaking the circuit of the stop relay R' on the decimal indicator so that the latter will resume its revolution and revert to the common use of other substations in the same section. This may conveniently be done by establishing over wire $l^2$ and the primary connector a connection from the signal transmitter controller to the L² side of the line calling over which, just as soon as the signal transmitter controller is started over wire $c^{14}$ as just explained, an impulse will be transmitted over the L² side of the line so as to actuate the magnet A⁵ and step the arm 142 forward thereby breaking the connection between L' and earth at the earthed contact 141.

In the rotary switch the connection with the wire $l^2$ is by contacts maintained or continued in the fifth and sixth row from intermediate Nos. 1 and 2 positions to and including No. 3 position. (The connection from the signal transmitter controller may be thus traced: from positive battery to the second contact in the second row of contacts signal transmitter controller, bridging brushes, upper or continuous feed row of contacts, wire $t'$, to contacts of rotary switch just mentioned and thence by bridging brushes to wire $l^2$.) The signal transmitter controller having been released, as explained, makes one whole revolution less one step, and finally comes to rest in the S. N. position, as will be presently explained, but in passing over the stepping row of contacts in its second row moves the signal transmitter arm 142 forward a half revolution over two quadrants of commutator contacts corresponding to the thousands and hundreds order, and connected respectively to the plates in the thousands and hundreds rows of the indicator.

*Rotary switch No. 2 position.*—When the rotary switch reaches the No. 2 position of rest, it establishes connection as follows: 1. It connects one coil of the signal relay R⁶ (see signal transmitter controller diagram) with the L' side of the line calling, and through said line with the arm 142 of the signal transmitter which now begins to move over its first or thousands quadrant of contacts connected respectively with the indicator plates of the thousands set. This movement takes place under the control of the signal transmitter controller operating over the L² side of the line. (The connection from the signal relay may be thus traced: positive battery, one coil of R⁶, wire $r^2$, contacts 3rd and 4th rows of rotary switch, wire $l'$ and through primary connector as already explained to L' line.) This connection as indicated, endures until the rotary switch leaves the No. 3 position of rest. The rotary switch also puts a coil of the signal relay R⁶ in connection over wire $g'$, with all the interconnectors of the same division and, through that, one of the interconnectors which is seized by the thousands register, with the particular idle secondary connector which is seized by said interconnector and, through said secondary connector, while in normal position, with negative battery. The circuit is not effective upon the relay R⁶ until the signal transmitter controller reaches the S. N. position just before completing its first revolution, and then it operates upon said relay to first cause the interconnector to stop as soon as it finds an idle division of secondary connector in the section to which the called substation is assigned, and second to operate the register magnet A⁴ of the secondary connector seized by the interconnector so as to move the same from normal contact to dead position one step where it will be isolated from interference, and finally and at the same time to cause the rotary switch to move from No. 2 to No. 3 position. The circuits over which these actions are effected will be traced when the operation has been carried to the point where the signal transmitter controller reaches the No. 43 contact. (The connection from the relay R⁶ to the $g'$ wire in the rotary switch may be thus traced: positive battery, relay R⁶, wire $r^2$, to contacts 7th and 8th rows No. 2 position of rotary switch, to contact in the 5th position and to wire $g'$.)

In the No. 2 position the rotary switch also establishes a connection to its own clutch magnet $C^3$ to make it ready for operation from a No. 43 contact in the signal transmitter controller, 5th row, where circuit is closed from positive battery by the action of relay $R^6$ when its lever is drawn against its front contact point. This action of the relay takes place after the interconnector has been moved to position to seize an idle secondary connector in the section of the line called. (This circuit over which the clutch magnet $C^3$ is operated may be traced as follows: positive battery, relay lever $R^6$, front contact, 6th or feed row of signal transmitter controller, No. 43 contact, wire $c^{15}$, contacts 11th and 12th rows, second position of rotary switch, to magnet $C^3$ and negative battery.) The rotary switch in the No. 2 position also establishes connections $a^8$, $a^{11}$, $c^{19}$ as follows: $a^8$ for the stepping magnet $A^2$ of the thousands register through the thousands set of stepping contacts of the signal transmitter controller, whereby the said thousands register may be stepped to form connection with the interconnector of the same division which controls the connection to the sections in the thousands grand division to which the line of the substation wanted is assigned; ($a^{11}$) for the stepping magnet $A^3$ of the register for the interconnector selected by the thousands register, and ($c^{19}$) for the clutch magnet $C^7$ of the same interconnector whereby the brushes in the cylinder may be started and permitted to revolve until they find an idle division of secondary connector in the section selected by the action of the register magnet $A^3$ of said interconnector when said brushes will automatically be brought to rest. (These connections may be traced as follows: $a^8$ for magnet $A^2$: from positive battery, back contact of relay $R^6$, feed ring No. 3 row of signal transmitter controller, No. 1 or thousands set of stepping contacts 4th row, wire $a^7$, magnet $A^2$, wire $a^8$, contacts No. 2 position in the second half of the cylinder of the rotary switch to negative battery. ($a^{11}$) for magnet $A^3$ of interconnector register: from positive battery, back contact of relay $R^6$, feed ring, 3rd row of signal transmitter controller, No. 2 or hundreds set of stepping contacts, 4th row, wire $a^9$, brush of thousands register moving on the inner row of contacts, contact connected to interconnector No. 2 (assuming now that the number of the substation called is 1845 or in the second thousand, thus requiring the thousands register to be stepped forward two steps) wire $a^{10}$, contact point in the cylinder of $I^2$, N position 3rd quadrant, brush bearing on same, magnet $A^3$, brush bearing on another contact of the $I^2$ cylinder, N position, common return wire $a^{11}$, for all the interconnectors of the same division, contacts No. 2 position in the second half of rotary switch cylinder, to negative battery.

($c^{19}$) for stop magnet $C^7$ of interconnector: from positive battery, back contact of relay $R^6$, feed ring 3rd row of signal transmitter controller, contact 43 on which connection is closed as soon as the signal transmitter controller has passed over the second set of stepping contacts, wire $c^{17}$, brush of thousands register moving over outer row of contacts, contact connected to No. 2 interconnector (assuming that the number of the substation called is in the second thousands,) wire $c^{18}$, magnet $C^7$, common return wire $c^{19}$ for the interconnectors of the same division, contacts of rotary switch, $c^{20}$ tap wire and to a bus wire $c^{21}$, which leads to that one of the segments or divisions of the consecution controller to which all of the interconnectors are assigned in the section of the exchange in which substation 736 is represented, and to negative battery by the front contact of the individual consecution relay for that section.)

By the movement of the rotary switch to the No. 2 position as described, the signal transmitter controller has been started and the circuits of the thousands register and interconnector prepared so that they may be operated through the controlling action of the signal transmitter controller, signal relay $R^6$, and the signal transmitter coöperating in the following manner: The first action of the signal transmitter controller is to close the circuit on wire $t'$ by the second contacts in the first two rows and the bridging brushes, thus transmitting an initial pulse which moves the arm 142 of the transmitter away from the initial contact 141 one step, thus breaking direct earth connection over the $L'$ side of the line and releasing the decimal indicator, as already explained. The arm 142 is now in a dead position, but in passing forward another step it will close circuit to the first of the contact plates in the thousands row of the indicator. This occurs as soon as the signal transmitter controller passes to the next live contact in the second row and begins to transmit pulses over wire $t'$ and the $L^2$ line to the stepping magnet $A^5$, so as to move the arm 142 forward step by step and cause it to pass in succession over the contact segments or pins connected in regular order to the plates of the indicator. This movement continues until the arm 142 passes over the contact connected with that plate in the thousands row to which the thousands indicator button has been set. As soon as this occurs a connection from the No. 1 side of the line to earth at the signal transmitter is formed, thus energizing the relay $R^6$ over wire $r^2$ rotary switch and No. 1 side of the line, and causing circuit to be broken at the back contact of the relay and closed on the front.

While the relay lever was against its back contact, it closed circuit to the magnet $A^2$ of the thousands register over the stepping contacts in the 4th row of the signal transmitter controller, but, as will be seen by the diagram, this connection is not established on the 3rd and 4th rows until after the arm 142 has been moved forward one step by the circuit established on the 1st and 2nd rows. Assuming now that the thousands button of the indicator at the substation has been set for calling a substation in the second thousands as, for instance, substation No. 1845; two stepping pulses will have been sent through the thousands register before the signal transmitter moves to position to energize the relay $R^6$. At this instant the action of the thousands register ceases because the circuit of its magnet $A^2$ is broken at the back contact of the relay $R^6$ and it remains out of action while the signal transmitter is stepped over the remaining contacts in the thousands segment, because the relay lever is held up until the signal transmitter controller has passed over the thousands set of stepping contacts. The relay lever may be held up by a circuit established as follows: (positive battery, front contact of relay, feed or bridging contacts 6th row of signal transmitter controller, feed or bridging contacts 5th row, to negative battery, through the other coil of $R^6$ to negative battery.) The relay lever remains up until the break is reached in the feed segment of the 6th row of the signal transmitter controller, which occurs after the brushes have passed the thousands set of stepping contacts, whereupon the relay armature will fall back and keep the circuit closed through its back contact in readiness for the operation of stepping the register of the interconnector forward by pulses transmitted through its magnet $A^3$ from the hundreds set of stepping contacts in the signal transmitter controller. During the first half of its revolution the signal transmitter controller has stepped the signal transmitter arm 142 over the thousands set of contacts in the first quadrant of the commutator, and it now begins, on entering its second half revolution to step the arm forward over the commutator plates of the hundreds order, which are connected in rotation to the hundreds set of plates in the indicator. Simultaneously with this operation the brush of the signal transmitter controller is passing over the stepping contacts in the 4th row and is producing controlling impulses which are transmitted over the circuit of the magnet $A^3$ in the interconnector, said circuit being over the back contact of relay $R^6$, wire $a^9$, and the connection established to interconnector No. 2 by the operation of the thousands register as just described.

The interconnector register is now stepped forward until the signal transmitter arm 142 passes the commutator contact, which is connected with the plate in the hundreds row of indicator contacts, to which the indicator button has been set, which for calling No. 1836 may be contact numbered 8 or that corresponding to the ninth hundred. When this contact is passed the relay $R^6$ is again excited over wire $r^2$ and the No. 1 line circuit in the same manner as already explained in the case of the thousands operation, thereby breaking the circuit through the register magnet $A^3$. Hence nine pulses will be transmitted to the register before it stops, thereby moving its brushes forward nine steps to rest upon points which connect with brushes in the interconnector cylinder adapted to ride in succession over points connected in regular order by means of the sets of bus wires $g^2$, $l^{31}$, $l^{32}$, $c^{24}$ with the several divisions of secondary connector in the section of the exchange to which the number called is assigned. In the case supposed, said section would be the ninth section in the second thousand of the exchange.

As soon as the relay $R^6$ is excited its armature lever is held up by the circuit established over the bridging contacts in the 5th and 6th rows of the signal transmitter controller, and its front contact, as just explained, in the case of the operation of the thousands register; and the signal transmitter completes its movement over the second quadrant of contacts under the control of the signal transmitter controller which, during such movement, produces no further effect upon the hundreds register of the interconnector, because the connection thereto is at such time broken at the back contact of the relay $R^6$. The brushes on the signal transmitter controller next encounter the contacts 43 in the 5th and 6th rows, over which circuits are established as already traced, first from front contact of relay $R^6$ by wire $c^{15}$ and rotary switch No. 2 position to the clutch magnet $C^3$ of the rotary switch, and second, by contacts 43, 4th row, and wire $c^{17}$ through the thousands register brush to and through the clutch or stop magnet $C^7$ of the interconnector selected, but just before reaching this position the signal transmitter controller breaks the holding circuit of the relay $R^6$ on the lower row of bridging contacts, as indicated on point 42, so as to permit the lever of the relay to fall back against its back contact. Hence when the bridging brushes reach the No. 43 contact in the 4th row, the connection is established from positive battery by the back contact of the relay by the wire $c^{17}$ to the interconnector clutch or stop magnet $C^7$, for the purpose of starting the brushes within the interconnector cylinder on their way to seek out an idle secondary connector in the section which has been selected by the operation of the interconnector register magnet $A^3$.

Inasmuch as the circuit of the clutch magnet $C^7$ is through the consecution controller, as already explained, said magnet will not be energized until the consecution controller closes connection for said clutch magnet. The moment, however that the circuit is closed it is maintained at the consecution controller by the magnet $R^{10}$. Until the consecution controller, however, closes the circuit for the interconnector magnet, the actions of the apparatus are delayed and the rotary switch will remain on the No. 2 position because, as will be presently shown, it is only started to the No. 3 position by the action of the relay at the instant that the interconnector finds an idle secondary connector, and the signal transmitter controller remains at rest on the 43 contact because its clutch magnet is again operated only when the rotary switch leaves the No. 2 position and passes to the No. 3 position. Hence, if two connections $c^{17}$ should be closed for two interconnectors on different sections of the exchange at identically the same instant by the operation of the substations seeking connection with one and the same substation, the said interconnectors would start into operation, one after the other, in the order in which the circuits for their clutch magnets were completed by the consecution controller, and the one first operated would establish the condition which, as will be described, would cause the second to receive the indication of "line busy" and prevent the connecting apparatus with which it is associated from going to talking position.

*Seizure of idle secondary connector.*—If the division of secondary connector with which connection is first established over one of the sets of bus wires by the movement of the interconnector is in normal or idle position, a circuit is established at the secondary connector for one of the coils of relay $R^6$, whereby the relay lever is drawn forward thus breaking at its back contact the connection to the stop magnet $C^7$ of the interconnector, so that the dog will drop back into the first notch of the disk D for the interconnector, and bring said interconnector to rest in position to maintain the connection with said idle secondary connector in the section wanted. The circuit over which the relay is thus controlled is in effect a "test" circuit. (This circuit of relay $R^6$ may be thus traced: positive battery signal transmitter controller diagram, through relay coil $R^6$, wire $r^2$, rotary switch second position, wire $g'$, feed segment 2nd quadrant, 4th row of interconnector to cylinder brush riding thereon, brush on inner row of contacts of register to the particular contact to which the register has been set by the hundreds impulses, cylinder brush connected thereto and riding over the row of contacts connected severally to the $g^2$ bus wires, and to which similar contacts in all the No. 2 interconnectors of the exchange are joined as already explained in connection with Fig. 10 and from the particular wire $g^2$ with which the brush is at the time in connection to the tap wire $g^3$ of the secondary connector which $g^2$ represents, to feed segment secondary connector upon which bears a brush joined to an inner or normal contact of the secondary connector register, brush bearing thereon to brush bearing on a normal contact of the secondary connector cylinder to which negative battery is connected, and to negative battery.) If, however, the secondary connector whose connection is first found by the rotating brushes of the interconnector has been previously seized and has therefore moved from normal position, the test connection to negative battery at the initial or normal contact of the secondary connector register will be open, the relay $R^6$ will not be energized, and the magnet $C^7$ of the interconnector will therefore remain excited and the brushes in the cylinder thereof will move along to the contacts through which connection may be made over a bus wire with the secondary connector in the next division of the section wanted. As soon as an idle secondary connector is found the relay $R^6$ is excited, and the magnet $C^7$ is discharged, thus bringing the interconnector to rest in connection with said idle secondary connector. As soon as the substation calling finds an idle division of secondary connector by the hunting action of the interconnector in the manner just described, the rotary switch is started and goes to the No. 3 position. This is due to the fact that when the relay $R^6$ is excited, to stop the interconnector as just explained, by breaking circuit at the back contact of the relay, it closes circuit on its front contact to contacts 43, 5th and 6th row signal transmitter controller, wire $c^{15}$, rotary switch second position and clutch magnet $C^3$ for the rotary switch. In leaving the No. 2 position the rotary switch also breaks the connections to the thousands register magnet $A^2$ and to the clutch magnet $C^7$ of the interconnector.

When the relay $R^6$ breaks circuit on its back contact to stop the interconnector, it closes circuit on its front contact, so as to also send an impulse over wires $c^{15}$, $l^{21}$ which energizes the magnet $A^4$ of the secondary connector seized, thus moving the register brushes forward one step to dead contacts and isolating said secondary connector so that it may not be seized from any other interconnector of the exchange. (This circuit may be traced as follows: positive battery, front contact of relay $R^6$, lower row of contacts signal transmitter controller, contacts 43, 5th and 6th rows, wire $c^{15}$, 9th and 10th rows of rotary switch No. 2 position, wire $l^{21}$, feed segment, 3rd row, 2nd segment, of the interconnector $I^2$, brush riding on same, brush bearing on next to the inner row of sets of contacts in the register, contact in the No. 7 position, brush bearing on points of cylinder connected to bus wire $l^{31}$, leading to the secondary connector already seized, tap wire $l^{41}$ to branch wire $a^{12}$, contact in the N position of the secondary connector cylinder, brush bearing on same, magnet $A^4$, another bridging brush bearing on contact in the N position of the secondary connector cylinder and to negative battery.)

When the rotary switch goes from the No. 2 to the No. 3 position its first action is to break the energizing circuit of the relay $R^6$, just traced over wire $r^2$ and a normal contact of the register for an idle secondary connector thus permitting the armature lever to fall back and close the circuit on its back contact in readiness for the transmission of the tens and units impulses to the secondary connector whereby the latter is set to connect with the line 1845 in the section of the exchange in which said secondary connector is located. The rotary switch also immediately breaks the circuit of its clutch magnet $C^3$ in passing from the No. 2 position so that said switch will automatically come to rest in the No. 3 position. In passing to the No. 3 position the rotary switch starts the signal transmitter controller again from its position of rest on the No. 43 contacts of the S. N. position by momentarily closing the circuit of the clutch magnet $C^6$ over wire $c^{14}$. (This circuit may be traced as follows: from positive battery rotary switch, second contact row, contacts 7th and 8th rows, between Nos. 2 and 3 positions, wire $c^{14}$ to clutch magnet $C^6$ and negative battery). The signal transmitter controller now revolves one whole revolution until it is automatically brought to rest again and automatically stops on the S. N. position again during which whole revolution the tens and units setting pulses are transmitted to the secondary connector previously seized by the interconnector.

*Rotary switch No. 3 position.*—In the No. 3 position the rotary switch closes as before the connection from the signal transmitter controller over wire $r^2$ to the line $L'$ and signal transmitter from which the relay is operated when the signal transmitter arm passes commutator segments in the 3rd and 4th rows which have been earthed by setting the indicator buttons for the tens and units rows of plates at the substation to position to indicate the tens and units values of the number of the substation wanted. In the case supposed they will have been set for transmitting numeral 45. The rotary switch also closes in this No. 3 position the same connection from the signal transmitter controller which it closed in the No. 2 position for the $L^2$ side of the line over which the impulses are transmitted for actuating the stepping magnet $A^5$ of the signal transmitter. (These circuits may be traced from the $t'$ and $r^2$ wires, through the rotary switch by contacts in the same rows as those by which said connections are closed when the rotary switch is in the No. 2 position.) In the No. 3 position the rotary switch also closes connection from the back contact of the relay $R^6$ over which the secondary connector may be controlled or operated and set to position corresponding to the tens and units of the substation number called. This control or operation is effected preferably over the same stepping contacts in the 4th row of the signal transmitter controller which operated previously as the thousands and hundreds stepping contacts. The operation for the tens of the substation number called is over the wire $a^7$ and through the rotary switch, and connecting wire $l^{21}$, to and through the interconnector and by branch wire $a^{12}$ to the magnet $A^4$ of the secondary connector by the same path traced in the case of the movement of the register forward one step to the dead contacts. The operation or control of the magnet $C^8$ of the secondary connector whereby it is set to proper units position is over the units set of stepping contacts, wire $a^9$, through the rotary switch, and by wire $c^{23}$ through the interconnector. (The connection over which magnet $A^4$ is operated is as follows: positive battery, back contact, relay $R^6$, feed ring, stepping row signal transmitter controller, wire $a^7$, wire $a^{13}$, contacts of rotary switch 9th and 10th rows, to wire $l^{21}$ and thence through the interconnector by path already traced in the case of the initial pulse which steps the magnet $A^4$ forward to isolate the particular secondary connector seized from interference. The connection for the magnet $C^8$ is from back contact of relay $R^6$, feed ring and stepping row of the signal transmitter controller in the units portion, wire $a^9$, $c^{22}$, contacts 7th and 8th row of the rotary switch, wire $c^{23}$, feed segment top row of interconnector No. 2, brush resting thereon, brush riding upon the outer row of contacts of the register, contact in the No. 8 position of the outer row, brush bearing on the contact of the interconnector cylinder connected to bus wire $c^{24}$, tap wire $c^{25}$, magnet $C^8$ of the secondary connector seized and to negative battery.)

Assuming that the secondary connector shown is the one already seized in the ninth section of the second thousand, the signal transmitter controller in the first half of its second revolution transmits pulses over the connection already described which will actuate the register of the secondary connector by means of magnet A⁴, forward step by step until the brushes thereof rest upon the No. 4 set of contacts in the contact segment. They are brought to rest at this point because simultaneously with such stepping forward the signal transmitter controller has transmitted, over the line L² by way of wire $l^2$ and the circuit already traced in the case of the thousands operation pulses which step the signal transmitter forward until the contact arm passes, in the third quadrant, the contact pin No. 4, which has been connected to earth by setting the button on the tens portion of the indicator to the No. 4 position. As soon as this connection is established in the signal transmitter controller, the relay R⁶ is excited by positive battery flowing over the wire $r^2$, and the circuit already described, to line L′ and to earth through the indicator whereby the relay lever is drawn away from its back contact and the transmission of actuating impulses through the circuit by way of its back contact to magnet A⁴ ceases, owing to the fact that the relay lever is held up by circuit established over its front contact as already explained. When the signal transmitter controller passes to the second half of its revolution the units setting pulses are transmitted through the magnet C⁸ of the secondary connector in the same manner that the hundreds setting pulses were transmitted through the register of the interconnector, the lever of relay R⁶ having been permitted before such transmission begins to fall back against its back contact through the interruption of the bridging circuit in the lower row of contacts in the signal transmitter controller. These pulses cease to flow when the relay lever is drawn up against its front contact again, which occurs as soon as the arm of the signal transmitter controller has been stepped around by means of the stepping action produced at the first and second rows of the signal transmitter controller to a point where it passes the contact in the fourth quadrant which has been connected to earth by the setting of the units button of the indicator to the No. 5 position.

By the action of the magnet C⁸, the brushes in the secondary connector cylinder are adjusted to position to make circuit upon the contacts that are joined by tap wires $l^{51}$, $l^{52}$, and $q^5$, with the lines L′, L² and G of the substation wanted. In the case supposed, to wit, line 736 calling line 1845, the secondary connector shown in the diagram is supposed to be the one in the 9th section of the second thousands which is connected over the bus wires $q^2$, $l^{31}$, $l^{32}$ and $c^{24}$, with the interconnector I² in the division seized by substation 736, as illustrated in the diagram Fig. 8. These lines L′, L² and G are therefore the lines of the No. 45 substation in the 9th section of the second thousands of the exchange.

The secondary connector is now in position to permit the calling substation 736 to establish talking connection through it with the called substation 1845. This is done in the manner to be presently described, but before the establishment of such connection the G circuit or wire of the called substation is charged on the passage of the rotary switch to the No. 4 position, which takes place immediately through the closure of a circuit by the signal transmitter controller at its S. N. position. The charging of the guard wire of the called substation over the tap wire $q^5$ charges the guard contacts of said called substation on all divisions of the primary and secondary connectors on which it is represented, so that if another substation as, for instance, 952, should attempt to seize the wire of the called substation 1845 upon any of the secondary connectors to which it is connected, the devices controlled by the calling substation 952 which must be operated in order to establish the talking connection with the called substation 1845 will be prevented from moving to the talking position, as will be presently described. On reaching the third position the rotary switch had also closed connection to its clutch magnet C³ so that the signal transmitter controller after having completed the setting of the secondary connector to connect with the line wanted and having brought the signal transmitter controller around to complete the direct ground connection on contact 145, may now send the rotary switch from the No. 3 position to the No. 4 position. This is done by the signal transmitter controller completing the connection at its S. N. position where it is automatically but temporarily brought to rest by the action of the notch in the disk D next to the normal position notch. (The circuit over which the clutch magnet C³ is operated may be thus traced: positive battery, second row of contacts signal transmitter controller, contacts at S. N. position, wire $c^{26}$, rotary switch, contacts 11th and 12th rows, magnet C³ to negative battery.) The rotary switch seized by substation 736 accordingly now passes from the No. 3 to the No. 4 position.

In passing from the No. 3 to the No. 4 position, circuits are completed by the rotary switch by means of which a test is applied to determine whether or not the signal transmitter controller shall pass automatically one short step from its S. N. to its normal position which it must occupy in order that the talking circuit with the called substation may be complete. If, on being applied, the test finds the line busy with which connection has been made on the secondary connector, the signal transmitter controller will not be released from its S. N. position, and, moreover, the circuit over which the calling substation subscriber receives an answer back signal when he operates his ringing key will remain open so that an answer back signal can not be transmitted, and he will thus be notified that the line wanted is busy. At the same time that it closes the test circuit the rotary switch momentarily closes on the contacts of the 11th and 12th rows a provisional release circuit for the magnet $C^6$ of the signal transmitter controller over the back contact of relay $R^6$. (This circuit may be traced as follows: positive battery relay lever and back contact of $R^6$, feed ring 3rd row of signal transmitter controller, No. 43 contact 4th row, wire $c^{27}$, contacts 11th and 12th rows of rotary switch, wire $c^{14}$, clutch magnet $C^6$ and negative battery.) This release circuit operates provided only that the secondary connector which has been set, as already described, finds the substation line idle, in which instance the G line of said subscriber will be dead. If, on the other hand, it finds the guard contact of the secondary connector alive or charged, which is the case if connection has already been made with said subscriber from some other line of the exchange, then the clutch of the signal transmitter controller will fail to operate because its circuit will be opened at the back contact of the relay $R^6$, which will be charged over the testing circuit just described leading from the guard contact on the secondary connector, said guard contact having been charged by the passage of the rotary switch to the 4th position, as will be presently described, and the signal transmitter controller will be prevented from going to talking position. (This test circuit may be traced as follows: from the live guard contact of the secondary connector when set to connection with the line wanted, brush bearing thereon, contact on the inner row of the contact segment of the register, brush adjusted to contact therewith by the action of the magnet $A^4$, feed ring, 10th row, wire $g^3$, bus wire $g^2$, contact in cylinder of interconnector to which the brush has been set to find a secondary connector in the section wanted, contact on inner row of the register to which the brush of said register has been set by the hundreds impulses, brush bearing thereon, brush of the interconnector cylinder bearing on the segment connected to wire $g'$, contact 7th row rotary switch between 3rd and 4th positions, wire $r^3$ through coil on relay $R^6$ to negative battery.) If, on the closure of this test circuit in the rotary switch the line with which connection has been made on the secondary connector seized is not in use, the guard contacts of the secondary connector will be dead, the relay $R^6$ will be unaffected and its armature lever will remain against its back contact so that the circuit of the release magnet of the signal transmitter controller will be intact at said contact, and the rotary switch in passing the contacts 11th and 12th row will energize the clutch magnet and permit the signal transmitter controller to move one short step to the normal position where it completes a break in the talking connection.

The signal transmitter controller when liberated in the manner just described, goes to the N position, thus completing its cycle of actions just as the rotary switch reaches the No. 4 position, and when it reaches said position closes connections effective in conjunction with other devices as will be presently described. In passing from third to fourth position, the rotary switch closes connection as shown for the relay $R^7$ at the third and fourth rows from $l'$, so that the said relay may be actuated and caused to draw up its armature lever when its circuit is broken at the substation preparatory to sending the rotary switch from fourth to fifth position.

*Rotary switch 4th position.*—The rotary switch having been sent to the 4th position completes connections as follows:

1st. It charges the guard contact of the line wanted, as, for instance, 1845, upon the secondary connector through which connection has been made with said line, and hence charges the guard contacts of said line upon all the secondary and primary connectors of the same section, namely, that to which the line 1845 is assigned, and thus guards said line from being seized by any other line, as, for instance, line 952. This guarding action is effected, as before explained, because although line 952 may find an idle section of secondary connector upon which 1845 is represented, said line 952 cannot send the signal transmitter controller and rotary switch by which it has seized such an idle secondary connector, to the position for talking connection, and, moreover, the substation line 952 will be notified that the line wanted as 1845 is busy, in the manner to be presently described. This guarding potential also prevents any action of the relay $R'$ for the decimal indicator to which the line of the called subscriber is connected in case he should endeavor to send a call after connection has been made with his line on a secondary connector. The manner in which this guarding potential acts to secure this result is by its action upon the magnet $R^3$, which acts to break the circuit of the relay $R'$ at the instant that the latter is connected to the line of said called subscriber. The current which flows for this purpose is from a guard wire of said called subscriber's line through his guard contact on ring 106 and by brush 116 through back contact of relay R⁴, relay R³, brush 112, ring 102, wire $r'$ and to negative battery by relay R², Fig. 4. The relay R³ is operated but relay R² does not act because as hereinbefore stated under the description of rotary switch No. 1 position, the relay R² is of low resistance and a few ampere turns while relay R³ being of high resistance acts as a choke coil for the momentary current. The condition is illustrated in Fig. 40, where a group of contacts embracing the contacts of the called subscriber in two of the secondary connectors and two of the primary connectors on one section of the exchange are shown and secondary connector No. 1 is shown as the one seized in making connection to the subscriber called.

2nd. The rotary switch in the 4th position connects the L′ side of the line calling, as 736, to positive battery, through one coil of the release relay R⁷, but with double voltage. The relay lever of R⁷ is thus drawn off its back contact and held in position in readiness for the breaking of the circuit through the coil of the release relay when the receiver is removed from the hook. When this occurs, the lever in going to its back contact closes the circuit which sends the rotary switch to the 5th position.

3rd. The rotary switch completes the break in the circuit of its own clutch magnet C³ by contacts in the 11th and 12th rows of the rotary switch ready for sending the rotary switch to the No. 5 position as soon as the No. 1 line is broken at the substation by lifting the telephone from the hook, as just stated, to cause the relay lever R⁷ to fall back against its back contact. (The circuit over which the guard contacts of the line called as 1845, are charged from the rotary switch employed by the calling subscriber may be traced as follows: positive battery, N position of the signal transmitter controller, wire $g^3$, contacts 4th to 5th position of rotary switch, to wire $g'$, and to guard contact on the secondary connector seized over the test circuit before traced from said guard contact, but in the reverse direction, and from said guard contact by the tap connection $g^5$ to the guard line G for the substation called, from which the guarding potential is distributed to the guard contacts of the secondary connectors in the same section). (The circuit of the relay R⁷ may be thus traced: positive battery, one coil of relay R⁷, wire $r^7$, contacts of rotary switch 3rd and 4th rows, wire $l'$, through the primary connector and the line L′, to the contact 145 of the signal transmitter to which the arm 142 was stepped by the final pulse sent by the signal transmitter controller just before it reached the No. 43 contact near the end of its second revolution, and to earth and negative of battery M B² at the central station.) (The circuit of the clutch magnet C³ whereby the rotary switch is sent from the 4th to the 5th position is as follows: positive battery, relay lever R⁷, back contact, when said lever is permitted to fall off from its front contact by the break of the circuit L′, wire $c^{28}$, contacts of rotary switch, clutch magnet C³ and negative battery.) Upon the transmitter arm reaching subnormal contact 145, as already explained, the toe of lock lever 156 drops into the notch in the disk 155, thus freeing the telephone switch lever 169 at substation 736. When now the telephone receiver is lifted from the hook it breaks the connection of the L′ side of the line through contact 145 of the signal transmitter to earth, thus discharging relay R⁷, and the lever of the same in going to back contact completes the circuit of the rotary switch clutch magnet, as just described, and sends the rotary switch to the 5th position, which is the talking position and signaling position for calling up the distant substation 1845. By the lifting of the receiver from the hook the telephone switch at the calling substation also transfers the L′ side of the line from earth to connection with the L² side of the line through the ringing key K, the telephone receiver and the contacts of the telephone transmitter typified at T. (Circuit is as follows: L′ side of the line, spring 147 of telephone switch, lower stop therefor, key K, telephone transmitter T, telephone receiver and to L² side of the line.)

*Rotary switch 5th position.*—By the rotary switch in the 5th position the L′ side of the line calling is connected to the L² side at the central office so as to establish a connection for key K through the ringing relay R⁸ and induction coil P to permit the ringing currents to be transmitted to the called line and conversation to take place, as will be presently described. (Complete circuit may be thus traced: from positive battery M B′, one coil of relay R⁷, wire $r^7$, contacts 3rd and 4th row of rotary switch, connection $l'$, calling substation circuit L′ and to L² side including the apparatus of substation as just described, wire $l^2$, contacts 5th and 6th rows rotary switch, wire $r^8$, second coil of release relay R⁷, but in a direction to neutralize the effect of the current in the first coil, relay R⁸, one side of induction coil P and back to negative of battery of M B′.) By the circuit thus established through the two coils of relay R⁷ the latter is unaffected owing to the neutralizing effect just mentioned, and hence its armature is prevented from closing circuit on its front contact, which latter circuit is the one over which the rotary switch is sent from the 5th to the 6th position, as will be presently described. The circuit thus established by the passing of the rotary switch to No. 5 position comes the relay R⁸ to be energized and to form at its front contact a connection which subsequently to calling forms the talking circuit for the called subscriber and is maintained during conversation by the battery, but the armature lever in moving up to this position first breaks the connection at its back contact to the poles of the signaling generator 201, and puts said relay R⁸ in readiness for operation by the ringing key at the substation. When the latter is depressed, it throws resistance into the circuit of relay R⁸ whose armature lever drops back and completes the connection for the ringing generator 201 to the called substation's line when the called substation is signaled. As this operation of the relay is produced at the subscriber's station by a ringing key without removing the receiver from connection with the line and inasmuch as the connections of said line are not thereby disturbed at the central office, the calling subscriber's line is in condition to permit the ringing signal to be repeated back from the central station over the calling subscriber's line and to be heard in his receiver. (The complete circuit over which the ringing current flows over the called line may be traced as follows: from one pole of generator 201, back contact of relay R⁸, wire r⁹, contacts and bridging brushes in the N position of the signal transmitter controller 5th and 6th rows, wire r¹⁰, contacts of the rotary switch which in practice would be located in the 5th position on the second half of the rotary switch cylinder, wire l²², feed segment 2nd row of l², brush bearing thereon and connected with brush bearing on second row of contacts of the register, contact No. 8 position of said contact sector, brush of the interconnector cylinder bearing on contact connected to bus wire l³², tap wire l⁴² leading to the idle connector previously seized in the 9th section of the second thousands, feed segment 4th row of secondary connector, cylinder brush bearing thereon and connected to brush bearing on the outer row of contacts of the secondary connector register, contact 4 of said row, brush of the secondary connector cylinder bearing on contact 5 in the second quadrant, wire l⁵², to the L² side of the substation called, then through the substation apparatus by the normal circuits including the signal bell 146, as already described, back to the secondary connector by wire l⁵¹, No. 5 contact upon which bears the brush joined to a No. 4 contact of the middle row of register contacts, register brush adjusted to engage the same, brush bearing on feed ring or segment of the secondary connector cylinder to the wire l⁴¹, which is connected through the interconnector with wire l²¹ by circuit already traced in connection with the operation of stepping the secondary connector register, contacts 9th and 10th rows of rotary switch cylinder, wire r¹¹, contacts and bridging brushes N position of the signal transmitter controller, wire r¹², to one side of the induction coil P and back to the other pole of the generator 201.)

The alternating or varying currents produced by generator 201 circulating over the circuit just described, which includes one coil of the induction coil P, operate inductively on the other coil of said induction coil and produce pulsations in the metallic circuit of the calling substation which, passing through the telephone receiver, produce a sound that gives notice at the calling substation that the call has been transmitted to the station wanted. The path of these induced currents is through the coils of relay R⁸, one coil of the release relay, over the subscriber's circuit, back through the other coil of the release relay and battery M B', through the circuit already traced as being formed for the ringing key K when the rotary switch reaches the 5th position, which circuit is also the talking circuit for the calling substation.

On the release of the ringing key of the calling substation the armature of the relay R⁸ is drawn against its front contact substituting for the connection from the generator 201 to the back contact a connection from M B' by the front contact, which circuit is completed, as already traced, in the case of the ringing current to and through the substation apparatus of the called subscriber and back through a coil of the induction coil to the negative pole of said battery instead of to the other pole of the generator 201. At the called substation, after the receipt of the signal, the circuit has been transferred from the bell to the telephone receiver and transmitter by the action of the telephone switch when the telephone is removed from the hook, and there is now, therefore, a talking connection formed for each substation through the battery M B' at the central office. This connection for the calling substation is through one side of the induction coil P, and for the called substation is through the other side thereof, so that the variations of current produced by the operation of either transmitter will be inductively transferred to the other substation line so that speech may be transmitted from either line to the other.

It will be noticed that the called substation circuit over which the signal goes from the generator 201 includes contacts in the N position of the signal transmitter controller, so that no signal will go to said station unless the signal transmitter controller of the calling substation has passed from the S N position one short step to the N; hence, unless the signal transmitter controller has been released from said S N position, no answer back signal will be transmitted to the calling substation, which will be notice to the subscriber that the substation wanted is busy. As already described, in connection with the operation when the rotary switch passes from the No. 3 to the No. 4 position, the signal transmitter controller will be held on this S N position when the rotary switch, in making the busy test, finds the line wanted already in use. The rotary switch in its 5th position also forms a connection for its own clutch magnet $C^3$, by which it may be sent from the 5th to the 6th position when the relay $R^7$ is operated from the substation by the hanging of the receiver upon the hook at the conclusion of a conversation. This release circuit is closed on the front contact of the relay $R^7$ when the latter is excited by current from positive battery over the $L'$ side of the line to earth and negative battery at the substation when the receiver of the calling subscriber is returned to the hook, and may be thus traced. (Positive battery, relay lever $R^7$, front contact, wire $c^{29}$, contacts 11th and 12th rows rotary switch, magnet $C^3$ and negative battery.) The operating circuit of the relay is over the $L'$ side of the line to earth. (It may be thus traced: from positive of battery M B′, one coil of relay $R^7$, wire $r^7$, contacts 3rd and 4th rows of rotary switch, wire $l'$ to $L'$, through the primary connector upper contact for spring 147 of receiver switch, arm 142, final or subnormal contact 145 of signal transmitter, to earth, negative of battery M B², back to M B′ at central station.) The rotary switch then passes to the No. 6 position, and in leaving the No. 5 position breaks the talking and signaling circuits already traced, but before reaching the No. 6 position puts positive battery to the $L^2$ side of the line calling, for the purpose of actuating magnet $A^5$ and stepping arm 142 from the contact 145 to the normal contact 140. (Circuit may be traced thus: positive battery, feed segment second row of rotary switch, contacts 6th and 5th rows, to wire $l^2$ and line $L^2$ through primary connector, contact of lower spring 148 of the telephone switch at substation magnet $A^5$, and spring 144 to earth.) When the signal transmitter reaches normal position, earth connection by spring 144 is broken, and the substation apparatus is now in normal position. The rotary switch also between Nos. 5 and 6 positions momentarily closes the release connection for sending the signal transmitter controller to N position in case it has been left on the 43 contact through finding the line wanted busy. This connection is through the No. 43 contacts and release magnet $C^6$. (It may be traced as follows: positive battery, 2nd row of signal transmitter controller contacts, S N contacts, wire $c^{26}$, contacts 11th and 12th rows, to wire $c^{14}$, clutch magnet $C^6$, and to negative battery.)

*Rotary switch No. 6 position.*—The rotary switch has now reached the No. 6 position, and now closes connections, first, whereby the primary connector may be started over connection $c^9$, and sent around three quarters or more of a revolution to normal; secondly, whereby the secondary connector may be started over the wire $c^{23}$, to be automatically arrested at normal; and thirdly, whereby its own clutch magnet may be energized to send the rotary switch to the 7th position as soon as the primary connector begins the last half of its revolution. (The circuit for starting the primary connector may be traced as follows: positive battery, one coil of clutch magnet $C^5$, wire $c^9$, contacts 3rd and 4th rows of rotary switch 6th position and negative battery. The circuit for starting the secondary connector and sending it around to normal, is from positive battery, feed segment 7th row of rotary switch, contacts 7th and 8th rows, wire $c^{23}$, over a circuit to negative battery already described in connection with the movement of the brushes in the secondary connector cylinder under the control of the units pulses. The release circuit of the rotary switch for sending it from 6th to 7th position is thus: positive battery, primary connector, contact in the 2nd row bridged by two connected brushes in the cylinder to another contact when the primary connector begins the last half of its revolution, wire $c^{31}$, contacts of rotary switch in the 11th and 12th rows, magnet $C^3$, and negative battery.)

It will be seen that the release of the rotary switch as just described is timed so as not to take place until the notched portion of the disk D, working in conjunction with the clutch magnets of the primary connector and secondary connector has passed the armature so that the latter will be held up by the un-notched portion and permit the devices to complete their revolution to normal, although the circuit of the magnet may be broken in the rotary switch when the latter leaves the No. 6 position.

*Rotary switch No. 7 position.*—As soon as the rotary switch reaches the No. 7 position, which it does immediately upon its release from the 6th position by the action of the primary connector, as just described, it releases the interconnector by an impulse transmitted over wire $c^{27}$ from + battery rotary switch diagram through the wires $c^{18}$, $c^{19}$, to clutch magnet $C^7$. (The circuit may be thus traced: positive battery, feed segment of the row of the rotary switch, contacts No. 7 position, 7th and 8th rows, wire $c^{27}$, brush of thousands register resting on contact connected to wire $c^{18}$, magnet $C^7$, wire $c^{19}$, contact No. 7 position of rotary switch, 5th and 6th rows, to negative battery.) The interconnector shaft thus being started, revolves from the position to which it has been set in the act of calling the substation until it automatically comes to rest by the armature dog of $C^7$ finding the normal notch in the disk D. At the same time that the rotary switch releases the interconnector, it completes a connection to its own clutch magnet $C^3$, whereby it may be sent from No. 7 position to normal by the action of the primary connector just before reaching the N or home position. This may be done by an impulse sent over the wire $c^{32}$, connected to the 10th point in the 4th quadrant, 2nd row of primary connector. (The circuit may be traced as follows: positive battery, 10th contact in the 2nd row of the first quadrant primary connector, forward one of the two bridging brushes riding on the 2nd row, rear brush, 10th contact of the 4th quadrant, wire $c^{32}$, contacts 11th and 12th rows of rotary switch, magnet $C^3$ and negative battery.) The rotary switch thereupon leaves the No. 7 position and revolves without stopping until it automatically comes to rest in the N position, ready for seizure by the division starter in response to a subsequent call from a substation on the same section.

The register brushes on the primary connector, the interconnector and the secondary connector are all forced back to the zero position by the operation already described of carrying said register bodily around with the brushes in the cylinder in a manner to bring the projection upon the escapement sector against a fixed lug or stop, as already described in setting forth the details of construction. In the case of the thousands register, the escapement sector carrying the register brushes is forced back by the pins 95 on the rotary switch as already described.

To recapitulate the operation of establishing connection between substations 736 and 1845 by the particular arrangement of apparatus shown; the initiatory act of pulling down the transmitter lever at the substation 736 places the L′ line to ground direct, and L² line to ground through the transmitter operating or controlling magnet. This causes the current to flow over the L′ line when the decimal indicator finds the 36 line plate or contact and through the line relay of said decimal indicator. The indicator is thus stopped on the L′ line of 36. When it stops it starts the division starter which had previously been stopped in position to start an idle division of the connecting apparatus. The division starter as soon as it starts, closes the circuit and starts the rotary switch of the idle division sending it from normal to No. 1 position. In moving to No. 1 position the rotary switch starts the decimal register controller and also the cylinder brushes of the primary connector of the same division, which stop automatically in the position indicated by the decimal indicator, while at the same time the decimal register controller in completing its revolution sets the register of the primary connector to position indicated by the tens brush of the decimal indicator. This places the primary connector in connection with substation 736 and connects the L′, L² and G lines for said substation with the rotary switch. As the decimal register controller comes to rest it sends the rotary switch to second position, thus starting the transmitter controller. The transmitter is then stepped forward in unison with said controller over the L² line. The first movement of the transmitter breaks the circuit of the L′ line to the decimal indicator relay and permits it to revert to common use. The guard line of the substation 736 is now charged and all guard contacts of said line are charged upon the primary and secondary connectors of the section, while the L′ line is connected to the signal relay operating with the signal transmitter controller. When the transmitter brush finds the contact pin connected to ground by the thousands indicator, the relay lever is drawn up. While it was against its back contact the thousands register was stepped forward to find the interconnection I² for the second thousands. In engaging its front contact the relay lever closes circuit through the secondary winding of the relay which holds the lever in its forward position until the signal transmitter has passed the thousands set of pins. By this means the thousands register is left in position to connect to interconnector I².

When the signal transmitter controller passes the thousands stepping contacts, the relay lever is permitted to drop back and close circuit to the hundreds register of the interconnector selected by the thousands register. The signal transmitter is now stepped forward together with the hundreds register of the interconnector until the transmitter finds the pin in its hundreds set of pins which has been grounded by the hundreds indicator. The signal relay lever is then drawn up and the interconnector register is stopped in connection with brushes of the interconnector cylinder which will pass over contacts representing all secondary connectors in the eight hundreds section of the second thousands of the exchange. The relay lever remains against its front contact until the transmitter has been stepped over the hundreds set of pins. The transmitter controller steps the signal transmitter past the hundreds set of pins and in coming to rest permits the signal relay lever to drop back and start the interconnector cylinder brushes which revolve until they come to the contact connected to an idle division of the secondary connector in the section of exchange for substation 1845, when they are stepped by current flowing over said contact and through one winding of the signal relay so as to cause the latter to break at its back contact the circuit of the controller magnet for the interconnector cylinder. The rotary switch is now started to 3rd position by circuit through the transmitter controller and relay lever which is against its forward contact. This breaks the circuit of relay magnet and allows relay lever to fall back again, and the signal transmitter controller is again started and sends a third or tens set of impulses to the transmitter and to the register magnet on the secondary connector which has been seized and is isolated.

When the transmitter finds in its third or tens set the pin which has been grounded by the tens indicator, the secondary connector register stops on contacts connected to brushes of the secondary connector cylinder which pass over a set of contacts therein to one of which line 1845 is connected and stops as before because the signal relay lever breaks circuit at its back contact. The transmitter controller passes the tens set of contacts and the relay lever again closes on its back contact and the signal transmitter is now stepped over its units set of pins. The cylinder brushes of the secondary connector are now stepped forward until the transmitter finds the grounded pin by the units indicator and the secondary connector brushes are now in connection with line and guard points 1845. The rotary switch now moves forward to position, just in front of the talking position, and the transmitter having been given a final step by the signal transmitter controller closes a ground for L' line over which the release relay is operated by one of its windings and its lever held forward. The lifting of the telephone from the hook allows the release relay lever to fall back and move the rotary switch to talking position. The rotary switch then completes the talking circuit and allows substation 736 to call 1845 by operating the ringing key, which allows ringing relay to put calling generator into circuit of 1845 through one winding of the repeating coil P. This sets up an induced current in the line 736 which informs substation 736 that the bell of called subscriber is ringing. The talking circuit is through transmitter controller on normal position and rotary switch on talking position. Had the guard contact of substation 1845 been charged by the said substation being busy, signal relay would have been held up against its front contact, thus preventing the transmitter controller from going to the talking position. When the telephone is placed on the hook, whether after a completed call or a busy one, the ground circuit is completed through side of line and release relay and rotary switch leaves talking position. This puts signal transmitter to normal position ready for another call and initiates the release of all the apparatus by the coöperation of the rotary switch and primary connector. As soon as the primary connector and rotary switch are at normal, the division to which they belong is in condition to be selected and seized by another calling substation.

It has already been explained under "Rotary switch No. 3 position" that by means of a test circuit a test is applied to determine whether the line seized upon the secondary connector is in use and that in case it be found in use the apparatus will be automatically held and prevented from going to talking position. This result may be accomplished by controlling the position of any portion of the apparatus.

It has already been described how one part as, for instance, the signal transmitter controller may be prevented from moving to contacts through which the talking connection is established and maintained. The same result might be accomplished by causing some portion of the apparatus to pass the position for establishing such connection instead of coming to rest there. Thus, for instance, the secondary connector when it finds a line busy on establishing connection therewith might be made to pass beyond the position by which connection is established with such line, thereby guarding said busy line from interference. In this case the talking and ringing connection over the N contacts of the signal transmitter controller may be dispensed with and the contacts bridged by a permanent connection as indicated in Fig. 41. To cause the secondary connector to pass the talking position it is only necessary to connect the clutch magnet $C^8$ of the secondary connector to the back contact of relay $R^6$, as shown, through the contact in the S. N. position of the signal transmitter controller and through the rotary switch by the wire connecting the wire $c^{27}$ with a contact in the 10th row, and the wire $c^{23}$ with a contact in the 9th row, No. 4 position of the rotary switch. In this case when the line is found busy at the secondary connector which has been set to connection therewith, the relay $R^6$ will be controlled as before over the test circuit but will keep the connection closed on its back contact so as to energize the magnet $C^8$ and send the secondary connector along past connection with the contacts of such busy line. (The circuit over which $C^8$ is thus energized may be thus traced: positive battery, relay lever back contact, thence to S. N. contacts in 4th row of signal transmitter controller, wire $c^{17}$, wire $c^{27}$, wire $c^{23}$ and over contacts already traced to magnet $C^8$ and to negative battery.) In other words the relay instead of preventing a part as, for instance, the signal transmitter controller, from going to a talking connection, causes a part of the connecting apparatus to go past the position for forming a talking connection.

From the foregoing it will be seen that each primary connector is a connecting apparatus whose function is, among other things, to place any line of the group of subscribers' lines in connection with a circuit containing a suitable signal receiving device and that it is made to establish this connection automatically for any one of the series or group of subscribers' lines connected with it by the action of a device controllable by the said lines nonsimultaneously and in a fixed order of rotation, which device when temporarily brought to rest by the preliminary signal or impulse from any subscriber's station causes the said connecting apparatus to automatically as it were identify or single out that subscriber's line on said connecting apparatus. In the particular form of our invention described herein such means consists of the springs or fingers on the decimal indicator which by stopping in particular positions single out the electro-magnetic mechanism individual to the particular line calling and which by the mechanical and electrical powers described causes the automatic setting of the connecting apparatus so as to establish the connection for that particular calling line. While we have described identifying spring fingers on the decimal indicator which bring into action electro-mechanical devices, we do not limit ourselves to the use of any particular power or force which being selectively called into action by rotating fingers or brushes will produce the desired identification of the calling subscriber's line on the connecting apparatus. It will also be seen and will be readily understood by those skilled in the art that the series of "divisions" of connecting apparatus described constitute a plurality of connecting divisions in some respects analogous to the cord circuits of a manual exchange and permit the connection together of a percentage of the series of subscribers' lines in pairs, the control of any idle divisions being given to the whole series of subscribers' lines of a section of the exchange, whether used individually or as one of a number of sections, non-simultaneously and in a fixed order of rotation by means of the progressive contact maker part of the apparatus consisting of the ring of line contacts 101 and brush 111. It will also be seen that in the operation of the apparatus the signal transmitter sends first the preliminary signal, and that its action is then positively delayed until the connection of the line with the signal receiving circuit is completed at the central station, until which time the transmitter cannot send its selective signals, but that on the establishment of said circuit the transmitter escapement magnet coöperating with the device at the central station which sends an impulse or impulses through said magnet, permits the transmitter to go forward and send the selective signals.

From the foregoing description taken in connection with the drawings, it will be seen that the essence of our invention lies in the provision of one or more secondary connectors (main - line - circuit selecting switches) for each of the groups of lines into which the substation lines of the exchange are divided, and the further provision of automatically controlled switches and connections whereby any line of all the groups of lines may place itself in connection with any secondary connector of any group which secondary connector may thereafter be adjusted by selective signals to connection with the line called, and that the additional secondary connector of any group over and above the one secondary connector by which one called line connection may be made, represent simply additional capacity or ability of the apparatus to provide more than one connection at a time by the use of any one of said additional connectors that may be at any time idle.

The invention claimed is as follows:

1. An automatic exchange having its substation circuits subdivided into sections, each of which sections is provided with two or more line connectors, each said connector having an adjustable brush or brushes capable of adjustment to position coincident with the contact of the line called independently of the brush or brushes for the other connector or connectors of the same section, and means on each section common to the lines thereof for placing any line of said section in operative electrical relation with any one of the connectors in the same or any other section.

2. In an automatic exchange having its main lines divided into, groups, the combination of a main-line-circuit selecting switch for each group adapted to select and establish connection with any one of the main lines of said group as a called line, and means for placing any calling line of each group of lines in connection with the main-line-circuit selecting switch for the same or for any other group of lines.

3. In an automatic exchange having its main lines divided into groups, two or more switches for each group, each said switch being adapted to establish connection with any line of its group, means for establishing a connection between any line of any group and any group of said switches, and electrically operated means by which an automatically selected one of said switches may be used in establishing talking circuit between different stations.

4. In an automatic exchange, having its main lines divided into groups, the combination of a group of selecting switches for each group of main lines, each said switch having brushes adjustable over its main line contacts independently of the brushes of other switches to bring said brushes opposite the contact of the called line, and means for placing any calling line of a group in connection with any one of the switches for said group or for any other group.

5. In an automatic exchange having its main lines divided into groups, the combination of a plurality of main line circuit-selecting switches for each group, means for adjusting a main line circuit-selecting switch of one group to establish connection with the lines of that group as called lines, a normally resting circuit-selecting switch for each group having contacts forming terminals of circuits joined respectively to the main line circuit-selecting switches of the several groups, means for connecting any calling line of a group to the normally resting circuit-selecting switch for that group, and means for adjusting the said normally resting circuit-selecting switch to select the main line circuit-selecting switches for the group of lines to which the called line belongs and for connecting with an idle one of said main line circuit-selecting switches in that group.

6. In an automatic exchange divided into sections, on each of which sections a particular number or group of substations is represented in fixed contacts, the combination of means on each section for adjusting a movable brush or brushes to form connection with the line contact of a calling substation in that section, a group of connections leading from each section to every other section of the exchange, a signal transmitter at each substation, and means controlled by said signal transmitter for selecting the group of connections leading to the particular section in which the called substation is represented and for forming a connection between the brush adjusted to rest upon the line contact of the calling line and an idle one of said connections.

7. In an automatic exchange divided into sections, to each of which a number of substations are assigned, the combination with a connector on each section upon which a called line of said section may be found or seized, of an inter-connector normally at rest upon which the connectors of the same and other sections are represented in suitable contact points or terminals joined to said connectors, means for starting said interconnector from any one of the substations of a section, a signal transmitter at each substation and means under the control thereof for setting the interconnector to position for connecting with a connector of the section to which the line called is assigned.

8. In an automatic exchange divided into sections to each of which a number of substations are assigned, the combination with a connector on each section upon which the called line of said section may be found, of an interconnector normally at rest upon which the connectors of the same and all other sections are represented in suitable contact points or terminals joined to said connectors, means for starting said interconnector from any one of the substations of the section and means under the control of the line calling for setting said interconnector when seized to position for establishing a circuit between said calling line and a connector of the section to which the called line is assigned, and means for restoring said interconnector to zero position or position of rest at the conclusion of a conversation.

9. In an automatic exchange having its main lines divided into groups, the combination of a group of secondary connectors, two or more in number for each group of main lines, a group of interconnectors, two or more in number for each group of main lines, sets of bus wires to which the secondary connectors are individually connected and taps from the bus wires belonging to each secondary connector to the contact points or terminals of interconnectors for all groups of main lines.

10. In an automatic exchange divided into sections, the combination with two or more secondary connectors for each section, each normally idle and any one of which in a section may be used in establishing a talking circuit between a calling subscriber's station and a desired one of the other subscribers' stations in that section, of means for automatically selecting an idle one of such connectors in any desired section, and automatic means for isolating the selected connector.

11. In an automatic exchange divided into sections, the combination of two or more secondary connectors in each section, each normally at rest, magnetically controlled means for coupling said connectors to a suitable driving shaft, and means for seizing an idle one of said connectors in any section from any section of the exchange.

12. In an automatic telephone exchange, the combination with a signaling generator and a talking generator at the central station, of means controlled from a subscriber's station for switching the signaling generator and talking generator into and out of circuit with the connected lines.

13. In an automatic exchange divided into sections, the combination with two or more secondary connectors in each section, of an interconnector for each section, normally idle and controlling the connections to said secondary connectors on the same and other sections, means for starting an interconnector on any section from any line on the same section, a controlling circuit on each secondary connector joined over the aforesaid connections to interconnectors on all sections and a circuit closer and breaker on each secondary connector on which the controlling circuit is completed in the normal position of the secondary connector, and adapted to break said controlling circuit when said secondary connector moves forward from normal position.

14. In an automatic exchange divided into sections, to each of which are assigned a number of substations, the combination of a series of individual connectors for each section, each connector of a section having contacts in which the lines of the section terminate individually, one or more normally idle interconnectors for each section for coupling the calling line to the section to which the called line is assigned, means for connecting any line of a section to one of said interconnectors and means for automatically bringing the interconnector to rest when it finds the circuit of an idle one of the series of connectors upon the required section.

15. In an automatic telephone exchange, a central source of energy for signaling to a called subscriber and a relay in the connection established by the exchange apparatus from the calling subscriber's circuit for governing the connection of said signaling generator with the called subscriber's circuit, and means for controlling the action of said relay at will from the calling subscriber's station after connection of the calling and called subscribers' lines.

16. In an automatic telephone exchange, the combination with a central source of energy, of means at the subscriber's station for controlling the number of selecting impulses generated from said source of energy for controlling or setting the exchange apparatus, a central source of energy and repeating induction coil, and means for automatically connecting the same with the circuits of the calling and called subscribers by the action of a signal or impulse sent from the calling subscriber's station.

17. In an automatic telephone exchange, the combination with a central source of energy and a repeating induction coil, of a signal transmitter at the subscriber's station adapted to control the number of selecting impulses operative at the central exchange and means connected with said subscriber's instrument for sending a signal for connecting the circuits of the calling and called subscribers in the central station apparatus with said repeating induction coil.

18. In an automatic telephone exchange, the combination of a central source of energy and repeating induction coil, switch devices for placing the same in connection with a calling subscriber's line and means governed over the said subscriber's circuit for controlling the action of said devices automatically by the act of lifting the telephone receiver from its hook.

19. In an automatic telephone exchange, a number of groups of main lines and a group of main line circuit-selecting switches for each group of main lines, the number of said selecting switches in each group forming a percentage of the whole number of main lines connected to them and each said switch being common for connection from any main line of any group but common for connection to only the lines of the group to which it belongs.

20. In a telephone exchange, a series of circuit-selecting switches divided into groups, a second group of main line selecting switches for each of the first named groups of switches and less in number than the main lines making use of the switches of the first named group, each switch of the second group including a pair of brushes or contact makers and devices for moving them into successive contact with a series of pairs of contact points, a pair of connections from each main line making use of the first named switches to a different pair of contacts on each main line circuit-selecting switch for that group and a pair of connecting lines from a pair of contact makers of each said main line circuit-selecting switch to a position adjacent to the whole series of first named switches, said pairs of connecting lines each being provided with branches connected to corresponding pairs of contact points on the first named switches.

21. In an automatic telephone exchange, a series of circuit-selecting switches each provided with a series of selectable contact points less in number than the whole number of main lines, connections from the contact points of each said switch, a series of main line circuit-selecting switches, the number of which is proportionate to the traffic demand, a division of the first named switches into groups, and a division of the main line circuit-selecting switches into an equal number of groups.

22. In an automatic telephone exchange, the combination of a circuit selecting switch and means for adjusting the same in response to selecting signals sent over a main line, two sets of contact points on said switch the said contact points being subdivided into rows, of a series of main line circuit-selecting switches connected to corresponding contact points in the said rows, contact makers on the first named switch and means for moving them over a selector row of contact points in the two sets so as to connect the said contact makers to one of said main line circuit-selecting switches, means for similarly moving the selected switch and means whereby such movement of the contact makers and one of said circuit-selecting switches will serve to connect by a complete metallic circuit said first named switch with any one of a series of main lines the number of which is greater than the number of connections extending from the first named switch.

23. In an automatic telephone exchange, the combination of a circuit-selecting switch and means for adjusting the same in response to selecting signals sent over a main line, two sets of contact points on said switch the said contact points being sub-divided into rows, of a series of main line circuit-selecting switches connected to corresponding contact points in the said rows, contact makers on the first named switch and means for moving them over a selected row of contact points in the two sets so as to connect the said contact makers to one of said main line circuit selecting switches, means for similarly moving the selected switch and means whereby such movement of the contact makers and one of said circuit selecting switches will serve to connect by a complete metallic circuit said first named switch with any one of a series of main lines the number of which is greater than the number of connections extending from the first named switch, and automatic means for stopping the movement of the contact makers when they make contact with a pair of contact points connected to a main line circuit selecting switch that is at the time at its normal position.

24. In an automatic telephone exchange, the combination of a circuit selecting switch and means for adjusting the same in response to selecting signals sent over a main line, two sets of contact points on said switch the said contact points being sub-divided into rows, of a series of main line circuit-selecting switches connected to corresponding contact points in the said rows, contact makers on the first named switch and means for moving them over a selected row of contact points in the two sets so as to connect the said contact makers to one of said main line circuit selecting switches, means for similarly moving the selected switch and means whereby such movement of the contact makers and one of said circuit selecting switches will serve to connect by a complete metallic circuit said first named switch with any one of a series of main lines the number of which is greater than the number of connections extending from the first named switch, means for automatically stopping the movement of the contact makers so as to select the first unemployed main line circuit-selecting switch in the group of such switches connected to said row of contact points, and means for moving the selected main line circuit-selecting switch to electrical connection with any main line in the group.

25. In an automatic telephone exchange, the combination with a central source of energy for talking, of switch devices for completing the connection of the calling and called subscribers with said source, a relay or electromagnet at the central office controlling the action of said switch devices, means for automatically connecting the same with the calling subscriber's circuit after completion of the selecting signals, and means at the subscriber's station for governing the action of said relay or electromagnet.

26. In a telephone exchange, a series of main lines divided into groups, a less numerous series of main line circuit-selecting switches divided into corresponding groups, on each said switch a pair of contact points for each member of the group of main lines to which it belongs, pairs of connections between the pairs of contacts and the corresponding main lines, a pair of contact makers on each switch adapted to be moved to successive contact with pairs of contact points, devices for so moving them, means for operating said devices from any main line of the exchange so as to complete electrical connection from the operating point to a selected member of the group of main lines to which the switch belongs and means for preventing a similar operation of the moved switch from a second main line while the said switch is in possession of a main line.

27. In a telephone exchange, the combination with a series of switches divided into groups, means for operating the same from a connected telephone line, a second series of main line circuit-selecting switches, divided into corresponding groups, each of which comprise a number of said main line circuit selecting switches proportionate to the traffic demand, electrical connections extending in pairs from each of the main line circuit selecting switches to all of the main lines connected to the corresponding group of switches of the first series and means whereby a movement of one switch of the first series and one of the second series will serve to make telephonic connection between the moved switch of the first series and any of the main lines in the exchange.

28. In a telephone exchange comprising a series of groups of electrically-operated or controlled local circuit-selecting switches and a corresponding series of groups of electrically-operated or controlled main line circuit-selecting switches forming a percentage of the whole number of lines served by each, means for operating any switch of the first series of groups so as to cause a preliminary selection of any desired group of the second series of switches, and automatic means for selecting and isolating an idle switch out of the preliminary selected group of main line circuit-selecting switches.

29. In a telephone exchange comprising main lines divided into groups, a series of groups of electrically-operated switches, one group for each group of main lines, a corresponding series of groups of main line circuit-selecting switches forming a percentage of the whole number of main lines served by said group, means for operating any switch of the first series so as to cause a preliminary selection of any desired group of the second series, further means for operating the switch of the first series so as to cause the automatic selection of an idle switch out of the preliminary selected group of the second series and means for operating the automatically selected switch so as to select any one of the main lines which control the operation of the corresponding first series.

30. A series of groups of main lines, a group of switches for each group of main lines, corresponding groups of main line circuit-selecting switches each having a number of main line contact points greater in number than the number of switches comprised in the group of which said switch constitutes a member, and electrically-operated means for moving a switch of the first series by a connected line to electrical connection with one of the main line circuit selecting switches and electrically-operated means by which the selected switch may be moved to electrical connection with any one of the main lines of the group of main lines corresponding to a group of the first-named switches.

31. A series of groups of local circuit-selecting switches, a group of main lines, a lesser group of main line circuit-selecting switches apportioned to each group of the first named switches, electrical connections from each of the latter to all of the main line circuit-selecting switches and return conductors from each main line circuit-selecting switch to each group to all of the lines corresponding to the group of switches to which it is apportioned.

32. In an automatic exchange divided into sections, the combination of a primary connector in each section in which the lines of the section terminate in points or contacts, means under the control of the line calling for setting the same to register with the point or contact of the line calling. a secondary connector in each section in which the lines of the section also terminate and adapted to be set to connection with any line of the section, an interconnector in each section and means under the control of the calling line for setting the interconnector to form connection between the primary connector for the calling line and secondary connector of the section to which the line called is joined.

33. The combination in an automatic exchange divided into sections, of a series of primary connectors on each section adapted to establish connection with a calling line, and a series of secondary connectors on each section adapted to establish connection with a called line, and a series of interconnectors for each section upon each of which the secondary connectors of the same and every other section are represented.

34. In an automatic exchange, the combination of a talking battery at the central office, a circuit closing device at the central office for closing a talking connection of the called subscriber through said battery, a receiver hook and means for automatically operating said circuit closing device when the calling subscriber's receiver is lifted from the hook.

35. The combination in an automatic exchange having its substation wires divided into sections, of a primary connector and a secondary connector for each section, each said connector being an individual piece of apparatus independent as to its circuits of the others, means under the control of the substations of a section for setting the primary connector of said section to connection with terminals of the line calling and means for setting the secondary connector of the same or any other section to form connection with the terminals of the line called upon said secondary connector.

36. In an automatic exchange having its main lines divided into groups, the combination of a primary connector having contact points or terminals in which the lines of a group terminate individually, said primary connector being normally idle mechanically and adapted to be adjusted to establish connection with any line of its own group, means for starting the same from any substation and stopping it in required position, and means for connecting the same, when so adjusted, with any other section of the exchange to form connection with the called substation on the latter section.

37. In an automatic exchange divided into sections, the combination with a primary connector on each section having a brush or brushes adapted to be adjusted over contacts representing the several lines of said section, a control or stop magnet for bringing the brushes to rest in a desired position the magnet being responsive to the action of a generator upon the initial closure of the circuit of said generator produced by the primary connector when its brushes reach position corresponding to the line calling, a controller adjustable in accordance with the designation of a called substation, and means automatically responsive to said controller for forming an electrical connection between the primary connector and any other section of the exchange to permit the calling line found by said primary connector to be placed in connection with the called substation on the latter section.

38. In an automatic exchange divided into sections, the combination of a primary connector on each section having a brush or brushes adapted to be adjusted over contacts in which the lines of the section terminate, a driving power normally disconnected from said brushes, a clutch for connecting the brushes with the driving power, means for automatically disconnecting the clutch when said brushes reach position for connection with a calling line, main line circuit-selecting apparatus for each section of the exchange, and means on each section for forming a connection between the primary connector of said section and the circuit-selecting apparatus on the section of the exchange to which the called line is connected.

39. In an automatic exchange divided into sections, the combination of the primary connector on each section adapted to be adjusted to establish connection with any line of its own section, a driving power, clutch devices for coupling said connector with the driving power, means for automatically disconnecting the clutch when by a progressive forward movement the primary connector has reached the normal or zero position and means for forming a connection between said primary connector on any section and another section of the exchange to enable connection between the calling and the called substation of the latter section to be established.

40. In an automatic exchange divided into sections, two or more secondary connectors for each section each connector having a rotatable brush or brushes normally disconnected from the driving power and means for coupling the brushes of each connector to said driving power independently of the others, means on each section for establishing a connection with the calling line thereof and means for placing the wire of said calling line in connection with one of said connectors on the same section with said calling line or on any other section.

41. In an automatic exchange divided into sections, the combination of a primary connector and secondary connector on each section both normally out of action or mechanically idle and on both of which all the lines of the section are represented in fixed points or contacts permanently connected to the lines, and means for connecting the primary connector whose brushes are adjusted to bear upon the contact of the line calling with the secondary connector of the same or any other section.

42. The combination in an automatic exchange divided into sections of a primary connector and a secondary connector on each section each normally out of action or mechanically idle, means for adjusting the primary connector from its position of rest over its line contacts to position of contact with the line calling, means for adjusting the secondary connector to position of connection with the line contact of a called line, and connecting devices for establishing connection between a primary connector adjusted to position of connection with the line calling and a secondary connector upon the same or any other section.

43. The combination with each section of an automatic exchange, of a series of primary connectors, each of which is a self-contained piece of apparatus structurally and operatively independent of the other primary connectors of the series, a series of secondary connectors, the members of which are also structurally and operatively independent of one another, means under the control of each of the substations connected to said section for starting a primary connector of said section and adjusting it to form connection with the line of the substation calling and means for putting said primary connector while connected with the line calling in connection with one of the secondary connectors on the same or any other section of the exchange.

44. The combination in an automatic exchange, of a group of main lines, a series of primary connectors adapted each to establish connection with any one of said lines as a calling line, a group of secondary connectors each adapted to establish connection to any one of said lines as a called line and structurally and operatively independent of the primary connector, and means under the control of each of the subscribers of said group of lines for establishing connection from a substation through one of the primary connectors to a secondary connector and thence to the called line.

45. In an automatic telephone exchange, the combination of subscribers' lines leading into said exchange, multiple contacts at the exchange for each subscriber's line, a source of electrical energy at the exchange, a repeating coil, and means under the control of the subscriber for supplying the talking circuit of connected subscribers from said source of electrical energy through said repeating coil and over pairs of said multiple contacts.

46. The combination with each section in an automatic exchange, of a series of primary connectors normally at rest and to each of which all the lines of a section are joined, means under the control of each substation for starting one of said primary connectors and adjusting it to establish a connection from said substation through said primary connector, a series of secondary connectors normally at rest and to each of which all the lines of a section are also joined, and means in the connection established by the primary connector for starting and setting a secondary connector of the same or any other section into position to establish connection through it with the line called.

47. In an automatic exchange divided into sections, the combination with each section of a series of primary connectors normally at rest or mechanically idle and a series of secondary connectors also normally at rest or mechanically idle and in all of which all the lines of the section are represented, means under the control of each substation for starting one of the primary connectors of the section to which the calling line is assigned and setting it to position to form a connection from the line calling through said primary connector, means in the circuit thus established for starting a secondary connector in the same or any other section and means under the control of the substation calling for setting said secondary connector into position where it will form connection from the calling line through the idle primary connector to and through said idle secondary connector to the line called.

48. In an automatic exchange divided into sections, the combination with each section of a series of primary connectors, a series of secondary connectors normally at rest, a controlling circuit for each secondary connector normally completed thereby in its position of rest and represented on its own and other sections in contacts upon which the circuit may be completed for the purpose of starting said secondary connector, one of the series of said secondary connectors on a section, means under the control of each substation in any section for establishing one of said circuits to start a secondary connector on the section wanted, and means under the control of the substation calling for setting said secondary connector into position where it will establish connection with the called line.

49. In an automatic exchange divided into sections, the combination with each section of a series of primary connectors and a series of secondary connectors in all of which all the lines of the section are represented said secondary connectors standing normally in position to complete each a controlling circuit for itself which is represented in each division of its own and other sections, means under the control of each substation for setting one of the primary connectors in the section to which said line is assigned, and means controlled over the circuit established by said primary connector for completing the controlling circuit of one of the secondary connectors in the section to which the called line is assigned whereby said secondary connector may be started and set to connection with the line called.

50. In an automatic exchange divided into sections, the combination of each section of a primary connector, a secondary connector and an interconnector normally mechanically idle, and adapted to complete connection to the secondary connectors on different sections in succession and a control or starting magnet whereby said interconnector may be started into operation and caused to move to position to establish connection with the secondary connector wanted said magnet being controlled in its action over the circuit established by the primary connector from the line calling.

51. The combination in an automatic exchange divided into sections, of a secondary connector for each section, an interconnector for each section normally mechanically idle and disconnected from the main lines of its section, a control circuit for the interconnector by means of which said interconnector may be adjusted to form connection with a secondary connector on the same section with said interconnector or on any other section, and means for placing any line of a section in operative relation to the control circuit for the interconnector of the same section.

52. In an automatic exchange divided into sections upon which respectively different lines of the exchange are grouped, the combination with each section of two or more connectors for establishing circuit with the line called, two or more interconnectors on each section said interconnectors respectively having points representing all of the connectors on all the sections in different groups of said sections, means under the control of the substation for setting one of the interconnectors to form connection with a connector in the section wanted and means for setting the connector over said connection to form circuit with the particular line of said section that is called.

53. In an automatic exchange divided into sections and having its sections arranged in a number of groups of sections, the combination with each section in a group, of two or more interconnectors, one for each group of sections, each said interconnector being adapted to form a local connection with any one of the sections embraced in the particular group of sections in which the line called is located.

54. In an automatic exchange divided into sections and having its sections arranged in groups each constituting a grand division, the combination with the primary connector in each section, of two or more interconnectors, one for each thousand or grand division of the exchange, a "thousands" register, means for connecting the latter with the substation calling through the primary connector and means under the control of the substation for setting said thousands register to form connection with the interconnector corresponding to the "thousands" of the substation called.

55. In an automatic exchange divided into sections and having its sections arranged in groups each constituting a grand division of the exchange, the combination with each section of two or more interconnectors one corresponding to each group making a grand division, a thousands register for bringing one or the other of said interconnectors into action, means for connecting said register with the substation calling, and means under the control of said substation for setting said register.

56. In an automatic exchange divided into sections in each of which a limited number of substation lines terminate, the combination with a series of primary connectors for each section, of means under the control of the substations of said section for bringing one of said primary connectors into action to establish thereby a connection with the line calling, two or more interconnectors for each primary connector each said interconnector controlling the circuits to a particular set or group of sections of the exchange, and means for connecting said primary connector with that one of the interconnectors which corresponds to the group of sections embracing the section in which the line of the substation called terminates.

57. In an automatic exchange divided into sections and having its sections subdivided into groups, the combination with each section of a series of primary connecting devices on each of which all the substation lines of the section are represented, two or more sets of bus wires over which sets respectively a connection may be established with sections on the exchange belonging to different groups of sections, and means for forming an electrical connection between any one of said primary connecting devices on a section and either of said sets of bus wires.

58. In an automatic exchange divided into sections each embracing 100, more or less, substation lines, said sections being grouped into groups of 10 sections, more or less, an interconnector on each section for each group of sections and contacts and connections whereby said interconnector may establish a connection to that particular one of its associated group of sections to which the line of the called subscriber is joined.

59. In an automatic exchange divided into sections each having a particular set or group of substation lines connected to it, and said sections being grouped into groups of ten sections, more or less, the combination for each section of two or more divisions of connecting apparatus each containing a primary connector, a secondary connector and an interconnector, one or more, there being one interconnector for each group of sections, means under the control of each substation for seizing the primary connector of an idle division, means for selecting in said division that one of the interconnectors which controls connections to the group of sections embracing the section of the called subscriber, means for setting said interconnector to establish connection with that particular section and with an idle secondary connector in the section, and means for setting the latter to form connection with the called subscriber's line.

60. The combination in an automatic exchange divided into sections and having said sections arranged in groups, one or more secondary connectors for each section whereby connection may be made to any one of the lines of a particular section as a called line, interconnectors having respectively contacts and connections leading to different groups of sections, and means under the control of the calling line of a section for placing the same in operative connection with that one of the interconnectors which controls the connections to the group of sections embracing the section to which the called line is assigned.

61. In an automatic exchange the combination with a series of secondary connectors, of an interconnector for forming connection with one of said secondary connectors, means for placing any one of a number of substation lines in connection with said interconnector, a test circuit for each of said secondary connectors, and means controlled over said test circuits for automatically stopping the interconnector when it finds the test circuit of an idle secondary connector.

62. In an automatic exchange the combination of a series of secondary connectors, an interconnector having a movable brush or brushes adapted to be adjusted over a series of contacts connecting respectively with said secondary connectors, a number of substation lines, means for connecting any one of said lines with an interconnector, a test circuit for each of said secondary connectors and means for stopping the interconnector controlled over the test circuit corresponding to the first secondary connector found idle.

63. In an automatic telephone system the combination with subscribers' lines, of trunks, switch controlling and telephone apparatus at each subscriber's station, automatic switches at the central office for hunting idle trunks for completing connections between subscribers, a central source of current, and means directed by said switch controlling apparatus for connecting said source so as to supply said telephone apparatus with transmitter current.

64. The combination of a series of movable switches, a second series of movable main line circuit-selecting switches, electrically controlled devices for moving a switch of the first series to electrical connection with successive switches of the second series and means by which the controlling circuit for the switch of the first series will be automatically broken when the said switch reaches connection to a circuit selecting switch of the second series which is in its normal position.

65. The combination of a series of movable switches, a second series of movable main line circuit-selecting switches, electrically controlled devices for moving a switch of the first series to electrical connection with successive switches of the second series, means by which the controlling circuit for the switch of the first series will be automatically broken when the said switch reaches connection to a circuit-selecting switch of the second series which is in its normal position, and means for automatically isolating said switch of the second series.

66. In a telephone exchange, a series of switches, a second series of main line circuit-selecting switches less in number than the number of lines by which the first named switches are operated, devices on each of the first named switches for moving it to electrical connection with successive ones of the second series, and means by which the switch so moved is automatically stopped when it reaches connection to a switch that is in its normal position.

67. In an automatic exchange divided into sections, the combination with a series of secondary connectors on each section, an interconnector on each section having contacts representing the secondary connectors on the same and other sections, test circuits corresponding respectively to the said secondary connectors of each series on all of said sections and means for stopping the interconnector controlled over the test circuit of the first secondary connector of the series found idle on the section wanted.

68. In an automatic exchange divided into sections, the combination with a series of secondary connectors on each section, of an interconnector comprising two coördinately operating switches one of which is adapted to select that brush of the other which rides over a group of contacts corresponding to the series of secondary connectors in the section wanted, test circuits one for each secondary connector of said series adapted to be closed in succession when the interconnector starts into operation and means for bringing said interconnector to rest controlled over the test circuit of an interconnector found idle in the series belonging to the section wanted.

69. In an automatic exchange divided into sections, the combination with a series of secondary connectors on each section, of an interconnector comprising two switches coordinated to select a series of secondary connectors and one secondary connector in the series, one of said switches consisting of groups of contacts and associated brushes corresponding respectively to different series of secondary connectors and the other a switch for picking out a particular one of said brushes, as and for the purpose described.

70. In an automatic exchange divided into sections, the combination with a series of secondary connectors on each section, of an interconnector on each section, a test circuit connecting said interconnector with each secondary connector on the same section with said interconnector and on other sections, means for automatically stopping the interconnector said means being controlled over the test circuit of the secondary connector found idle and means controlled over a circuit governed by said interconnector for simultaneously stepping the secondary connector forward from normal position to isolate it from interference.

71. In an automatic exchange divided into sections, the combination with an interconnector on each section, of a secondary connector for each section, a test circuit for each secondary connector, means controlled by said test circuit for automatically stopping the interconnector when it finds the secondary connector on the section wanted, and means controlled over a circuit joining said interconnector and secondary connector for isolating the found secondary connector from interference.

72. In an automatic exchange, the combination with a series of secondary connectors on each of which the substation lines are represented, an interconnector common to said lines, a test circuit for each secondary connector, a relay means for connecting the relay to the test circuits of the secondary connectors in succession as the interconnector moves in its search for an idle secondary connector and means controlled by said relay for isolating the secondary connector found from interference.

73. In an automatic exchange, the combination with a series of secondary connectors, of an interconnector subject to the control of the substations represented on said secondary connectors, a test circuit for each secondary connector, a relay means for connecting the relay to said test circuits in succession as the interconnector moves in its search for an idle secondary connector, and means controlled by said relay for stopping the interconnector and simultaneously isolating the secondary connector found idle from interference.

74. In an automatic exchange divided into sections, the combination with a series of secondary connectors on each section, of a circuit closer on each section for closing connections to the secondary connectors of the same or another section in succession for the purpose of establishing circuit between the calling and called substation, a test circuit for each secondary connector, a relay means for completing the connection of the relay with said test circuits in succession, and means controlled by said relay for automatically stopping the circuit closer in connection with a secondary connector found idle and simultaneously or immediately thereafter moving the secondary connector found idle forward from normal position where it will be isolated from interference.

75. In an automatic exchange divided into sections, the combination with a series of secondary connectors on each section, of a circuit closer on each section for closing connections to the secondary connectors of the same or another section in succession to form a talking circuit between the calling and called substation, a test circuit for each secondary connector, means for completing said test circuits in succession, and means controlled over said test circuit for automatically stopping the circuit closer in connection with a secondary connector found idle and at the same time moving the secondary connector found idle forward from normal position where it will be isolated from interference.

76. In an automatic exchange, the combination with a series of secondary connectors, of an interconnector controlling connections to said secondary connectors, a relay, means for connecting said relay with the secondary connectors in succession over circuits completed in the normal position of said secondary connectors, a clutch or stop magnet for the interconnector controlled by the relay and an actuating magnet for the secondary connector also controlled by said relay whereby the interconnector may be stopped and the secondary connector moved from normal position to isolate it from interference.

77. In an automatic exchange divided into sections, the combination with a series of secondary connectors on each section, of a circuit closer on each section for closing connection to the secondary connectors of the same or another section in succession, a test circuit for each secondary connector completed over a circuit closed by the secondary connector when in normal position, a relay, means for connecting the same in succession with said secondary connectors as the circuit closer moves to establish connection with said secondary connector, control magnets whereby the said circuit-closer may be stopped and the secondary connector started and connections controlled by said relay for governing the action of said magnets to thereby stop the circuit closer and start the secondary connector found idle.

78. In an automatic exchange, the combination with a series of secondary connectors on each section, of an interconnector subject to the control of a number of substations, a test circuit for each secondary connector completed over contacts in the normal position of the secondary connector and joined to the interconnector, and means controlled by said test circuit for automatically stopping the interconnector when it finds a secondary connector of the same or any other section whose test circuit is complete at said normal contacts.

79. In an automatic exchange, the combination of a series or group of secondary connectors each adapted to select any line from a group of lines, and having contacts closed on the respective connectors of the group in their idle position, an interconnector adapted to establish connection from one line of the same group of lines to any one of said group of secondary connectors, a series of circuits completed successively by the interconnector over contacts on itself and contacts closed by the respective secondary connectors of the group in their idle position, and means controlled over said circuits for bringing said interconnectors to rest.

80. The combination in an automatic exchange divided into sections, of an interconnector, a starting and stopping magnet for the same, a relay controlling the action of said magnet, a series of secondary connectors on each section, a test circuit for each, and means for closing a connection for the relay to said test circuits in succession whereby when an idle secondary connector is found on the same section with the interconnector or any other the relay may be operated to bring the interconnector to rest.

81. In an automatic exchange, the combination with a secondary connector, of a series of interconnectors each subject to the control of a number of substations, a test circuit for said secondary connector represented on each interconnector and means controlled thereby for stopping any interconnector when it finds the secondary connector idle.

82. In an automatic exchange, the combination with a plurality of substation lines and a secondary connector, of a series of interconnectors, means whereby each of said interconnectors may be seized by any one of said substation lines, a test circuit for the secondary connector represented on each interconnector, and means controlled over said test circuit for stopping the interconnector operating upon the test circuit in position to establish and maintain a connection with the secondary connector when it finds said secondary connector idle.

83. In an automatic exchange, the combination with a plurality of substation lines and a secondary connector, of a series of interconnectors normally disconnected from the latter but each subject to the control of each of said substation lines, a test circuit for the secondary connector passing to and through each of said interconnectors, means controlled over said test circuit for stopping an interconnector in position to establish connection with the secondary connector, and release means for each interconnector controllable from a substation.

84. In an automatic exchange divided into sections, the combination with a secondary connector of any section, of a series of interconnectors distributed throughout the sections of the exchange, a test circuit for said secondary connector and means controlled over said test circuit for stopping any interconnector in position to establish connection with a secondary connector.

85. In an automatic exchange divided into sections, the combination of a secondary connector, a series of interconnectors, one on each section, a test circuit for said secondary connector terminating in the interconnectors of all sections, means for adjusting the interconnector of any section to form connection with said secondary connector, and means for changing the electrical condition of the test circuit of said secondary connector upon all the other interconnectors when said secondary connector is seized, whereby the said secondary connector may be isolated from interference.

86. In an automatic telephone system, a plurality of substation telephone transmitters, trunks for connecting the substations together in pairs for conversation, switches for hunting idle trunks, and a source of current at the central office for supplying talking current over a selected trunk to a substation transmitter.

87. In an automatic telephone system the combination with idle trunk selector and line connector switches serially connecting the calling and called subscribers' stations, of a source of transmitter supply current at the central office connected in a bridge of the limbs of the talking circuit thus established.

88. In an automatic telephone exchange the combination of subscribers' lines leading into said exchange, signal transmitting and telephone apparatus at each subscriber's station, two or more switching mechanisms at the exchange controlled by signals of the same polarity sent from a subscriber's station and adapted to connect two or more pairs of calling and called subscribers' lines together for the purpose of conversation at the same time, a source of electromotive force at the central station, and means responsive to signals from subscribers' stations for connecting said source to two or more talking circuits at the same time, the connection of the same with each circuit being made after the selective adjustment of the switching mechanism.

89. In a system of electrical intercommunication, the combination of signal transmitting and telephone apparatus at a subscriber's station, said signal transmitting apparatus being adapted to send in succession two different sets of controlling signals, signal receiving apparatus at the central office, a controlling switch for controlling circuits to said signal receiving apparatus and adapted to close in succession circuits whereby the signals of the different sets may be made effective in succession as to said sets upon different portions of the signal receiving apparatus, a source of electrical energy at the central office for supplying the current to the signal transmitting apparatus at a subscriber's station and to the signal receiving apparatus at the central office and automatic means at the central office automatically brought into action at the conclusion of each set of impulses for operating the said controlling switch to direct electrical energy over one signal receiving circuit and the subscriber's circuit during the reception of one set of signals and over another signal receiving circuit and the subscriber's circuit during the reception of the second set of signals.

90. In an automatic exchange, the combination of a series of movable switches, a second series of movable main-line-circuit selecting switches, a source of electric energy at the exchange common to a number of said switches and supplying current to devices for moving a switch of the first series to electrical connection with successive switches of the second series, means for selecting an idle switch of the second series, means for isolating the same from interference and means for connecting said source to the calling and called lines after the establishment of talking connection.

91. In an automatic exchange, the combination of switch apparatus for connecting two lines together for conversation, a release relay, switch devices at the central office for connecting said relay to a line when the apparatus is in talking position, a source of energy common to a number of lines, a telephone switch at a subscriber's station, and means for closing a circuit from said source of energy through said relay when the telephone is restored to the hook.

92. In an automatic exchange, the combination of a connector adapted to be adjusted to connection with any one of a group of substation lines, a guard point for each line of the group, a circuit changer normally operating to close circuit to the lines of said group in succession and a circuit closing brush operated by said circuit changer and adapted to establish a connection to the guard point on each line coincidently with the establishment of connection with said line by the circuit changer.

93. In an automatic exchange having its substation lines divided into groups, the combination with each group, of a series of secondary connectors, means under the control of the substation for seizing an idle secondary connector and setting it to connection with the line called, means for establishing a guarding potential on all said secondary connectors upon the initiation of a call from any line, and means controlled by said guarding potential for preventing any other line from establishing connection with said calling line after the initiation of its call.

94. In an automatic telephone exchange having its main lines divided into groups, the combination of a series of main-line-circuit selecting switches for each group, each switch being adapted to select any one of the main-lines of its group as a called line, a source of electric energy at the central office, means for placing any two or more calling lines of each group of lines in simultaneous connection respectively with two or more main-line-circuit selecting switches belonging respectively to the same or different groups of lines, and means for automatically introducing said source of electric energy to two or more pairs of calling and called lines so as to supply energy to all of said lines in common and at the same time.

95. In an automatic exchange, the combination with a series of secondary connectors each adapted to establish connection with any line called, circuits over which a guarding potential may be established for any line upon said secondary connectors, a magnet for closing said circuits upon the initiation of a call said magnet being in the circuit of the calling line and a source of current.

96. In an automatic telephone exchange, the combination of subscribers' lines leading into said exchange, fixed multiple contact for each subscriber's line, a source of electric energy at the exchange adapted to supply current to connected subscribers' lines, a repeating coil to one coil of which the calling line is connected when the switching apparatus is in talking position and to another coil of which the called line is connected when said apparatus is in talking position, a ringing generator at the said exchange and means for introducing the current from the ringing generator to a called line including the coil of the repeating coil, as and for the purpose described.

97. In an automatic exchange divided into sections, the combination with a series of secondary connectors on each section, each secondary connector having guard points corresponding to the several lines, of a relay for applying a guarding potential to said points, a source of current, and a circuit changer for connecting said relay and the contact of said relay respectively to the lines of a section and to the guard points corresponding to said lines on the secondary connectors in succession.

98. In an automatic exchange, the combination of subscribers' lines, a source of direct current at the central office, a source of alternating current at the central office, means for diminishing the flow of direct current in a calling subscriber's line, and means controlled thereby for introducing the said alternating current to the called line.

99. In an automatic exchange, the combination of a number of substation lines, of a revolving circuit changer adapted to establish connection with said lines in succession, and a relay in a circuit common to the lines for establishing a guarding potential over a connection established by the circuit changer when it is in position to close the circuit of the substation calling.

100. In an automatic telephone exchange, the combination of subscribers' lines, circuit selecting switches, connecting or trunk wires less in number than the number of subscribers' lines and controlling said switches, means for establishing a talking circuit over one of said trunk wires and one of said switches, a source of electric energy at the central office for supplying current to a connected pair of lines, a generator at the central office for supplying ringing current to the subscribers' lines, and means at the subscriber's station for introducing the said ringing current to the line of a called subscriber.

101. In an automatic telephone exchange, the combination of subscribers' lines leading into a central office, switching mechanism located at the central office, a source of electric energy at the central office for supplying direct current to the lines of the subscribers and to the switching mechanism at the central office, a generator at the central office for supplying ringing current to the subscribers' lines and means for decreasing the current flow in a calling subscriber's line and means controlled thereby for introducing the current from said ringing generator over the called line.

102. In an automatic exchange, the combination of a circuit selecting switch at the central office, means for adjusting the same to position to select a contact of a called subscriber's line, a circuit closing device at the central office adapted to close a talking connection at the central office and means for automatically operating the same when the calling subscriber's telephone is lifted from the hook.

103. In a telephone system, the combination with a group of lines, of a group of line finders to which said lines are multiplied, banks of multiple called terminals of said lines, switches for connecting therewith, means actuated in initiating a call over any line for establishing an abnormal condition of each of its multiple calling terminals, means for causing one of said finders to thereupon connect with one of said multiple calling terminals, and means rendered active by said finder to restore the normal condition of the multiple calling terminals of said line, and establish an abnormal condition of each of its multiple called terminals.

104. An automatic trunk selector comprising trunk line terminals arranged in groups, and means for testing said terminals individually and by groups.

105. The combination with a circuit changer adapted to establish connection with a number of lines in succession, of a magnet common to said lines for stopping the circuit changer upon the contact of a line calling, a contact over which a guarding potential is established for the line calling by said circuit changer, means for releasing the circuit changer to restore it to common use of the lines of a section, a simultaneously operating circuit closer through which a guarding potential may be supplied for the line calling independent of that supplied at the initiation of a call, and a source of current.

106. In an automatic exchange, the combination of a circuit changer for establishing connection to the lines in succession, a stop magnet common to the lines, a circuit closer by which a guarding potential is established when the circuit calling is established when the circuit changer is at rest, means for breaking the circuit of said magnet to release the circuit changer, means operating simultaneously for establishing a substitute guarding potential for the line calling, and a source of current.

107. In an automatic exchange the combination with a circuit changer and its stop magnet common to a number of lines, of means for establishing a guarding potential for the line calling controlled by said circuit changer when in position corresponding to said line, a circuit closer at the substation for energizing said stop magnet, means at the central office for closing a circuit over which said circuit closer may be actuated to break the line circuit and release the circuit changer, means for closing a circuit whereby a guarding potential may be substituted for that supplied on the reception of the initial signal, and a source of current.

108. The combination with a number of groups of line terminals, of selective apparatus for connecting therewith adapted to test said groups of terminals, one after the other, to select a group containing a definite line.

109. The combination with groups of lines, of a selector carrying terminals for said groups, a test contact for each group of line terminals, a source of current associated with each group, a conductor connecting said source with the test contact of each group, and means for varying the continuity of said conductor according to the selectability or non-selectability of the line terminals in that group.

110. An automatic telephone system including a subscriber's line, a calling device at the substation, means for locking said calling device, passive terminals for said line at the exchange, link circuits at the exchange having at their ends automatic switches adapted to connect with said terminals, selector switches at the other ends of said link circuits, and electromagnetic mechanism automatically effective only on connection of one of said first-mentioned switches with said passive terminals to unlock said calling device.

111. The combination of an impulse generator at the central office, a called line circuit selector operated by impulses from said generator, a test circuit completed by said circuit selector in its called line position, a circuit closing device operatively connected with the impulse generator and forming in one position of the generator a part of the talking connection, means for closing a gap in the test circuit after the generator has ceased to furnish impulses and before it reaches position to close the talking circuit, stop devices adapted to stop the generator at such intermediate position, and means responsive to the condition of the test circuit for governing the action of said stop device as and for the purpose described.

112. In an automatic exchange, the combination of an impulse generator at the central office, a called line circuit selector, a guard point thereon for each of a group of lines, means for completing a connection with the guard point of any line when the connection is made to said line by said circuit selector, a circuit closing and breaking device operatively connected with the impulse generator, a test circuit leading to the called line circuit selecting switch and the guard contact of the line called, a relay, a release circuit for the impulse generator and controlled in part by said relay, and a circuit changer adapted to close at the same time the connection of the release circuit through the relay contacts and circuit closing and breaking device and the connection of the relay coils to the test circuit.

113. In an automatic telephone exchange system, the combination with a subscriber's line, of a calling device at the substation including an actuating member, means for locking said actuating member, passive calling terminals for said line at the exchange, a plurality of automatic switches for connecting with said terminals, means operated from the substation to initiate travel of one of said switches to connect with said calling terminals, and mechanism operated responsive to connection made with said calling terminals only to unlock said actuating member.

114. A telephone exchange system comprising a plurality of subscribers' telephone lines divided into groups, a plurality of interconnecting link-circuits, a plurality of electrically controlled switches for completing connections between any calling lines and any called lines, said switches including line selectors assigned by groups to groups of lines, and means for establishing as many simultaneously existing conversational circuits between pairs of lines all in the same group as there are line selectors for the group.

115. In an automatic exchange, the combination of a number of substation lines, a series of connectors having line and guard points, a normally revolving circuit changer in which the lines terminate, means for stopping the same, means controlled by said circuit changer for placing one of said connectors in connection with the line calling, a source of electric potential for charging the guard points of the line on all of said connectors, and a line relay common to the lines for bringing into action simultaneously the means for stopping the circuit changer, starting the devices for seizing upon an idle connector and for closing the circuit of the source of electric potential to charge the guard points of a line calling upon all the connectors of a series.

116. In an automatic exchange a circuit changer adapted to form connection with a number of substation lines in succession, a series of connectors each having line and guard points, a stop relay common to the lines, means controlled thereby for bringing the circuit changer to rest in position corresponding to the line calling, adjusting or controlling circuits completed through the circuit changer for setting the connector, and a charging circuit controlled by the relay and connected to the guard points of the calling line on all the connectors.

117. The combination in an automatic telephone exchange, of a line finder provided with line and guard points, a main line circuit selecting switch for selecting the line called and provided with line and guard points, and means whereby a guarding potential is established over the guard point of the selecting switch to the guard point of the line finder and means controlled thereby for preventing a subscriber's signal transmitter at the end of a called line from becoming operative until said guarding potential is removed.

118. A telephone system including telephone lines, line selectors for selecting calling lines provided in number determined by the expected co-existing calls from said lines, connectors for connecting to the called line provided in number based upon the expected percentage of co-existing calls one or more classes of intermediate group selecting switches, the switches of each class being provided in number similarly determined, electromagnetic switching mechanism to adjust one switch of each class to establish a complete talking circuit between a calling line and a called line, and means for operating said line selectors to connect each with a different line.

119. A telephone exchange system comprising calling lines, line selectors operative to connect each with a different calling line, called lines, connectors for establishing connection with the called lines, interconnecting link-circuits, and intermediate switches of different classes for uniting said link-circuits and lines into conversational circuits.

120. In an automatic exchange, a revolving circuit changer having a line contact ring and a guard contact ring as described, a line connector adapted to be set to form connection with the line calling, a units ring and a tens ring on said circuit changer controlling the adjustment of said connector, a relay common to the lines for charging the guard points of the line calling over the contact appropriated to said line on the guard ring, and a source of current.

121. A telephone exchange system including a plurality of interconnecting link-circuits each terminating at its opposite ends in movable switch contacts, a set of passive contacts accessible to each movable contact, conductors terminating in said passive contacts, and control means common to a plurality of said link-circuits for causing the movable contacts of an idle link-circuit to establish connection with definite conductors.

122. A telephone system comprising a group of telephone lines, a group of connecting apparatus for interconnecting said lines and an intermediate link circuit provided with automatically controlled mechanism for interchangeably connecting one end of said link with the lines of the group and the other end interchangeably with the connecting apparatus of the group.

123. A telephone exchange system including manually operated impulse controlling mechanism, a relay at the exchange adapted to be controlled responsive to said mechanism, a step by step switch mechanism at the exchange including movable contact arms, an operating magnet for said arms, a second step by step switch mechanism at the exchange including movable contact arms, an operating magnet for said arms, terminals of trunking circuits associated with each switch mechanism adapted for use in establishing connections, a conductor adapted to transmit currents controlled by said relay connected with the operating magnet of said first switch mechanism, and apparatus for disconnecting said conductor from said magnet and connecting it through to the operating magnet of said second switch mechanism.

124. In an automatic exchange divided into sections, the combination of a connector on one section, a talking circuit leading thereto from the section of the calling line, means for adjusting said connector to connection with the called line, a guard circuit extending from the section of the calling line to said connector and means on the section of the calling line for establishing a guarding potential on said guard circuit.

125. In an automatic exchange divided into sections, the combination of a secondary connector on each section, a bus wire leading from each secondary connector to every section of the exchange and means in each section for establishing a guarding potential on the bus wire leading to any secondary connector in use.

126. In an automatic exchange having its main lines divided into groups, circuit selecting switches for each group, each said switch being provided with a guard point or contact for each line of its group, circuit connections from the switches for each group to all the portions of the exchange to which other groups of lines are connected and means controlled by the calling line of any group for establishing over such connections a guard potential at the guard point of any circuit selecting switch adjusted to connection with a called line.

127. In an automatic exchange divided into sections, a secondary connector for each section, a bus wire extending therefrom to all sections, guard contacts on each secondary connector for all the lines represented thereon, means for establishing connection between the guard contact on any line and the bus wire when the switch is adjusted for talking connection with that line, and means controlled by the calling line of any section for establishing a guard potential on said bus wire.

128. In an automatic exchange divided into sections, the combination of a secondary connector on each section adapted to be adjusted to position to connect with a called line of the same section, a connection from each secondary connector to all sections of the exchange and means on each section for establishing a guarding potential upon the connection of any secondary connector.

129. An automatic telephone system including a telephone line, means for transmitting directive currents thereover, a trunk selector switch and a connector switch each having a separate magnet, and a single relay operated by said directive currents to control said magnets.

130. In a telephone system the combination with a plurality of lines, of a plurality of sets of switches for interconnecting said lines, a relay individual to a switch in one of the sets of switches and adapted to control the adjustment thereof, means for transferring said relay into association with a switch of another set selected by means of said first switch, whereby said second switch also may be adjusted under the control of the same relay as the first.

131. In a telephone system the combination with a group of lines, a plurality of sets of switches of different classes, a plurality of relays for the common use of said lines, means for placing an idle one of said relays under the control of one of said lines, and means for thereafter controlling a switch in each of the sets of switches by means of said relay.

132. In an automatic exchange divided into sections each provided with means for making connection with a line on the same or any other section, the combination with the connecting devices of the sections, of devices for rendering the connecting apparatus of each section momentarily operative and then inoperative, said devices being timed to act upon the apparatus of the several sections successively as and for the purpose described.

133. In an automatic exchange divided into sections and having on each section connecting apparatus normally at rest for connecting the calling with the called line, of means for giving control of the connecting apparatus on a section to the lines of said section in succession, and means for rendering the connecting apparatus on the different sections successively capable of operation and after intervals of sufficient duration to prevent interference when calls for the same substation are received on different sections at about the same time.

134. In an automatic exchange divided into sections and having on each section two or more sets of connecting apparatus for connecting the calling line with a called line on the same or any other section, the combination of means for giving control of the apparatus upon a section to the lines of said section in succession and means operating upon the connecting apparatus collectively for each section for rendering the same operative on the various sections in succession.

135. In an automatic exchange, the combination with a series of lines of two or more sets of connecting apparatus, controlled circuits therefor, a revolving switch or circuit changer on which said circuits are closed in succession, or one at a time, means for holding said switch temporarily in position of rest and means controlled by said connecting apparatus for releasing and starting it again on its revolution as soon as the set of connecting apparatus seized has been adjusted to position where it is isolated.

136. In an automatic exchange divided into sections, the combination of connecting apparatus for establishing connection from a substation line of any section to a substation line of the same or any other section, operating circuits for said connecting apparatus, means for intermittently closing a break in the operating circuits of the connecting apparatus for the several sections consecutively for said sections, and means for automatically maintaining the circuit of a section upon which a call is received when the circuit changer passes on to close a circuit for another section.

137. In an automatic exchange divided into sections, the combination substantially as described of one or more secondary connectors for each section, one or more interconnectors for each section and means acting independently of the operating devices of said interconnectors for closing the operative circuits of the same in succession for the different sections.

138. In an automatic exchange divided into sections, the combination with two or more secondary connectors on each section, of interconnecting apparatus on each section for establishing a circuit leading to one or the other of said secondary connectors on the same or any other section, and means for putting the interconnecting apparatus of one section into and out of operative condition and then the interconnecting apparatus of another section, said means acting to render the interconnecting apparatus of the several sections respectively capable of action consecutively only.

139. In an automatic exchange divided into sections, the combination of a series of primary connectors, series of secondary connectors and a series of interconnectors for each section on each of which latter the secondary connectors of the same and all other sections are represented, and continuously acting means for rendering the interconnectors of the several sections operative consecutively for different sections.

140. In an automatic exchange divided into sections, the combination with secondary connectors on the several sections, of interconnecting apparatus on each section for establishing a connection with one of said secondary connectors on any section of the exchange, and means for rendering the interconnecting apparatus of the several sections respectively capable of operation dissimultaneously only.

141. In an automatic exchange divided into sections, the combination of a series of primary connectors, a series of secondary connectors and a series of interconnectors for each section on each of which latter the secondary connectors of the same and all other sections are represented said interconnectors being normally at rest, and means for closing and breaking the starting circuits for the interconnectors of one section and then the starting circuits for the interconnectors of other sections in sequence as and for the purpose described.

142. In an automatic exchange divided into sections, the combination of a series of primary connectors, a series of secondary connectors and a series of interconnectors for each section said interconnectors controlling the circuits to secondary connectors of the same and other sections, and means operating independently of said interconnectors for rendering the interconnectors of one section momentarily operative and then the interconnectors of other sections in regular sequence but dis-simultaneously for the different sections.

143. In an automatic exchange divided into sections, the combination of a series of secondary connectors and a series of interconnectors for each section, means responsive to controlling signals sent from a subscriber's station for adjusting the interconnector, and means operating independently of the controlling signals received from a substation for rendering the interconnectors of different sections capable of operation consecutively as described so that the signals received simultaneously on different sections shall be spaced out on said interconnectors.

144. In an automatic exchange divided into sections, the combination with a connector on each section upon which the called line of each section may be found, an interconnector for each section upon which the connectors of the same and all other sections are represented, means for seizing said interconnector from any one of the substations of its own section and means for rendering the interconnectors of the various sections capable of operation dissimultaneously only.

145. In an automatic exchange divided into sections, the combination with a connector on each section for establishing connection with the line called on said section, an interconnector for each section upon which the connectors of the same and other sections are represented, said interconnector being normally at rest, means for starting said interconnector on the reception of a call from any substation of its own section, and means for rendering the interconnectors of the several sections respectively capable of operating dissimultaneously only.

146. In an automatic exchange divided into sections, the combination with a secondary connector on each section for forming connection with the line called on said section, of an interconnector for each section upon which the connectors of the same and all other sections are represented, means for starting the said interconnector upon the reception of a call from any one of the substations of its own section and a continuously operating means for rendering the interconnectors of the various sections capable of starting dissimultaneously only.

147. In an automatic exchange divided into sections, the combination with secondary connectors on the several sections, of an interconnector for each section controlling the circuits to the connectors of the same and other sections said interconnector being normally at rest, means for starting said interconnector upon the reception of a call from any substation of its own section, and continuously operating devices for closing and opening a break in the starting circuits of said interconnectors said devices operating first upon the starting circuits of one section and then upon the starting circuits of the other sections successively as and for the purpose described.

148. The combination in an automatic exchange divided into sections, of one or more connectors on each section for establishing connection with the called line of said section, devices on each section for placing a calling line thereof in connection with a connector of the same or any other section, said devices being normally at rest and means for rendering the devices for one section operative to select a connector on the section wanted and then rendering the similar devices of other sections momentarily operative in regular sequence as and for the purpose described.

149. In an automatic exchange, the combination with different sets of connecting apparatus, of a consecution controller comprising a continuously operating circuit changer for closing a connection to said sets in succession, means for maintaining th closure of a connection after the circuit changer leaves the point where it finds the corresponding set of apparatus ready to operate and means controlled by the connecting apparatus for automatically restoring said connection to normal condition.

150. In an automatic exchange, the combination with different sets of connecting apparatus, of a circuit-changer common to said sets over whose contacts operative connections for said sets are closed consecutively, and an electromagnet in each of said connections having contacts adapted to maintain a connection through a coil upon itself when the circuit changer passes to the contacts of other sets.

151. In a telephone system the combination with a group of lines, a set of switches for the common use of said lines, a relay for each of said switches, a second set of switches, means for assigning to one of said lines an idle one of said first set of switches, means under the control of its relay for adjusting said switch in connecting it with a switch of the second set, and means for thereafter adjusting said second switch also under the control of the same relay.

152. In an automatic exchange having its main lines divided into groups, the combination of groups of main line circuit selecting switches, each adapted to establish a connection with any line of its group as a called line, local circuit selecting switches for each group of main lines, each provided with a number of contacts representing main line circuit selecting switches of different groups and bus wires or connections leading from each main line circuit selecting switch to contacts on each of the local circuit selecting switches.

153. In an automatic exchange divided into sections each of which is provided with a number of sets of connecting apparatus, each subject to the control of all the lines of the same section, separate or independent connections from each section to all of the others in combination with means under the control of the substations for setting said connecting apparatus to register with the connection leading to the section to which the line called is joined.

154. The combination of a connector in which a number of lines terminate in fixed points, a revolving commutator or indicator adapted to make connection with said lines in succession, means common to the lines for bringing said commutator to rest in position of connection with the line calling, and means governed by said commutator when in such position for adjusting the connector to find and make circuit with the fixed point in which the same line terminates.

155. In an automatic exchange, the combination of a normally revolving line finder to which subscriber lines of the exchange are individually connected, a stop-controlling magnet adapted to be energized over said line finder and a line connected thereto when calling, and means at the substation of a connected line for breaking the circuit of said magnet to restart the line finder.

156. In an automatic exchange, a continuously revolving decimal indicator comprising a circuit changer to the contacts of which substation lines are individually connected, a stop ring having notches, one for each line contact, a stop-controlling magnet, a stop for engaging the notches in said ring controlled by said magnet, means at the substation of a line for energizing said magnet whereby the decimal indicator is caused to stop in engagement with the contact of said line, and means at the substation for breaking the circuit of said magnet to restart the said decimal indicator.

157. In an automatic exchange, the combination with a decimal indicator comprising a circuit changer to the contacts of which substation lines are individually connected, a brush-carrying arm adapted to move over said contacts, a controlling magnet, a dog controlled by said magnet adapted to bring the arm positively to rest when its brush is resting on the contact of the calling line, and means at the substation of a connected line for automatically releasing the dog to permit the brush-carrying arm to resume its revolution.

158. The combination of a primary connector upon each of which a number of lines are represented in fixed contacts and adapted to be adjusted to connection with any one of said contacts, a division starter or selector, a rotary switch, a decimal indicator or primary line-finder which finds the line calling, means controlled thereby for simultaneously calling into action the division starter or selector and rotary switch, and means controlled by the primary connector for closing a stop or control circuit over which the primary connector may be brought to rest in connection with the line calling.

159. In an automatic exchange having its main lines divided into groups, the combination with each group of a series of primary circuit selecting switches normally idle mechanically and on each of which all the lines of the group are represented, a line finder provided with means for making connection between the lines successively and a local circuit common to them, and means for starting an idle primary circuit selecting switch and bringing the same to rest in position for establishing connection to the line calling upon the reception in said local circuit of a signal from any main line of a group.

160. In an automatic exchange, the combination with a primary circuit-selecting switch in which a number of substation lines terminate, a line indicator controllable by said lines non-simultaneously and in fixed order of rotation, means controlled by said line indicator for automatically adjusting said switch to connection with a calling line, and means for automatically releasing said line indicator.

161. The combination in an automatic exchange of a primary connector on which all the lines of a section terminate in contact points, a decimal indicator having as many contacts as there are lines and subject to the control of all said lines, and means controlled by said indicator when it registers with the contact of the line calling for setting said primary connector automatically to establish circuit with the same line.

162. The combination in an automatic exchange, of a group of main lines, a primary circuit selecting switch, normally at rest and having contacts in which all the lines of the group terminate, a circuit changer adapted to establish connection with the lines of said group successively, means common to said lines for stopping the circuit changer temporarily in positions individual to the lines, means for starting the primary circuit-selecting switch, and a stop circuit for the primary circuit selecting switch controlled by the circuit changer.

163. The combination in an automatic exchange of a primary connector on which the lines of a section terminate, means for moving said primary connector to complete the connection to the calling line, a decimal indicator comprising a circuit changer having as many contacts as there are lines and subject to the control of all the lines of said section, and a series of stop circuits for the primary connector corresponding to different positions of the primary connector and decimal indicator and terminating in corresponding contacts on both of said devices.

164. The combination in an automatic exchange of a primary connector normally at rest on which all the lines of the section terminate, a decimal indicator having as many contacts as there are lines and responsive to the initial signal received from the calling line, means for starting said primary connector, and a stop control circuit for the primary connector controlled by said indicator.

165. The combination in an automatic exchange of a primary connector, a decimal indicator adapted to establish connection in succession with the substation lines, means for moving said decimal indicator and for stopping the same in position corresponding to the line calling, and means controlled by said decimal indicator for setting the primary connector to position for forming connection with the corresponding line.

166. In an automatic exchange, the combination of a connector in which a number of substation lines terminate in contact points and adapted to be set to form connection with the contact point of a calling line, a plurality of sets of contacts closed in succession by said connector in the course of its movement to position of connection with the contact point of the calling line, the said contact sets corresponding respectively to sets of numerals in different decimal places of the several line numbers, and initial signaling means for each line adapted to stop the connector in a position to close connections in the several sets of contacts to indicate the number of the calling line.

167. In an automatic exchange, the combination with a connector adapted to be adjusted into position over a series of line contacts for establishing connection with one of said lines, a series of stop controlling circuits independent of said contacts and established by said connector in its different positions and corresponding respectively to the different lines of the section and means controlled by the line calling for completing a break in the stop controlling circuit appropriate to that line as and for the purpose described.

168. In an automatic exchange, the combination of a line indicator consisting of a revolving circuit changer, a series of substation lines terminating in contacts of said indicator, means for bringing said indicator to rest from any line, a connector adapted to be set to connect with a contact in which the line calling terminates, a series of contacts corresponding to the different numerals in one of the decimal places of the several numbers, circuits for said contacts, and means controlled over said circuits when the indicator comes to rest for controlling the position of the connector.

169. In an automatic exchange the combination of a line indicator consisting of a revolving circuit changer, a series of substation lines terminating in contacts of said indicator, means for bringing said indicator to rest upon the contact of any line, a connector adapted to be set to position to connect with a contact in which the line calling terminates, a series of contacts closed by said connector successively as it moves to position for forming connection with the line calling, stop devices and circuits for said stop devices connected to said contacts and contacts closed by the line indicator in its several positions of rest.

170. In an automatic exchange, the combination with a number of substation lines, of a connector in which said lines terminate and which is adapted to be set to connect with any calling line, a revolving circuit changer making connection successively at a series of contact points corresponding to the different numerals in one of the decimal places of the several line numbers, means controlled over the circuits of said contacts for setting the connector to register or connect with the line calling and means controlled by the lines for arresting the circuit changer when in connection with the contact point representing a decimal value of the line calling.

171. The combination in an automatic exchange of a number of substation lines, a connector in which said lines terminate and which is adapted to be set to establish a connection with any calling line, a revolving circuit changer adapted to close circuit successively upon a series of contact points, means controlled over the circuits of said contact points for bringing the connector to rest in different positions corresponding respectively to the lines, and means controlled by the calling line for arresting the circuit changer in position to establish the stop circuit corresponding to said line.

172. In an automatic exchange, the combination with a number of substation lines, of a connector adapted to be set to connect with any calling line, a revolving circuit changer making connection with a series of contact points corresponding to the different numerals in one of the decimal places of the several line numbers, another series of contact points corresponding to the different numerals in the other decimal place of the several line numbers, circuits for said contacts, means controlled over said circuits for setting the connector and means controlled by the line for arresting the circuit changer when connection is made with points representing the number of the calling line on said two series of contact points.

173. The combination of a circuit changer normally revolving and making connection with a number of substation lines in succession, a connector in which said lines terminate and which is adapted to be set to form connection with any one of said lines, means common to said lines for stopping said circuit changer when brought to a stop by any one of said lines and means controlled by said circuit changer for setting the connector to form connection with the same line.

174. The combination of a circuit changer normally revolving, a stop magnet, a relay controlling the same and common to the lines with which the circuit changer makes connection in succession, a connector in which the same lines terminate, and means controlled by the circuit changer for setting the same to connection with the line calling.

175. In an automatic exchange the combination with a plurality of sets of connecting apparatus normally idle mechanically and adapted to be set to form connection between any two in a number of substation lines, of a normally revolving substation line finder, means for arresting the same from any line and means controlled by said line finder for seizing an idle division or set of connecting apparatus when said line finder is arrested.

176. In an automatic exchange, a normally revolving indicator or circuit changer having a divided line contact ring in which a number of lines terminate, a divided contact ring whose contacts represent respectively the different values in the units place of the line numbers, a second divided contact ring whose contacts correspond to the different numerals in the tens place of the line numbers, means for arresting the circuit changer from any line by means of a circuit formed over the line contact of the calling line, a line connector and means controlled over the circuits established on the units and tens rings when the circuit changer is arrested for setting the connector to the appropriate line position.

177. In an automatic exchange, the combination substantially as described, of a circuit changer having a divided line contact ring with one contact for each line, a tens contact ring with ten segments, a units contact ring having ten groups with the individual contacts of the groups cross connected in groups of ten occupying different circumferential positions to permit connection to be made with a units contact of any value simultaneously with a connection upon any one of the tens contacts, a line connector adapted to be set in position to make connection with a contact forming the terminal of the calling line and means in the circuits established over the units and tens rings for controlling the position of the said connector when the circuit changer is arrested upon a contact of the line contact ring corresponding to the number of the substation calling.

178. In an automatic exchange, the combination with a number of substation lines and a circuit changer adapted to make connection with said lines in succession, of a selector adapted to be set to different positions each representing one of said lines, an electric impulse generator at the exchange for operating said selector and means governed by the position of said circuit changer for determining the number of impulses that shall be applied to said selector.

179. In an automatic exchange, the combination with a number of lines, of a circuit changer having contacts to which said lines are respectively connected, the said circuit changer being adapted to close connection to said lines in succession, a divided contact ring whose contacts represent respectively different values 0 to 9 inclusive, a contact brush for said divided contact ring moving synchronously with said circuit changer, circuits for the contacts of said divided contact ring, an electric impulse generator, selectors controlled by said impulse generator, and means controlled over the circuits of said divided contact ring for determining the number of impulses that shall be applied to said selectors.

180. In an automatic exchange the combination with a circuit changer adapted to close connection to a number of lines in succession, of a divided contact ring and circuits therefor, a contact brush revolving over said ring synchronously with said circuit changer, an electric impulse generator, connectors actuated thereby, and means for connecting the said impulse generator to said connectors at a time in the operation of said impulse generator predetermined by the particular circuit closed over said divided contact ring.

181. In an automatic exchange the combination with a circuit changer adapted to close connection to a number of lines in succession, of a divided contact ring and circuits therefor, a brush for said ring revolving synchronously with said circuit changer, an impulse generator adapted to produce a determinate number of impulses at each operation and means controlled over the circuits connected to the divided contact ring for establishing connections for said impulses at different times in the cycle of actions of said impulse generator.

182. In an automatic exchange, the combination of a revolving circuit changer having a divided contact ring to the contacts of which a number of lines are individually connected, a divided number indicating ring, an electric impulse generator, a series of selector contacts connected respectively to contacts of said number indicating ring, a brush adapted to move over said selector contacts synchronously with the impulse generator, and means for rendering the latter active when the brush finds the contact of the number indicating ring indicated by a calling line.

183. In an automatic exchange, the combination with a connector, of an electric impulse generator, a local circuit including said impulse generator for controlling said connector, means for starting the said impulse generator upon the initiation of a call, and means controlled by the calling line for governing the number of impulses transmitted by the said impulse generator.

184. In an automatic exchange, the combination of an impulse generator, a relay controlled by the substation lines for rendering the impulse generator operative to transmit its impulses, and means controlled by the impulse generator for reversing the position of the relay armature when the generator has completed its action.

185. In an automatic exchange, the combination of a local impulse generator, a relay for rendering the same operative, a synchronously operating impulse generator transmitting its impulses over the line to a substation, means at the substation for controlling the action of the relay, and means for reversing the position of the relay armature when the line impulse generator has completed its action.

186. In an automatic exchange, the combination of a signal transmitter at a substation including a circuit-changing arm and a series of contacts adapted to be engaged thereby, means for controlling the movement of said circuit-changing arm, a number indicator, an impulse generator at the exchange operating synchronously with said circuit-changing arm, a relay at the exchange for modifying the action of said impulse generator, and a circuit for operating said relay including said circuit-changing arm and said indicator.

187. In an automatic exchange, the combination of a signal transmitter having a circuit-changing arm and contacts at a substation, a number indicator, mechanism at the substation for advancing said circuit-changing arm over contacts connected with the said number indicator, an impulse generator at the exchange operating synchronously with said circuit-changing arm, a circuit from the exchange to the substation including said circuit-changing arm, and means at the exchange responsive to changes in the electric condition of said circuit for governing the operation of said impulse generator.

188. In an automatic exchange, the combination of line circuits, a signal transmitter having a circuit-changing arm at a substation, an impulse generator at the central office furnishing impulses for operating the said circuit changing arm over one line circuit, a signal relay at the central office operated over another line circuit including the circuit changing arm and a local circuit at the central office controlled by said relay.

189. In an automatic exchange, the combination of line and central office circuits, a signal transmitter having a circuit-changing arm at a substation, an impulse generator at the central office furnishing impulses over one line circuit for operating the said circuit-changing arm and over a central office circuit for controlling the action of the exchange, and a signal relay at the central office connected over another line circuit with the circuit-changing arm at the substation, the said relay controlling the said central office circuit.

190. In an automatic exchange, the combination of line circuits, a signal transmitter having a circuit-changing arm at a substation, means at the central office for controlling the action of said circuit changing arm over one line circuit, a connector at the central office, mechanism controlling the action of said connector, a relay operated over another line circuit including the circuit changer and a governing circuit for said mechanism controlled by the relay.

191. In an automatic exchange, the combination with a connector at the central office, of a signal transmitter having a circuit-changing arm at a substation, means at the central office for controlling the advance of said circuit-changing arm, a device at the central office operating synchronously with said signal transmitter and actuated independently of the connector for controlling the adjustment of said connector, and means for modifying the action of said device when the said circuit-changing arm reaches a predetermined position.

192. In an automatic exchange, the combination of line circuits, a signal transmitter having a circuit-changing arm at the substation of a line calling, means at the central office for controlling the movement of said circuit-changing arm, a connector at the central office, a local circuit for controlling the operation of said connector to connect with the line called, an impulse generator at the central office for controlling the adjustment of said connector and operating in said local circuit, and means controlled by the said signal transmitter and operating over the circuit of the line calling for governing the action of said impulse generator.

193. In an automatic exchange, the combination of a signal transmitter having a circuit-changing arm at the substation, a connector at the central office adapted to be set to position to connect with the line of the substation called, a local circuit at the central office, an impulse generator included in said local circuit for furnishing adjusting impulses whose number determines the position which the connector shall assume in order to form connection with the line called, and means controlled by the said signal transmitter for governing the action of said impulse generator.

194. In an automatic exchange, the combination of a signal transmitter having a circuit-changing arm at the substation of a calling line, an impulse generator at the central office for controlling the advance of said circuit-changing arm, a connector at the central office adapted to be set to position to connect with the substation of a called line and controlled in its action by impulses furnished by said impulse generator, and means controlled by the said signal transmitter operating over the calling line for governing the action of the said impulse generator upon the said connector.

195. In an automatic exchange, the combination of a signal transmitter located at a substation and provided with a circuit changing arm adapted to close connection at a series of points in succession, an impulse generator at the central office supplying impulses to a line running to the substation for advancing the circuit changing arm of the transmitter, a connector adapted to be set to position to connect with the substation called and controlled in its action by impulses from said impulse generator and means controlled over a circuit including the points of connection closed successively by the arm of the transmitter for controlling the action of the impulse generator upon the said connector.

196. In an automatic exchange, the combination of a connector, a local circuit at the exchange, an impulse generator supplying impulses to said local circuit, a relay controlling the said local circuit, a signal transmitter having means for closing connection successively at a series of points in its progressive movement, an indicator having means for controlling the return connections from said points, and a circuit for said relay including the points closed in succession by said signal transmitter.

197. The combination of a series of main lines, a circuit changer adapted to close circuit to said lines in succession, means for stopping the circuit changer in response to a signal sent over any line and through the circuit changer, means for releasing the circuit changer to permit it to resume its operation, a circuit breaker for breaking the circuit and means connected with the circuit changer for actuating said circuit breaker at each repetition of the closure of circuit to the line after the circuit changer resumes operation and during the time that the line calling is in use for conversation.

198. In an automatic exchange, the combination of a series of switches, a group or series of main lines, a starting device for starting said switches, means controlled by each switch for stopping the starting device, and means common to the lines and operable thereby successively for bringing the starting device into operation to cause it to leave a stop position and start an idle switch.

199. In an automatic exchange, the combination with a series of connectors adapted to be set to connection with the line calling and a controller for each comprising a rotary switch governing the starting and resetting circuits whereby said connector may be started and reset to normal, of starting mechanism for releasing said controller, said starting mechanism standing normally in position preparatory to starting said controller, and means under the control of the substations for starting said mechanism whereby it may move and start the controller into operation.

200. The combination in an automatic exchange of a number of divisions of connecting apparatus common to a number of substation lines, a division starter adapted to act upon said divisions in succession, means for controlling the division starter from any one of said substation lines, and a series of test circuits connected respectively to said divisions and adapted to be closed in succession by said starter, and means controlled over said test circuits whereby the division starter may be brought to rest when it finds a test circuit that is connected to an idle division of connecting apparatus.

201. In an automatic exchange, the combination with a number of divisions of connecting apparatus common to a number of substations, starting circuits, one for each division, and a division circuit closer controlling said starting circuits, of a series of test circuits, one for each division, means for closing the test circuit of each division just before the division circuit closer reaches the starting circuit of said division, means controlled over the test circuit for stopping the division circuit closer when it finds a test circuit connected to an idle division and means controlled over the substation circuits for starting the division circuit closer from any one of the substations.

202. In an automatic exchange, the combination with a number of divisions of connecting apparatus, of starting and test circuits for the several divisions, a division starter adapted to close in succession said starting and test circuits, the succession of closures being so arranged that each test circuit shall be closed just before the starting circuit for the same division is reached, means controlled over the test circuit for stopping the division starter when the test circuit of an idle division is found, and means controlled by the substation lines for starting the division starter.

203. In an automatic exchange, the combination with a number of sets of connecting apparatus, of a starting circuit for each, a test circuit for each formed over contacts in the normal or idle position thereof, a switch adapted to close said circuits in succession and in alternation, means for starting said switch from any one of a number of lines and means for automatically stopping said switch as soon as it encounters the circuit of an idle set and in position to next close the start-circuit of said sets.

204. In an automatic exchange, the combination of a number of sets of connecting apparatus, a division starter normally at rest and adapted when set into operation to close a starting circuit for an idle set of connecting apparatus, a series of substation lines, a relay common to said lines, means for closing the circuit of said lines in succession through said relay, and means controlled by the relay for bringing the division starter into operation.

205. In an automatic exchange, the combination of a number of sets of connecting apparatus common to a number of lines, but normally idle mechanically, an electromagnet, means for closing the circuits of said lines in succession through said electromagnet and means controlled by said electromagnet for starting an idle set of said apparatus into operation.

206. In an automatic exchange, the combination with a number of sets of connecting apparatus common to a number of lines and normally mechanically idle, a starting circuit for each set, an electromagnet, means for closing the circuits of said lines in succession through said electromagnet, and means controlled by said electromagnet for closing the starting circuit for one of said sets.

207. In an automatic exchange, the combination with each of two or more sections each containing a number of individual interconnectors provided with contacts and connections for establishing a connection from the calling line to the section whereon the called line is located, a starting circuit for each interconnector, a circuit over which the position of said interconnector may be controlled, means for closing the starting circuit of said interconnector and means for placing the control circuit thereof in connection with the calling line.

208. In an automatic exchange, the combination with a group of substation lines, of circuit-selecting switches, a receiver of selective signals, each of said switches being adapted to establish connection between any one of said lines and said receiver, a normally inactive switch, means controlled thereby for bringing an idle one of said circuit-selecting switches into operation, and means under the control of each of said lines for starting said normally inactive switch.

209. In an automatic exchange having its main lines divided into groups, the combination of a series of primary connectors, receivers of selective signals, each primary connector adapted to establish connection between any line of a group and one of said receivers, a series of secondary connectors, each adapted to establish connection with any line of a group as a called line, a series of interconnectors for each group, each adapted to establish a path from a primary connector to a secondary connector, and means responsive to signals from the substation for starting and adjusting an idle interconnector of a group to the position for selecting a secondary connector adapted to establish connection with a line in the same group with the calling line or in any other group.

210. The combination in an automatic exchange having its main lines divided into groups, circuit selecting switches for each group, each adapted to establish connection with any line of the group as a called line, local circuit selecting switches for each group, adjustable under the control of selective signals transmitted from the substations, and wires or connections leading from a local circuit selecting switch of each group to each main line circuit selecting switch in the same and every other group for establishing talking connection between a calling line of the main line joined to any local circuit selecting switch and any one of said main line selecting switches and adapted respectively to establish connection to the main lines of different groups.

211. In an automatic exchange the combination with a number of sets of connecting apparatus, of a revolving line finder to the segments of which the substation lines are individually connected, means for automatically stopping the line finder when the line calling is found, means controlled over the circuit so formed for placing one of the sets of connecting apparatus in operative electrical relation with the calling line and means controlled by the set seized for causing the line finder to revert to common use.

212. The combination in a signal transmitter, of an actuating lever, mechanism connected with said lever for closing a signal circuit near the end of its throw, a telephone switch and means connected therewith for limiting the throw of said lever when the switch is out of normal position to prevent the closure of the signal circuit.

213. The combination in a signal transmitter, of a power winding lever, a circuit changing arm for transmitting selective signals, means for sending a preliminary signal by said arm before it begins the transmission of the selective signals and means connected with the power winding lever for moving the arm to position to send the preliminary signal when the said lever completes its winding operation.

214. The combination with an automatic signal transmitter, of a telephone switch, a locking device adapted to hold the switch in normal position while the signal transmitter is sending a signal and means for unlocking the switch automatically after the signal transmitter has completed its operation of sending the signals.

215. In an automatic exchange, the combination with a selective signal transmitter, and an operating or controlling magnet therefor, of a metallic telephone circuit and switching devices for connecting one side of the circuit to ground through the portion of the transmitter which sends the selective signals and the other side to ground through the operating or controlling magnet.

216. The combination of a selective signal transmitter, a telephone transmitting and receiving apparatus at the same station, a switch for changing the connections with the main line from condition for the transmission of a signal from said signal transmitter to condition for use of the telephone transmitter and receiver and means controlled by said signal transmitter for rendering the switch inoperative to change the connections until after the signal transmitter has completed the signaling operation.

217. In an automatic signal transmitter, the combination of a power winding device, a transmitter controlling or operating magnet, circuit closing devices adapted to close the connection for one side of the main line through the operating magnet and for the other side to earth independently of the magnet and means for actuating said circuit closing devices from the power winding device after the winding operation is completed.

218. In a signal transmitter for an automatic exchange, the combination with the metallic telephone circuit, of a number indicator, a transmitter circuit changing arm, groups of contacts connected respectively to the points of the number indicator, a controlling or actuating magnet for the transmitter, and switch devices for connecting one side of the circuit to ground through said arm and number indicator and simultaneously connecting the other side of the metallic circuit to earth through the controlling or actuating magnet for said transmitter.

219. The combination of a signaling transmitter adapted to send selective signals, means whereby the said signal transmitter may close one break in a signal circuit at a temporary position of rest of the transmitter mechanism, following the transmission of the selective signals and before its restoration to normal position, a telephone switch, contacts and connections whereby a signal may be sent through said signal transmitter in its temporary position of rest by the restoration of the receiver to the hook.

220. In a telephone exchange, the combination with a progressive contact mechanism, of a driving shaft, a driven device, a clutch, a magnet for operating the clutch to couple the driving shaft to the driven device and a clutch controlling disk or wheel adapted to keep the power coupled during movement of the parts to a predetermined extent and then to uncouple the same.

221. In an automatic exchange divided into sections, the combination with each section of a secondary connector adapted to be set to connection with a called line, an interconnector on each section, and a bus wire running through all sections of the exchange and connected to the secondary connector in one section, and taps from said bus wire terminating respectively in contact points representing said secondary connector on the interconnectors of all the sections.

222. In an automatic exchange divided into sections, the combination with each section of a secondary connector, an interconnector for each section, a test wire running from all sections of the exchange and connected to the secondary connector of one section and taps from said test wire to the interconnectors of the section on which the secondary connector is located and of all other sections.

223. In an automatic exchange having its main lines divided into groups, a circuit selecting switch for each group adapted to establish connection to any line of its group as a called line, a series of circuit selecting switches controllable respectively by the main lines of different groups, a bus wire for each of the said circuit selecting switches used as called line switches, and taps on each of the bus wires to contacts on the whole series of said circuit selecting switches controllable from different groups of main lines respectively, whereby the main line of any group may, through adjustment of a circuit selecting switch, be connected over a bus wire with a main line selecting switch of the same or any other group or lines.

224. In an automatic exchange divided into sections, the combination of a connector on one section, a bus wire running through a number of sections, a contact of said connector upon which a guarding potential for a called line may be established, a brush or brushes of said connector connected to said bus wire and adapted to be moved into connection with said contact, tap wires leading from said bus wire to each section, and means on each section for forming connection with the tap wire on that section, whereby the guarding potential may be established on the said contact.

225. In an automatic exchange having its main lines divided into groups, the combination of a secondary connector for any group of lines, a guard point or contact on said secondary connector, a connector brush adapted to engage the same, a bus wire and source of guarding potential, and means controlled by the main lines of all groups used as calling lines for forming a connection between the source of guarding potential and said bus wire.

226. In an automatic exchange, the combination of a connector switch for establishing connection with a line when called, a selecting switch for establishing connection between a calling line and the said connector switch, guard points on both said switches, a bus wire carrying a guarding potential, and means for establishing connection between said bus wire and the guard point of the said connector switch, and thence to the corresponding guard point of said selecting switch.

227. In an automatic exchange divided into sections, the combination with a series of interconnectors on each section and a series of secondary connectors on each section, of a series of bus wires running through all sections and each connected to a secondary connector, tap wires from each bus corresponding to each secondary connector and terminating respectively in a contact on each interconnector of all sections and means in said interconnector for forming a connection with the tap wire required for establishing circuit to the secondary connector in the section on which the called line is located.

228. In an automatic exchange, the combination of main lines divided into groups, a group or series of secondary connectors for each group of main lines, an interconnector for each group of main lines comprising two switches, one having a number of groups of contact points representing different groups of secondary connectors, each said group of contact points being provided with an individual contact brush, the other switch being provided with a brush and coöperating contacts connected respectively to the different brushes of the first named switch, means for adjusting the one switch to select a brush, and means for adjusting the selected brush to pick out a particular one of its group of contacts.

229. In an automatic exchange having main lines divided into groups, the combination of a group of main-line-circuit selecting switches for each group of main lines and each adapted to make connection to the lines of said group when called, local-circuit selecting switches provided with groups of contacts, each group of which contacts is connected to one of the groups of main-line-circuit selecting switches, means for selecting one of said groups of contacts and means for adjusting a contact brush over the selected group of contacts to pick out one of the main-line-circuit selecting switches to which said group of contacts is connected.

230. In an automatic exchange having its main lines divided into groups, main-line-selecting switches arranged in groups, and a local-circuit selecting switch at the exchange having groups of contacts, each group representing a different group of main-line-circuit selecting switches and each member of said group of contacts representing a different member in a group of main-line-circuit selecting switches whereby on selection of a group of contacts the movement of a brush over said group will select one of the main line circuit selecting switches serving a particular group of main lines.

231. In an automatic exchange divided into sections, the combination with a series of secondary connectors on each section, of an interconnector on each section comprising two adjustable switches, one having groups of contacts corresponding respectively to the several series of secondary connectors and a number of brushes riding respectively on said groups of contacts, and the other adjustable switch of said interconnector having a brush riding over contacts connected respectively to the brushes for different groups.

232. In an automatic exchange divided into sections, each having a series of secondary connectors, the combination of a cylinder switch on each section, said switch having groups of contacts connected with the secondary connectors of the several sections respectively and sets of brushes adapted to be adjusted together over said contacts to form connections with the contacts of the different sections, and a register consisting of a switch having an adjustable brush and contacts engaged thereby and connected respectively with the several adjustable brushes of the said cylinder switch.

233. In an automatic exchange divided into sections, the combination with a series of secondary connectors on each section, of an interconnector on each section comprising switch contacts forming terminals of wires leading respectively to secondary connectors on the several sections of the exchange, brushes adjustable over said contacts, a driving shaft for said brushes, a clutch for connecting the brushes to said shaft, an electromagnet and a clutch-controlling disk having notches, the armature of said electromagnet being adapted when retracted to engage one of the notches of said disk and to free the clutch, means for energizing said electromagnet, and means for deënergizing the same when a brush of said interconnector is in coincidence with a contact joined to an idle secondary connector.

234. In an automatic exchange having its main lines divided into groups, the combination of a series of main line circuit-selecting switches for each group, and a local circuit-selecting switch for each group, the said local circuit-selecting switch having groups of contacts and connections therefrom leading respectively to the several groups of main line switches, whereby the local circuit-selecting switch of any group may at any time select the series of main line circuit-selecting switches for any one of the whole number of groups of lines and connect with any one of the main line circuit-selecting switches in the selected series.

235. In an automatic exchange, the combination with a group of substation lines, of two or more divisions of connecting apparatus common to said lines and of a number determined by the traffic demand, a primary connector for each division having contacts and brushes normally at rest but adapted to be adjusted to connection with any calling line, each said primary connector comprising a self-contained piece of apparatus structurally independent in its contacts, brushes and connections of the other primary connectors for the same group of lines, means for selecting an idle division of apparatus, means for starting the primary connector of said division on the reception of a signal from any line, and means for automatically bringing the said primary connector to rest when the contact of the line calling is found.

236. In an automatic exchange, the combination with a number of substation lines, of two or more divisions of connecting apparatus common to said lines and including primary connectors, each of said primary connectors comprising two interconnected switches, one having main line contacts divided into groups and brushes adapted to engage said contacts, and the other having contacts connected to the said brushes and a brush adapted to engage the last mentioned contacts, the said primary connector also comprising means for operating said switches, whereby one selects a group of contacts including a main line contact of the line calling and the other selects the said main line contact in that group, and each of said primary connectors constituting a self-contained or individual piece of apparatus whose contact members, brushes and connections are independent of the primary connectors of other divisions.

237. In an automatic exchange, the combination with a number of substation lines, of two or more divisions of connecting apparatus, each division containing a primary connector for establishing a connection with a calling line, and an interconnector through which the connection is made from the primary connector to the called line, each primary connector and interconnector of a division having connections which are independent at all times of the connections for the primary connectors and interconnectors of other divisions, so that the primary connector, its associated interconnector and connections therefor in each division constitutes a unitary equipment capable of being added to or removed from the exchange according to the traffic demand.

238. In an automatic exchange, the combination with a group of lines, of a number of sets of apparatus adapted to be adjusted to establish connection between the calling and called line, said sets of apparatus forming a percentage of the whole number of lines in the group and each of said sets forming an electrical apparatus, structurally and electrically self-contained and adapted to be added to or removed from the section of the exchange in accordance with the traffic demand without disturbing other sets, and means automatically responsive upon the initiation of a call for selecting an idle set of apparatus.

239. In an automatic exchange, the combination with a number of substation lines, of two or more sets of apparatus common to said lines, each containing a primary connector having a bank of contacts set in insulating material and forming respectively the terminals of said substation lines, together with a suitable brush or brushes adjustable over said contacts, each said primary connector constituting a self-contained piece of apparatus which is structurally independent of the other primary connectors, and means for adjusting the brushes of each over the contacts independently of the means for adjusting the brushes of the others, and means automatically responsive upon the initiation of a call for selecting an idle set of apparatus.

240. In an automatic exchange, the combination with a number of substation lines, of a number of divisions of connecting apparatus each containing a primary connector and interconnector and a secondary connector, each said primary connector of a division embracing a switch cylinder in which contacts representing all of said lines are anchored in a mass of insulating material and which is structurally independent of the switch cylinders for other divisions, and connections between each primary connector and the corresponding interconnector of its division independent at all times of those used for other pairs of primary connector and interconnector for other divisions.

241. In an automatic exchange divided into sections, the combination on each section of a number of sets or divisions of connecting apparatus each embracing a primary connector, an interconnector and a secondary connector, said devices in each division being structurally and adjustably independent of those constituting other divisions but having all the secondary connectors of all sections represented each in the interconnectors of all sections so that any one of the primary connectors of any section may be connected with any one of the secondary connectors of the same or any other section.

242. The combination, in an automatic exchange, of a switch embracing groups of contacts mounted in insulating material and a number of brushes coöperating therewith and mounted upon a rotary member or carrier, a suitable clutch and actuating magnet for coupling and uncoupling said carrier from a constantly operating driving power, and a switch mounted to rotate with the first-named switch and embracing an escapement device, an actuating spring therefor, and a suitable controlling magnet controlling the scape lever.

243. In a switch device for an automatic exchange, the combination of a rotary brush-carrying shaft, a continually rotating driving shaft, a clutch for connecting the driving and the brush-carrying shaft, an actuating magnet for said clutch and a notched disk whose notches coincide with the several positions of rest to be assumed by the brushes, said disk coöperating with the parts actuated by the magnet to keep the clutch engaged during passage of the brushes from one position to another.

244. In an automatic exchange, the combination of a rotary brush-carrier rotating over suitable contacts forming terminals of circuits in the apparatus, a continually rotating driving shaft, a clutch and an actuating magnet for coupling the driving shaft to the brush-carrying shaft or member, a clutch control disk adapted to rotate with the driven portion of the apparatus and when freed to hold the clutch engaged, and a releasing notch or depression in said disk adapted to permit the clutch to be freed at the zero or normal position of the apparatus.

245. In an automatic exchange, the combination substantially as described with the driving brushes of the apparatus, and a suitable driving shaft continually operating, of a clutch adapted to couple the driving and driven shaft, an armature connected with said clutch, a clutch control disk, and a dog adapted to engage the disk for the purpose of holding the clutch engaged and suitably connected with said armature so as to free the disk when the clutch couples the driving and driven shaft.

246. In an automatic exchange, the combination with an adjustable brush adapted to move over a series of contacts, of an escapement sector carrying said brush, an actuating spring connected with the sector and adapted to rotate the same, and a scape lever for permitting the sector to move step-by-step in one direction under the influence of the spring, said scape lever having pallets adapted to permit the scape sector to be forced back to normal position past said pallets, and a magnet for controlling the motion of the scape lever.

247. In an automatic switch, the combination with the escapement sector carrying switch brushes and mounted upon a rotary support, of a scape lever adapted to allow the sector to move step-by-step but to permit the escapement sector to be forced back to zero past the scape lever teeth, and a lug or obstruction in the path of the sector adapted to be engaged thereby when the escapement sector is carried around by the rotary support upon which the sector is mounted.

248. In an automatic switch, the combination with the step-by-step brush-carrying support, and a controlling magnet adapted to cause the same to move in one direction during adjusting operation to find a particular contact, and a rotary support upon which said switch is eccentrically mounted, of an obstruction mounted in the path of the rotary member of the switch for the purpose of forcing the same back to zero, and adapted to be cleared by it to free the switch when its brushes have been restored to the normal or zero point.

249. In an automatic exchange, the combination with a series of fixed line contacts forming the terminals respectively of the substation lines, of an adjustable brush or brushes adapted to be rotated over the same, a continually actuating driving power, a clutch for connecting said driving power to the brush carrier, an actuating controlling magnet for the clutch and a clutch control disk rotating with the brushes and adapted to keep the clutch engaged as and for the purpose described.

250. In an automatic exchange, a line connector comprising a rotary switch whose brushes rotate over contacts connected respectively to a number of substation lines, a clutch for connecting said switch with a suitable driving power, a clutch control disk adapted to keep the clutch engaged but to free it in the several positions that the switch is required to assume, a magnet for controlling the position of said clutch, and a release circuit connected to a brush adapted to ride over a series of contacts over which circuit may be established for discharging the magnet in the several positions that the switch must keep to make connection with the various lines.

251. In an automatic exchange, the combination with a number of substation lines, of a divided contact ring in the segments of which said lines terminate, guard circuits corresponding to the several lines, a second divided contact ring whose segments connect respectively to said guard circuits, a continually rotating structure carrying brushes bearing respectively on said rings, suitable driving power frictionally connected with said structure and a clutch or stop magnet for stopping the rotation of said structure to cause said brushes to come to rest on the said segments.

252. In an automatic exchange, the combination of two divided contact rings having respectively main line and guard line contacts, brushes adapted to rotate over said rings, a rotary frame or carrier on which the brushes are mounted, a stationary stop ring, a stop adapted to engage the same for stopping the rotation of the carrier and a stop actuating magnet mounted on said carrier.

253. In an automatic exchange, the combination substantially as described of a primary connector, a rotary switch, a decimal register controller, and contacts and connections whereby the rotary switch on leaving its normal position may complete starting or control circuits for the decimal register controller and primary connector.

254. In an automatic exchange, the combination with the primary connector and a decimal register controller, of the rotary switch having contacts and circuit connections whereby it may in passing from one position to another complete starting circuits for the primary connector and decimal register controller, and in coming to rest may recomplete a starting circuit for itself controlled by the decimal register controller.

255. In an automatic exchange, the combination with a circuit selecting switch, comprising two coöperating switch devices, one having a series of brushes and contacts therefor and the other a brush and series of contacts connected respectively to the brushes of the first switch, control circuits for said switches, a circuit changing switch, by means of which said control circuits are completed and a restarting circuit for said circuit-changing switch completed by said circuit changer in a position in which it completes the said control circuits.

256. The combination of a main-line circuit-selecting switch, a series of stop circuits therefor corresponding respectively to different positions in which said circuit selecting switch is brought to rest, a revolving line-finder, means for stopping the same in different positions corresponding respectively to said lines, means for completing different stop circuits of the main-line circuit selecting switch in different positions respectively of said line-finder, a clutch controlling magnet for the main-line circuit-selecting switch having two windings, one a starting and the other a deënergizing stop winding, a local circuit changing switch, adapted to close and break the circuits of said windings, a restarting circuit for said circuit changer, and means for completing said circuit after the adjustment of the coöperating switches so as to afford a circuit over which to cause the circuit changing switch to move forward a step and break the circuit of said clutch controlling magnet.

257. The combination of a primary connector, a decimal register controller, a decimal indicator, a series of selecting circuits controlled thereby, a relay energized over one of said circuits, means controlled by said relay for connecting the source of electric energy to the stepping contact brush of the decimal register controller, and means for throwing said relay out of action over a circuit closed by the decimal register controller as it completes its movement.

258. The combination with a decimal register controller, of a driving power, a clutch and a clutch controlled disk operatively connected to rotate with the decimal register controller and provided with a controlling step or notch located in proper position to free the clutch and bring the controller to rest at the termination of its cycle of actions.

259. The combination of a decimal indicator having line and guard contact rings and contact brushes adapted to rotate over the same, a relay $R^4$ controlling the connection of the brush riding on the guard contact ring, a stop magnet $C'$, a relay magnet $R'$ and means for operating the same over circuits including contacts of the line contact ring.

260. The combination of a line finder, a plurality of sets of connecting apparatus common to the lines connected to the line finder, a starting circuit for each set, a division starter for closing said starting circuits, one at a time, a stop magnet for the line finder, a starting circuit for the division starter and a relay $R'$ common to the lines of the line-finder and controlling the connections of the said stop magnet and of the starting circuit for the division started.

261. In an automatic exchange, the combination of a signal transmitter controller at the central office, a main line circuit selecting switch, a circuit changing switch having contacts and connections for completing the circuit between the signal transmitter controller and said main-line circuit-selecting switch, a starting circuit for the signal transmitter controller and contacts and connections on the circuit changing switch for completing said starting circuit when the connection between the signal transmitter controller and the main line circuit selecting switch is completed.

262. The combination in an automatic exchange, of a signal transmitter controller at the central office, a local circuit at the central office for receiving impulses produced by the signal transmitter controller, a main line circuit selecting switch, a circuit changing switch for completeing the connection between said selecting switch and signal transmitter controller, a starting circuit for the signal transmitter controller, and means for completing the said starting circuit when the circuit-changing switch passes to position for forming connection between the selecting switch and signal transmitter controller.

263. The combination with the decimal indicator and its stop relay R' in a common connection from the segments of said indicator, of a primary connector, a relay R³ controlling the circuit of relay R', a rotary switch between the primary connector and the connecting apparatus for placing a calling and called line in circuit with one another, and contacts and connections controlled by said rotary switch whereby the relay R³ may be operated while the rotary switch is in connection with the calling line.

264. The combination of a decimal indicator, having line and guard contact rings, a stop relay in a common connection from the line contact ring, a brush rotating on the guard contact ring, and a relay connected to the brush of the guard contact ring and controlling the circuit through the coils of the stop relay, as and for the purpose described.

265. The combination of a decimal indicator having a guard contact ring, a main-line circuit-selecting switch having line contacts and corresponding guard contacts, means for stopping the decimal indicator by a signal sent over any line, a source of guarding potential, a circuit changer, and means controlled thereby for restarting the decimal indicator and at the same time closing the connection between the source of guarding potential and the guard contact of the line by which the decimal indicator is brought to rest.

266. The combination of a main-line-circuit selecting switch, a circuit changing switch, a signal transmitter controller, a signal transmitter operating over one side of the main line circuit, means operated over the other side of the main line circuit for actuating the signal transmitter, and contacts and connections whereby the circuit changer may complete the connection between the signal transmitter controller and the main-line-circuit selecting switch to permit the operation of the signal transmitter over one side of the main line selected.

267. The combination, substantially as described, of a number of sets or divisions of connecting apparatus, a division starter, a clutch controlling magnet therefor having two windings, means for energizing the magnet by one of said windings to bring the division starter into operation, and means for completing the circuit of the other winding through said division starter and an idle division or set of apparatus.

268. The combination of a line-finder adapted to complete the connection to a number of lines in succession—a relay common to said lines, a number of sets or divisions of connecting apparatus joined to said lines, a division starter, a double wound magnet, means for completing the circuit of one winding through the several sets or divisions of apparatus, and connections for the other winding controlled by the action of said relay.

269. The combination with a line finder or progressive contact maker having a divided contact ring, of a decimal register controller, having contacts respectively connected to the contacts of said ring, a series of stepping contacts on said decimal register controller adapted to generate stepping impulses, a relay, means for connecting the same in succession to those contacts of the decimal register controller which are connected to contacts of the said ring, and a source of electric energy connected to the stepping contacts through a contact controlled by the relay.

270. The combination with a series of main lines, of a line-finder, means common to said lines for stopping the same upon any one of the line contacts, a main-line circuit-selecting switch comprising two coöperating switches, one a cylinder switch having groups of contacts and corresponding brushes therefor, the other a register switch having contacts connected respectively to said brushes, a decimal register controller for sending a series of impulses through the register switch, means governed by the line finder in its several positions of rest for controlling the number of impulses sent, a number of stop controlling contacts on the cylinder switch, and means on the line finder for completing the connection to different ones of said stop-controlling contacts depending upon the position in which the line-finder is brought to rest.

271. The combination with the signal transmitter controller at the central office, of a signal transmitter at the substation controlled from a line joining the central office and substation, a decimal indicator controlled by said transmitter over another line, switch devices for completing the starting circuit of said signal transmitter controller and contacts and connections for simultaneously completing the circuit whereby the said signal transmitter controller may send an impulse over the connecting line for the purpose of operating the signal transmitter and thereby causing the decimal indicator to revert to common use 272. The combination of the signal relay R⁶, a signal transmitter at a substation, means for actuating the same over one line circuit, means for actuating the signal relay from the signal transmitter over another line circuit, a rotary switch, a signal transmitter controller adapted to furnish impulses for operating the signal transmitter, and contacts and connections governed by the rotary switch for placing the signal transmitter controller in connection with one line circuit and the signal relay in connection with the other line circuit.

273. The combination in an automatic exchange divided into sections, of a local-circuit selecting switch, inter-connector, adapted to select connections leading from one section to others, a controlling or operating circuit for said circuit selecting switch, a signal relay governing said circuit and a circuit changing switch at the exchange having contacts and connections for joining the relay to a main line and for joining the controlling circuit of the interconnector to the contacts of the relay.

274. In an automatic exchange, the combination of the relay R⁶, the local impulse generator, an interconnector having a control magnet and connections therefor through the contacts of the relay with said impulse generator, and switch devices having contacts and connections for completing the circuit of the coils of said relay and a substation line and for closing the connection through the contacts of the relay with said control magnet.

275. In an automatic exchange divided into sections each having a number of divisions or sets of connecting apparatus, the combination with two or more interconnectors in each division controlling respectively the connections to different groups of sections, of a thousands register consisting of a switch adapted to complete a circuit to one or the other of said interconnectors, a relay governing the control circuit of said register, and a rotary switch having contacts and connections for placing the coils of the relay in circuit with a substation line and the contacts of the relay in connection with the said register.

276. The combination of a group of main line circuit selecting switches, a local circuit selecting switch, (interconnector), controlling circuits therefor leading to said main-line-circuit selecting switches, control circuits for said main-line circuit selecting switches, a double wound relay, one winding of which is a main line winding, while the other is a local circuit winding, means for placing a local circuit winding of the relay in connection with the brush of the interconnector controlling the circuits through the main line circuit selecting switches in their idle position, and front and back contacts for the relay, one governing the control circuits for the interconnector and the other the control circuits of the main line circuit selecting switches.

277. In an automatic exchange, the combination with the double wound relay R⁶ having one coil in a line circuit, of an interconnector controlling the connections to a series of secondary connectors, a control or stop magnet for the interconnector governed by said relay, a switch magnet A⁴ on each secondary connector in a connection through a contact and traveling brush of the interconnector including a contact of the relay, and a circuit maker and breaker controlled by said magnet A⁴ and serving to close circuit in the normal position of the secondary connector.

278. In an automatic exchange, the combination of a double wound relay, one winding of which is a main line winding and the other a local circuit winding, a series of main line circuit selecting switches, a local circuit selecting switch having a movable brush and series of contacts, a series of secondary connectors having register magnets connected respectively to said contacts, connections from the movable brush of the local circuit selecting switch to the local winding of the relay and a control or stop magnet for said circuit selecting switch governed by the relay.

279. The combination with two or more interconnectors, of a thousands register for selecting an interconnector, a rotary switch and controlling circuit therefor, a signal transmitter controller furnishing main line impulses and local circuit impulses to the thousands register, and means for closing the control circuit of the rotary switch when the signal transmitter controller has completed its action necessary for furnishing the maximum number of impulses required at any time for operating the thousands register.

280. The combination of two or more interconnectors, each provided with an operating magnet, a thousands register provided with an operating magnet and controlling connections to said interconnectors, a signal transmitter controller adapted to furnish in succession first a series of impulses for operating the thousands register and then a series of impulses for operating the interconnector, a rotary switch adapted to close in succession the circuit through the operating magnet of the thousands register for the reception of one set of impulses and then through a contact of the thousands register for the reception of the second set of impulses, a starting magnet for the interconnector and means governed by the signal transmitter controller for closing the circuit thereof after the said signal transmitter controller has completed its action of furnishing the maximum number of impulses required for the latter set.

281. The combination of a signal transmitter, a circuit closing arm therefor, adapted to close a number of circuits in succession, a number indicator adapted to complete connections with one of said circuits, an impulse generator at a distant station, means operated by the impulses furnished thereby for advancing the circuit closing arm step by step, and a signal relay at said station governing the flow of said impulses and connected to a main line circuit passing through the circuit closing arm of the transmitter.

282. The combination of the thousands register, the signal transmitter having a circuit changing arm connected to a line circuit, a relay at the central office in said line circuit, an operating circuit for the thousands register normally closed over the back contact of the relay and a circuit over the front contact of the relay and embracing coils of the relay magnet, as and for the purpose described.

283. The combination with connecting apparatus at the central office in an automatic exchange, of a signal transmitter controller furnishing sets of impulses thereto, a main line relay, a back contact of the relay in the circuit over which the sets of impulses flow, a front contact connected to a local circuit including a magnet coil of the relay, and means controlled by the signal transmitter controller for breaking the latter circuit on the completion of its action in sending one of the sets of impulses whereby the relay may be placed in condition for completing, at its back contact, the circuit for the succeeding set of impulses.

284. The combination of the interconnector having a cylinder switch embodying a number of brushes adapted to move simultaneously over groups of contacts, said groups being connected respectively to different series of devices each series being on a different section of the exchange, a test circuit for the cylinder switch, a starting magnet therefor, a signal transmitter, a register switch for selecting a particular one of the cylinder switch brushes, an adjusting circuit for said register, a signal relay having a coil in a line circuit leading to a signal transmitter and controlling by its back contact the adjusting circuit of the register, a front contact for the relay controlling the circuit for a coil of the relay whereby the relay lever is held up until the completion of the whole set of adjusting impulses at any time used in setting a register, a test circuit for the cylinder switch also controlled by said relay, and means for breaking the hold-up circuit to discharge the relay and actuate the magnet which starts the cylinder switch.

285. In an automatic exchange, the combination of a signal transmitter, an interconnector embracing a cylinder switch and register switch coöperating as described to pick out the connection to a section of the exchange and to a particular set of apparatus in said section, a signal relay having a coil in a line circuit leading to the signal transmitter, an adjusting circuit for the register switch including the back contacts of the relay, a hold-up or lock circuit completed over the front contact, a test circuit for the cylinder switch also controlled by said relay, and a signal transmitter controller having contacts for closing the starting circuit on the interconnector over the back contact of said relay.

286. The combination in an automatic exchange divided into sections, of an interconnector for each section comprising a cylinder switch having sets of contacts and associated brushes corresponding to different sections of the exchange and a coöperating register switch adapted to select a particular brush moving over a series of contacts corresponding to the section of the exchange required, a start-magnet controlling the action of the cylinder switch and a consecution controller through a contact of which the circuit of said start magnet is intermittently closed, as and for the purpose described.

287. The combination of a signal transmitter, a signal relay having a coil in the line circuit leading to the signal transmitter, a rotary switch having a starting circuit completed over the front contact of the relay, successively acting adjusting circuits controlled over a back contact thereof and contacts and connections as described whereby the rotary switch may complete the said circuits in the required order in its several positions of rest.

288. In an automatic exchange divided into sections and having a series of secondary connectors on each section, the combination of the signal relay, the rotary switch having a starting circuit controlled over the front contact thereof, a register switch controlling the connections to the several sections of the exchange, a switch adapted to complete the connection to the several secondary connectors of each section in succession, a control magnet for said switch, and contacts and connections whereby the said rotary switch in its successive positions of rest may complete the control circuits, first for the register switch and then for the switch that selects the idle secondary connector.

289. The combination with a series of main-line circuit selecting switches, normally at rest, starting circuits therefor, a circuit selecting switch governing the connection to said series of switches, a controlling circuit for said circuit selecting switch and a relay having a back contact connected to the said controlling circuit and a front contact controlling the said starting circuits.

290. In an automatic exchange, the combination of a series of main-line-circuit selecting switches, each adjustable to position for establishing connection with any one of a group of main lines, an impulse generator furnishing impulses for adjusting said switches, devices responsive to selective signals sent from a subscriber's station and adapted to control the number of such impulses transmitted, a guard contact for each line on each selecting switch, a guard wire or connection for each switch, and circuit closing devices on the impulse generator for closing the circuit of said guard wire on the completion of the adjustment of the switch.

291. In a telephone exchange, the combination with a talking circuit and a connector for establishing said circuit between lines, of a signal transmitter controller having talking circuit contacts, a rotary switch, a test circuit, a relay having a connection with said test circuit completed by said rotary switch, and a release circuit for the signal transmitter controller including contacts of the relay and contacts of the rotary switch closed by the latter at the time the test circuit is completed.

292. The combination of a main-line-circuit selecting switch, an impulse generator supplying adjusting impulses thereto, a test circuit for said switch, circuit closing devices on the impulse generator for closing a connection in the talking circuit between the switch and the calling line, a release circuit for the impulse generator, a relay controlling the same and means for connecting the relay to the test circuit.

293. The combination of the signal transmitter controller, a circuit closing device operatively connected therewith and forming part of the talking circuit, guard contacts for the several lines, means for completing a connection between the test circuit and the guard contact of the line called, a relay, a stop controlling circuit for the signal transmitter controller, a circuit changing rotary switch and connections through said rotary switch for the stop controlling circuit of the signal transmitter controller over the contacts of the relay and for the test circuit through the coils of the relay.

294. In a telephone exchange, the combination of a receiver switch at a substation, a circuit-changing switch at the central office having contacts and connections forming in one position a part of the talking circuit, a stop-controlling circuit for said circuit-changing switch, a relay, means for advancing said circuit-changing switch to a position to include said relay in circuit with said receiver switch, the said relay being controlled by the said receiver switch and in turn controlling said stop-controlling circuit, whereby the said circuit-changing switch is advanced to talking position by the act of the subscriber in taking his receiver for use.

295. In a telephone exchange, the combination of two main-line-circuit selecting switches, one for establishing connection with the calling and the other with the called line, an intermediate circuit changer switch having circuit closing devices forming a part of the talking connection, a stop controlling magnet therefor, a telephone receiver switch at the substation, and means for governing the action of said stop controlling magnet over a line circuit connecting the telephone receiver switch and the central office whereby the circuit changer switch may be sent to talking position.

296. In a telephone exchange, the combination of a circuit closer at the central office for closing the talking connection between the calling and called line terminals, circuit changing devices at the central office, a release relay controlling the movements of said circuit changing devices, a telephone receiver switch at the substation, means controlled over a circuit including the main line and contacts of the telephone receiver switch for causing the circuit changer to connect the release relay to the main line when the telephone receiver is put into use, and means controlled by the restoration of the telephone receiver switch to normal to energize said release relay.

297. In an automatic exchange, the combination of a closed circuit to the calling subscriber and means under the control of the calling subscriber for varying the flow of current in said closed circuit for the purpose of signaling the called subscriber.

298. The combination with the receiver hook, of contacts and connections for establishing a signaling circuit through the receiver when the same is lifted from the hook and means under the control of the calling subscriber for signaling the called subscriber over the said established signaling circuit.

299. The combination with the receiver hook, of contacts and connections for establishing a signaling circuit through the telephone receiver when lifted from the hook and means under the control of the calling subscriber for varying the current flow in the line for the purpose of signaling the called subscriber.

300. In a telephone exchange, the combination with a signaling generator and a connection therefrom to a called line, of a calling line, a relay having coils in circuit with said line, a back contact of said relay being included in the connection from said generator, means at a station of the calling line for introducing resistance into the line circuit whereby said relay is released, and a source of current for said relay coils.

301. In an automatic telephone exchange, the combination of a repeating induction coil and ringing generator at the central station, and means under the control of a calling subscriber for introducing current from the ringing generator to a called line through one circuit of the repeating coil while the circuit of said calling subscriber is through the other circuit of the repeating coil.

302. The combination of a repeating coil and a ringing relay controlling the circuits thereof at the central station, switch devices at the same station for connecting the ringing relay to the main line, a telephone receiver switch at the subscriber's station and means for automatically operating said switch devices over the main line when the receiver is taken from the hook.

303. The combination in an automatic exchange of a repeating induction coil, a ringing generator and ringing relay all at the central office, switch devices having contacts and connections for establishing the circuit of the called line through the ringing generator, one side of the repeating induction coil and the relay contacts and for the calling line through the relay coils.

304. The combination in an automatic exchange, of a repeating induction coil, a ringing generator, a ringing relay all at the central office, switch devices for establishing the circuit of the called line through the ringing generator induction coil and relay contacts, and the circuit of the calling line through the relay coils, a telephone switch at a substation, and a control circuit for said switch devices including the telephone switch.

305. The combination of a main-line-circuit selecting switch, a guard contact for each line, means for closing a connection to the guard contact when the switch completes connection to the called line, a signaling generator, a repeating induction coil, circuit closing devices adapted to close and break a connection of the calling line with said repeating coil, a test circuit, and means responsive to the condition of said test circuit for rendering the said circuit closing devices inoperative to close the connection to the repeating coil in one condition of the test circuit and operative in another condition of said test circuit.

306. In an automatic exchange the combination of a release relay, switch devices at the central office for connecting said relay to the subscribers' lines, a telephone receiver switch at a subscriber's station and means controlled thereby for operating the said switch devices when the receiver is lifted from the hook.

307. The combination with central office apparatus, of a metallic talking circuit extending to a subscriber's station, a generator at the central office, a release relay neutral to the current on the talking circuit, and means at the subscriber's station for grounding one side of the line for the purpose of operating the said relay.

308. The combination with the rotary switch having a release circuit therefor, means for controlling said release circuit from the substation to permit the rotary switch to be released and sent forward a step at the conclusion of the conversation, a primary connector and a secondary connector, release circuits therefor controlled by said rotary switch, and a secondary release circuit for the rotary switch completed by the primary connector just before reaching normal position.

309. In an automatic telephone exchange, the combination with a series of subscribers' lines leading into said exchange, of a plurality of calling line connector switches common for the use of said lines, electromagnetic means for initially controlling the operation of said connector switches one at a time, and means for forming temporary electrical connection between said initial controlling means and one of said lines at a time.

310. In an automatic telephone exchange, the combination with a series of subscribers' lines leading into said exchange, of a plurality of calling line connector switches common for the use of said lines located at said exchange, electromagnetic means for initially controlling the operation of said connector switches one at a time, and a progressive contact maker for placing the said electromagnetic means in operative connection with said lines successively and with one at a time.

311. In an automatic telephone exchange, the combination with a series of subscribers' lines leading into said exchange, of a plurality of calling line connector switches common for the use of said lines located at said exchange, an electromagnet for initially controlling the said connector switches one at a time, and a progressive contact device placing said controlling magnet in connection with said lines successively and with one at a time.

312. In a telephone system having a central exchange and subscribers' stations, a plurality of automatically operated calling line connector switches common for the use of said stations and located at said exchange, a circuit normally broken at a subscriber's station and at the exchange, a progressive contact maker closing the break in said circuit at the exchange at periodically recurring intervals, means for closing the break at the subscriber's station, and means for initially controlling an idle one of said connector switches upon the establishment of said circuit.

313. In an automatic telephone system, the combination with subscribers' stations and an exchange, of lines leading from said subscribers' stations to said exchange, a common return between the said subscribers' stations and said exchange, the said common return being normally disconnected from the subscribers' lines both at the subscribers' stations and at the said exchange, a progressive contact-maker connecting the said common return to the subscribers' lines one at a time periodically and in rotation, means at the subscribers' stations for connecting the said subscriber's line to the common return, a plurality of connector switches common for the use of said stations, and means for rendering an idle one of said connector switches operative upon the establishment of a circuit including any one of said lines and the said common return.

314. In an automatic exchange, the combination with a series of subscribers' lines, of signal-receiving devices, connecting apparatus to which said lines are directly connected and by means of which any one of said lines may be placed in operative relation to said signal-receiving devices, an indicating device controllable by said subscribers' lines non-simultaneously and in fixed order of rotation, and adapted when temporarily brought to rest by a preliminary signal or impulse from a subscriber's station to automatically identify or single out that subscriber's line on said connecting apparatus and thereby to place it in operative relation to one of said signal-receiving devices, and means for automatically restarting said indicating device after the identification has been made.

315. The combination of a series of subscribers' lines, of a receiver of selective signals, connecting apparatus controllable by said subscribers' lines non-simultaneously and in a fixed order of rotation and adapted to place any line in operative relation to the receiver of selective signals in response to a preliminary signal or impulse from any line and means for automatically restoring said connecting apparatus to the use of other lines when such operative connection has been effected.

316. In an automatic telephone exchange, the combination with a series of subscribers' lines, of a plurality of calling line connector switches common for the use of said lines to which the subscribers' lines are directly connected, signal receiving apparatus, means controllable by the said subscribers non-simultaneously and in a fixed order of rotation whereby the subscribers' lines are put into operative relationship through an idle one of said connector switches to a signal receiving apparatus, and means for automatically restoring the connecting and signaling apparatus to their normal position after the termination of a conversation.

317. In an automatic telephone exchange, the combination of a series of subscribers' lines, a connecting apparatus to which said lines are connected and by means of which any one of said lines may be placed in connection with signal receiving devices, means controllable by said subscribers' lines non-simultaneously and adapted to automatically place a calling line in connection with a signal receiving circuit through said connecting apparatus, a signal transmitter at each subscriber's station embodying means for sending a preliminary signal followed by a selective signal or signals, and means at the signal transmitter and at the central station coöperating to hold the signal transmitter in the preliminary impulse position until the said connecting apparatus has prepared a path for said selective signals.

318. In an automatic telephone exchange, the combination of a number or group of subscribers' lines each provided with transmitting apparatus at the subscribers' station adapted to send a preliminary impulse or signal followed by a selective signal or signals, primary connecting apparatus at a central station whereby a plurality of lines forming a percentage of the whole number of said group of lines connected thereto, may be placed in connection with the devices for receiving the selective signal, means controllable by the subscribers non-simultaneously and in fixed order of rotation and adapted under the action of a preliminary impulse to bring about the operation of the primary connecting apparatus to place the line of the calling subscriber in connection with the devices for receiving the selective signal or signals, secondary connecting apparatus, forming a means independent of the primary connecting apparatus, whereby a plurality of the subscribers' lines constituting a percentage of the whole group of subscribers, may be connected to the exchange circuits and means responsive to the selective signals introduced into the exchange through the primary apparatus for setting said secondary connecting apparatus to connection with the line of the called subscriber.

319. In an automatic telephone exchange, sub-station lines divided into groups, primary connecting wires in as many groups, circuit selecting switches in groups, each responsive to the first set of signals sent from any sub-station and over a primary connecting wire, primary line connecting apparatus adapted to connect a calling main line to an idle primary connecting wire in response to a preliminary electrical impulse from a calling sub-station, a second series of circuit selecting switches any one of which may be selected by a first named selecting switch and controlled by the second set of signals, idle tertiary connecting wires one of which is chosen by the action of said second set of signals, final main line circuit selecting switches responsive to selecting signals and adapted to connect the chosen tertiary connecting wire to the called main line and means for automatically isolating such chosen final main line circuit selecting switch from choice over other tertiary wires.

320. In an automatic telephone system, sub-station circuits grouped into sections, grand divisions of sub-station circuits comprising two or more sections of sub-station circuits, two or more circuit selecting switches belonging to each section of sub-station circuits each adapted to establish connection with any sub-station circuit of its section, a set of bus wires connected to and controlling each said switch belonging to a section, two or more switches belonging to each grand division each adapted to establish connection with any set of bus wires connected to any switch in its own grand division, a set of bus wires connected to and controlling each said switch belonging to a grand division and switches controlled by main lines each adapted to establish connection with any set of bus wires connected to any switch controlling a grand division.

321. In an automatic telephone exchange, the combination of a number of subscribers' lines leading into said exchange, a series of signal-receiving switches less in number than the number of said lines, progressive switches less in number than the number of lines and interposed between the calling lines and said signal-receiving switches, means for selecting an idle progressive switch on the initiation of a call, and means for operating said idle progressive switch to place the calling line in operative relation with a signal-receiving switch.

322. In an automatic telephone exchange, the combination of a series of switches connected to the lines as calling lines, a series of switches connected to the lines as called lines, connecting wires less in number than the lines of the exchange leading from the calling line switches, connecting wires less in number than the lines of the exchange leading from the called line switches, circuit-selecting switches less in number than the lines of the exchange, and sending apparatus adjustable in accordance with line designations and automatically controlling said circuit-selecting switches to join the connecting wires from calling line switches to the connecting wires from called line switches.

323. In an automatic telephone exchange, the combination of subscribers' lines leading into said exchange, called line circuit-selecting switches, a plurality of trunks less in number than the subscribers' lines common for the use of said lines, means under the control of any calling subscriber for automatically appropriating and isolating any idle one of said trunk lines, sending apparatus adjustable in accordance with the designations of called lines, and means automatically controlled by said sender for connecting the appropriated trunk line to one of said circuit-selecting switches and for advancing the connected circuit-selecting switch to extend the connection to the called subscriber.

324. In an automatic telephone exchange the combination of a series of subscribers' lines leading into said exchange, a plurality of primary connectors each adapted to establish connection with any one of said lines, a plurality of signal receiving devices connected respectively to said primary connectors and means operative by the said series of subscribers non-simultaneously and in succession for securing control of idle signal receiving devices.

325. In a telephone exchange having its main lines divided into groups provided with inter-connecting bus or trunk wires, the combination with each group of trunk line selecting switch, means for automatically bringing the same to rest upon an idle trunk line and means for connecting any main line of a group to said switch.

326. The combination with the stations of a telephone exchange, said stations divided into groups, and a less number of switches divided into corresponding groups, each switch of any one group being common for the use of any station of the same group but not usable by any of the stations in the other groups, means controlled from any station for automatically selecting an idle one of the switches in the corresponding group, and means also controlled from the station for moving the automatically selected switch so as to extend the connections to any of the other groups.

327. In a telephone system, trunk lines, subscribers' lines, automatic means for selecting the first idle trunk line, means for connecting the selected trunk line to a called subscriber's line, a common battery, and automatic means for closing connection from the common battery to the selected trunk line to supply talking current to the called substation.

328. In a telephone system, trunk lines, subscribers' lines, an automatic switch adapted to pass over busy trunk lines and to select the first idle trunk line, means for connecting the selected trunk line to a called subscriber's line, a common battery with connections to supply talking current over said trunk line to the called subscriber's line, and automatic means for releasing said switch.

329. In a telephone system, a plurality of lines, automatic means for selecting the first idle line, a common battery, and automatic means for closing connection through said automatic selecting means to supply talking current to a subscriber's substation.

330. In a telephone system, a plurality of lines, an automatic switch for selecting idle lines, adapted to make connection with some one of said lines unless the same are all busy, and automatic means for supplying talking current through the said switch to a subscriber's substation.

331. In a telephone system, a plurality of lines, terminals for said lines, automatic means for traversing said terminals until an idle line is found, and automatic means for supplying talking current to the automatically selected line.

332. In a telephone system, the combination of a plurality of lines, automatic means for selecting and extending connection to idle lines, means for signaling a called subscriber, a source of current, means associated with the line-selecting means for connecting the source of current to the automatically selected line, and automatic means for releasing.

333. In a telephone system, a plurality of lines, a switch adapted to operate at different levels, means in said switch for selecting a level in accordance with a certain digit of the called number, means in said switch for then causing the operation thereof in a selected level until an idle line is found, and automatic means for supplying the selected line with current.

334. In a telephone system, an automatic switch provided with line conductors, a battery, a ringer relay for use in signaling the called subscriber, means by which said ringer is adapted to switch one of said line conductors from one pole of said battery to the other, a plurality of lines, and means in said switch for automatically selecting an idle line.

335. In a telephone system, a plurality of lines any one of which will serve the purpose of a calling subscriber, means including an automatic switch for automatically selecting an idle line for the calling subscriber, and means controlled at said automatic switch for supplying talking current to a subscriber's substation.

336. In a telephone system, a plurality of lines, automatic means for selecting a group of said lines and for connecting with the first idle line in the selected group, a common battery, and automatic means for closing connection through said automatic means for selecting to supply talking current to a subscriber's station.

337. In a telephone system, a common battery automatic connector having provisions for selecting the first idle one of a number of lines common to a single subscriber, and having means for feeding talking current to any called line thus automatically selected, as set forth.

338. In a telephone system, an automatic connector having provisions for automatically selecting the first idle one of a number of lines common to a single subscriber, in combination with automatic means for trunking a calling subscriber into connection with said connector, and means for supplying talking current through the said connector to any called line thus automatically selected.

339. In a telephone exchange system, the combination with telephone lines, of a plurality of connecting circuits, a pair of automatically operated connection switches for each said connecting circuit adapted to be controlled over a calling line, all of said telephone lines being normally associated with one of said connecting circuits, and means operated during the use of said connecting circuit by one of said lines in calling for transferring the remaining lines into association with another connecting circuit.

340. In a telephone exchange system, the combination with telephone lines, of a plurality of connecting circuits, a pair of automatic connection switches associated with each said connecting circuit and adapted to unite a pair of said lines, electromagnetic apparatus controlled over a calling line for operating said switches, all of said lines being normally associated with the first said connecting circuit, and a switching device actuated when said first connecting circuit is taken for use by one of said lines for transferring the remaining lines into association with the next said connecting circuit.

341. In a telephone exchange system, the combination with telephone lines, a plurality of automatic selector switches, any idle one of which may be used by a calling line, an automatic line finder associated with each said selector switch, means controlled by any line calling for operating an idle line finder to make connection with such calling line, circuits established by said idle line finder to bring its associated selector switch into operative relation to said calling line, a sender device at the substation of each line, and means controlled thereby for operating said selector over said circuits established by the line finder.

342. In a telephone exchange system, the combination with telephone lines, of a plurality of connecting circuits, a pair of automatic switches for each said connecting circuit adapted to unite two of said lines, electromagnetic apparatus controlled over a calling line for operating said switches, a plurality of said lines being normally associated with the first said connecting circuit for calling, and a switching device actuated when said first connecting circuit is taken for use by one of such lines in calling to transfer the remainder of said plurality of lines into association with the next said connecting circuit.

343. In a telephone exchange system, the combination with telephone lines, of a plurality of connecting circuits, a pair of automatic switches for each said connecting circuit adapted to unite two of said lines, electromagnetic apparatus controlled over a calling line for operating said switches, a plurality of said lines being normally associated with the first of a group of said connecting circuits for calling, and a switching device actuated when such connecting circuit is taken for use by one of such lines in calling to transfer the remainder of such plurality of lines to the next connecting circuit of such group.

344. In a telephone exchange system, the combination with telephone lines, of incoming and outgoing terminals for said lines, a plurality of connecting circuits, each adapted to interconnect any two of said lines, switches associated with said incoming terminals for uniting each connecting circuit with the incoming terminals of a calling line, automatic selector switches associated with said outgoing terminals for uniting each connecting circuit with a called line, means for selecting an idle connecting circuit for the use of a calling line, and a sender device adapted to control any one of said selector switches over said idle connecting circuit.

345. In a telephone exchange system, the combination with telephone lines, of a plurality of connecting circuits each adapted to serve any one of said lines in calling, automatic switching apparatus adapted to unite the calling line with the first idle one of said connecting circuits, an automatic selector switch associated with each said connecting circuit, and a sender device adapted to control each said selector switch over its associated connecting circuit.

346. In a telephone exchange system, the combination with telephone lines, of a plurality of connecting circuits each adapted to serve any one of said lines in calling, a plurality of said lines being normally associated with one of said connecting circuits, means operated when such connecting circuit is taken for use by one of said lines in calling to transfer the remainder of said lines into association with another of said connecting circuits, an automatic selector switch associated with each said connecting circuit, and a sender device adapted to control each said selector switch over its associated connecting circuit.

347. In a telephone exchange system, the combination with telephone lines and their terminals, of a plurality of selector switches, switching apparatus adapted to select the terminals of a calling line to connect such line with an idle one of said selector switches, and a sender device adapted to control such selector switch over the circuit established by said switching apparatus.

348. In a telephone exchange system, the combination with telephone lines, of a plurality of connecting circuits each adapted to interconnect any two of said lines, means operated when any one of said connecting circuits is taken for use by one of said lines to prevent its seizure by any other line, an automatic selector switch associated with each said connecting circuit, and a sender device adapted to control each said selector switch over its associated connecting circuit.

349. In a telephone exchange system, the combination with telephone lines, of a plurality of connecting circuits adapted to interconnect said lines, automatic switching apparatus associated with a plurality of said connecting circuits operated by any one of said lines in calling to unite the calling line with one of said connecting circuits, an automatic selector switch associated with each said connecting circuit, and a sender device adapted to control said selector switch over a circuit established by said automatic switching apparatus.

350. In a telephone exchange system, the combination with telephone lines, of a plurality of connecting circuits, a plurality of said connecting circuits being individual to a group of said lines for calling, each of said group of lines being normally associated with one of said connecting circuits for calling, automatic switching apparatus associated with each said connecting circuit for uniting said connecting circuit with a called line, and automatic switching apparatus interposed between said connecting circuits and calling lines adapted to unite the first idle connecting circuit with a calling line.

351. In a telephone exchange system, the combination with telephone lines, of a plurality of connecting circuits, automatic switching apparatus associated with each said connecting circuit for uniting said connecting circuit with a called line, a plurality of said connecting circuits being individual to a group of said lines for calling, all of said group of lines being normally associated with one of said connecting circuits for calling, automatic switching apparatus adapted to unite the first line calling with the connecting circuit to which said group of lines is normally associated, and means for transferring the remainder of said group of lines into direct association with the next connecting circuit individual to said group.

352. In a telephone exchange system, the combination with telephone lines, of a plurality of connecting circuits, automatic switching apparatus associated with each said connecting circuit and adapted to be controlled thereover for uniting said connecting circuit with a called line, line switching apparatus for uniting said connecting circuits with calling lines, a plurality of said lines being normally associated with one of said connecting circuits for calling, and means operated upon the taking for use of said connecting circuit for associating said plurality of lines with another of said connecting circuits.

353. In a telephone exchange system, the combination with telephone lines, of a plurality of connecting circuits, automatic switching apparatus adapted to unite one of said connecting circuits with a called line, a line switching device individual to each said connecting circuit adapted to unite said connecting circuit with any one of said lines in calling, and a sender device adapted to control said automatic switching apparatus over said connecting circuit.

354. In a telephone exchange system, the combination with telephone lines, of a plurality of connecting circuits, automatic switching apparatus adapted to unite one of said connecting circuits with a called line, line switching mechanism individual to each said connecting circuit adapted to unite said connecting circuit with any one of said telephone lines in calling, and a sender device temporarily associated with said connecting circuit and operating through connections made by said line switching mechanism for controlling said automatic switching apparatus.

355. In a telephone exchange system, the combination with telephone lines, of a plurality of connecting circuits, an automatic selector switch associated with each said connecting circuit, an automatic line finder associated with each said connecting circuit, means controlled by any line in calling for operating the first idle line finder to unite its associated connecting circuit to such calling line, circuits established by said line finder to bring said selector switch into operative relation to said calling line, a sender device at the substation of each line adapted for controlling said associated selector over said connecting circuit.

356. In a telephone exchange system, the combination with a plurality of telephone lines, of incoming and outgoing terminals for said lines, a plurality of connecting circuits, line finder apparatus associated with the incoming terminals of said lines for uniting a connecting circuit with a calling line, automatic switching apparatus associated with the outgoing terminals of said lines adapted to unite said connecting circuit with a called line, and a sender device adapted to control said automatic switching apparatus over said connecting circuit.

357. In a telephone exchange system, the combination with a plurality of telephone lines, of incoming and outgoing terminals for said lines, a plurality of connecting circuits, a line finder device associated with the incoming terminals of said lines and controlled from a calling station for uniting one of said connecting circuits with a calling line, an automatic selector switch associated with said outgoing terminals for uniting said connecting circuit with the called line, and a sender device adapted to control said selector switch over said connecting circuit.

358. In a telephone exchange system, the combination with a plurality of telephone lines, of incoming and multiple terminals for said lines, a plurality of connecting circuits, of a line finder device for each connecting circuit associated with said incoming terminals and adapted to be controlled from a calling station for uniting an idle one of said connecting circuits with a calling line, an automatic selector switch associated with said multiple terminals for uniting such connecting circuit with a called line and a sender device adapted to be temporarily associated with said selector switch for controlling said switch over said connecting circuit.

359. In a telephone exchange system, the combination with telephone lines, of a plurality of connecting circuits, a pair of automatically operated connection switches for each said connecting circuit adapted to be controlled over a calling line, a plurality of said telephone lines being normally associated with one of said connecting circuits for calling, and means operated during the use of said connecting circuit by one of said plurality of lines in calling for transferring the remainder of said plurality of lines into association with another connecting circuit.

360. In a telephone exchange system, the combination with telephone lines, of a plurality of connecting circuits, a pair of automatic switches for each said connecting circuit adapted to unite two of said lines, electromagnetic apparatus controlled over a calling line for operating said switches, a plurality of said lines being normally associated with the first of a group of said connecting circuits for calling, and means operated during the use of such connecting circuit by one of said plurality of lines in calling for transferring the remainder of such plurality of lines into association with the second connecting circuit of said group.

361. In a telephone exchange system, the combination with a calling and a called telephone line, of a connecting circuit, switching apparatus for uniting said connecting circuit with said calling line, an automatic selector switch controlled over said calling line to select said called line, and a circuit automatically established upon the completion of the operation of said selector switch and controlled over said calling line to test said called line.

362. An exchange system comprising telephone lines, switching mechanisms to a plurality of which each of the lines is connected, each switching mechanism including a plurality of sets of fixed contacts and a set of movable contacts adapted in its travel to successively engage the sets of fixed contacts, starting means associated with each switching mechanism, and means individual to each line adapted to control the starting means of any one of the switching mechanisms to which the line is connected.

363. In an exchange system, the combination with a plurality of connecting circuits and a group of lines, of a plurality of line finders associated therewith each forming the terminal of a connecting circuit, controlling apparatus adapted when actuated to change the electrical condition of a line and to cause one of said line finders to extend the circuit of that line to a connecting circuit, and automatic means for again changing the electrical condition of said line when the line finder makes connection therewith, whereby other line finders are prevented from making connection with that line.

364. In an exchange system, the combination with a plurality of connecting circuits and a group of lines, of a plurality of line finders associated therewith each forming the terminal of a connecting circuit, controlling apparatus at the substation of each line adapted when said line is calling to change the electrical condition thereof and to cause one of said line finders to extend the circuit of the calling line to a connecting circuit, and automatic means for again changing electrical condition of the line calling when said line finder makes connection therewith, whereby other line finders are prevented from making connection with that line.

365. In an exchange system, the combination with a plurality of finder switches, each provided with stationary terminals and movable terminals, of a plurality of lines multiplied to the stationary terminals of said switches, switching apparatus adapted when actuated to change the electrical condition of the stationary terminal of a line on each of said finder switches, means operated upon the actuation of said switching mechanism for causing the movable terminal of a finder switch to traverse the stationary terminals thereof, and means responsive to the changed electrical condition of the line terminal when connection is made therewith, adapted to again change the electrical condition of the stationary terminals of said line on each of said switches whereby other finder switches are prevented from making connection with that line.

366. In an exchange system, the combination with a plurality of finder switches, each provided with stationary and movable terminals, of a plurality of lines multiplied to the stationary terminals of said switches, switching apparatus adapted to change the electrical condition of the stationary terminal of a line at each of said finder switches, means operated by said switching apparatus when actuated to cause the movable terminals of a finder switch to traverse the stationary terminals thereof, and means associated with the finder switch adapted when connection is made with said stationary terminal to again change the electrical condition of the stationary terminals of said line on each of said switches whereby other finder switches are prevented from making connection with said line.

367. In a telephone exchange system, the combination with a group of subscribers' lines, of a plurality of connecting circuits therefor, automatic transfer mechanism adapted to maintain an idle connecting circuit in operative relation to the group, and automatic progressively traveling switching apparatus adapted when a subscriber is calling to extend the circuit of his line to said idle connecting circuit.

368. In an exchange system, the combination with a group of lines, of a plurality of connecting circuits therefor, controlling apparatus associated with said lines, automatic transfer mechanism adapted to maintain an idle connecting circuit in operative relation to the group, and automatic progressively traveling switching apparatus adapted upon the actuation of the controlling apparatus of any line to extend the circuit thereof to said connecting circuit.

369. In a telephone exchange system, the combination with a group of subscribers' lines, of a plurality of connecting circuits therefor less in number than the lines, automatic transfer mechanism adapted to maintain an idle connecting circuit in operative relation to the group, and automatic progressively traveling switching apparatus adapted when a subscriber is calling to extend the circuit of his line to said connecting circuit.

370. In an exchange system, the combination with a group of lines, of a plurality of connecting circuits therefor, controlling apparatus associated with said lines, automatic transfer mechanism adapted to shift the connecting circuits one after another into operative relation to said group, and automatic progressively traveling switching apparatus adapted upon the actuation of the controlling apparatus of any line to extend the circuit thereof to the connecting circuit then in operative relation to the roup.

371. In an exchange system, the combination with a group of lines, of a plurality of connecting circuits therefor, controlling apparatus associated with said lines, automatic progressively traveling switching apparatus associated with said connecting circuits and adapted upon the actuation of the controlling apparatus of any line to extend the circuit thereof to an idle connecting circuit, and means operating thereupon to transfer the remaining lines of the group into operative relation to another idle connecting circuit.

372. In an exchange system, the combination with a group of lines, of a plurality of connecting circuits therefor, an idle one of said connecting circuits being normally in operative relation to said group, controlling apparatus for said lines, automatic progressively traveling switching mechanism adapted upon the actuation of the controlling apparatus of any line to extend the circuit thereof to said idle connecting circuit, and means operating under the control of said automatic progressively traveling switching mechanism to transfer the remaining lines of the group into operative relation to another idle connecting circuit.

373. In a telephone exchange system, the combination with a group of telephone lines, of a plurality of connecting circuits, therefor, an idle one of said connecting circuits being normally in operative relation to said group, calling mechanism at the substations of said lines, automatic progressively traveling switching apparatus adapted when a subscriber is calling to extend the circuit of his line to said idle connecting circuit, and means actuated upon the operation of said switching apparatus to transfer the remaining lines of the group into operative relation to another idle connecting circuit.

374. The combination with telephone lines, of selectors at a central office, an automatic finder associated with each selector, means controlled by any line in calling for operating said finder to make connection with such calling line, circuits established by said finder bringing said selector under the direct control of said calling line, a controlling switch at the substation of each line, and means controlled thereby for operating said selector through the agency of the circuits established by said finder.

375. In a telephone call distributing system, the combination with a plurality of telephone lines each extending to a connection terminal at a central office, of a plurality of automatic finder switches to which said lines are multiplied, a plurality of connecting circuits to a particular one of which each of said finder switches is adapted to extend the connection of any of the aforesaid lines, a terminal for each of said connecting circuits wherewith connection may be completed with any of the aforesaid lines at the connection terminal thereof, mechanism adapted to cause the movement of said finder switches, actuating means for said mechanism controlled in initiating a call in any of the aforesaid lines, and means adapted to arrest the movement of the finder switch to complete connection with the calling line.

376. A normally at rest switching apparatus comprising a plurality of switches, each provided with electro-magnetically-actuated propelling means, and a switch-operating machine common to all of said switches, said machine including automatic means for opening and closing electrical connection with the said propelling means of the different switches, one at a time, whereby said machine may be employed for operating any switch without interfering with its subsequent use for operating other switches while the said operated switch remains in use.

377. An automatic telephone system comprising a plurality of subscribers' lines, a plurality of switches less in number than the total number of said subscribers, trunk lines leading from said switches, and a normally at rest switch-operating machine common to all of said switches and under the control of the subscribers, whereby any one of said subscribers may cause one of said switches to connect one of said trunk-lines with his line before calling the number of any other subscriber.

378. In a telephone system, calling and called subscribers' lines, means for establishing connection between said lines comprising a coupling link, said coupling link consisting of a line finder for finding the calling line, and a trunk finder for finding an idle trunk in the direction of the called line.

379. A telephone system comprising trunks, telephone lines to be connected with said trunks, switching means for so doing, a trunk-selecting mechanism, an electrical impulse-transmitting mechanism associated with said selecting mechanism, and subscriber-controlled automatic means for causing the impulses received by said switching means from said transmitting mechanism to always correspond to the number of the calling telephone line, said switching means provided with means for causing said selecting mechanism to select the next idle trunk-line each time the previously selected trunk-line is put in connection with a calling telephone line, whereby each calling subscriber always gets the idle trunk-line automatically selected by the previous call.

380. A telephone system provided with trunks, and automatic trunk-selecting and connecting apparatus by which each calling subscriber selects a trunk for the next call.

381. In a telephone system, the combination of a plurality of switches, trunk-lines leading from said switches, telephone lines, automatic trunk-selecting mechanism adapted to distinguish between idle and busy trunk-lines, automatic means by which said selecting mechanism maintains all idle telephone lines in selective relation to the first idle trunk-line next in order after the one last in use, a switch-operating mechanism common to all of said switches, adapted for use by calling subscribers in operating said switches, each said switch provided with a multiple terminal of each of said telephone lines.

382. In a telephone system, an automatic electrical impulse-transmitter provided with a series of contacts, a wiper for engaging said contacts, means for moving the wiper over all of the contacts each time any subscriber calls, means for automatically cutting out one or more of said contacts to vary the number of impulses for the different subscribers, means by which calling subscribers initiate the operation of said transmitter, and means responsive to said impulses for finding the calling subscribers.

383. In an automatic telephone system, the combination with the subscribers' lines divided in groups, of a plurality of preselectors and first-selectors for each line group, each preselector comprising line contacts connected to the subscribers' lines of the group, a traveling contact device and means for moving said contact device to cause it to make contact with the line contacts, each first-selector comprising line contacts, a traveling contact device in electrical communication with the traveling contact device of one of the preselectors, and means for moving this traveling contact to its line contacts, trunk lines connected in multiple to the line contacts of the first-selectors, an auxiliary switch common to a plurality of preselectors, coupled for a call with one of said preselectors and working simultaneously with the same, and means connected with the trunk lines and arranged to make the final connection over the selected trunk line to the desired subscriber.

384. In an automatic telephone system, the combination with the subscribers' lines divided in groups, and for each line group a plurality of pairs of switches, each pair comprising a preselector and a first-selector, each preselector and first-selector comprising line contacts, a traveling contact device coacting with the individual line contacts and means for moving the traveling contact device, the traveling contact device of each preselector being in electrical communication with the traveling contact device its companion first-selector, an auxiliary switch common to a plurality of preselectors, coupled for a call with one of said preselectors and working simultaneously with the same, the line contacts of the preselectors being connected to the respective subscribers' lines of the group, of trunk lines divided in sets and connected in multiple to the line contacts of the first-selectors, and means arranged to make the final connection to the desired subscriber.

385. In an automatic telephone system, the combination with the subscribers' lines divided in groups, of a plurality of pairs of switches for each line group, each pair comprising a preselector and corresponding first-selector, each preselector and first-selector comprising line contacts, a traveling contact device and means for moving the traveling contact device into engagement with the single line contacts, the traveling contact device of each preselector being in electrical communication with that of its companion first-selector, the line contacts of the preselector being connected to the corresponding subscribers' lines, trunk lines connected to the line contacts of the first-selectors, an auxiliary switch common to a plurality of preselectors, coupled for a call with one of said preselectors and working simultaneously with the same, a subscriber's calling relay arranged to set in action said auxiliary switch and the means for moving the traveling contact device of an idle preselector, and to stop the said preselector upon the arrival of its traveling contact device at the contacts of the calling subscriber's line, and means at the calling station for controlling the traveling contact device of the corresponding first-selector.

386. In an automatic telephone system, the combination with the subscribers' lines divided in groups, of a plurality of switches for each line group, said switches being arranged in pairs, each pair comprising a preselector and a first-selector, each preselector and its first-selector comprising line contacts, a traveling contact device arranged to engage said line contacts, the traveling contact device of each preselector being in electrical communication with that of the corresponding first-selector, the line contacts of each preselector being connected to the corresponding subscribers' lines, trunk lines connected to the line contacts of the first-selector, means for moving said traveling contact devices, an auxiliary switch common to a plurality of preselectors, coupled for a call with one of said preselectors and working simultaneously with the same, a subscriber's calling relay arranged to set in action the means for moving the traveling contact device of a preselector, a cut-off relay arranged to cut out the calling subscriber's calling relay when the preselector is set on the calling line, means at the calling station for controlling the traveling contact device of the first-selector, and means operated over the selected trunk line for making the final connection to the desired subscriber.

387. In an automatic telephone system, the combination with the subscribers' lines divided in groups, of a plurality of switches for each line group, said switches being arranged in pairs, each pair comprising a preselector and a corresponding first-selector, each preselector and its first-selector comprising line contacts, a traveling contact device arranged to engage said line contacts, the traveling contact device of each preselector being in electrical communication with that of the corresponding first-selector, the line contacts of each preselector being connected to the corresponding subscribers' lines, trunk lines connected to the line contacts of the first-selectors, an auxiliary switch common to a plurality of preselectors, coupled for a call with one of said preselectors and working simultaneously with the same, means for moving said traveling contact devices, a subscriber's calling relay arranged to set in action said auxiliary switch and the means for moving the traveling contact device of a preselector, a cut-off relay arranged to cut out the called subscriber's calling relay, means actuated at the calling station for controlling the traveling contact device of the first-selector, and means operated over the selected trunk line for making the final connection to the desired line.

388. In an automatic telephone system, the combination with the subscribers' lines divided in groups, of a plurality of preselectors and first-selectors for each line group, each comprising line contacts, a traveling contact device arranged to engage its line contacts, and means for moving the traveling contact device, the traveling contact device of each preselector being in electrical communication with that of one of the first-selectors, the contacts of the preselectors being connected to the corresponding subscribers' lines, trunk lines connected in multiple to the first-selectors, an auxiliary switch common to a plurality of preselectors; coupled for a call with one of said preselectors and arranged to stop its traveling contact device on the contacts of the calling subscriber's line, a preselector finder controlled by the preselectors and arranged to couple an idle preselector for the next call with said auxiliary switch, means actuated at the calling station for moving the traveling contact device of the first-selector, and means operated over said trunk lines for making the final connection between subscribers' lines.

389. In an automatic telephone system, the combination with the subscribers' lines divided in groups, a plurality of preselectors and selectors arranged in pairs, and a plurality of connectors for each line group, each preselector, selector and connector comprising line contacts, a traveling contact device and means for moving its traveling contact device into engagement with its line contacts, the traveling contact device of each preselector being in electric communication with the traveling contact of its corresponding selector, an auxiliary switch common to a plurality of preselectors, coupled for a call with one of said preselectors, and working simultaneously with the same, the subscribers' lines of the group being connected in multiple as incoming lines to the line contacts of the preselectors and as outgoing lines to the line contacts of the connectors, a system of trunk lines divided in sets and each connected in multiple to the respective line contacts of the selectors and to the traveling contact device of a corresponding connector, means for the automatic working of the preselectors to set the traveling contact device of an idle preselector on a calling line, and means at the subscribers' stations to start an idle preselector and for actuating and controlling its corresponding selector and a connector of the desired subscriber's line group.

390. In an automatic telephone system, the combination with the subscribers' lines divided in groups, of a plurality of preselectors and first-selectors for each line group, each comprising line contacts, a traveling contact device arranged to engage its line contacts, and means for moving the traveling contact device, the traveling contact device of each preselector being in electrical communication with that of one of the first-selectors, the contacts of the preselectors being connected to the corresponding subscribers' lines, trunk lines connected in multiple to the first-selectors, an auxiliary switch common to a plurality of preselectors, coupled for a call with one of said preselectors and arranged to stop its traveling contact device on the contacts of the calling subscriber's line, switching apparatus controlled by the preselectors and arranged to bring the next idle preselector into the sphere of control of the said auxiliary switch, means actuated at the calling station for moving the traveling contact device of the first-selector, and means operated over said trunk lines for making the final connection between subscribers' lines.

391. In a telephone system, a line, a relay for said line, an automatic progressively movable switch for finding said line, means for operating said switch controlled by said line relay, and a cut-off relay for rendering said line relay inoperative when the line is found.

392. In a telephone system, a called line, a relay for said line, a progressively movable switch mechanism controlled by said relay, said mechanism operated only when said line is used as a calling line, and means for automatically rendering said relay inoperative when the line is called.

393. A telephone system including a subscriber's line, selective switches adapted to select said line, a line relay normally operatively associated with said line, a distributer switch sensitive to said relay having a movable contact, contacts therefor adapted to be engaged by said movable contact when the distributer switch is operated, circuit connections to said contacts from mechanisms of said selective switches, each contact being connected to mechanism pertaining to a particular switch, and means for altering the electrical condition of a contact pertaining to an idle selective switch when engaged by said movable contact to start the idle switch.

394. In a telephone system, a plurality of subscribers' lines, means for trunking from said lines comprising a plurality of switching trunks less in number than the lines, means for connecting any one of said lines with any one of said trunks, said means comprising a plurality of automatic progressively movable switches arranged in sets, a trunk line normally connecting the switches in each set, each set having terminals of the lines and of the switching trunks, and a subscriber's line relay for controlling one of the switches in a set.

395. In a telephone system, a plurality of subscribers' lines, means for trunking from said lines comprising a plurality of switching trunks less in number than the lines, means for connecting any one of said lines with any one of said trunks, said means comprising a plurality of automatic progressively movable switches arranged in sets, a trunk line normally connecting the switches in each set, each set having terminals of the lines and of the switching trunks, and a subscriber's line relay for controlling one of the switches in a set to make the other switch of a set responsive to extend a connection to one of the switching trunks.

396. In a telephone system, a plurality of subscribers' lines, means for trunking from said lines comprising a plurality of switching trunks less in number than the lines, means for connecting any one of said lines with any one of said trunks, said means comprising a plurality of automatic progressively movable switches arranged in sets, a trunk line normally connecting the switches in each set, each set having terminals of the lines and of the switching trunks, a subscriber's line relay for controlling one of the switches in a set to make the other switch of a set responsive to extend a connection to one of the switching trunks, and a centralized battery for all trunking purposes.

397. In an automatic telephone system, the combination with a plurailty of normally open instrument circuits each having multiple terminals arranged in different switch banks, and wipers coöperating with each bank and normally inoperative mechanism for driving the wipers of each switch adapted to be actuated by the closing of an instrument circuit to advance their wipers and arrest them in engagement with the terminals of said closed circuit, of a starter-switch mechanism associated with the several switches which is actuated simultaneously with the actuation of each switch to render said switch unresponsive upon the closing of any other instrument circuit, said starter-switch then rendering another switch responsive thereto.

398. In an automatic telephone exchange system, a plurality of subscribers' lines, a number of automatic selector switches less than the number of lines, and adapted to connect with the lines wanted, finder or answering switches arranged in groups, each group having the terminals of a definite group of subscribers' lines, a starter switch for the group of finder switches which renders a finder switch after it has been actuated by one subscriber's line unresponsive to current impulses on any other line and cuts in another finder switch to render it responsive to such impulses.

399. In an automatic telephone system, the combination with a plurality of instrument circuits, a plurality of selector switches less in number than the number of instrument circuits and a plurality of finder switches, one for each selector switch, each finder switch having a multiple terminal for each instrument-circuit, and electromagnetic mechanism for operating the finder switches, of a starter switch controlling circuits of said operating mechanisms, and means associated with each instrument circuit and controlled thereby to actuate the finder and starter switches so as to place said finder switches successively in condition to be operated in response to successive calls despatched over different instrument circuits.

400. In an automatic telephone exchange system, the combination with a plurality of normally open instrument circuits, a finder switch mechanism comprising terminals for said circuits, contact elements coöperating therewith, electromagnetic devices, including a starter wire, actuated when an instrument circuit is closed to cause the elements to traverse the terminals until engaging the terminals of the closed instrument circuit, and a source of current supply for the circuits.

401. A telephone system comprising telephone lines, connecting apparatus, line selectors for selecting the calling lines, less in number than said lines, other selectors, one associated with each line selector for selecting the idle connecting apparatus, control apparatus adapted to start a single line selector for each call initiated over said lines, a common conductor for said control apparatus having branches one for each line, and apparatus for each line for changing the electrical condition of said common conductor to operate said control apparatus.

402. A telephone exchange system comprising a plurality of telephone lines, a plurality of associated link-circuits, automatic switching means for extending the circuit of an idle one of said link circuits to include a calling one of said telephone lines, electrically controlled master switch mechanism common to a plurality of said link circuits and responsive to a control exercised over a circuit including said calling telephone line to select an idle one of said link circuits and to actuate said switching means to establish connection between it and said calling telephone line, and means for extending the circuit of the selected line circuit to a desired called telephone line.

403. In a telephone exchange system, a plurality of line-circuits and connective means therefor, with intermediate selector mechanism adapted to place a calling line in connection with the connective means and comprising the following instrumentalities: a primary selector switch to pick out the calling line, a secondary selector switch connected to the primary switch to pick out an idle connective means, a relay responsive to current in a calling line and adapted to control the primary selector switch so as to connect it to the line, controlling means for the secondary selector switch normally disabling the same but acting upon the operation of the primary selector switch to render the secondary selector operative, and means associated with each connective means to operate the secondary selector when idle, substantially as described, 404. A telephone exchange system comprising subscribers' lines, groups of trunk lines terminating in corresponding groups of waiting contacts, a link circuit, means for automatically connecting said link circuit with any calling line, a traveling terminal for said link circuit, automatic mechanism directively controlled for moving said terminal to a group of waiting contacts corresponding to an elected group of trunk lines and automatically controlled for connecting said traveling terminal with a waiting contact corresponding to a trunk line in the elected group, and means for connecting said trunk line to the line of a called subscriber.

405. A telephone exchange system comprising a group of subscribers' lines, a lesser group of link circuits adapted for simultaneous independent association therewith, groups of trunk lines terminating in corresponding groups of waiting contacts, means for automatically connecting any link circuit with any calling line, a traveling terminal for each link circuit, automatic mechanism directively controlled for moving any traveling terminal to a group of waiting contacts corresponding to an elected group of trunk lines and automatically controlled for connecting said traveling terminal with a waiting contact corresponding to a trunk line in the elected group, means for connecting said trunk line to the line of a called subscriber, and means for preventing the association of a second link circuit with said trunk line during said engagement.

406. A telephone exchange system comprising groups of subscribers' lines, lesser groups of link circuits for said line groups, groups of trunk lines corresponding to said line groups and terminating in corresponding groups of waiting contacts, means for automatically connecting any link circuit with any calling line of a related line group, a traveling terminal for each link circuit, automatic mechanism directively controlled for moving any traveling terminal to a group of waiting contacts corresponding to an elected group of trunk lines and automatically controlled for connecting said traveling terminal with a waiting contact corresponding to an idle trunk line in the elected group, and means for connecting said idle trunk line to the line of a called subscriber in the corresponding line group.

407. A telephone exchange system comprising subscribers' lines, groups of trunk lines terminating in corresponding groups of waiting contacts, a link circuit, switching means coupled to one end of said link circuit for connecting with a calling line, a traveling terminal coupled to the other end of said link circuit, automatic mechanism directively controlled for moving said terminal to a group of waiting contacts corresponding to an elected group of trunk lines and automatically controlled for connecting said traveling terminal with a waiting contact corresponding to a trunk line in the elected groups, and means for connecting said trunk line to the line of a called subscriber.

408. A telephone exchange system comprising a group of subscribers' lines, a lesser group of link circuits adapted for simultaneous independent association therewith, groups of trunk lines terminating in corresponding groups of waiting contacts, switching means coupled to one end of each link circuit for connecting with any calling line, a traveling terminal coupled to the other end of each link circuit, automatic mechanism directively controlled for moving any traveling terminal to a group of waiting contacts corresponding to an elected group of trunk lines and automatically controlled for connecting said traveling terminal with a waiting contact corresponding to a trunk line in the elected group, means for connecting said trunk line to the line of a called subscriber, and means for preventing the association of a second link circuit with said trunk line during said engagement.

409. A telephone exchange system comprising groups of subscribers' lines, lesser groups of link circuits for said line groups, groups of trunk lines corresponding to said line groups and terminating in corresponding groups of waiting contacts, switching means coupled to one end of each link circuit for connecting with any calling line of a related line group, a traveling terminal coupled to the other end of each link circuit, automatic mechanism directively controlled for moving any traveling terminal to a group of waiting contacts corresponding to an elected group of trunk lines and automatically controlled for connecting said traveling terminal with a waiting contact corresponding to an idle trunk line in the elected group, and means for connecting said idle trunk line to the line of a called subscriber in the coresponding line group.

410. A telephone exchange system comprising telephone lines terminating in waiting contacts, other telephone lines terminating in groups of waiting contacts, a link circuit provided with a traveling terminal at each of its two extremities, automatic switching mechanism for connecting said link circuit to any one of said first mentioned telephone lines by moving one of said traveling terminals to engagement with the contact corresponding to such line, and automatic switching mechanism for connecting said link circuit to any one of said other telephone lines comprising means primarily adjusted for advancing the other of said traveling terminals to the group of contacts and secondarily adjusted for connecting said terminal with the contact in the group corresponding to such other telephone line.

411. A telephone exchange system comprising telephone lines terminating in waiting contacts, other telephone lines terminating in groups of waiting contacts, a group of link circuits each provided with a traveling terminal at each of its two extremities, means for isolating an idle one of said link circuits, automatic switching mechanism for connecting the isolated link circuit to any one of said first mentioned telephone lines by moving one of its traveling terminals to engagement with the contact corresponding to such line, automatic switching mechanism for connecting said isolated link circuit to any one of said other telephone lines comprising means primarily adjusted for advancing the other of its traveling terminals to the group of contacts and secondarily adjusted for connecting said terminal with the contact in the group corresponding to such other telephone line, and means to prevent the connection of a second link circuit of said group with the so-connected telephone line.

412. A telephone exchange system comprising a group of subscribers' lines arranged in sub-groups, groups of waiting contacts corresponding to said sub-groups, a link circuit having a traveling terminal, automatic switching mechanism for connecting said link circuit to a calling line in any sub-group comprising means primarily adjusted for advancing said traveling terminal to the group of contacts corresponding to the sub-group and secondarily adjusted for connecting said terminal with the contact in said group corresponding to said calling line, and means for connecting said link circuit to a wanted line.

413. A telephone exchange system comprising a group of subscribers' lines arranged in sub-groups, groups of waiting contacts corresponding to said sub-groups, a link circuit having a traveling terminal, automatic switching mechanism actuated responsive to the initiation of a call by a line in any sub-group for connecting said link circuit to said line comprising means primarily adjusted for advancing said traveling terminal to the group of contacts corresponding to the sub-groups and secondarily adjusted for connecting said terminal with the contact in said group corresponding to said calling line, and means for connecting said link circuit to a wanted line.

414. A telephone exchange system comprising a group of subscribers' lines arranged in sub-groups, groups of waiting contacts corresponding to said sub-groups, a group of link circuits each having a traveling terminal, means for isolating an idle one of said link circuits, automatic switching mechanism for connecting said isolated link circuit to a calling line in any sub-group comprising means primarily adjusted for advancing said traveling terminal to the group of contacts corresponding to the sub-group and secondarily adjusted for connecting said terminal with the contact in said group corresponding to said calling line; and means for preventing the connection of a second one of said link circuits to the connected calling line.

415. A telephone exchange system comprising telephone lines terminating in groups of waiting contacts, other telephone lines also terminating in groups of waiting contacts, a link circuit provided with a traveling terminal at each of its two extremities, automatic switching mechanism for connecting said link circuit to any one of said first mentioned telephone lines comprising means primarily adjusted for advancing one of said traveling terminals to the group of contacts and secondarily adjusted for connecting said terminal with the contact in the group corresponding to such line, and automatic switching mechanism for connecting said link circuit to any one of said other telephone lines by moving the other of said traveling terminals to the groups of contacts and connecting it with the contact in the group corresponding to such other telephone line.

416. A telephone exchange system comprising telephone lines terminating in groups of waiting contacts, other telephone lines also terminating in groups of waiting contacts, a group of link circuits each provided with a traveling terminal at each of its extremities, means for isolating an idle one of said link circuits, automatic switching mechanism for connecting the isolated link circuit to any one of said first mentioned telephone lines comprising means primarily adjusted for advancing one of its traveling terminals to the group of contacts and secondarily adjusted for connecting said terminal with the contact in the group corresponding to such line, automatic switching mechanism for connecting said isolated link circuit to any one of said other telephone lines comprising means primarily adjusted for advancing the other of its traveling terminals to the group of contacts and secondarily adjusted for connecting said other terminal with the contact in the group corresponding to such other telephone line, and means to prevent the connection of a second link circuit of said group with a so-connected telephone line.

417. A telephone exchange system comprising subscribers' lines, trunk lines, a link circuit for associating calling lines with said trunk lines, a traveling terminal at each end of said link circuit, groups of waiting contacts corresponding to said subscribers' lines, groups of waiting contacts corresponding to said trunk lines, means for connecting said trunk lines to wanted lines, automatic switching mechanism for connecting said link circuit to a calling line comprising means primarily adjusted for advancing one of said traveling terminals to the group of contacts and secondarily adjusted for connecting said terminal with the contact in the group corresponding to said calling line, and automatic switching mechanism comprising means primarily adjusted for advancing the other of said traveling terminals to an elected group of trunk line contacts and secondarily adjusted for connecting said other terminal with the contact of an idle trunk line in said elected group.

418. A telephone exchange system comprising a plurality of telephone circuits, a plurality of waiting contacts constituting terminals of said circuits, a coöperating traveling contact, means for advancing said traveling contact to a desired waiting contact, and directively controlled means common to a plurality of telephone lines electromagnetically adjusted to predetermine the contact to which said traveling terminal shall be advanced.

419. A telephone exchange system comprising groups of telephone circuits, groups of waiting contacts constituting terminals of said circuits, coöperating traveling contact, means for advancing said traveling contact to a desired group of waiting contacts, and directively controlled means common to a plurality of telephone lines electro-magnetically adjusted to predetermine the group to which said traveling terminal shall be advanced.

420. A self-acting telephone-exchange divided into exchange-sections, each exchange-section comprising more than two sub-sections, stationary and movable terminals at each sub-section, loop circuits of which said movable terminals form the terminal connectors, means at each exchange-section and under the control of the calling subscriber for selecting stationary terminals with which connection is desired, and means at each exchange-section for selecting movable terminals to be used in making these connections.

421. A self-acting telephone-exchange divided into exchange sections, each exchange-section comprising more than two sub-sections, stationary and movable terminals at each sub-section, loop circuits of which said movable terminals form the terminal connectors, automatic means at each exchange-section and under the control of the calling subscriber for selecting stationary terminals with which connection is desired, and automatic means at each exchange-section for selecting movable terminals to be used in making these connections.

422. A self-acting telephone-exchange divided into exchange-sections, each exchange-section consisting of sub-sections, stationary and movable terminals at each sub-section, loop circuits of which said movable terminals form the terminal connectors, means, within the control of subscribers, at each exchange-section, for selecting stationary terminals with which connection is desired, and means at each exchange-section for selecting movable terminals to be used in making these connections.

423. A self-acting-telephone-exchange divided into exchange-sections, each exchange-section consisting of sub-sections, stationary and movable terminals at each sub-section, loop circuits of which said movable terminals form the terminal connectors, automatic means, within the control of subscribers, at each exchange-section, for selecting stationary terminals with which connection is desired, and automatic means at each exchange-section for selecting movable terminals to be used in making these connections.

424. A self-acting telephone-exchange divided into exchange-sections, to each of which a group of subscribers is connected and each of which consists of sub-sections, stationary terminals for the exclusive use of calling subscribers at one sub-section, stationary terminals for the exclusive use of called subscribers at another sub-section, stationary terminals at an intermediate sub-section, movable terminals at each of the sub-sections for connection with the stationary terminals, means for selecting the stationary terminals with which connection is desired, and means for selecting the movable terminals to be used in making these connections.

425. A telephone-exchange formed of one or more exchange-sections, each exchange-section comprising a plurality of sub-sections upon which telephone lines terminate, loop circuits each having two terminal connectors and extending between one of the sub-sections and an intermediate sub-section of the same exchange-section and adapted to be connected with a telephone line to extend the circuit to said intermediate sub-section, trunk-lines extending between a second sub-section of the same or other exchange-sections and said intermediate sub-section and adapted to be connected with said telephone line to extend the circuit from said auxiliary sub-section to said second sub-section, and automatically operated means at each of the sub-sections for uniting a pair of telephone lines, one of the loop circuits and one of the trunk-lines.

Signed at New York, in the county of New York and State of New York, this 18th day of April, A. D. 1900.

JAMES H. LORIMER.

Witnesses:
DELBERT H. DECKER,
ETHEL L. LAWLER.

Signed at Piqua, in the county of Miami and State of Ohio, this 21st day of April, A. D. 1900.

GEORGE W. LORIMER.

Witnesses:
ALLEN L. MARSHALL,
N. D. NEILL.

Copies of this patent may be obtained for five cents each, by addressing the "Commissioner of Patents, Washington, D. C."